United States Patent
Khan et al.

(10) Patent No.: US 9,792,118 B2
(45) Date of Patent: Oct. 17, 2017

(54) VECTOR PROCESSING ENGINES (VPES) EMPLOYING A TAPPED-DELAY LINE(S) FOR PROVIDING PRECISION FILTER VECTOR PROCESSING OPERATIONS WITH REDUCED SAMPLE RE-FETCHING AND POWER CONSUMPTION, AND RELATED VECTOR PROCESSOR SYSTEMS AND METHODS

(71) Applicant: QUALCOMM Incorporated, San Diego, CA (US)

(72) Inventors: Raheel Khan, Tustin, CA (US); Fahad Ali Mujahid, Irvine, CA (US); Afshin Shiravi, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 998 days.

(21) Appl. No.: 14/082,075

(22) Filed: Nov. 15, 2013

(65) Prior Publication Data

US 2015/0143078 A1 May 21, 2015

(51) Int. Cl.
*G06F 9/30* (2006.01)
*G06F 15/80* (2006.01)
*G06F 9/38* (2006.01)

(52) U.S. Cl.
CPC ...... *G06F 9/30036* (2013.01); *G06F 9/30014* (2013.01); *G06F 9/3887* (2013.01); *G06F 9/3895* (2013.01); *G06F 15/8053* (2013.01)

(58) Field of Classification Search
CPC ............................. G06F 9/30; G06F 9/30036
See application file for complete search history.

(56) References Cited

U.S. PATENT DOCUMENTS 5,299,320 A * 3/1994 Aono .................. G06F 9/30036
712/2
5,563,817 A 10/1996 Ziegler, Jr. et al.
(Continued)

FOREIGN PATENT DOCUMENTS

| EP | 0466997 A1 | 1/1992 |
|---|---|---|
| GB | 2464292 A | 4/2010 |
| WO | 2009073787 A1 | 6/2009 |

OTHER PUBLICATIONS

Yu, J. etal., Vector Processing as a Soft-core CPU Accelerator, 2008, ACM, pp. 222-231.*

(Continued)

*Primary Examiner* — Eric Coleman
(74) *Attorney, Agent, or Firm* — Loza & Loza, LLP/Qualcomm

(57) ABSTRACT

Vector processing engines (VPEs) employing a tapped-delay line(s) for providing precision filter vector processing operations with reduced sample re-fetching and power consumption are disclosed. Related vector processor systems and methods are also disclosed. The VPEs are configured to provide filter vector processing operations. To minimize re-fetching of input vector data samples from memory to reduce power consumption, a tapped-delay line(s) is included in the data flow paths between a vector data file and execution units in the VPE. The tapped-delay line(s) is configured to receive and provide input vector data sample sets to execution units for performing filter vector processing operations. The tapped-delay line(s) is also configured to shift the input vector data sample set for filter delay taps and provide the shifted input vector data sample set to execution units, so the shifted input vector data sample set does not have to be re-fetched during filter vector processing operations.

30 Claims, 44 Drawing Sheets

(56) References Cited

U.S. PATENT DOCUMENTS

| | | | |
|---|---|---|---|
| 6,018,755 A * | 1/2000 | Gonikberg | H03H 17/06 708/303 |
| 6,119,048 A | 9/2000 | Kondo et al. | |
| 6,189,094 B1 | 2/2001 | Hinds et al. | |
| 7,756,196 B1 | 7/2010 | Despain et al. | |
| 7,782,252 B2 | 8/2010 | Kang | |
| 2003/0014457 A1 * | 1/2003 | Desai | G06F 7/57 708/520 |
| 2008/0225929 A1 | 9/2008 | Proctor et al. | |
| 2009/0248769 A1 | 10/2009 | Chua | |
| 2010/0272161 A1 | 10/2010 | Goldberg et al. | |
| 2011/0075720 A1 * | 3/2011 | Elenes | H04B 1/1081 375/232 |
| 2011/0182169 A1 | 7/2011 | Li | |
| 2012/0284487 A1 | 11/2012 | Saha et al. | |
| 2014/0280407 A1 | 9/2014 | Khan | |
| 2014/0280420 A1 | 9/2014 | Khan | |
| 2014/0281370 A1 | 9/2014 | Khan | |
| 2014/0365548 A1 * | 12/2014 | Mortensen | G06F 9/3001 708/523 |
| 2015/0143076 A1 | 5/2015 | Khan | |
| 2015/0143077 A1 | 5/2015 | Khan | |
| 2015/0143079 A1 | 5/2015 | Khan et al. | |
| 2015/0143085 A1 | 5/2015 | Khan et al. | |
| 2015/0143086 A1 | 5/2015 | Khan | |

OTHER PUBLICATIONS

Elhossini, Ahmed, etal., An FPGA Implementation of the LMS Adaptive Filter for Audio Processing, 2006, IEEE, 8 pages.*

Diefendorff, K,., etal., AltiVec Extension to PowerPC Accelerates Media Processing, 2000, IEEE, pp. 85-96.*

International Search Report and Written Opinion—PCT/US2014/065557—ISA/EPO—Feb. 24, 2015.

* cited by examiner

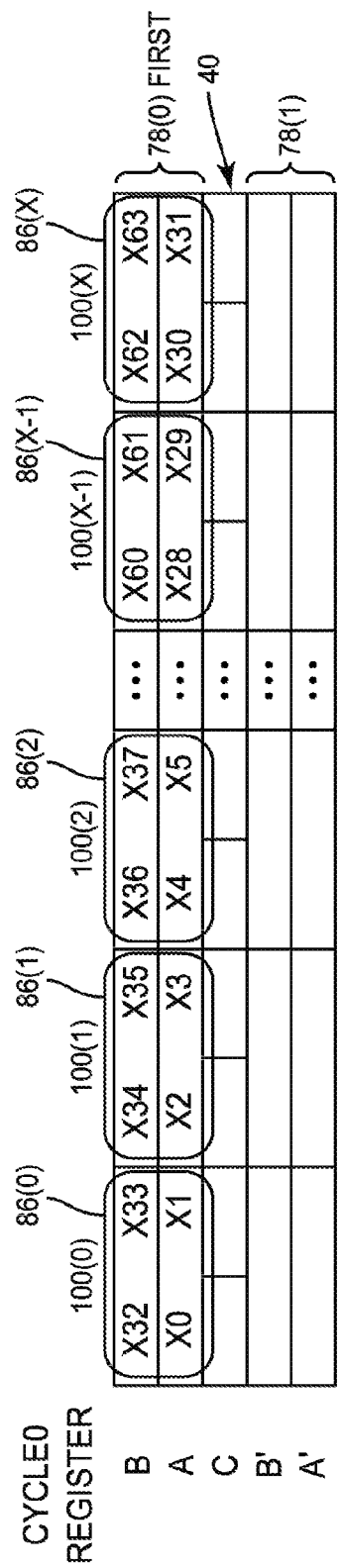
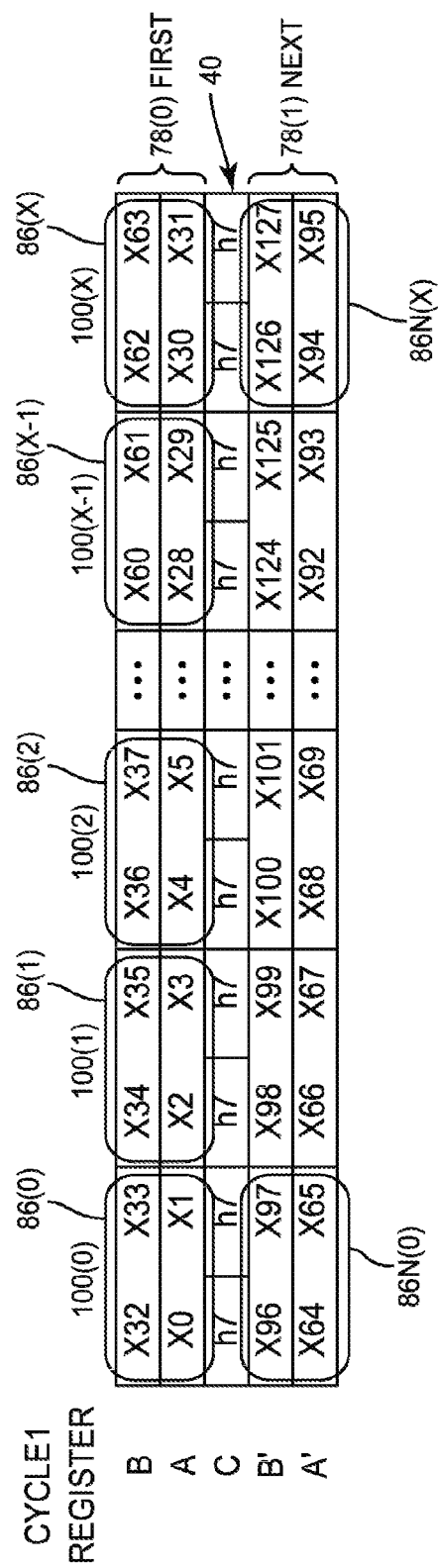
FIG. 9A
FIG. 9B

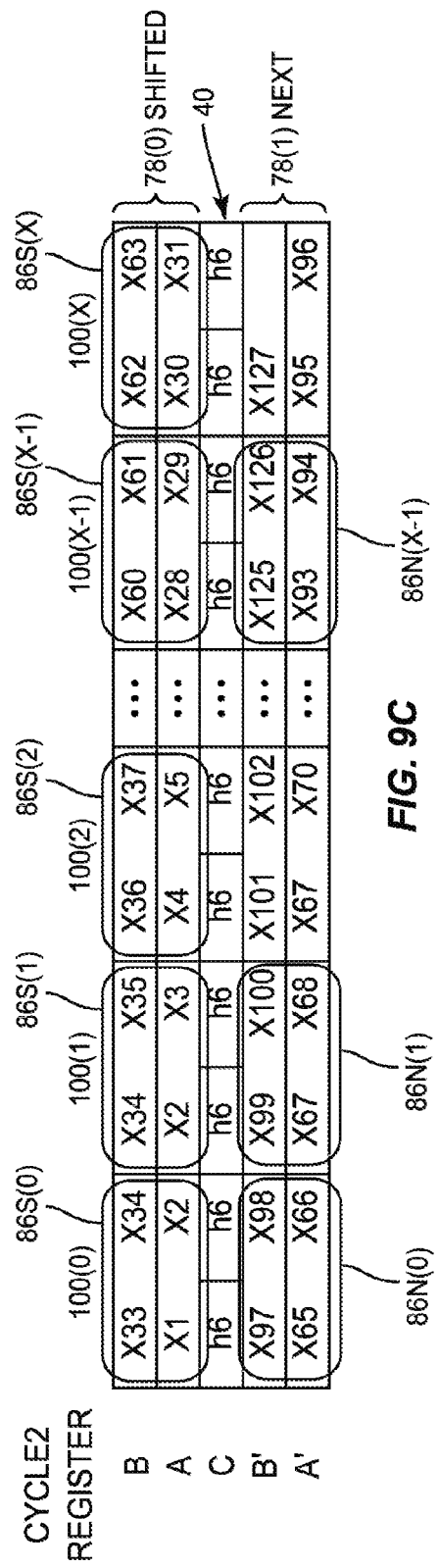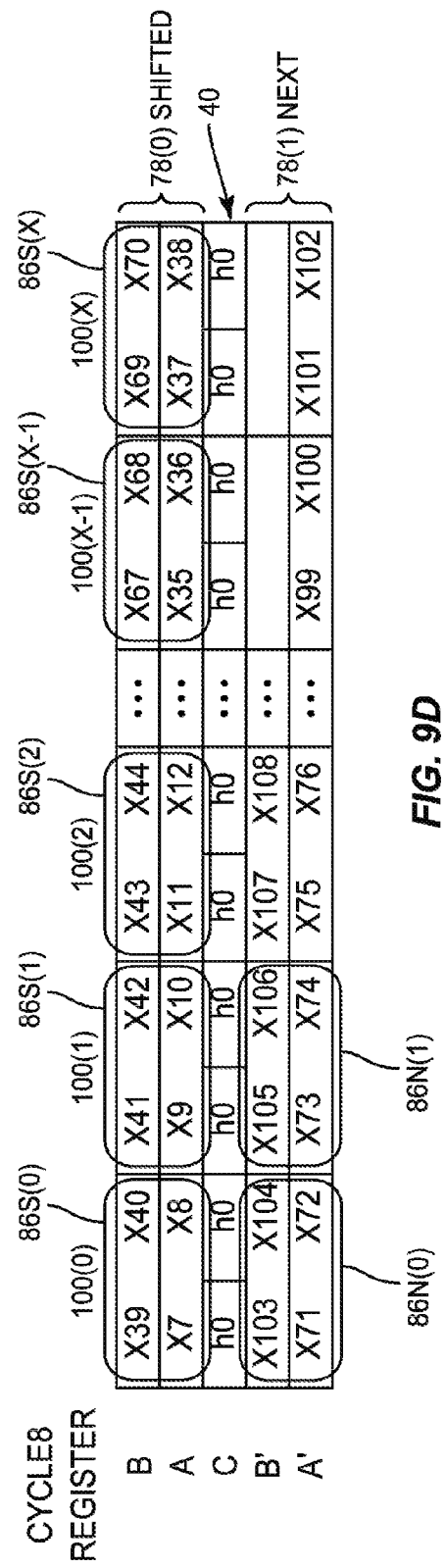

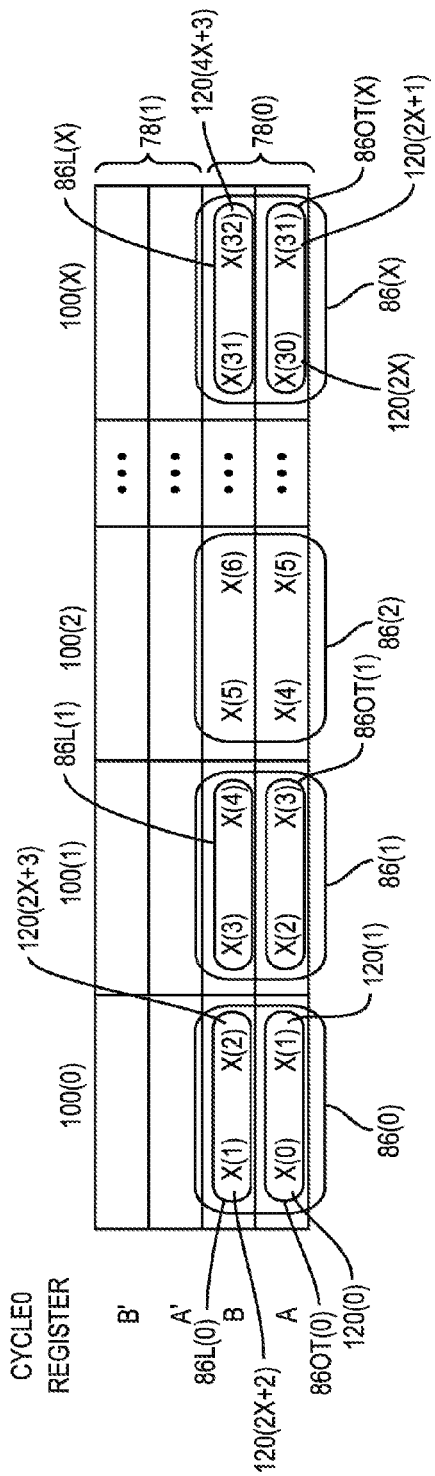
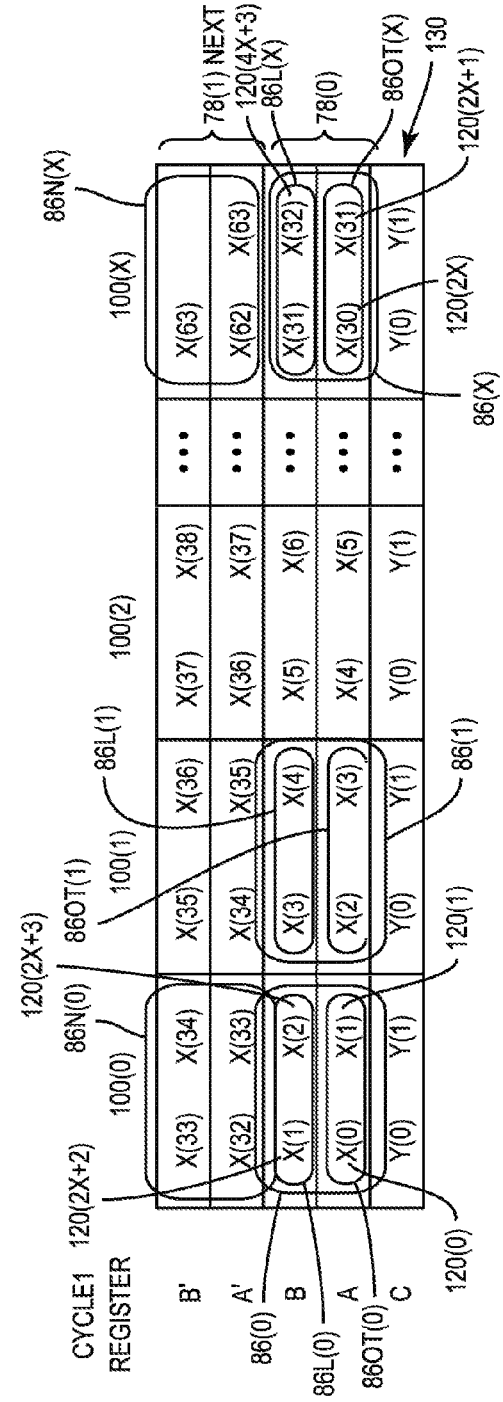
FIG. 15A
FIG. 15B

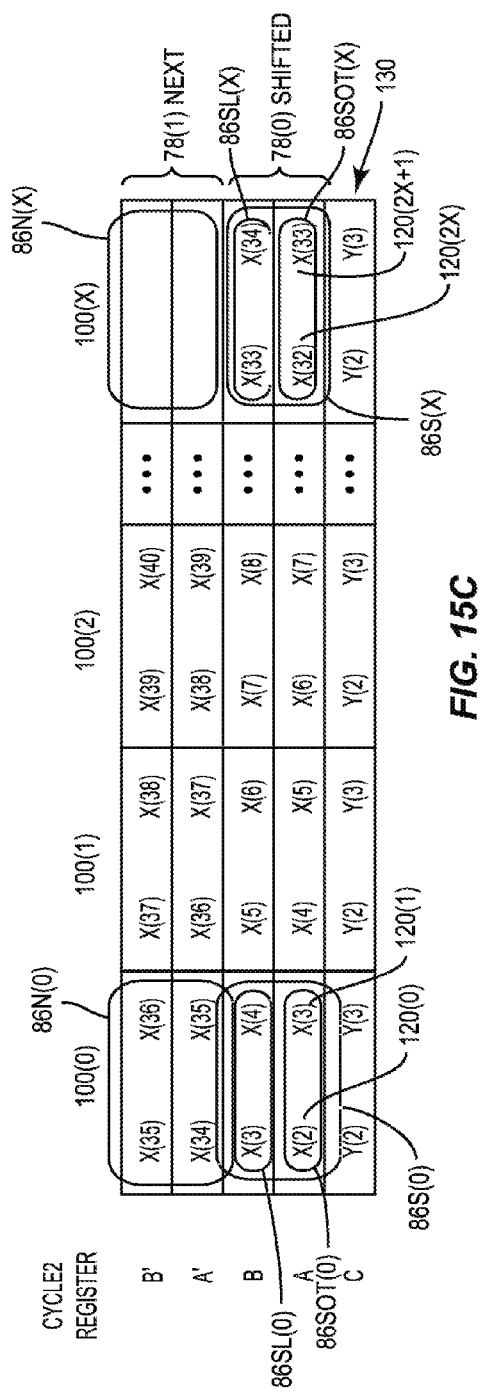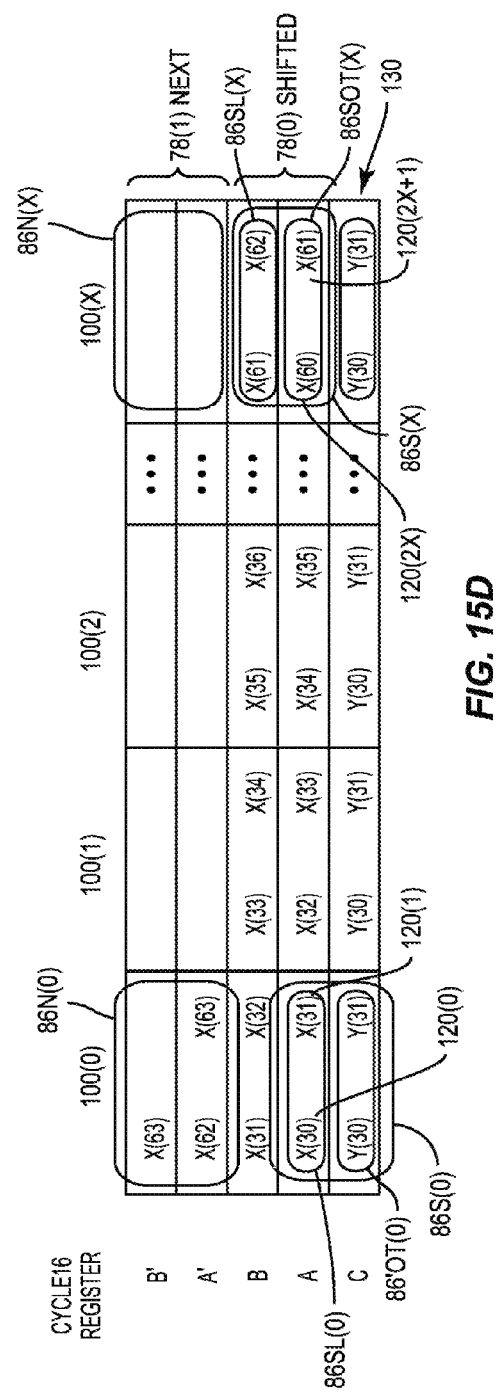

FIG. 18A
FIG. 18B

| Field | Bit Range | Description |
|---|---|---|
| BIAS_SC16 | [7:0] | Bias for arithmetic instructions when using sc16 data format. The bias range is limited to -14 to 14. A positive value indicates a left shift; a negative value indicates a right shift. |
| Reserved | [15:8] | Reserved field |
| DECIMATE_SRC1 | [16] | Decimate and format conversion bit for first source data:<br>0 → No decimate or format conversion<br>1 → Decimate and convert from SC8 to SC16 |
| DECIMATE_SRC2 | [17] | Decimate and format conversion bit for second source data:<br>0 → No decimate or format conversion<br>1 → Decimate and convert from SC8 to SC16 |
| DEST_FMT | [18] | Select the format of output data<br>0 → Destination is stored in SC16 format<br>1 → Convert output from SC16 to SC8 and write in either the even or odd output location as specified in the DECIMATE_PHASE field |
| DECIMATE_PHASE | [19] | Decimate phase for both sources and destination:<br>0 → Take even samples (x0, x2, etc)<br>1 → Take odd samples (x1, x3, etc) |
| Reserved | [31:20] | Reserved field |

*FIG. 22*

VECTOR PROCESSING ENGINES (VPES) EMPLOYING A TAPPED-DELAY LINE(S) FOR PROVIDING PRECISION FILTER VECTOR PROCESSING OPERATIONS WITH REDUCED SAMPLE RE-FETCHING AND POWER CONSUMPTION, AND RELATED VECTOR PROCESSOR SYSTEMS AND METHODS

RELATED APPLICATIONS

The present application is related to U.S. patent application Ser. No. 13/798,641 entitled "VECTOR PROCESSING ENGINES HAVING PROGRAMMABLE DATA PATH CONFIGURATIONS FOR PROVIDING MULTI-MODE VECTOR PROCESSING, AND RELATED VECTOR PROCESSORS, SYSTEMS, AND METHODS," 123249 filed on Mar. 13, 2013 and incorporated herein by reference in its entirety.

The present application is related to U.S. patent application Ser. No. 13/798,618 entitled "VECTOR PROCESSING CARRY-SAVE ACCUMULATORS EMPLOYING REDUNDANT CARRY-SAVE FORMAT TO REDUCE CARRY PROPAGATION, AND RELATED VECTOR PROCESSORS, SYSTEMS, AND METHODS," 123248 filed on Mar. 13, 2013 and incorporated herein by reference in its entirety.

The present application is also related to U.S. patent application Ser. No. 14/082,079 entitled "VECTOR PROCESSING ENGINES (VPEs) EMPLOYING TAPPED-DELAY LINE(S) FOR PROVIDING PRECISION CORRELATION/COVARIANCE VECTOR PROCESSING OPERATIONS WITH REDUCED SAMPLE RE-FETCHING AND POWER CONSUMPTION, AND RELATED VECTOR PROCESSOR SYSTEMS AND METHODS," 124364 filed on Nov. 15, 2013 and incorporated herein by reference in its entirety.

The present application is also related to U.S. patent application Ser. No. 14/082,088 entitled "VECTOR PROCESSING ENGINES (VPEs) EMPLOYING FORMAT CONVERSION CIRCUITRY IN DATA FLOW PATHS BETWEEN VECTOR DATA MEMORY AND EXECUTION UNITS TO PROVIDE IN-FLIGHT FORMAT-CONVERTING OF INPUT VECTOR DATA TO EXECUTION UNITS FOR VECTOR PROCESSING OPERATIONS, AND RELATED VECTOR PROCESSOR SYSTEMS AND METHODS," 124365 filed on Nov. 15, 2013 and incorporated herein by reference in its entirety.

The present application is also related to U.S. patent application Ser. No. 14/082,081 entitled "VECTOR PROCESSING ENGINES (VPEs) EMPLOYING REORDERING CIRCUITRY IN DATA FLOW PATHS BETWEEN EXECUTION UNITS AND VECTOR DATA MEMORY TO PROVIDE IN-FLIGHT REORDERING OF OUTPUT VECTOR DATA STORED TO VECTOR DATA MEMORY, AND RELATED VECTOR PROCESSOR SYSTEMS AND METHODS," 124450 filed on Nov. 15, 2013 and incorporated herein by reference in its entirety.

The present application is also related to U.S. patent application Ser. No. 14/082,073 entitled "VECTOR PROCESSING ENGINES (VPEs) EMPLOYING MERGING CIRCUITRY IN DATA FLOW PATHS BETWEEN EXECUTION UNITS AND VECTOR DATA MEMORY TO PROVIDE IN-FLIGHT MERGING OF OUTPUT VECTOR DATA STORED TO VECTOR DATA MEMORY, AND RELATED VECTOR PROCESSING INSTRUCTIONS, SYSTEMS, AND METHODS," 124363U1 filed on Nov. 15, 2013 and incorporated herein by reference in its entirety.

The present application is also related to U.S. patent application Ser. No. 14/082,067 entitled "VECTOR PROCESSING ENGINES (VPEs) EMPLOYING DESPREADING CIRCUITRY IN DATA FLOW PATHS BETWEEN EXECUTION UNITS AND VECTOR DATA MEMORY TO PROVIDE IN-FLIGHT DESPREADING OF SPREAD-SPECTRUM SEQUENCES, AND RELATED VECTOR PROCESSING INSTRUCTIONS, SYSTEMS, AND METHODS," 124363U2 filed on Nov. 15, 2013 and incorporated herein by reference in its entirety.

BACKGROUND

I. Field of the Disclosure

The field of the disclosure relates to vector processors and related systems for processing vector and scalar operations, including single instruction, multiple data (SIMD) processors and multiple instruction, multiple data (MIMD) processors.

II. Background

Wireless computing systems are fast becoming one of the most prevalent technologies in the digital information arena. Advances in technology have resulted in smaller and more powerful wireless communications devices. For example, wireless computing devices commonly include portable wireless telephones, personal digital assistants (PDAs), and paging devices that are small, lightweight, and easily carried by users. More specifically, portable wireless telephones, such as cellular telephones and Internet Protocol (IP) telephones, can communicate voice and data packets over wireless networks. Further, many such wireless communications devices include other types of devices. For example, a wireless telephone may include a digital still camera, a digital video camera, a digital recorder, and/or an audio file player. Also, wireless telephones can include a web interface that can be used to access the Internet. Further, wireless communications devices may include complex processing resources for processing high speed wireless communications data according to designed wireless communications technology standards (e.g., code division multiple access (CDMA), wideband CDMA (WCDMA), and long term evolution (LTE)). As such, these wireless communications devices include significant computing capabilities.

As wireless computing devices become smaller and more powerful, they become increasingly resource constrained. For example, screen size, amount of available memory and file system space, and amount of input and output capabilities may be limited by the small size of the device. Further, battery size, amount of power provided by the battery, and life of the battery are also limited. One way to increase the battery life of the device is to design processors that consume less power.

In this regard, baseband processors may be employed for wireless communications devices that include vector processors. Vector processors have a vector architecture that provides high-level operations that work on vectors, i.e. arrays of data. Vector processing involves fetching a vector instruction once and then executing the vector instruction multiple times across an entire array of data elements, as opposed to executing the vector instruction on one set of data and then re-fetching and decoding the vector instruction for subsequent elements within the vector. This process allows for a reduction in the energy required to execute a program, because among other factors, each vector instruction needs to be fetched fewer times. Since vector instructions operate on long vectors over multiple clock cycles at the same time, a high degree of parallelism is achievable with simple in-order vector instruction dispatch.

FIG. 1 illustrates an exemplary baseband processor 10 that may be employed in a computing device, such as a wireless computer device. The baseband processor 10 includes multiple processing engines (PEs) 12, each dedicated to providing function-specific vector processing for specific applications. In this example, six (6) separate PEs 12(0)-12(5) are provided in the baseband processor 10. The PEs 12(0)-12(5) are each configured to provide vector processing for fixed X-bit wide vector data 14 provided from a shared memory 16 to the PEs 12(0)-12(5). For example, the vector data 14 could be 512 bits wide. The vector data 14 can be defined in smaller multiples of X-bit width vector data sample sets 18(0)-18(Y) (e.g., 16-bit and 32-bit sample sets). In this manner, the PEs 12(0)-12(5) are capable of providing vector processing on multiple vector data sample sets 18 provided in parallel to the PEs 12(0)-12(5) to achieve a high degree of parallelism. Each PE 12(0)-12(5) may include a vector register file (VR) for storing the results of a vector instruction processed on the vector data 14.

Each PE 12(0)-12(5) in the baseband processor 10 in FIG. 1 includes specific, dedicated circuitry and hardware specifically designed to efficiently perform specific types of fixed operations. For example, the baseband processor 10 in FIG. 1 includes separate WCDMA PEs 12(0), 12(1) and LTE PEs 12(4), 12(5), because WCDMA and LTE involve different types of specialized operations. Thus, by providing separate WCDMA-specific PEs 12(0), 12(1) and LTE-specific PEs 12(4), 12(5), each of the PEs 12(0), 12(1), 12(4), 12(5) can be designed to include specialized, dedicated circuitry that is specific to frequently performed functions for WCDMA and LTE for highly efficient operation. This design is in contrast to scalar processing engines that include more general circuitry and hardware designed to be flexible to support a larger number of unrelated operations, but in a less efficient manner.

One type of specialized vector processing operation is filtering. A filter operation computes a quantized time-domain representation of the convolution of a sampled input time function and a representation of a weighting function of the filter. Convolution in the time domain corresponds to multiplication in the frequency domain. Thus, digital filters can be realized by an extended sequence of multiplications and additions carried out at a uniformly spaced sample interval. A digitized input signal can be filtered in a PE by passing the digitized input signal samples through structures that shift the clocked data into summers (adders), delay samples, and multipliers. For example, a finite impulse response (FIR) filter can be implemented using a finite number of delay taps ("N") on a delay line with "N" computation coefficients to computer the filter function.

However, filtering operations may be difficult to parallelize in vector processors due to the specialized data flow paths provided in vector processors. When an input vector data sample set to be filtered is shifted between delay taps, the input vector data sample set is re-fetched from the vector data file, thus increasing power consumption and reducing throughput. To minimize re-fetching of input vector data sample sets from memory, the data flow path could be configured to provide the same number of multipliers as delay taps for efficient parallelized processing. However, other vector processing operations may require fewer multipliers, thereby providing inefficient scaling and underutilization of the multipliers in the data flow path. If the number of multipliers is reduced to be less than the number of delay taps to provide scalability, parallelism is limited by more re-fetches being required to memory to obtain the same input vector data sample set for different phases of the filter processing.

SUMMARY OF THE DISCLOSURE

Embodiments disclosed herein include vector processing engines (VPEs) employing a tapped-delay line(s) for providing precision filter vector processing operations with reduced sample re-fetching and power consumption. Related vector processor systems and methods are also disclosed. The VPEs disclosed herein are configured to provide filter vector processing operations that involve multiplication of input vector data sample sets with filter coefficients and accumulation of results. To minimize re-fetching of input vector data samples from memory to reduce power consumption, a tapped-delay line(s) is included in the data flow paths between a vector data file and execution units in the VPE. The tapped-delay line(s) is configured to receive and provide input vector data sample sets to execution units for performing filter vector processing operations. The tapped-delay line(s) is also configured to shift the input vector data sample set for each filter delay tap and provide the shifted input vector data sample set to the execution units, so the shifted input vector data sample set does not have to be re-fetched from the vector data file during each processing stage of the filter vector processing operation. In this manner, the reduced re-fetching operation reduces power consumption. Further, the efficiency of the data flow paths in the VPE are not limited by the re-fetching delay of the input vector data sample set from memory. The shifted input vector data sample set is provided localized to the execution units. The vector processing in the execution units is only limited by computational resources rather than by data flow limitations. Further, the filter vector processing operations may be more precise, because accumulations for intermediate filter processing stages in the execution units do not have to be stored in memory, and rounded as a result, while the execution units wait for shifted input filter sample data to be re-fetched from memory.

Further, the filter vector processing operations in the VPE employing the tapped-delay line(s) disclosed herein can be fully parallelized without requiring the same number of multipliers as filter delay taps. This is because the tapped-delay line(s) can provide a shifted input vector data sample set to the execution units for filter processing without incurring delay from re-fetching of the input vector data sample set from the vector data file. By allowing parallelization of filter vector processing operations with fewer multipliers than filter delay taps, the data flow paths of the VPE can be reprogrammed to more easily scale down the number of multipliers reserved for other types of vector processing operations that require fewer multipliers, so that the multipliers in the VPE are not underutilized for efficiency purposes. For example, if data flow paths in the VPE are configured to employ a greater number of multipliers for filter vector processing operations than required for other types of vector processing operations, the additional multipliers may be unused during execution of these other vector processing operations, thereby underutilizing the multiplier processing resources of the VPE.

In this regard in one embodiment, a VPE configured to provide a filter vector processing operation is provided. The VPE comprises at least one vector data file. The vector data file(s) is configured to provide an input vector data sample set in at least one input data flow path for a filter vector processing operation. The vector data file(s) is also configured to receive a resultant filtered output vector data sample set from at least one output data flow path. The vector data file(s) is further configured to store the resultant filtered output vector data sample set. The VPE also comprises at least one tapped-delay line provided between the at least one vector data file and at least one execution unit in the at least one input data flow path. The tapped-delay line(s) is configured to shift the input vector data sample set by a vector data sample width in a plurality of pipeline registers for each processing stage among a plurality of processing stages equal to a number of filter taps in the filter vector processing operation, to provide a shifted input vector data sample set for each processing stage among the plurality of processing stages.

Further, the VPE also comprises the at least one execution unit provided in the at least one input data flow path. The execution unit(s) comprises at least one multiplier configured to apply a filter tap operation on the shifted input vector data sample set for each processing stage among the plurality of processing stages, to generate a filter tap output vector data sample set for each filter tap of the filter vector processing operation. The execution unit(s) also comprises at least one accumulator configured to accumulate the filter tap output vector data sample sets in the at least one accumulator for each processing stage among the plurality of processing stages. The execution unit(s) is configured to provide the resultant filtered output vector data sample set on the at least one output data flow path. In this manner as a non-limiting example, the execution unit(s) is configured to accumulate the filter tap output vector data sample sets for each processing stage among the plurality of processing stages, without the input vector data sample set being re-fetched from the vector data file(s).

In another embodiment, a VPE configured to provide filter vector processing operations is provided. The VPE comprises at least one vector data file means. The vector data file means comprises a means for providing an input vector data sample set in at least one input data flow path means for a filter vector processing operation. The vector data file means also comprises a means for receiving a resultant filtered output vector data sample set from at least one output data flow path means to be stored. The VPE also comprises at least one tapped-delay line means provided between the at least one vector data file means and at least one execution unit means in the at least one input data flow path means. The tapped-delay line means comprises a means for shifting the input vector data sample set by a vector data sample width in a plurality of pipeline registers for each processing stage among a plurality of processing stages equal to a number of filter taps in the filter vector processing operation, to provide a shifted input vector data sample set for each processing stage among the plurality of processing stages.

Further, the VPE also comprises the at least one execution unit means provided in the at least one input data flow path means. The execution unit means comprises a means for applying a filter tap operation on the shifted input vector data sample set for each processing stage among the plurality of processing stages, to generate a filter tap output vector data sample set for each filter tap of the filter vector processing operation. The execution unit means also comprises a means for accumulating the filter tap output vector data sample sets in at least one accumulator for each processing stage among the plurality of processing stages. The execution unit means also comprises a means for providing the resultant filtered output vector data sample set in the at least one output data flow path means for the filter vector processing operation.

In another embodiment, a method of performing a filter vector processing operation in a VPE is provided. The method comprises fetching an input vector data sample set from at least one vector data file into at least one input data flow path for a filter vector processing operation. The method also comprises receiving the fetched input vector data sample set in the at least one input data flow path into at least one tapped-delay line provided in the at least one input data flow path between the at least one vector data file and at least one execution unit. For each processing stage of a plurality of processing stages in the at least one execution unit, wherein a number of the plurality of processing stages equals a number of filter taps of the filter vector processing operation, the method also comprises providing the input vector data sample set from the at least one tapped-delay line in the at least one input data flow path to the least one execution unit in a current processing stage, applying a filter tap operation on the input vector data sample set in the at least one execution unit in the current processing stage to generate a filter tap output vector data sample set, accumulating the filter tap output vector data sample set with a prior resultant filtered output vector data sample set in the current processing stage, providing the prior resultant filtered output vector data sample set, and shifting the input vector data sample set within the at least one tapped-delay line to a next filter tap for the filter vector processing operation in the input vector data sample set to provide a shifted input vector data sample set as the input vector data sample set. The method also comprises providing the prior resultant filtered output vector data sample set as a resultant filtered output vector data sample set in at least one output data flow path to the at least one vector data file to be stored in the at least one vector data file.

BRIEF DESCRIPTION OF FIGURES

FIG. 9A is a schematic diagram of an input vector data sample set initially stored in a primary tapped-delay line in the VPE of FIG. 4 as part of a first filter tap execution of an exemplary eight (8) tap filter vector processing operation;

FIG. 9B is a schematic diagram of filter tap coefficients stored in a register file and shadow input vector data sample set initially stored in a shadow tapped-delay line in the VPE of FIG. 4 as part of a first filter tap execution of the exemplary eight (8) tap filter vector processing operation filter vector processing operation illustrated in FIG. 9A;

FIG. 9C is a schematic diagram of shifted input vector data sample sets stored in the primary tapped-delay line and the shadow tapped-delay line, and the filter tap coefficients stored in a register file, in the VPE of FIG. 4 as part of a second filter tap execution of the exemplary eight (8) tap filter vector processing operation;

FIG. 9D is a schematic diagram of the shifted input vector data sample sets stored in the primary tapped-delay line and the shadow tapped-delay line, and the filter tap coefficients stored in the register file, in the VPE of FIG. 4 as part of an eighth filter tap execution of the exemplary eight (8) tap filter vector processing operation;

FIG. 15A is a schematic diagram of the input vector data sample set from the vector data file initially provided in the primary tapped-delay line in the VPE of FIG. 11 as part of a first processing stage of a correlation/covariance vector processing operation;

FIG. 15B is a schematic diagram of a shadow input vector data sample set from the vector data file initially stored in the shadow tapped-delay line in the VPE of FIG. 11 as part of a first processing stage of a correlation/covariance vector processing operation;

FIG. 15C is a schematic diagram of the shifted input vector data sample sets stored in the primary tapped-delay line and the shadow tapped-delay line and the shifted input vector data sample set stored in the register file, in the VPE of FIG. 11 as part of a second processing stage of a correlation/covariance vector processing operation;

FIG. 15D is a schematic diagram of the shifted input vector data sample sets stored in the primary tapped-delay line and the shadow tapped-delay line, and the shifted input vector data sample set stored in the register file, in the VPE of FIG. 11 as part of a fourteenth processing stage of a correlation/covariance vector processing operation;

FIGS. 18A and 18B are diagrams of exemplary interleaved vector data samples of a vector data sample set stored in a vector data file of a VPE in signed complex sixteen (16) bit format and complex eight (8) bit format, respectively;

FIG. 22 illustrates an exemplary vector instruction data format to provide programming to the VPE of FIG. 19 to provide in-flight format conversion of the input vector data sample set in an input data flow path before receipt at execution units;

DETAILED DESCRIPTION

Figure 1:
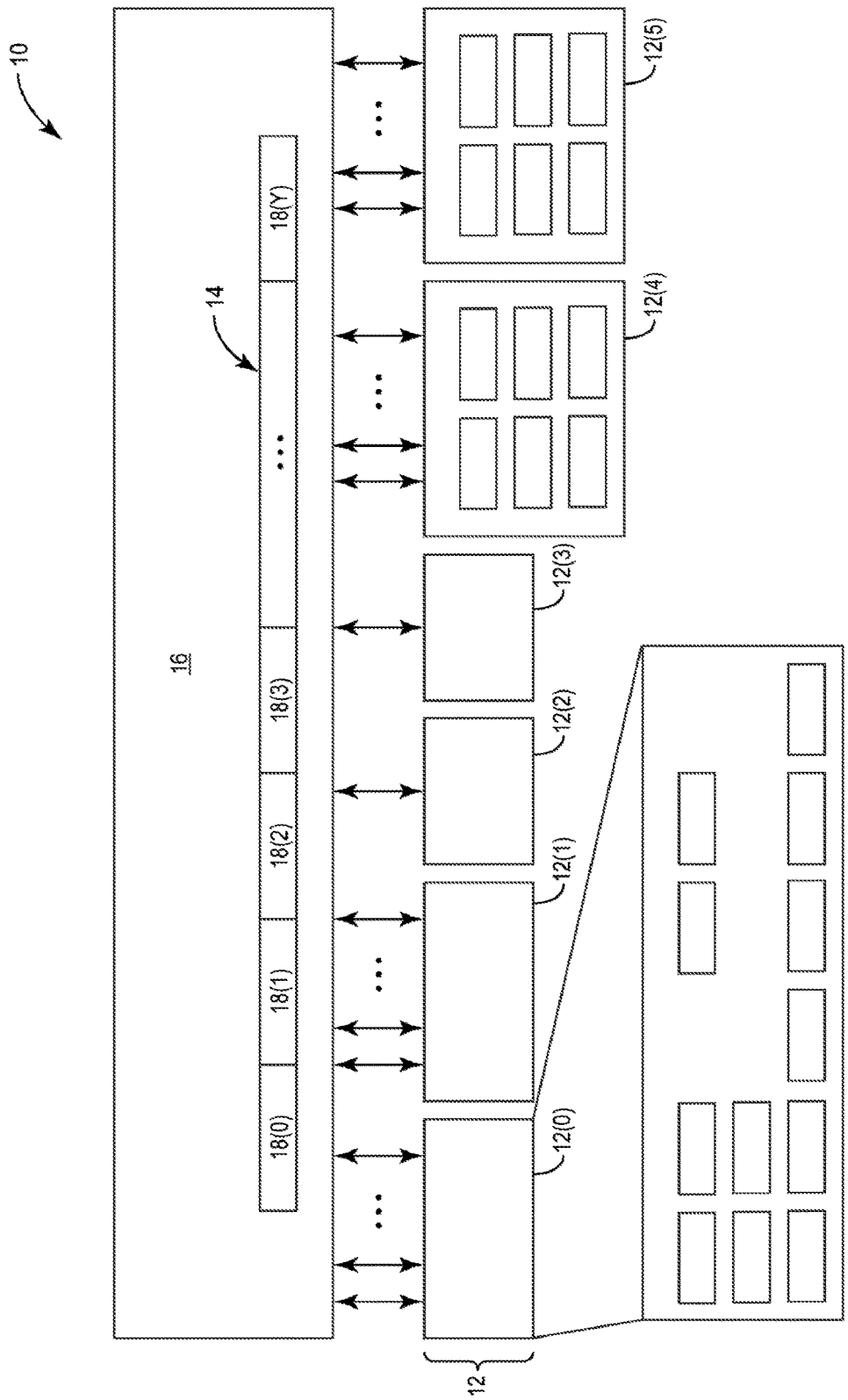
FIG. 1 is a schematic diagram of an exemplary vector processor that includes multiple vector processing engines (VPEs), each dedicated to providing function-specific vector processing for specific applications.

With reference now to the drawing figures, several exemplary embodiments of the present disclosure are described. The word "exemplary" is used herein to mean "serving as an example, instance, or illustration." Any embodiment described herein as "exemplary" is not necessarily to be construed as preferred or advantageous over other embodiments.

Embodiments disclosed herein include vector processing engines (VPEs) employing a tapped-delay line(s) for providing precision filter vector processing operations with reduced sample re-fetching and power consumption. Related vector processor systems and methods are also disclosed. The VPEs disclosed herein are configured to provide filter vector processing operations that involve multiplication of input vector data sample sets with filter coefficients and accumulation of results. To minimize re-fetching of input vector data samples from memory to reduce power consumption, a tapped-delay line(s) is included in the data flow paths between a vector data file and execution units in the VPE. The tapped-delay line(s) is configured to receive and provide input vector data sample sets to execution units for performing filter vector processing operations. The tapped-delay line(s) is also configured to shift the input vector data sample set for each filter delay tap and provide the shifted input vector data sample set to the execution units, so the shifted input vector data sample set does not have to be re-fetched from the vector data file during each processing stage of the filter vector processing operation. In this manner, the reduced re-fetching operation reduces power consumption. Further, the efficiency of the data flow paths in the VPE are not limited by the re-fetching delay of the input vector data sample set from memory. The shifted input vector data sample set is provided localized to the execution units. The vector processing in the execution units is only limited by computational resources rather than by data flow limitations. Further, the filter vector processing operations may be more precise, because accumulations for intermediate filter processing stages in the execution units do not have to be stored in memory, and rounded as a result, while the execution units wait for shifted input filter sample data to be re-fetched from memory.

Further, the filter vector processing operations in the VPE employing the tapped-delay line(s) disclosed herein can be fully parallelized without requiring the same number of multipliers as filter delay taps. This is because the tapped-delay line(s) can provide a shifted input vector data sample set to the execution units for filter processing without incurring delay from re-fetching of the input vector data sample set from the vector data file. By allowing parallelization of filter vector processing operations with fewer multipliers than filter delay taps, the data flow paths of the VPE can be reprogrammed to more easily scale down the number of multipliers reserved for other types of vector processing operations that require fewer multipliers, so that the multipliers in the VPE are not underutilized for efficiency purposes. For example, if data flow paths in the VPE are configured to employ a greater number of multipliers for filter vector processing operations than required for other types of vector processing operations, the additional multipliers may be unused during execution of these other vector processing operations, thereby underutilizing the multiplier processing resources of the VPE.

Figure 2:
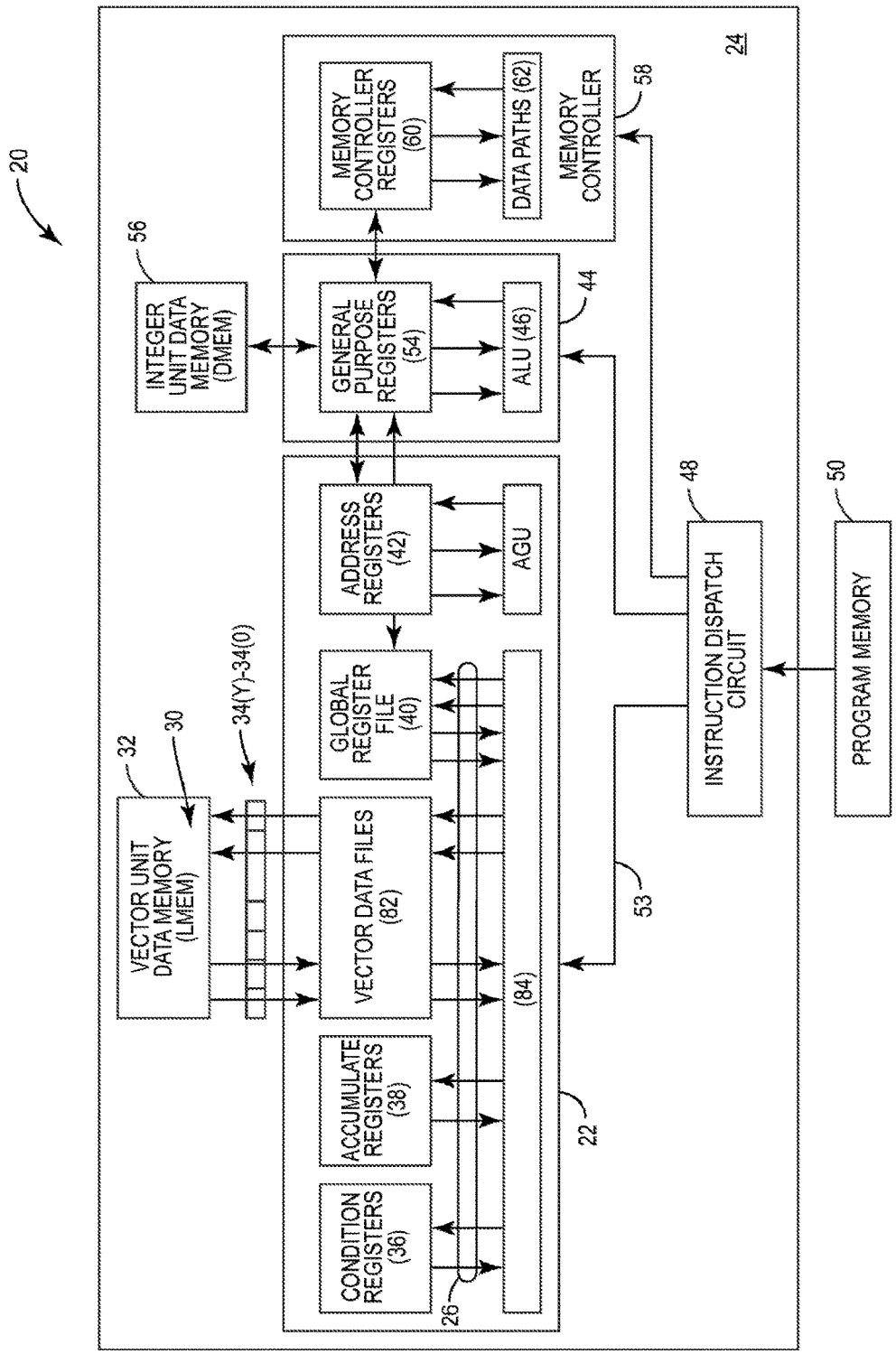
FIG. 2 is a schematic diagram of an exemplary baseband processor that includes a VPE having programmable data path configurations, so that common circuitry and hardware provided in the VPE can be programmed in multiple modes to perform specific types of vector operations in a highly efficient manner for multiple applications or technologies, without a requirement to provide separate VPEs.

In this regard, FIG. 2 is a schematic diagram of a baseband processor 20 that includes an exemplary vector processing unit 22, also referred to as a vector processing engine (VPE) 22. As will be discussed in more detail below, the VPE 22 includes execution units 84 and other particular exemplary circuitry and functionality to provide vector processing operations including the exemplary vector processing operations disclosed herein. The baseband processor 20 and its VPE 22 can be provided in a semiconductor die 24. In this embodiment, as will be discussed in more detail below, the baseband processor 20 includes a common VPE 22 that includes programmable data paths 26 that can be programmed to provide different programmable data path configurations. In this manner, the programmable data paths 26 between the execution units 84 and vector data files 82 in the VPE 22 can be programmed and reprogrammed to provide different, specific types of vector processing operations in different operation modes without the requirement to provide separate VPEs 22 in the baseband processor 20.

Figure 3:
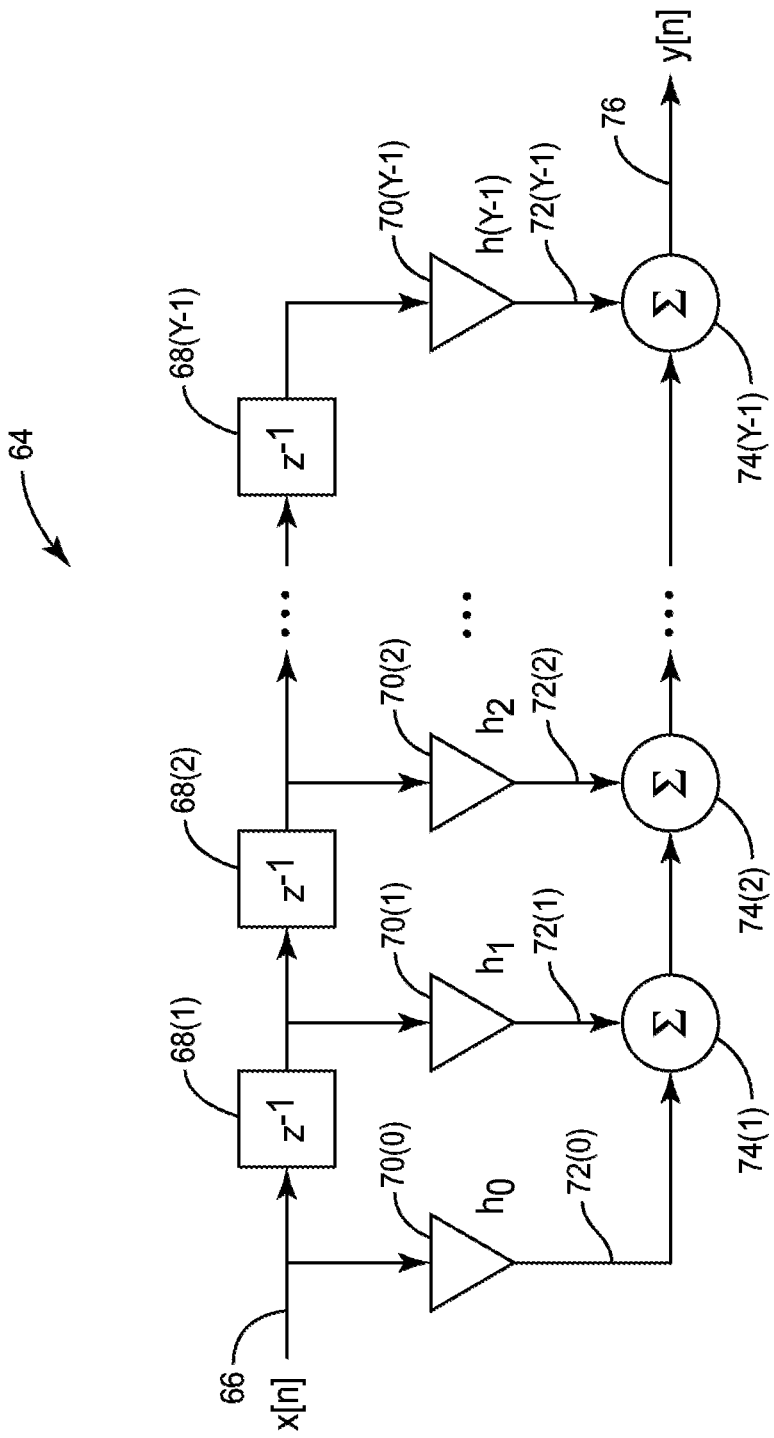
FIG. 3 is a schematic diagram of a discrete finite impulse response (FIR) filter that may be provided in a filter vector processing operation supported by a VPE.

Before discussing the particular circuitry and vector processing operations configured to be provided by the VPE 22 in this disclosure for efficient processing starting with FIG. 3, the components of the baseband processor 20 in FIG. 2 are first described. The baseband processor 20 in this non-limiting example is a 512-bit vector processor. The baseband processor 20 includes components in addition to the VPE 22 to support the VPE 22 providing vector processing in the baseband processor 20. The baseband processor 20 includes vector registers, also known as vector data files 82, that are configured to receive and store vector data 30 from a vector unit data memory (LMEM) 32. For example, the vector data 30 is X bits wide, with 'X' defined according to design choice (e.g., 512 bits). The vector data 30 may be divided into vector data sample sets 34. As a non-limiting example, the vector data 30 may be 256-bits wide and may comprise smaller vector data sample sets 34(Y)-34(0). Some vector data sample sets 34(Y)-34(0) can be 16-bits wide as an example, and others of the vector data sample sets 34(Y)-34(0) can be 32-bits wide. The VPE 22 is capable of providing vector processing on certain chosen vector data sample sets 34(Y)-34(0) provided in parallel to the VPE 22 to achieve a high degree of parallelism. The vector data files 82 are also configured to store results generated when the VPE 22 processes the vector data 30. In certain embodiments, the VPE 22 is configured to not store intermediate vector processing results in the vector data files 82 to reduce register writes to provide faster vector instruction execution times. This configuration is opposed to scalar instructions executed by scalar processing engines that store intermediate results in registers, such as scalar processing digital signal processors (DSPs).

The baseband processor 20 in FIG. 2 also includes condition registers 36 configured to provide conditions to the VPE 22 for use in conditional execution of vector instructions and to store updated conditions as a result of vector instruction execution. The baseband processor 20 also includes accumulate registers 38, a global register file 40 that includes global registers, and address registers 42. The accumulate registers 38 are configured to be used by the VPE 22 to store accumulated results as a result of executing certain specialized operations on the vector data 30. The global register file 40 is configured to store scalar operands for certain vector instructions supported by the VPE 22. The address registers 42 are configured to store addresses addressable by vector load and store instructions supported by the VPE 22 to retrieve the vector data 30 from the vector unit data memory 32, and store vector processing results in the vector unit data memory 32.

With continuing reference to FIG. 2, the baseband processor 20 in this embodiment also includes a scalar processor 44 (also referred to as an "integer unit") to provide scalar processing in the baseband processor 20 in addition to vector processing provided by the VPE 22. It may be desired to provide a central processing unit (CPU) configured to support both vector and scalar instruction operations based on the type of instruction executed for highly efficient operation. In this embodiment, the scalar processor 44 is a 32-bit reduced instruction set computing (RISC) scalar processor as a non-limiting example. The scalar processor 44 includes an arithmetic logic unit (ALU) 46 for supporting scalar instruction processing in this example. The baseband processor 20 includes an instruction dispatch circuit 48 configured to fetch instructions from program memory 50, decode the fetched instructions, and direct the fetched instructions to either the scalar processor 44 or through a vector data path 53 to the VPE 22 based on instruction type. The scalar processor 44 includes general purpose registers 54 for use by the scalar processor 44 when executing scalar instructions. An integer unit data memory (DMEM) 56 is included in the baseband processor 20 to provide data from main memory into the general purpose registers 54 for access by the scalar processor 44 for scalar instruction execution. The DMEM 56 may be cache memory as a non-limiting example. The baseband processor 20 also includes a memory controller 58 that includes memory controller registers 60 configured to receive memory addresses from the general purpose registers 54 when the scalar processor 44 is executing vector instructions requiring access to main memory through memory controller data paths 62.

One type of specialized vector processing operation that may be desired to be supported by vector instruction processing by the VPE 22 is filtering. A filter operation computes a quantized time-domain representation of the convolution of a sampled input time function and a representation of a weighting function of the filter. Convolution in the time domain corresponds to multiplication in a frequency domain. Thus, digital filters can be realized in the VPE 22 by an extended sequence of multiplications and additions carried out at a uniformly spaced sample interval. For example, a discrete finite impulse response (FIR) filter can be implemented using a finite number (Y) of delay taps on a delay line with "Y" computation filter coefficients to compute a filter function.

In this regard, FIG. 3 is a schematic diagram of an exemplary discrete FIR filter 64 that may be desired to be supported through a filter vector processing operation in the VPE 22 in FIG. 2. A digitized input signal 66 (x[n]) can be filtered by passing digitized input signal samples (x[0], x[1], . . . x[n]) through delay structures called "filter delay taps" 68(1)-68(Y–1). The filter delay taps 68(1)-68(Y–1) shift clocked digitized input signal samples (i.e., x[0], x[1], . . . x[n]) into multipliers 70(0)-70(Y–1) for all digitized input signal samples (i.e., x[0], x[1], . . . x[n]) to each be multiplied by filter coefficients (h[0]-h(Y–1)) to provide filter sample multiplicands 72(0)-72(Y–1) (i.e., h(l)*x[n–l]). The filter sample multiplicands 72(0)-72(Y–1) are summed together by summers (i.e., adders) 74(1)-74(Y–1) to provide a resultant filtered output signal 76 (i.e., y[n]). Thus, the discrete FIR filter 64 in FIG. 3 can be summarized as follows:

$$y[n]=\Sigma_{l=0}^{l=Y-1}h(l)*x[n-l]$$

where:
n is the number of input signal samples;
x[n] is the digitized input signal 66;
y[n] is the resultant filtered output signal 76;
h(l) are the filter coefficients; and
Y is the number of filter coefficients.

The filter coefficients h(l) may be complex. In one aspect, the VPE 22 may receive filter coefficients (e.g., from the global register file 40). The VPE 22 may use the received filter coefficients directly to perform the FIR filter function, in which case the filter coefficients h(l) in the above equation may represent the received filter coefficients. Alternatively, the VPE 22 may compute the complex conjugates of the received filter coefficients before using them to perform the FIR filter function, in which case the filter coefficients h(l) in the above equation may represent the conjugates of the received filter coefficients.

The above discrete FIR filter 64 in FIG. 3 can be recast as:

$$y[n]=x[n]*h0+x[n-1]*h1+\ldots+x[n-7]*h7$$

However, filtering operations, such as the discrete FIR filter 64 in FIG. 3, may be difficult to parallelize in vector processors due to the specialized data flow paths provided in a vector processor. When the input vector data sample set (e.g., the vectorized digitized input signal 66) to be filtered is shifted between filter delay taps (e.g., 68(1)-68(Y–1)), the input vector data sample set is re-fetched from a vector data file, thus increasing power consumption and reducing throughput. To minimize re-fetching of input vector data sample sets from a vector data file, the data flow path in a vector processor could be configured to provide the same number of multipliers (e.g., 70(0)-70(Y–1)) as filter delay taps (e.g., 68(1)-68(Y–1)) for efficient parallelized processing. However, other vector processing operations may require fewer multipliers thereby providing inefficient scaling and underutilization of the multipliers in the data flow path. If the number of multipliers is reduced to be less than the number of filter delay taps to provide scalability, parallelism is limited by more re-fetches being required to memory to obtain the same input vector data sample set for different phases of the filter processing.

Figure 4:
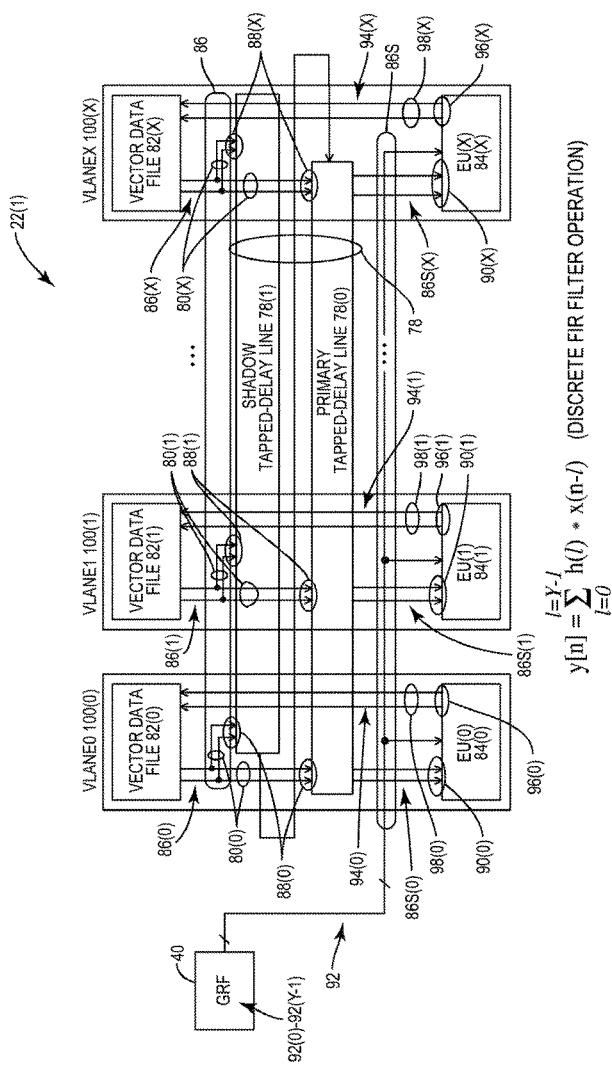
FIG. 4 is a schematic diagram of an exemplary VPE employing tapped-delay lines to receive and provide shifted input vector data sample sets to execution units to be processed with filter coefficient data for providing precision filter vector processing operations with reduced re-fetching and power consumption.

In this regard, FIG. 4 is a schematic diagram of an exemplary VPE 22(1) that can be provided as the VPE 22 in FIG. 2. As will be described in more detail below, the VPE 22(1) in FIG. 4 provides precision filter vector processing operations in the VPE 22(1) with eliminated or reduced vector data sample re-fetching and reduced power consumption. The precision filter vector processing operations can be provided in the VPE 22(1) as compared to filter vector processing operations that require storage of intermediate results requiring vector data sample re-fetching, thereby increasing power consumption as a result. To eliminate or minimize re-fetching of input vector data samples from a vector data file to reduce power consumption and improve processing efficiency, tapped-delay lines 78 are included in input data flow paths 80(0)-80(X) between vector data files 82(0)-82(X) and execution units 84(0)-84(X) (also labeled "EU") in the VPE 22(1). 'X'+1 is the maximum number of parallel input data lanes provided in the VPE 22(1) for processing of vector data samples in this example. The tapped-delay lines 78 are configured to receive an input vector data sample set 86(0)-86(X) on tapped-delay line inputs 88(0)-88(X) as a subset or all of the input vector data samples 86 of the input vector data sample set 86(0)-86(X) from a corresponding subset or all of the vector data files 82(0)-82(X). The input vector data sample set 86(0)-86(X) is comprised of 'X+1' input vector data samples 86, which in this example are 86(0), 86(1), . . . , and 86(X).

With continuing reference to FIG. 4, the tapped-delay lines 78 store input vector data sample sets 86(0)-86(X) fetched from the vector data files 82(0)-82(X) to be processed by the execution units 84(0)-84(X) for a filter vector processing operation. As will be discussed in more detail below with regard to FIGS. 6 and 7 below, the tapped-delay lines 78 are configured to shift the input vector data sample sets 86(0)-86(X) for each filter delay tap (i.e., filter processing stage) of the filter vector processing operation according to a filter vector instruction to be executed by the VPE 22(1) to provide a shifted input vector data sample set 86S(0)-86S(X) to the execution units 84(0)-84(X). All of the shifted input vector data samples 86S comprise the shifted input vector data sample set 86S(0)-86S(X). The tapped-delay lines 78 provide the shifted input vector data sample 86S(0)-86S(X) to execution unit inputs 90(0)-90(X) of the execution units 84(0)-84(X) during the filter vector processing operation. In this manner, intermediate filter results based on operations performed on the shifted input vector data sample set 86S(0)-86S(X) for the filter taps of the filter vector processing operation do not have to be stored, shifted, and re-fetched from the vector data files 82(0)-82(X) during each processing stage of the filter vector processing operation performed by the VPE 22(1). Thus, the tapped-delay lines 78 can reduce power consumption and increase processing efficiency for filter vector processing operations performed by the VPE 22(1).

A processing stage in the VPE 22(1), which is also referred to as a "vector processing stage," comprises circuitry and associated vector data paths that are designed to carry out a specific task or operation. A vector processing operation may executed by the VPE 22(1) in several different processing stages. Each processing stage may be performed over one or multiple clock cycles of the VPE 22(1). Consequently, execution of a vector processing operation in the VPE 22(1) may take many clock cycles to complete, since each processing stage of the vector processing operation may consume one or more clock cycles each. For example, a processing stage may include the fetching of the input vector data sample set 86(0)-86(X) into the tapped-delay lines 78 in the VPE 22(1) in FIG. 4. The vector processing stages in the VPE 22(1) can be pipelined.

The execution units 84(0)-84(X) may include one or more pipeline stages that process the fetched input vector data sample set 86(0)-86(X). For example, one pipeline stage in the execution units 84(0)-84(X) may include an accumulation stage comprised of accumulators configured to perform accumulation operations. As another example, another pipeline stage in the execution units 84(0)-84(X) may include a multiplication stage comprised of multipliers configured to perform multiplication operations.

With continuing reference to FIG. 4, the execution units 84(0)-84(X) receive a filter coefficient 92 from among filter coefficients 92(0)-92(Y−1) stored in the global register file 40 of FIG. 2 for the filter vector processing operation, where 'Y' can equal the number of filter coefficients for the filter vector processing operation. The execution units 84(0)-84(X) are each configured to multiply one of the received filter coefficient 92(0), 90(1), . . . 90(Y−1) with a shifted input vector data sample 86S(0), 86S(1), . . . 86S(X) of the shifted input vector data sample set 86S(0)-86S(X) during each processing stage of the vector filter processing operation to provide intermediate filter vector data output samples in the execution units 84(0)-84(X). The intermediate filter vector data output sample sets are accumulated in each of the execution units 84(0)-84(X) (i.e., a prior accumulated filter output vector data sample is added to a current accumulated filter output vector data sample). This provides a final, resultant filter output vector data sample set 94(0)-94(X) provided by the execution units 84(0)-84(X) on execution unit outputs 96(0)-96(X) on output data flow paths 98(0)-98(X), respectively, for each shifted input vector data sample 86S(0), 86S(1), . . . 86S(X) in the shifted input vector data sample set 86S(0)-86S(X). The resultant filter output vector data sample set 94(0)-94(X) is comprised of 'X+1' resultant filter output vector data samples 94, which in this example are 94(0), 94(1), . . . , and 94(X). The resultant filter output vector data sample set 94(0)-94(X) is stored back in the respective vector data files 82(0)-82(X) for further use and/or processing by the VPE 22(1) without having to store and shift intermediate filter vector data output sample sets generated by the execution units 84(0)-84(X).

With continuing reference to FIG. 4 and as will be discussed in more detail below, the tapped-delay lines 78 are programmable to be controlled according to the vector instruction being processed. If a filter vector instruction is not being processed, the tapped-delay lines 78 can be programmed to not be included in the input data flow paths 80(0)-80(X) between the vector data files 82(0)-82(X) and the execution units 84(0)-84(X). In this embodiment, the tapped-delay lines 78 are configured to load and shift the input vector data sample set 86(0)-86(X) received from the vector data files 82(0)-82(X) to provide a shifted input vector data sample set 86S(0)-86S(X) for each filter tap of the filter vector processing operation. Thus, the shifted input vector data sample set 86S(0)-86S(X) can be provided to the execution units 84(0)-84(X) for execution of a filter tap of the filter vector processing operation. Without a tapped-delay line 78, a separate shifting process would have to be performed to provide the shifted intermediate input vector data sample set again to the execution units 84(0)-84(X) for subsequent filter taps of the filter vector processing operation, thereby increasing latency and consuming additional power. Further, the efficiency of the input and output data flow paths 80(0)-80(X), 98(0)-98(X) in the VPE 22(1) is not limited by the re-fetching delay of the shifted input vector data sample set 86S(0)-86S(X) from the vector data files 82(0)-82(X) during the filter vector processing operation.

The shifted input vector data sample set 86S(0)-86S(X) is provided by the tapped-delay lines 78 localized to the execution units 84(0)-84(X). The vector processing in the execution units 84(0)-84(X) is only limited by computational resources rather than by data flow limitations. This means that the execution units 84(0)-84(X) are kept busy continuously, or substantially continuously, receiving the shifted input vector data sample set 86S(0)-86S(X) for performing vector processing operations without having to wait for the shifted input vector data sample set 86S(0)-86S(X) to be fetched from the vector data files 82(0)-82(X).

Further, the filter vector processing operations performed by the VPE 22(1) in FIG. 4 may be more precise by employing the tapped-delay lines 78, because output accumulations for intermediate filter processing stages in the execution units 84(0)-84(X) do not have to be stored in the vector data files 82(0)-82(X). Storing of intermediate output vector data sample sets from the execution units 84(0)-84(X) in the vector data files 82(0)-82(X) may result in rounding. Thus, when the next intermediate output vector data sample set would be provided to the execution units 84(0)-84(X) for the vector processing operation, any rounding error would be propagated and added during each multiplication phase of the vector processing operation. In contrast, in the example of the VPE 22(1) in FIG. 4, the intermediate output vector data sample sets calculated by the execution units 84(0)-84(X) do not have to be stored in the vector data files 82(0)-82(X). The execution units 84(0)-84(X) can accumulate prior intermediate output vector data sample sets with intermediate output vector data sample sets for next filter delay taps, because the tapped-delay lines 78 provide the shifted input vector data sample set 86S(0)-86S(X) to the execution units 84(0)-84(X) during the vector processing operation to be processed, and the results are accumulated with prior vector data sample sets for prior filter delay taps.

With continuing reference to FIG. 4, the VPE 22(1) in this embodiment is comprised of a plurality of vector data lanes (labeled VLANE0-VLANEX) 100(0)-100(X)) for parallelized processing. Each vector data lane 100(0)-100(X) contains a vector data file 82 and an execution unit 84 in this embodiment. Taking vector data lane 100(0) as an example, the vector data file 82(0) therein is configured to provide the input vector data sample 86(0) on the input data flow path 80(0) to be received by the execution unit 84(0) for filter vector processing. As discussed above, the tapped-delay lines 78 are provided in the input data flow path 80(0) to shift the input vector data sample 86(0) and to provide the shifted input vector data sample 86S(0) to the execution unit 84(0) for filter vector processing. The vector data file 82(0) is also configured to receive a resultant filter output vector data sample 94(0) provided by the execution unit 84(0) as a result of filter vector processing from the output data flow path 98(0) to be stored back in the vector data file 82(0) for a subsequent vector processing operation, as needed or desired according to the current or next vector instruction to be processed by the VPE 22(1).

Any number of vector data lanes 100(0)-100(X) may be provided in the VPE 22(1) as desired. The number of vector data lanes 100(0)-100(X) provided in the VPE 22(1) may be based on tradeoffs for parallelized vector processing for efficiency purposes versus the additional circuitry, space, and power consumption involved in providing additional vector data lanes 100(0)-100(X). As one non-limiting example, sixteen vector data lanes 100 may be provided in the VPE 22(1), with each vector data lane 100 having a data width capability of thirty-two (32) bits, to provide for parallelized processing of up to 512 bits of vector data in the VPE 22(1).

With continuing reference to FIG. 4, using vector data file 82(0) in vector data lane 100(0) as an example but applicable to all vector data files 82(0)-82(X), the vector data file 82(0) allows one or multiple samples of an input vector data sample 86(0) to be stored for vector processing. The width of the input vector data sample 86(0) is provided according to programming of the input vector data sample 86(0) according to the particular vector instruction being executed by the VPE 22(1). The width of the input data flow path 80(0) is programmable and reprogrammable on a vector-instruction-by-vector-instruction basis, including on clock-cycle-by-clock-cycle basis for a given vector instruction to provide different widths of the input vector data sample 86(0) to the tapped-delay lines 78 and the execution unit 84(0). In this manner, the vector data lane 100(0) can be programmed and reprogrammed to provide processing of different widths of the input vector data sample 86(0) depending on the type of vector instruction being executed.

For example, the vector data file 82(0) may be thirty-two (32) bits wide and capable of storing input vector data samples 86 that are also up to thirty-two (32) bits wide. An input vector data sample 86(0) may consume the entire width of the vector data file 82(0) (e.g., 32 bits), or may be provided in smaller sample sizes of the vector data file 82(0) width. The input vector data sample 86(0) size can be configured based on programming of the input data flow path 80(0) configuration for the size of the input vector data sample 86(0) based on a vector instruction being executed by the VPE 22(1). For example, the input vector data sample 86(0) may comprise two (2) separate 16-bit vector data samples for one vector instruction. As another example, the input vector data sample 86(0) may comprise four (4) 8-bit vector data samples in the vector data file 82(0) for another vector instruction, as opposed to one (1) 32-bit vector data sample. In another example, the input vector data sample 86(0) may comprise one (1) 32-bit vector data sample. The VPE 22(1) is also capable of programming and reprogramming the output data flow path 98(0) for the vector data file 82(0) to receive different sizes of a resultant filter output vector data samples 94(0) provided by the execution unit 84(0) to the vector data file 82(0) for each vector instruction and/or each clock cycle of a given vector instruction.

Figure 5:
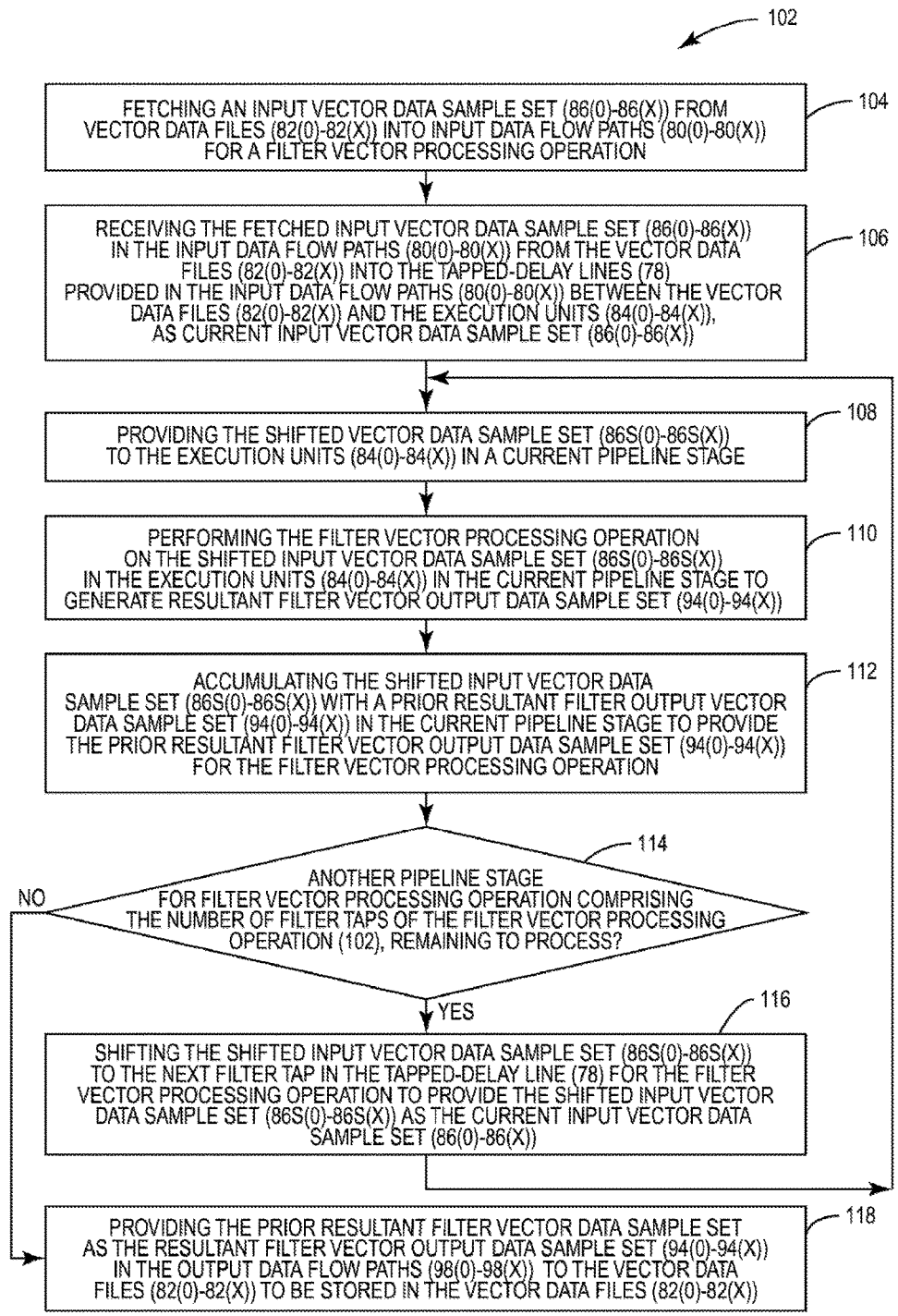
FIG. 5 is a flowchart illustrating an exemplary filter vector processing operation that can be performed in the VPE in FIG. 4 according to an exemplary filter vector instruction.

A further description of additional details and features of the VPE 22(1) in FIG. 4 and the tapped-delay lines 78 for providing the shifted input vector data sample set 86S(0)-86S(X) to the execution units 84(0)-84(X) in the input data flow paths 80(0)-80(X) in this embodiment will now be described. In this regard, FIG. 5 is a flowchart illustrating an exemplary filter vector processing operation 102 that can be performed in the VPE 22(1) in FIG. 4 employing the tapped-delay lines 78 according to an exemplary filter vector instruction. The exemplary tasks performed in the filter vector processing operation 102 in FIG. 5 will be described with reference to the examples provided in FIGS. 6A-10.

Figures 6A, 6B:
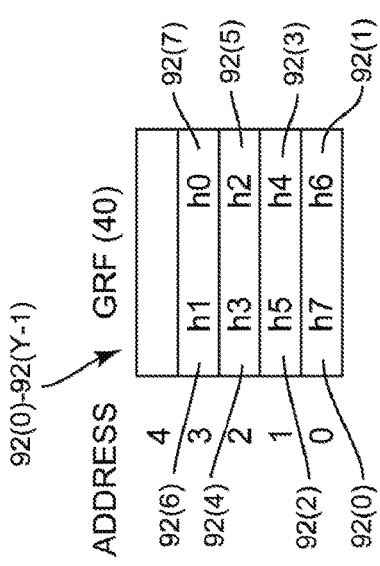
FIG. 6A is a schematic diagram of filter tap coefficients stored in a register file in the VPE of FIG. 4.
FIG. 6B is a schematic diagram of exemplary input vector data sample sets stored in a vector data file in the VPE in FIG. 4.

With reference to FIG. 5, the input vector data sample set 86(0)-86(X) to be processed in the filter vector processing operation 102 according to a filter vector instruction is fetched from vector data files 82(0)-82(X) into the input data flow paths 80(0)-80(X) for the filter vector processing operation 102 (block 104). As discussed above with regard to the VPE 22(1) in FIG. 4, the input vector data sample set 86(0)-86(X) is multiplied by the filter coefficients 92(0)-92(Y−1) received from the global register file 40 in the execution units 84(0)-84(X). For example, FIG. 6A illustrates filter coefficients 92(0)-92(Y−1) (i.e., h7-h0) in the global register file 40. In this example, there are eight (8) filter coefficients 92 stored in the global register file 40 providing eight (8) filter taps in the filter vector processing operation 102 to be performed. Note that in this example, the filter vector processing operation 102 from the discrete FIR filter 64 equation in FIG. 3 discussed above is $$y[n]=x[n]*h0+x[n-1]*h1+ \ldots +x[n-7]*h7.$$

FIG. 6B illustrates an exemplary input vector data sample set 86(0)-86(X) stored in the vector data files 82(0)-82(X) in the VPE 22(1) in FIG. 4 representing an input signal to be filtered by the filter vector processing operation 102. In this example, sample X0 is the oldest sample, and sample X63 is the most recent sample. In other words, in this example, sample X63 occurs in time after sample X0. Because each address of the vector data files 82(0)-82(X) is 16-bits wide, the first input vector data sample set 86(0)-86(X) stored in the vector data files 82(0)-82(X) spans ADDRESS 0 and ADDRESS 1, as shown in FIG. 6B. This allows the vector data files 82(0)-82(X) to provide input vector data samples 86 of 32-bit width to support the 32-bit width capability of the execution units 84(0)-84(X) in the VPE 22(1) example in FIG. 4. In this regard, there are sixty-four (64) total input vector data sample subsets (i.e., X0-X63) each 8-bits in width totaling 512 bits that comprise the first input vector data sample set 86(0)-86(X). Similarly, ADDRESS 2 and ADDRESS 3 store another, second input vector data sample set 86(0)-86(X) stored in the vector data files 82(0)-82(X). Note that in the example of FIG. 6B, eight (8) addresses (ADDRESS 0-7) of each vector data file 82(0)-82(X) are shown, which illustrate 256 total input vector data samples 86 (i.e., X0-X255), but such is not limiting.

Either one, some, or all of the vector data lanes 100(0)-100(X) in the VPE 22(1) in FIG. 4 can be employed to provide the filter vector processing operation 102 according to the programming of the vector instruction depending on the width of the input vector data sample set 86(0)-86(X) involved in the filter vector processing operation 102. If the entire width of the vector data files 82(0)-82(X) is required, all vector data lanes 100(0)-100(X) can be employed for the filter vector processing operation 102. Note that the filter vector processing operation 102 may only require a subset of the vector data lanes 100(0)-100(X) that may be employed for the filter vector processing operation 102. This may be because the width of the input vector data sample set 86(0)-86(X) is less than the width of all vector data files 82(0)-82(X), where it is desired to employ the additional vector data lanes 100 for other vector processing operations to be performed in parallel to the filter vector processing operation 102. For the purposes of discussing the current example, it is assumed that the input vector data sample set 86(0)-86(X) employed in the filter vector processing operation 102 involves all vector data lanes 100(0)-100(X).

With reference back to FIG. 5, a fetched input vector data sample set 86(0)-86(X) is provided to the input data flow paths 80(0)-80(X) from the vector data files 82(0)-82(X) to be loaded into the tapped delay-lines 78 as a current input vector data sample set 86(0)-86(X) (block 106). An input vector data sample set 86(0)-86(X) is loaded into the primary tapped-delay line 78(0) as the input vector data sample set 86(0)-86(X) to be processed by the execution units 84(0)-84(X) for the filter vector processing operation 102. The input vector data sample set 86(0)-86(X) loaded into the primary tapped-delay line 78(0) is not shifted for the first filter tap operation of the filter vector processing operation 102. However, as discussed above and discussed in more detail below with regard to FIG. 7, the purpose of the tapped-delay lines 78 is to provide shifting of the input vector data sample set 86(0)-86(X) to provide a shifted input vector data sample set 86S(0)-86S(X) to the execution units 84(0)-84(X) for subsequent filter tap operations of the filter vector processing operation 102. During each processing stage of the filter vector processing operation 102 executed by the execution units 84(0)-84(X), the input vector data samples 86 are shifted in the primary-tapped delay line 78(0) to provide the shifted input vector data sample set 86S(0)-86S(X) to the execution units 84(0)-84(X). In this manner, the input vector data sample set 86(0)-86(X) does not have to be stored, shifted in the vector data files 82(0)-82(X), and re-fetched for each filter tap operation of the filter vector processing operation 102.

If the optional shadow tapped-delay line 78(1) is provided in the VPE 22(1), a next input vector data sample set 86N(0)-86N(X) can also be loaded from the vector data files 82(0)-82(X) into the shadow tapped-delay line 78(1). As will be discussed in more detail below with regard to FIG. 7, the next input vector data sample set 86N(0)-86N(X) is shifted into the primary tapped-delay line 78(0) during the filter vector processing operation 102 to become at least part of the shifted input vector data sample set 86S(0)-86S(X). Thus, the primary tapped-delay line 78(0) can have the shifted input vector data sample set 86S(0)-86S(X) available during the filter vector processing operation 102 without fetching delay that would otherwise be incurred if the execution units 84(0)-84(X) were required to wait until the next input vector data sample set 86N(0)-86N(X) to be executed for the filter vector processing operation 102 was fetched from the vector data files 82(0)-82(X) into the primary tapped-delay line 78(0).

Figure 7:
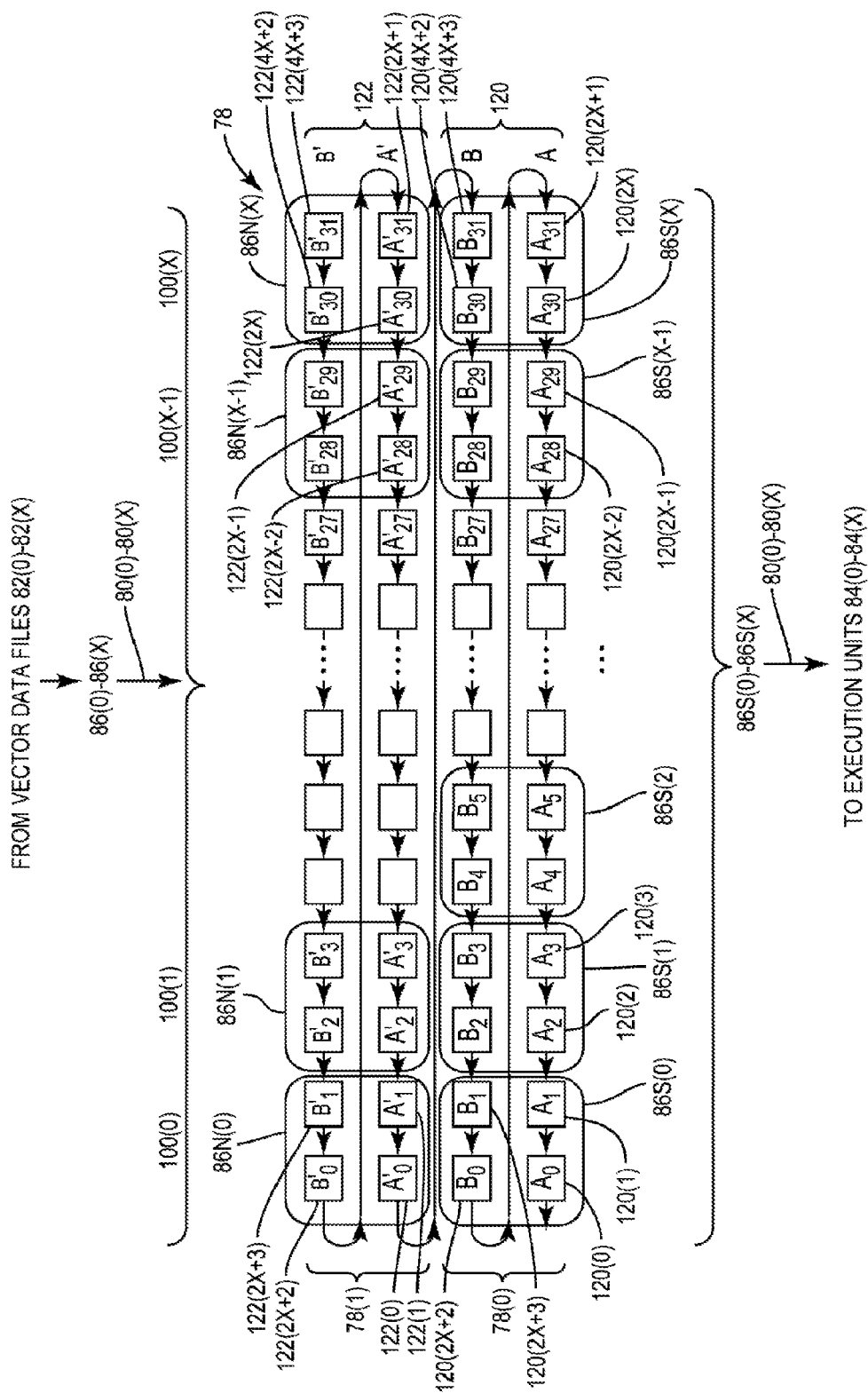
FIG. 7 is a schematic diagram illustrating an exemplary tapped-delay line and optional shadow tapped-delay line that can be provided in the VPE in FIG. 4, wherein the exemplary tapped-delay lines each comprise a plurality of pipeline registers for receiving and providing, to execution units, an input vector data sample set from vector data memory and a shifted input vector data sample set, during filter vector processing operations performed by the VPE.

In this regard, FIG. 7 illustrates the exemplary tapped-delay lines 78 that can be provided in the VPE 22(1) in FIG. 4. In this embodiment, the tapped-delay lines 78 comprise the shadow tapped-delay line 78(1) and the primary tapped-delay line 78(0). The primary-tapped delay line 78(0) in this example is comprised of a plurality of 8-bit primary pipeline registers 120 to allow resolution of input vector data samples 86 down to 8-bits in length. The first input vector data sample set 86(0)-86(X) processed by the execution units 84(0)-84(X) will be un-shifted in this example for the first filter tap of the filter vector processing operation 102, as will be discussed in regard to FIG. 9A below. As the execution units 84(0)-84(X) process subsequent filter taps for the filter vector processing operation 102, the input vector data samples 86 in the input vector sample set 86(0)-86(X) stored in the primary tapped-delay line 78(0) are shifted in the primary pipeline registers 120(0)-120(4X+3), as indicated by the arrows in FIG. 7, to become the shifted input vector data sample set 86S(0)-86S(X). In this manner, the execution units 84(0)-84(X) are fully utilized by receiving and performing the filter vector processing operation 102 of the shifted input vector data sample set 86S(0)-86S(X) without having to store and shift the input vector data sample set 86S(0)-86S(X), and re-fetch the shifted input vector data sample set 86S(0)-86S(X) from the vector data files 82(0)-82(X).

In this embodiment, the primary pipeline registers 120(0)-120(4X+3) collectively are the width of the vector data files 82(0)-82(X) in FIG. 4. In the example of the vector data files 82(0)-82(X) being 512-bits in width with "X" equal to fifteen (15), there will be sixty-four (64) total primary pipeline registers 120(0)-120(63) each of eight (8) bits in width to provide a total width of 512 bits (i.e., 64 registers×8 bits each). Thus in this example, the primary tapped-delay line 78(0) is capable of storing the entire width of one (1) input vector data sample set 86(0)-86(X). By providing the primary pipeline registers 120(0)-120(4X+3) of eight (8) bit widths in this example, the input vector data sample set 86(0)-86(X) can be shifted in the primary pipeline registers 120(0)-120(4X+3) down to a vector data sample size of eight (8) bits for 8-bit filter vector processing operations. If larger sized input vector data sample 86 sizes are desired for a filter vector processing operation, such as 16-bit or 32-bit samples for example, the input vector data sample set 86(0)-86(X) can be shifted in the primary pipeline registers 120(0)-120(4X+3) by two (2) primary pipeline registers 120 at a time.

With continuing reference to FIG. 7, the shadow tapped-delay line 78(1) is also provided in the tapped-delay line 78. The shadow tapped-delay line 78(1) can be employed to latch or pipeline a next input vector data sample set 86N(0)-86N(X) from the vector data files 82(0)-82(X) for a subsequent vector processing operation. A next input vector data samples 86N from the next input vector data sample set 86N(0)-86N(X) is shifted from the shadow tapped-delay line 78(1) into the primary tapped-delay line 78(0) as each filter tap for the filter vector processing operation 102 is executed by the execution units 84(0)-84(X). The shadow tapped-delay line 78(1) is also comprised of a plurality of 8-bit shadow pipeline registers 122 to allow resolution of input vector data samples 86 down to 8-bits in length similar to the primary tapped-delay line 78(0). Like the primary pipeline registers 120(0)-120(4X+3), the shadow pipeline registers 122(0)-122(4X+3) provided in the shadow tapped-delay line 78(1) collectively are the width of the vector data files 82(0)-82(X), which is 512-bits in this example. Thus, the shadow pipeline registers 122(0)-122(4X+3) of the shadow tapped-delay line 78(1) are also capable of storing the entire width of one (1) input vector data sample set 86(0)-86(X). Thus in this embodiment, the number of shadow pipeline registers 122(0)-122(4X+3) included in the primary tapped-delay line 78(0) is four times the number of vector data lanes 100(0)-100(X), which total sixteen (16) in this example (i.e., X=15). Thus, the number of shadow pipeline registers 122 also totals sixty-four (64) in this example for a total of 512 bits (i.e., 64 registers×8 bits each). As discussed above with regard to the primary tapped-delay line 78(0), by providing the shadow pipeline registers 122(0)-122(4X+3) of eight (8) bit widths in this example, the next input vector data sample set 86N(0)-86N(X) can be shifted down to a vector data sample size of eight (8) bits for 8-bit filter vector processing operations.

Figure 8:
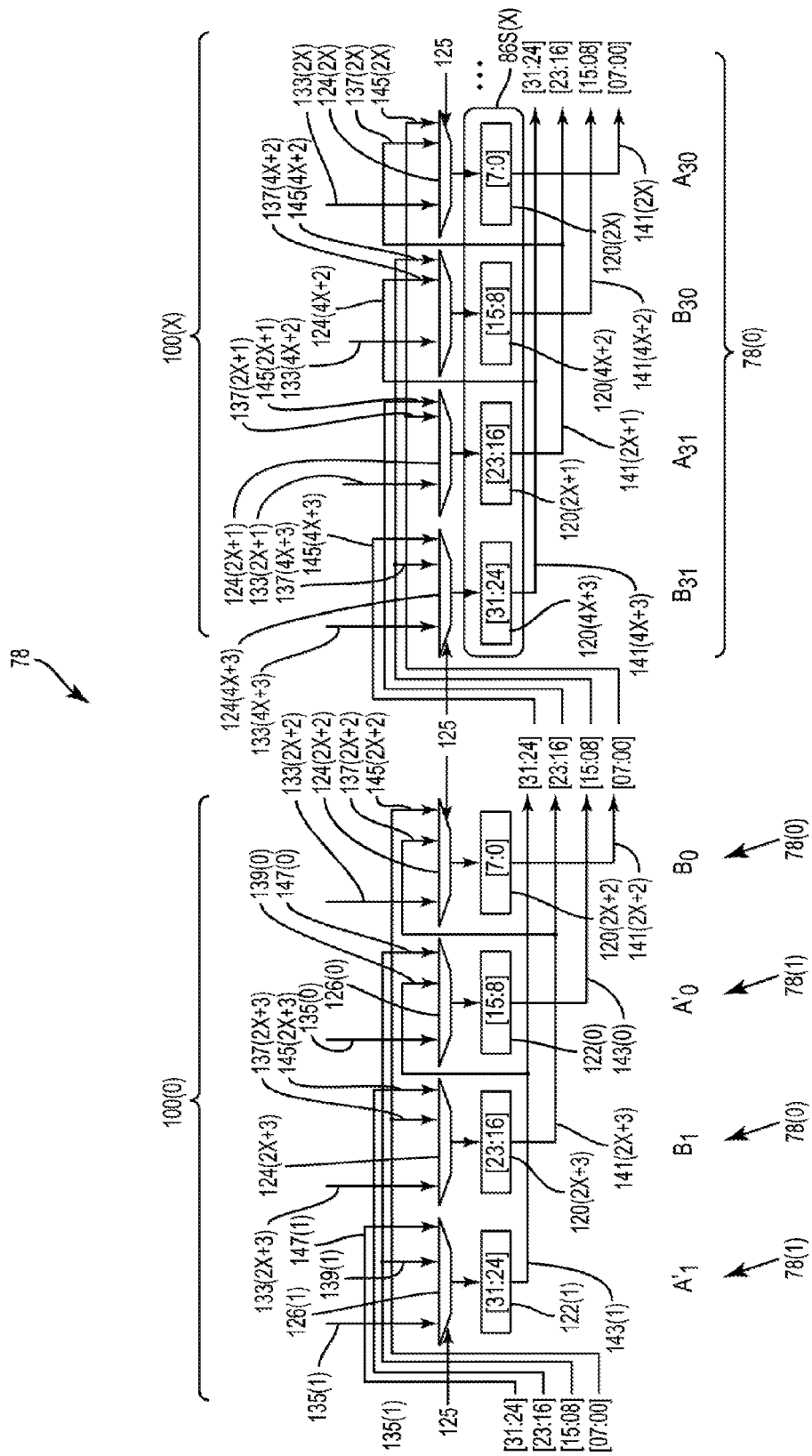
FIG. 8 is a schematic diagram illustrating more exemplary detail of the tapped-delay lines in FIG. 7, illustrating exemplary detail of pipeline registers in data lanes, including intra-lane and inter-lane routing among the pipeline registers for shifting of input vector data samples in an input vector data sample set during a filter vector processing operation.

FIG. 8 is a schematic diagram illustrating selected primary pipeline and shadow pipeline registers 120, 122 present in the primary and shadow tapped-delay lines 78(0), 78(1) in FIG. 7. FIG. 8 is provided to facilitate discussing an example of shifting input vector data samples 86 between primary and shadow pipeline registers 120, 122. As discussed above, the input vector data samples 86 can also be shifted within the primary and shadow tapped-delay lines 78(0), 78(1) as well as from the shadow tapped-delay line 78(1) to the primary tapped-delay line 78(0). The pipeline registers 120, 122 are each 8-bits wide in this example to allow for input vector data sample 86 shifting at 8-bits of resolution if desired. This will be discussed in more detail below. The primary and shadow tapped-delay lines 78(0), 78(1) are also capable of performing 16-bit and 32-bit shifting resolution of input vector data samples 86, as will also be discussed in more detail below.

In this regard, FIG. 8 illustrates shifting of input vector data samples 86 into primary pipeline registers 120(4X+3), 120(2X+1), 120(4X+2), and 120(2X) that form the storage registers for input vector data sample 86S(X) in the primary tapped-delay line 78(0) in FIG. 7. Primary pipeline registers 120(4X+3) and 120(4X+2) are registers $B_{31}$ and $B_{30}$, respectively, in the primary tapped-delay line 78(0) in FIG. 7. Primary pipeline registers 120(2X+1) and 120(2X) are registers $A_{31}$ and $A_{30}$, respectively, in the primary tapped-delay line 78(0) in FIG. 7. As illustrated in FIG. 7, primary pipeline registers 120(4X+3) and 120(4X+2) for registers $B_{31}$ and $B_{30}$ are configured to receive shifted input vector data samples 86 from adjacent shadow pipeline registers 122 in the shadow tapped-delay line 78(1). Thus, in the example in FIG. 8, shadow pipeline registers 122(0), 122(1) for registers $A'_0$ and $A'_1$, respectively, are illustrated as being configured to shift input vector data samples 86 into primary pipeline registers 120(4X+3) and 120(4X+2) for $B_{31}$ and $B_{30}$. Similarly, in the example in FIG. 8, primary pipeline registers 120(2X+3) and 120(2X+2) for registers $B_1$ and $B_0$, respectively, in the primary tapped-delay line 78(0) are illustrated as being configured to shift input vector data samples 86 into adjacent primary pipeline registers 120(2X+1) and 120(2X) for registers $A_{31}$ and $A_{30}$. Exemplary shifting of input vector data samples 86 between these registers will now be discussed.

With continuing reference to FIG. 8, to provide for the flexibility to configure the primary and shadow pipeline registers 120, 122 to load new input vector data sample sets 86(0)-86(X) from the vector data files 82(0)-82(X) in FIG. 4 as well as shifting of the input vector data samples 86, an input vector data sample selector is associated with each of the primary and shadow pipeline registers 120, 122. In this regard, input vector data sample selectors 124(0)-124(4X+3) are provided to vector data loaded or shifted into primary pipeline registers 120(0)-120(4X+3), respectively, in the primary tapped-delay line 78(0). Input vector data sample selectors 126(0)-126(4X+3) are provided to vector data loaded or shifted into shadow pipeline registers 122(0)-122(4X+3), respectively, in the shadow tapped-delay line 78(1). The input vector data sample selectors 124(0)-124(4X+3) and input vector data sample selectors 126(0)-126(4X+3) are each a multiplexor in this example. As will be discussed in more detail below, the input vector data sample selectors 124(0)-124(4X+3), 126(0)-126(4X+3) can each be controlled by data width shift control inputs 125 to select input vector data to either be loaded or shifted into the primary and shadow pipeline registers 120(0)-120(4X+3), 122(0)-122(4X+3).

Note that in FIG. 8, only input vector data sample selectors 124(4X+3), 124(4X+2), 124(2X+1), 124(2X) are shown for primary pipeline registers 120(4X+3), 120(4X+2), 120(2X+1), 120(2X), respectively, which correspond to registers $B_{31}$, $B_{30}$, $A_{31}$ and $A_{30}$, respectively. Only input vector data sample selectors 126(1), 126(0), 124(2X+3), 124(2X+2) are shown in FIG. 8 for pipeline registers 122(1), 122(0), 120(2X+3), 120(2X+2), respectively, which correspond to registers $A'_1$, $A'_0$, $B_1$, and $B_0$, respectively.

With continuing reference to FIG. 8, if new input vector data is to be loaded into the primary and shadow tapped-delay lines 78(0), 78(1) for a vector processing operation, the data width shift control inputs 125 can be configured by the VPE 22(1) in FIG. 4 to cause the input vector data sample selectors 124(4X+3), 124(4X+2), 124(2X+1), 124(2X) to select the load data flow paths 133 (4X+3), 133 (4X+2), 133(2X+1), 133(2X). Selecting the load data flow paths 133 (4X+3), 133(4X+2), 133(2X+1), 133(2X) allows input vector data from the vector data files 82(0)-82(X) to be stored in the primary pipeline registers 120(4X+3), 120(4X+2), 120(2X+1), 120(2X). Loading input vector data from the vector data files 82(0)-82(X) may be performed on a new or next vector instruction to be processed by the VPE 22(1) as an example. Similarly, the data width shift control inputs 125 can also be configured by the VPE 22(1) in FIG. 4 to cause the input vector data sample selectors 126(1), 124 (2X+3), 126(0), 124(2X+2) to select the input data flow paths 135(1), 133(2X+3), 135(0), 133(2X+2). Selecting the load data flow paths 135(1), 133(2X+3), 135(0), 133(2X+2) allows input vector data from the vector data files 82(0)-82 (X) to be stored in the pipeline registers 122(1), 120(2X+3), 124(0), 120(2X+2).

With continuing reference to FIG. 8, if the vector data stored in the primary tapped-delay line 78(0) and shadow tapped-delay line 78(1) is desired to be shifted for a vector processing operation, the data width shift control inputs 125 can be configured by the VPE 22(1) in FIG. 4 to cause the input vector data sample selectors 124(4X+3), 124(4X+2), 124(2X+1), 124(2X) to select the input data flow paths 137(4X+3), 137(4X+2), 137(2X+1), 137(2X) for vector data sample shifting. The data width shift control inputs 125 also cause the input vector data sample selectors 126(1), 124 (2X+3), 126(0), 124(2X+2) to select the input data flow paths 139(1), 137(2X+3), 139(0), 137(2X+2) for vector data sample shifting. As illustrated therein, the input vector data sample selectors 124(4X+3), 124(4X+2), 124(2X+1), 124 (2X) and input vector data sample selectors 126(1), 124 (2X+3), 126(0), 124(2X+2) each include output data flow paths 141(4X+3), 141(4X+2), 141(2X+1), 141(2X) and 143 (1), 141(2X+3), 143(0), 124(2X+2), respectively, that allow vector data to be shifted to other registers. The output data flow paths shown in FIG. 8 are part of the output data flow paths 141(0)-141(4X+3) and 143(0)-143(4X+3) that are now shown in total, but included for the input vector data sample selectors 124(0)-124(4X+3) in the primary tapped-delay line 78(0) and the input vector data sample selectors 126(0)-126(4X+3) in the shadow tapped-delay line 78(1), respectively.

As examples, during 8-bit vector data shifting, the input vector data sample selectors 124(4X+3), 124(4X+2), 124 (2X+1), 124(2X) and input vector data sample selectors 126(1), 124(2X+3), 126(0), 124(2X+2) are configured to select the input data flow paths 137(4X+3), 137(4X+2), 137(2X+1), 137(2X), 139(1), 137(2X+3), 139(0), **137(2X+

2), respectively. In this regard, as an example, the vector data in primary pipeline register 120(2X+1) (i.e., $A_{31}$) is shifted on output data flow path 141 (2X+1) to primary pipeline register 120(2X) (i.e., $A_{30}$), as illustrated in FIG. 8. The vector data in primary pipeline register 120(4X+3) (i.e., $B_{31}$) is shifted on output data flow path 141 (4X+3) to primary pipeline register 120(4X+2) (i.e., $B_{30}$), as illustrated in FIG. 8. The vector data in shadow pipeline register 122(0) (i.e., $A'_0$) is shifted on output data flow path 143(0) to primary pipeline register 120(4X+3) (i.e., $B_{31}$), as illustrated in FIG. 8. The vector data in primary pipeline register 120(2X+3) (i.e., $B_1$) is shifted on output data flow path 141(2X+3) to primary pipeline register 120(4X+2) (i.e., $B_{30}$), as illustrated in FIG. 8. The vector data in shadow pipeline register 122(1) (i.e., $A'_1$) is shifted on output data flow path 143(1) to shadow pipeline register 122(0) (i.e., $A'_0$), as illustrated in FIG. 8. The vector data in primary pipeline register 120 (2X+2) (i.e., $B_0$) is shifted on output data flow path 141 (2X+2) to primary pipeline register 120(2X+1) (i.e., $A_{31}$), as illustrated in FIG. 8.

With continuing reference to FIG. 8, during 16-bit vector data shifting, the input vector data sample selectors 124(4X+3), 124(4X+2), 124(2X+1), 124(2X) and input vector data sample selectors 126(1), 124(2X+3), 126(0), 124(2X+2) are configured to select the input data flow paths 145(4X+3), 145(4X+2), 145(2X+1), 145(2X), 147(1), 145(2X+3), 147 (0), 145(2X+2), respectively. In this regard, as an example, the vector data in primary pipeline register 120(2X+2) (i.e., $B_0$) is shifted on output data flow path 141(2X+2) to primary pipeline register 120(2X) (i.e., $A_{30}$), as illustrated in FIG. 8. The vector data in shadow pipeline register 122(0) (i.e., $A'_0$) is shifted on output data flow path 143(0) to primary pipeline register 120(4X+2) (i.e., $B_{30}$), as illustrated in FIG. 8. The vector data in primary pipeline register 120(2X+3) (i.e., $B_1$) is shifted on output data flow path 141(2X+3) to primary pipeline register 120(2X+1) (i.e., $A_{31}$), as illustrated in FIG. 8. The vector data in shadow pipeline register 122(1) (i.e., $A'_1$) is shifted on output data flow path 143(1) to primary pipeline register 120(4X+3) (i.e., $B_{31}$), as illustrated in FIG. 8.

If 32-bit vector data shifting is desired in the primary and shadow tapped-delay lines 78(0), 78(1), the vector data stored in the primary pipeline registers 120(0)-120(4X+3) and the shadow pipeline registers 122(0)-122(4X+3) can be shifted in two (2) 16-bit vector data shift operations, if desired.

Note in FIG. 7 that primary pipeline registers 120(4X+3), 120(4X+2) for registers $B_{31}$ and $B_{30}$, and primary pipeline registers 120(2X+1), 120(2X) for registers $A_{31}$ and $A_{30}$, are logically associated with each other to shifted input vector data sample 86S(X), but are not physically adjacent to each other as illustrated in FIG. 8. This arrangement is provided in this example due to the storage pattern of the input vector data sample set 86(0)-86(X) in the vector data files 82(0)-82(X), as illustrated in FIG. 6B. As also illustrated in FIG. 6B, the input vector data sample set 86(0)-86(X) stored in the vector data files 82(0)-82(X) spans ADDRESS 0 and ADDRESS 1. Note however, that the disclosure herein is not limited to this storage pattern of the input vector sample set 86(0)-86(X) in the vector data files 82(0)-82(X).

Further, with regard to FIG. 8, the tapped-delay lines 78(0), 78(1) are configurable to be selectively provided or not provided in the input data flow paths 80(0)-80(X) between the vector data files 82(0)-82(X) and the execution units 84(0)-84(X) based on a programmable input data path configuration for the tapped-delay lines 78(0), 78(1) according to a vector instruction to be executed. For example, if the vector instruction is not a filter vector processing instruction and/or does not otherwise require the tapped-delay lines 78(0), 78(1) to shift the input vector data sample sets 86(0)-86(X), the tapped-delay lines 78(0), 78(1) can be configured to not latch the input vector data sample sets 86(0)-86(X). The input vector data sample sets 86(0)-86(X) can be provided from the vector data files 82(0)-82(X) to the respective execution units 84(0)-84(X) by bypassing the primary and shadow tapped-delay lines 78(0), 78(1). This programmable data path configuration further allows the primary and shadow tapped-delay lines 78(0), 78(1) to be provided or not provided in the input data flow paths 80(0)-80(X). The primary and shadow tapped-delay lines 78(0), 78(1) can be programmed to be provided or not provided in the input data flow paths 80(0)-80(X) for each vector instruction, as desired.

FIG. 9A illustrates an input vector data sample set 86(0)-86(X) loaded from the vector data files 82(0)-82(X) into the primary tapped-delay line 78(0) during a first clock cycle (CYCLE0) of a filter vector processing instruction. The primary tapped-delay line 78(0) and the shadow tapped-delay line 78(1) are shown in simplified form from FIG. 7. The global register file 40 is also shown. The first input vector data sample set 86(0)-86(X) is loaded into the primary tapped-delay line 78(0) as input vector data samples X0-X63. For example, a special vector instruction may be supported to load the first input vector data sample set 86(0)-86(X) into the primary tapped-delay line 78(0) (and also the shadow-tapped delay line 78(1), as discussed in more detail below). This first input vector data sample set 86(0)-86(X) was stored in ADDRESSES 0 and 1 in the vector data files 82(0)-82(X) shown in FIG. 6B. Note that in this example, X0, X1, X32, and X33 form the first input vector data sample 86(0), only because of the storage pattern of the vector data files 82(0)-82(X) in the VPE 22(1) in FIG. 4 for this example. Other input vector data samples 86 are similarly formed as shown in FIG. 9A (e.g., 86(1), 86(2), . . . 86(X)). Other patterns could be provided to group the input vector data samples 86 together to form the input vector data sample set 86(0)-86(X).

FIG. 9B illustrates a next input vector data sample set 86N(0)-86N(X) loaded into the shadow tapped-delay line 78(1) during a second clock cycle (CYCLE1) of a filter vector processing instruction. The next input vector data sample set 86N(0)-86N(X) is loaded into the shadow tapped-delay line 78(1) after the first input vector data sample set 86(0)-86(X) from the vector data files 82(0)-82 (X) is loaded into the primary tapped-delay line 78(0) to setup the execution of a filter processing operation. This next input vector data sample set 86N(0)-86N(X) is loaded into the shadow tapped-delay line 78(1) as input vector data samples X64-X127. This next input vector data sample set 86N(0)-86N(X) was stored in ADDRESSES 2 and 3 in the vector data files 82(0)-82(X) shown in FIG. 6B. Note that in this example, X64, X65, X96, and X97 form the first input vector data sample 86(0), only because of the storage pattern of the vector data files 82(0)-82(X) in the VPE 22(1) in FIG. 4 for this example. Other patterns could be provided to group the input vector data samples 86 together to form the input vector data sample set 86(0)-86(X). The first filter coefficients 92(0) from the global register file 40 are also shown as provided in a register ("C") to the execution units 84(0)-84(X) in FIG. 9B for use in the filter vector processing operation 102.

With reference back to FIG. 7, as the input vector data samples 86 are shifted in the primary tapped-delay line 78(0) during each processing stage of the filter vector processing operation 102, the next input vector data samples 86N stored in the shadow pipeline registers 122 are also shifted in the shadow pipeline registers 122 of the shadow tapped-delay line 78(1). The input vector data sample 86 stored in the first shadow pipeline register 122(0) in FIG. 7 is shifted into the last primary pipeline register 120(4X+3) of the primary tapped-delay line 78(0) during each shift. Thus, in this manner, as the filter vector processing operation 102 processing stages progress in the execution units 84(0)-84(X), at least a portion of the next input vector data sample set 86N(0)-86N(X) initially stored in the shadow tapped-delay line 78(1) is shifted into the primary tapped-delay line 78(0) to be provided to the execution units 84(0)-84(X) for processing. The number of shifts will be dependent on the number of filter taps provided in the filter vector processing operation 102 in this example. If the number of input vector data samples 86 in the input vector data sample set 86(0)-86(X) fetched into the primary tapped-delay line 78(0) and shadow tapped-delay line 78(1) from the vector data files 82(0)-82(X) is less than the number of filter taps in the filter vector processing operation 102, the execution units 84(0)-84(X) can perform the filter vector processing operation 102 without any further input vector data sample sets 86(0)-86(X) being re-fetched from the vector data files 82(0)-82(X). However, if the number of filter taps in the filter vector processing operation 102 is greater than the input vector data samples 86 in the input vector data sample set 86(0)-86(X) fetched into the primary tapped-delay line 78(0) and shadow tapped-delay line 78(1) from the vector data files 82(0)-82(X), additional input vector data sample sets 86(0)-86(X) can be fetched from the vector data files 82(0)-82(X) as part of the filter vector processing operation 102. After the filter vector processing operation 102 is complete on the shifted input vector data sample set 86S(0)-86S(X), the execution units 84(0)-84(X) can then be provided with the previous next input vector sample data set 86N(0)-86N(X) stored in the primary tapped-delay line 78(0) as the shifted input vector data sample set 86S(0)-86S(X) for a next vector processing operation if unprocessed input vector data sample 86S are present in the tapped-delay lines 78(0), 78(1).

Another exemplary rationale for providing the shadow tapped-delay line 78(1) is as follows. If a current filter vector processing operation 102 involves more input vector data samples 86 than can be provided in the width of the vector data lanes 100(0)-100(X), an additional input vector data sample set 86(0)-86(X) loaded into the shadow tapped-delay line 78(1) will be available to the execution units 84(0)-84(X) during the filter vector processing operation 102 without delay. As the filter vector processing operation 102 progresses through the shifted input vector data sample sets 86S(0)-86S(X) during execution, as discussed above, additional next input vector data sample sets 86N(0)-86N(X) loaded into the shadow tapped-delay line 78(1) are shifted into the primary tapped-delay line 78(0). Thus in this manner, the next input vector data sample set 86N(0)-86N(X) for use in vector processing by the execution units 84(0)-84(X) is available without delay. The execution units 84(0)-84(X) can continue to be fully utilized during the filter vector processing operation 102 regardless of whether a single fetched input vector data sample set 86(0)-86(X) of the width of the vector data files 82(0)-82(X) is sufficient to perform the entire filter vector processing operation 102.

After the first input vector data sample set 86(0)-86(X) and next input vector data sample set 86N(0)-86N(X) are loaded into the primary tapped-delay line 78(0) and the shadow tapped-delay line 78(1), respectively, the first input vector data sample set 86(0)-86(X) provided in the primary tapped-delay line 78(0) is provided to the respective execution units 84(0)-84(X) to be processed in a first processing stage of the filter vector processing operation 102 (block 108 in FIG. 5). The first input vector data sample set 86(0)-86(X) is shifted in the primary tapped-delay line 78(0) to become the shifted input vector data sample set 86S(0)-86S(X) to be processed by the execution units 84(0)-84(X) after the first input vector data sample set 86(0)-86(X) is processed by the execution units 84(0)-84(X). The shifted input vector data sample 86S(0) is provided to the execution unit 84(0), the shifted input vector data sample 86S(1) is provided to the execution unit 84(1), and so on, as illustrated in the VPE 22(1) in FIG. 4.

Next, the execution units 84(0)-84(X) perform the filter vector processing operation 102 (block 110 in FIG. 5). More particularly, the execution units 84(0)-84(X) multiply the first input vector data sample set 86(0)-86(X) by the current filter coefficient 92(0) in a first iteration according to the operation: $y[n]=x[n-7]*h7$ in this example, where $x[n-7]$ is the first input vector data sample set 86(0)-86(X) to provide the resultant filter output vector data sample set 94(0)-94(X). In subsequent iteration of the filter vector processing operation 102 (block 110 in FIG. 5), subsequent shifted input vector data sample sets 86S(0)-86S(X) for the filter vector processing operation 102 are multiplied by the current filter coefficient 92(1)-92(Y−1). The execution units 84(0)-84(X) accumulate the resultant filter vector output vector data sample set 94(0)-94(X) with the prior resultant filter output vector data sample set 94(0)-94(X) calculated by the execution units 84(0)-84(X) to provide the new prior resultant filter output vector data sample set 94(0)-94(X) (block 112 in FIG. 5). In the first processing stage of the filter vector processing operation 102, there is no prior resultant filter output vector data sample set.

If all processing stages of the filter vector processing operation 102 have been completed (block 114 in FIG. 5), the accumulated prior resultant filter output vector data sample set 94(0)-94(X) is provided as the resultant filter output vector data sample set 94(0)-94(X) in the output data flow paths 98(0)-98(X) to be provided and stored in the vector data files 82(0)-82(X) (block 116 in FIG. 5). If all processing stages of the filter vector processing operation 102 have not been completed (block 114 in FIG. 5), the samples stored in the tapped-delay lines 78(0) and 78(1) are shifted within the tapped-delay lines 78(0), 78(1) to provide a next shifted input vector data sample set 86S(0)-86S(X) for the filter vector processing operation 102 (block 118 in FIG. 5). The shifted input vector data sample set 86S(0)-86S(X) is provided for calculating a next resultant filter output vector data sample set as an intermediate result to be accumulated with the prior resultant filter output vector data sample set until the filter vector processing operation 102 is complete. The shifting of the input vector data samples 86 to provide the shifted input vector data sample set 86S(0)-86S(X) in the tapped-delay lines 78(0), 78(1) was previously described above in detail with regard to FIG. 7. The final accumulation of the intermediate results provided by the execution units 84(0)-84(X) for the filter vector processing operation 102 is provided as the resultant filter output vector data sample set 94(0)-94(X) from the execution units 84(0)-84(X), as illustrated in FIG. 4.

FIG. 9C illustrates the contents of the tapped-delay lines 78 when the input vector data sample set 86(0)-86(X) is shifted in a second processing stage of the filter vector processing operation 102 to become the next shifted input vector data sample set 86S(0)-86S(X) for the next filter processing operation y[n]=x[n−6] *h6. The shifted input vector data sample set 86S(0)-86S(X) in the primary tapped-delay line 78(0) is shifted in the primary pipeline registers 120(0)-120(4X+3) according to the width of input vector data sample shifting prescribed by the vector instruction being executed. For example, sample X2 is shifted in shifted input vector data sample 86S(0), as illustrated in FIG. 9C. The new shifted input vector data sample set 86S(0)-86S(X) is provided to the execution units 84(0)-84(X) for execution for the next filter tap of the filter vector processing operation 102. The filter coefficient 92 provided to the execution units 84(0)-84(X) is also the next filter coefficient 92, which is "h6" in this example.

With continuing reference to FIG. 5, the process repeats by providing the shifted input vector data sample set 86S(0)-86S(X) from the primary tapped-delay line 78(0) to the execution units 84(0)-84(X) (block 108 in FIG. 5) to be multiplied with the next filter coefficient 92 (block 110 in FIG. 5). The resultant filter output vector data sample set 94(0)-94(X) is accumulated with the prior resultant filter output vector data sample set 94(0)-94(X) (block 112 in FIG. 5). FIG. 9D illustrates the state of the input vector data samples 86 present in the tapped-delay lines 78(0), 78(1) during the last processing stage of the exemplary filter vector processing operation 102. In this example as shown in FIG. 9D, there were eight (8) filter taps (Y) in the filter vector processing operation 102, because of filter coefficients 92 "h7"-"h0" (i.e., 92(0)-92(Y−1)). "h0" is the last filter coefficient 92 in the filter vector processing operation 102 as shown in FIG. 9D. The shifted input vector data sample set 86S(0)-86S(X) has been shifted seven (7) times (one time less than the number of filter taps) such that input vector data sample X39 is stored in the shifted input vector data sample 86S(0) in the primary tapped-delay line 78(0) in the final, eighth, processing stage for the filter vector processing operation 102.

Note that while the example of the filter vector processing operation 102 described above employs each of the vector data lanes 100(0)-100(X) in the VPE 22(1) to provide the filter vector processing operation 102, such is not required. The filter vector processing operation 102 may only require a subset of the vector data lanes 100(0)-100(X) to be employed for the filter vector processing operation 102. For example, the width of the input vector data sample set 86(0)-86(X) may be less than the width of all vector data files 82(0)-82(X), where it is desired to employ the additional vector data lanes 100 for other vector processing operations to be performed in parallel to the filter vector processing operation 102. In this scenario, the tapped-delay lines 78(0), 78(1) in FIG. 7 may need to be modified to shift the next input vector data sample set 86N(0)-86N(X) from the shadow tapped-delay line 78(1) to the primary tapped-delay line 78(0) as shifted input vector data sample set 86S(0)-86S(X) in a vector data lane 100 prior to reaching the end vector data lane 100(X).

Figure 10:
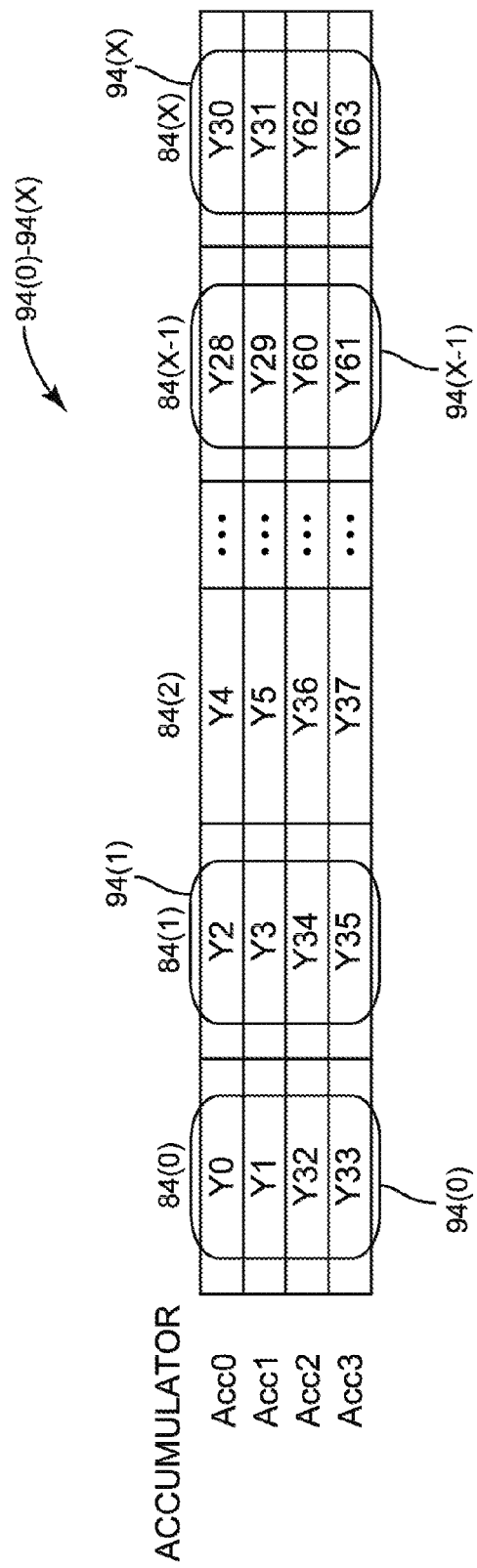
FIG. 10 is a schematic diagram of contents of accumulators of the execution units in the VPE of FIG. 4 after the exemplary eight (8) tap filter vector processing operation has been fully executed.

FIG. 10 is a schematic diagram of contents of accumulators (i.e., the resultant filter output vector data samples 94) in the execution units 84(0)-84(X) in the VPE 22(1) of FIG. 4 after the exemplary eight (8) tap filter vector processing stages in the above example have been fully executed according to y[n]=x[n]*h0+x[n−1]*h1+ . . . x[n−7]*h7 Accumulators Acc0-Acc3 are shown in FIG. 10, because in this example, each execution unit 84(0)-84(X) has four accumulators disposed in parallel for each vector data lane 100(0)-100(X). The accumulated resultant output vector data samples can be provided on the output data flow paths 98(0)-98(X) to the vector data files 82(0)-82(X) as the collective resultant filter output vector data sample set 94(0)-94(X) to be stored therein for further analysis and/or processing. A specialized vector instruction may be supported by the VPE 22(1) to move rows of the resultant filter output vector data sample set 94(0)-94(X) from the vector data files 82(0)-82(X) to the vector unit data memory 32 of FIG. 2, if desired.

Other types of vector processing operations other than the filter vector processing operation 102 can also enjoy processing efficiencies in a VPE by use of tapped-delay lines 78 like or similar to that provided in the VPE 22(1) in FIG. 4 discussed above. For example, another specialized vector processing operation that involves shifting of input vector data sample sets 86 in a VPE is a correlation/covariance vector processing operation (referred to herein as "correlation vector processing operation"). As an example, it may be desired to employ vector processing to provide correlation operations to choose the direct spread-spectrum code (DSSC) (i.e., chip sequence) for demodulating a user signal in a CDMA system to provide good separation between the user signal and signals of other users in the CDMA system. The separation of the signals is made by correlating the received signal with the locally generated chip sequence of the desired user. If the signal matches the desired user's chip sequence, the correlation function will be high and the CDMA system can extract that signal. If the desired user's chip sequence has little or nothing in common with the signal, the correlation should be as close to zero as possible (thus eliminating the signal), which is referred to as cross-correlation. If the chip sequence is correlated with the signal at any time offset other than zero, the correlation should be as close to zero as possible. This is referred to as auto-correlation, and is used to reject multi-path interference.

However, correlation operations may be difficult to parallelize in vector processors due to the specialized data flow paths provided in vector processors. When the input vector data sample set representing the signal to be correlated is shifted between delay taps, the input vector data sample set is re-fetched from the vector data file, thus increasing power consumption and reducing throughput. To minimize re-fetching of the input vector data sample set from memory, the data flow path could be configured to provide the same number of multipliers as delay taps for efficient parallelized processing. However, other vector processing operations may require fewer multipliers thereby providing inefficient scaling and underutilization of the multipliers in the data flow path. If the number of multipliers is reduced to be fewer than the number of delay taps to provide scalability, parallelism is limited by more re-fetches being required to memory to obtain the same input vector data sample set for different phases of the correlation processing.

Figure 11:
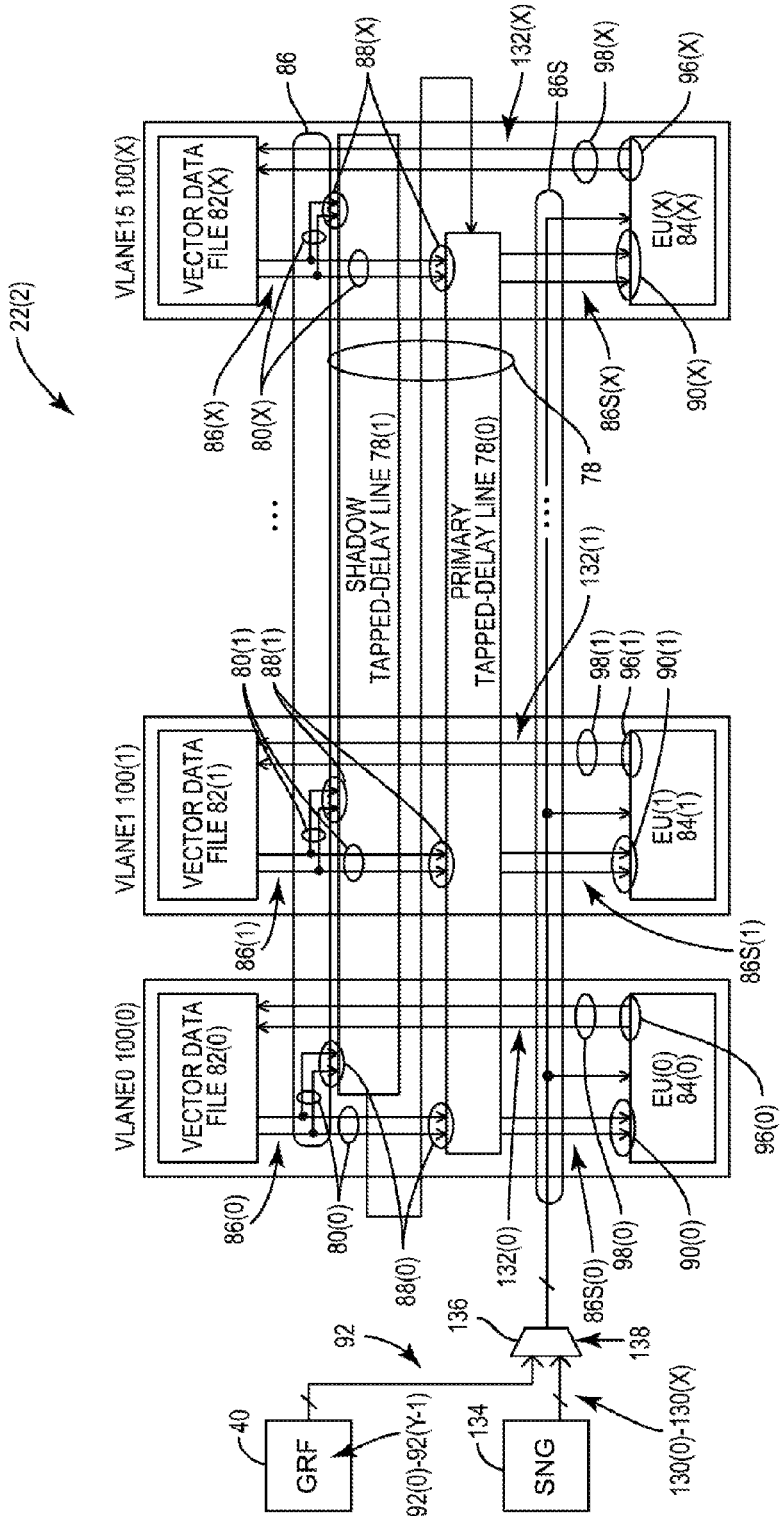
FIG. 11 is a schematic diagram of an exemplary VPE employing tapped-delay lines to receive and provide shifted input vector data sample sets to execution units to be processed with sequence number data for providing precision correlation/covariance vector processing operations with reduced re-fetching and power consumption.

In this regard, FIG. 11 is a schematic diagram of another exemplary VPE 22(2) that can be provided as the VPE 22 in FIG. 2. As will be described in more detail below, the VPE 22(2) in FIG. 11 is configured to provide precision correlation vector processing operations in the VPE 22(2) with eliminated or reduced vector data sample re-fetching and reduced power consumption. The precision correlation vector processing operations can be provided in the VPE 22(2) as compared to correlation vector processing operations that require storage of intermediate results requiring vector data sample re-fetching, thereby increasing power consumption as a result. To eliminate or minimize re-fetching of input vector data samples from a vector data file to reduce power consumption and improve processing efficiency, the tapped-delay lines 78 included in the VPE 22(1) in FIG. 4 are also included in the input data flow paths 80(0)-80(X) between the vector data files 82(0)-82(X) and execution units 84(0)-84(X) (also labeled "EU") in the VPE 22(2). 'X'+1 is the maximum number of parallel input data lanes provided in the VPE 22(2) for processing of vector data samples in this example. As previously discussed above, the tapped-delay lines 78 are configured to receive an input vector data sample set 86(0)-86(X) on tapped-delay line inputs 88(0)-88(X) as a subset or all of input vector data samples 86 of the input vector data sample set 86(0)-86(X) from a corresponding subset or all of the vector data files 82(0)-82(X). All the input vector data samples 86 comprise the input vector data sample set 86(0)-86(X). As will be discussed in more detail below, the input vector data sample set 86(0)-86(X) from the vector data files 82(0)-82(X) is correlated in the VPE 22(2) with a reference vector data sample set 130(0)-130(X) to provide a resultant correlated output vector data sample set 132(0)-132(X). The reference vector data sample set 130(0)-130(X) is comprised of 'X+1' reference vector data samples 130, which in this example are 130(0), 130(1), ..., and 130(X). The resultant correlated output vector data sample set 132(0)-132(X) is comprised of 'X+1' resultant correlated output vector data samples 132, which in this example are 132(0), 132(1), ..., and 132(X).

With continuing reference to FIG. 11, the tapped-delay lines 78 shift the input vector data sample set 86(0)-86(X) for each correlation delay tap (i.e., correlation processing stage) of the correlation vector processing operation according to a correlation vector instruction to be executed by the VPE 22(2) to provide a shifted input vector data sample set 86S(0)-86S(X). All of the shifted input vector data samples 86S comprise the shifted input vector data sample set 86S(0)-86S(X). The tapped-delay lines 78 shift the input vector data sample set 86(0)-86(X) to provide a shifted input vector data sample set 86S(0)-86S(X), to execution unit inputs 90(0)-90(X) of the execution units 84(0)-84(X) during a correlation vector processing operation. In this manner, intermediate correlation results based on the operations performed on the shifted input vector data sample set 86S(0)-86S(X) do not have to be stored, shifted, and re-fetched from the vector data files 82(0)-82(X) during each processing stage of a correlation vector processing operation performed by the VPE 22(2). Thus, the tapped-delay lines 78 can reduce power consumption and increase processing efficiency for a correlation vector processing operation performed by the VPE 22(2).

With continuing reference to FIG. 11, the execution units 84(0)-84(X) also receive the reference vector data sample 130 from among the reference vector data sample set 130(0)-130(X) stored in a sequence number generator (SNG) 134 for the correlation vector processing operation. The execution units 84(0)-84(X) are configured to correlate the reference vector data sample set 130(0)-130(X) with the input vector data sample set 86(0)-86(X) as part of the correlation vector processing operation. However, note that the sequence number generator 134 could also be a register or other file. The sequence number generator 134 is provided in this embodiment to provide the reference vector data sample set 130(0)-130(X), because the correlation vector processing operation in this example is for a CDMA correlation vector instruction. The reference vector data sample set 130(0)-130(X) is provided as a generated chip sequence for use in signal extraction from the input vector data sample set 86(0)-86(X) if the correlation between the reference vector data sample set 130(0)-130(X) and the input vector data sample set 86(0)-86(X) is high.

For example, the correlation vector processing operation for a CDMA vector correlation instruction could provide a correlation between on-time input vector data samples 86 in the input vector data sample set 86(0)-86(X) and late input vector data samples in the input vector data sample set 86(0)-86(X). For example, the on-time input vector data samples 86 in the input vector data sample set 86(0)-86(X) may be the even input vector data samples 86 in the input vector data sample set 86(0)-86(X) (e.g., 86(0), 86(2), 86(4), ... 86(X−1)). The late input vector data samples 86 in the input vector data sample set 86(0)-86(X) may be the odd input vector data samples 86 in the input vector data sample set 86(0)-86(X) (e.g., 86(1), 86(3), 86(5), ... 86(X)). Alternatively, the on-time input vector data samples 86 may be the odd input vector data samples 86, and the late input vector data samples 86 may be the even input vector data samples 86. The results of the correlation vector processing operation, the resultant correlated output vector data sample set 132(0)-132(X) for the on-time input vector data samples 86, and the late input vector data samples 86 may be used to determine whether to use the on-time or late input vector data samples from the input vector data sample set 86(0)-86(X) for signal extraction. For example, an on-time correlation vector processing operation may be provided according to the following:

$$R_{xy}^{OT}[n] = \sum_{l=0}^{l=511} y[2l] * x[2l+n],$$

where:
n is the number of input signal samples;
x[n] is the digitized input signal 66;
y[n] is the reference signal; and
l is the sample number.

A late correlation vector processing operation may be provided according to the following:

$$R_{xy}^{LT}[n] = \sum_{l=0}^{l=511} y[2l+1] * x[2l+1+n],$$

where:
n is the number of input signal samples;
x[n] is the digitized input signal 66;
y[n] is the reference signal; and
l is the sample number.

The reference signal y[n] (i.e., reference vector data samples) may be complex. In one aspect, the VPE 22(2) may receive a reference signal (e.g., from the sequence number generator 134). The VPE 22(2) may use the received reference signal directly to perform the on-time and late correlation operations, in which case the reference signal y[n] in the above equations may represent the received reference signal. Alternatively, the VPE 22(2) may compute the complex conjugate of the received reference signal before using the reference signal to perform the on-time and late correlation operations, in which case the reference signal y[n] in the above equations may represent the conjugate of the received reference signal.

With continuing reference to FIG. 11, the execution units 84(0)-84(X) are each configured to multiply the reference vector data sample set 130(0)-130(X) with the shifted input vector data samples 86S(0), 86S(1), ... 86S(X) of the shifted input vector data sample set 86S(0)-86S(X) during each processing stage of the correlation vector processing operation to provide intermediate correlation output vector data samples in the execution units 84(0)-84(X). The intermediate correlation output vector data sample sets are accumulated in each of the execution units 84(0)-84(X) (i.e., prior accumulated correlation output vector data sample is added to current correlation output vector data sample). This provides the final, resultant correlated output vector data sample set 132(0)-132(X) provided by the execution units 84(0)-84(X) on execution unit outputs 96(0)-96(X) on the output data flow paths 98(0)-98(X), respectively, for each input vector data sample set 86(0), 86(1), ... 86(X) to be stored back in the respective vector data files 82(0)-82(X) for further use and/or processing by the VPE 22(2) without having to store and shift intermediate correlation output vector data sample sets generated by the execution units 84(0)-84(X).

Further, note that the same components and architecture provided in the VPE 22(2) in FIG. 11 is provided in the VPE 22(1) in FIG. 4. The sequence number generator 134 is added and multiplexed by a multiplexor 136 with the global register file 40 that can provide the filter coefficients 92(0)-92(Y−1) or other data to be processed with the reference vector data sample set 130(0)-130(X). Thus, the VPE 22(2) in FIG. 11 can provide both the aforementioned filter vector processing operations and correlation vector processing operations discussed here and in more detail below by control of the multiplexor 136. The multiplexor 136 can be controlled by a selector signal 138 that is controlled based on the vector instruction being executed by the VPE 22(2). For a filter vector instruction, the selector signal 138 can be configured to provide filter coefficients 92(0)-92(Y−1) from the global register file 40 to be provided to the execution units 84(0)-84(X). For a correlation vector instruction, the selector signal 138 can be configured to select the reference vector data sample set 130(0)-130(X) from the sequence number generator 134 to be provided to the execution units 84(0)-84(X).

With continuing reference to FIG. 11 and as will be discussed in more detail below, the tapped-delay lines 78(0), 78(1) are programmable to be controlled according to the vector instruction being processed. If a correlation vector instruction or other instruction that does not employ the tapped-delay lines 78 is not being processed, the tapped-delay lines 78 can be programmed to not be included in the input data flow paths 80(0)-80(X) between the vector data files 82(0)-82(X) and the execution units 84(0)-84(X). In this embodiment, as previously discussed, two tapped-delay lines 78 are provided, a primary tapped-delay line 78(0) and a shadow tapped-delay line 78(1), with the shadow-tapped delay line 78(1) being optional in this embodiment. As previously discussed, without the tapped-delay lines 78, a separate shifting process would have to be performed to provide the shifted intermediate input vector data sample set again to the execution units 84(0)-84(X), thereby increasing latency and consuming additional power. Further, the efficiency of the input and output data flow paths 80(0)-80(X), 98(0)-98(X) in the VPE 22(2) are not limited by the re-fetching delay of the shifted input vector data sample set 86S(0)-86S(X) from the vector data files 82(0)-82(X) during a correlation vector processing operation. The shifted input vector data sample set 86S(0)-86S(X) is provided by the tapped-delay lines 78 localized to the execution units 84(0)-84(X). The vector processing in the execution units 84(0)-84(X) is only limited by computational resources rather than by data flow limitations.

Further, the correlation vector processing operations performed by the VPE 22(2) in FIG. 11 may be made more precise by employing the tapped-delay lines 78, because output accumulations for intermediate correlation processing stages in the execution units 84(0)-84(X) do not have to be stored in the vector data files 82(0)-82(X). Storing of intermediate vector data sample sets from the execution units 84(0)-84(X) in the vector data files 82(0)-82(X) may result in rounding. Thus, when the next intermediate vector data sample set would be provided to the execution units 84(0)-84(X) for the vector processing operation, any rounding error would be propagated and added during each multiplication phase of the vector processing operation. In contrast, in the example of the VPE 22(2) in FIG. 11, the intermediate correlation output vector data sample set calculated by the execution units 84(0)-84(X) do not have to be stored in the vector data files 82(0)-82(X). Prior intermediate correlation output vector data sample sets can be accumulated with intermediate correlation output vector data sample sets for next correlation output vector data sample sets, because the tapped-delay lines 78 provide the shifted input vector data sample sets 86S(0)-86S(X) to the execution units 84(0)-84(X) during the vector processing operation to be processed, and the results accumulated with prior vector data sample sets for prior correlation output vector data sample sets.

The previous discussion of the components provided in the VPE 22(1) in FIG. 4 above is equally applicable for the VPE 22(2) in FIG. 11, and thus will not be re-described.

Figure 12A:
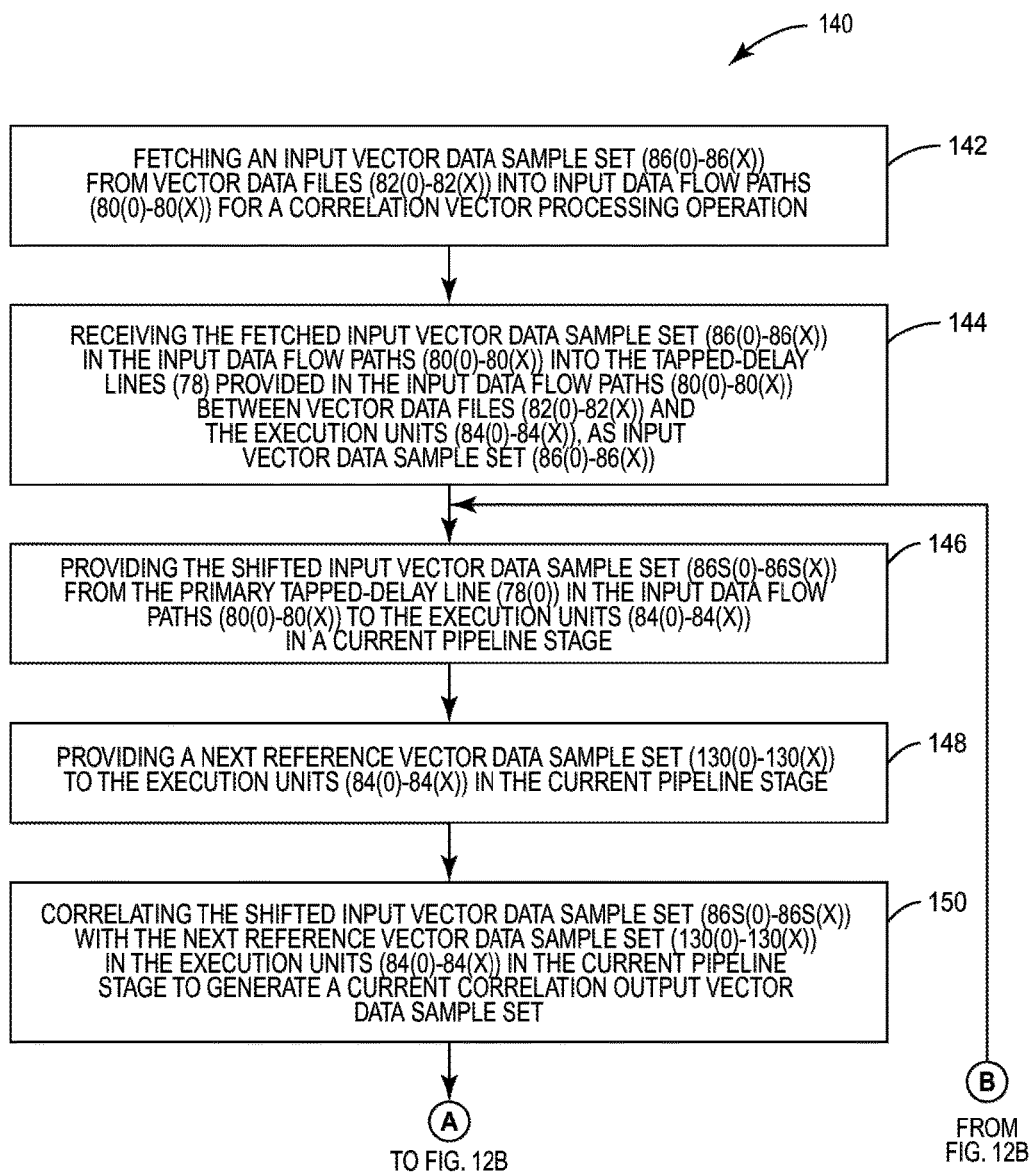
FIGS. 12A and 12B are flowcharts illustrating exemplary correlation/covariance vector processing operations that can be performed in parallel in the VPE in FIG. 11 with fetched interleaved on-time and late input vector data sample sets according to an exemplary correlation/covariance vector processing operation.
Figure 12B:
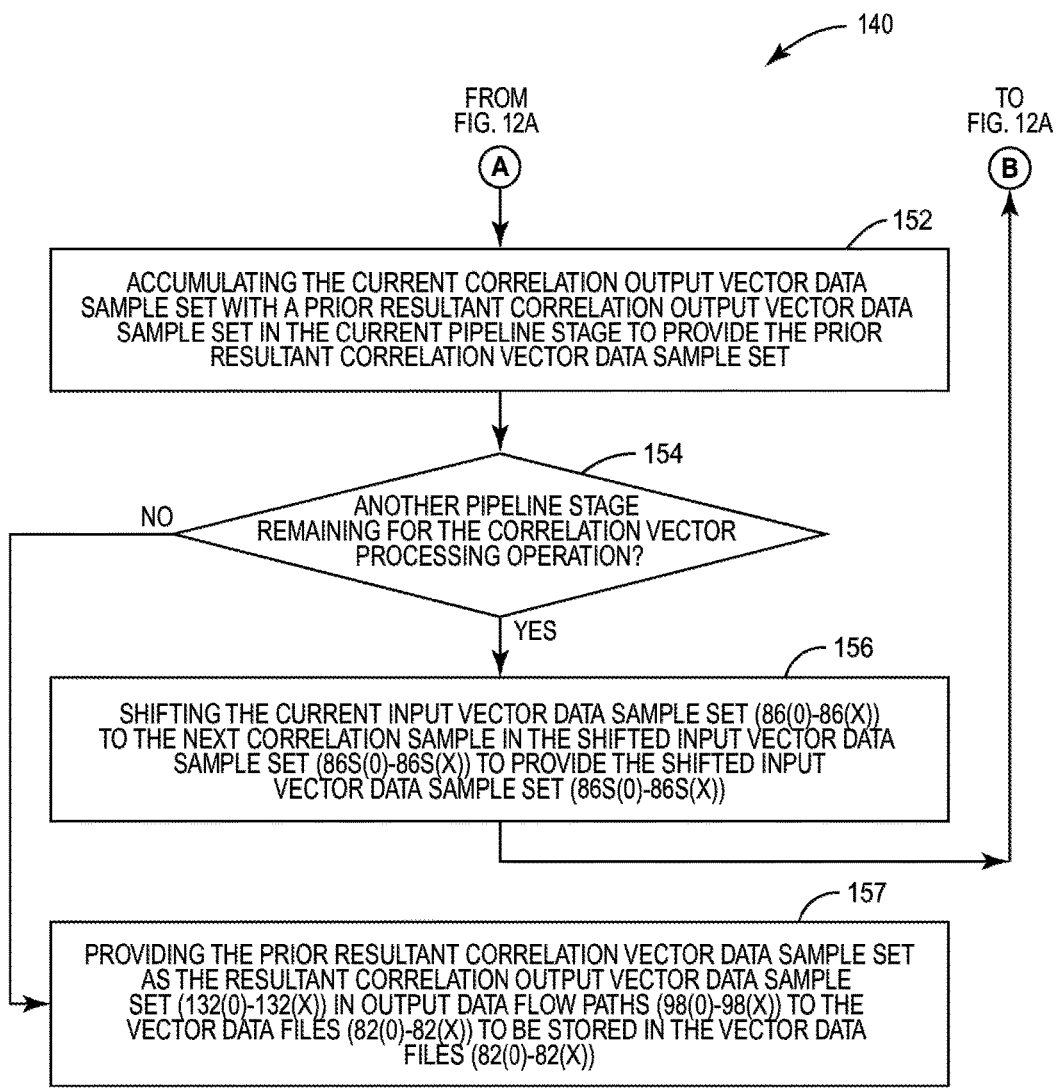

A further description of additional details and features of the VPE 22(2) in FIG. 11 and the tapped-delay lines 78 for providing the shifted input vector data sample set 86S(0)-86S(X) to the execution units 84(0)-84(X) in the input data flow paths 80(0)-80(X) in this embodiment will now be described. In this regard, FIGS. 12A and 12B are flowcharts illustrating an exemplary correlation vector processing operation 140 that can be performed in the VPE 22(2) in FIG. 11 employing the tapped-delay lines 78 according to an exemplary correlation vector instruction. FIGS. 12A and 12B are flowcharts illustrating an exemplary correlation/covariance vector processing operations that can be performed in parallel in VPE 22(2) in FIG. 11 with fetched interleaved on-time and late input vector data sample sets according to an exemplary correlation/covariance vector processing operation.

Figure 13:
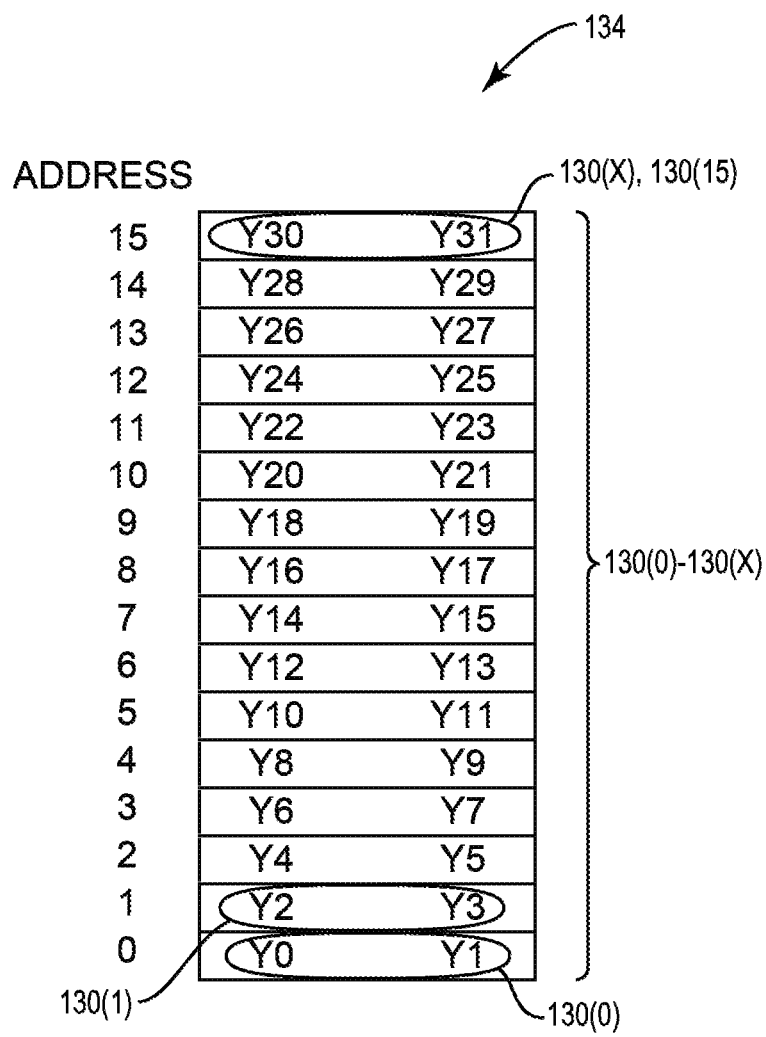
FIG. 13 is a schematic diagram of a correlation/covariance input vector data sample set stored in a register file in the VPE of FIG. 11.

The exemplary tasks performed in the correlation vector processing operation 140 in FIGS. 12A and 12B will be described with reference to examples provided in FIGS. 13-17B. With reference to FIG. 12A, the input vector data sample set 86(0)-86(X) to be processed in a correlation vector processing operation 140 according to a correlation vector instruction is fetched from the vector data files 82(0)-82(X) into the input data flow paths 80(0)-80(X) for a correlation vector processing operation 140 (block 142). As discussed above with regard to the VPE 22(2) in FIG. 11, the input vector data sample set 86(0)-86(X) is multiplied by the reference vector data sample set 130(0)-130(X) received from the sequence number generator 134 in the execution units 84(0)-84(X). For example, FIG. 13 illustrates the reference vector data sample set 130(0)-130(X) in the sequence number generator 134. In this example, there are sixteen (16) reference vector data samples 130(0), 130(1), ... 130(15) stored in the global register file 40 to be correlated with sixteen (16) input vector data samples 86(0), 86(1), ... 86(15) in the input vector data sample set 86(0)-86(X). FIG. 6B previously discussed above illustrated an exemplary input vector data sample set 86(0)-86(X) stored in the vector data files 82(0)-82(X), which is also applicable in this example and thus will not be re-described here.

Either one, some, or all of the vector data lanes 100(0)-100(X) in the VPE 22(2) in FIG. 11 can be employed to provide the correlation vector processing operation 140 according to the programming of the vector instruction depending on the width of the input vector data sample set 86(0)-86(X) and the reference vector data sample set 130 (0)-130(X) to be correlated in the correlation vector processing operation 140. If the entire width of the vector data files 82(0)-82(X) is required, all vector data lanes 100(0)-100(X) can be employed for the correlation vector processing operation 140. Note that the correlation vector processing operation 140 may only require a subset of the vector data lanes 100(0)-100(X) that may be employed for the correlation vector processing operation 140. This may be because the width of the input vector data sample set 86(0)-86(X) is less than the width of all vector data files 82(0)-82(X), where it is desired to employ the additional vector data lanes 100 for other vector processing operations to be performed in parallel to the correlation vector processing operation 140. For the purposes of discussing the current example, it is assumed that the input vector data sample set 86(0)-86(X) and the reference vector data sample set 130 (0)-130(X) employed in the correlation vector processing operation 140 involves all vector data lanes 100(0)-100(X) in the VPE 22(2).

With reference back to FIG. 12A, a fetched input vector data sample set 86(0)-86(X) is provided into the input data flow paths 80(0)-80(X) from the vector data files 82(0)-82 (X) to be loaded into the tapped delay-lines 78 as a first input vector data sample set 86S(0)-86(X) for the correlation vector processing operation 140 (block 144). An input vector data sample set 86(0)-86(X) is loaded into the primary tapped-delay line 78(0) as the input vector data sample set 86(0)-86(X) to be processed by the execution units 84(0)-84(X) for the correlation vector processing operation 140. The input vector data sample set 86(0)-86(X) loaded into the primary tapped-delay line 78(0) is not shifted for the first operation of the correlation vector processing operation 140. A next input vector data sample set 86N(0)-86N(X) can also be loaded into the shadow tapped-delay line 78(1) as a next input vector data sample set 86N(0)-86N(X) to be processed by the execution units 84(0)-84(X). As previously discussed above and discussed in more detail below, the purpose of the tapped-delay lines 78 is to provide shifting of the input vector data sample set 86(0)-86(X) to provide a shifted input vector data sample set 86S(0)-86S(X) to the execution units 84(0)-84(X) for subsequent correlation operations during operation of the correlation vector processing operation 140. During each processing stage of the correlation vector processing operation 140 executed by the execution units 84(0)-84(X), the input vector data samples 86 are shifted in the primary-tapped delay line 78(0) to provide the shifted input vector data sample set 86S(0)-86S (X) to the execution units 84(0)-84(X). In this manner, the input vector data sample set 86(0)-86(X) does not have to be stored, shifted in the vector data files 82(0)-82(X), and re-fetched for each correlation operation of the correlation vector processing operation 140.

Figure 14:
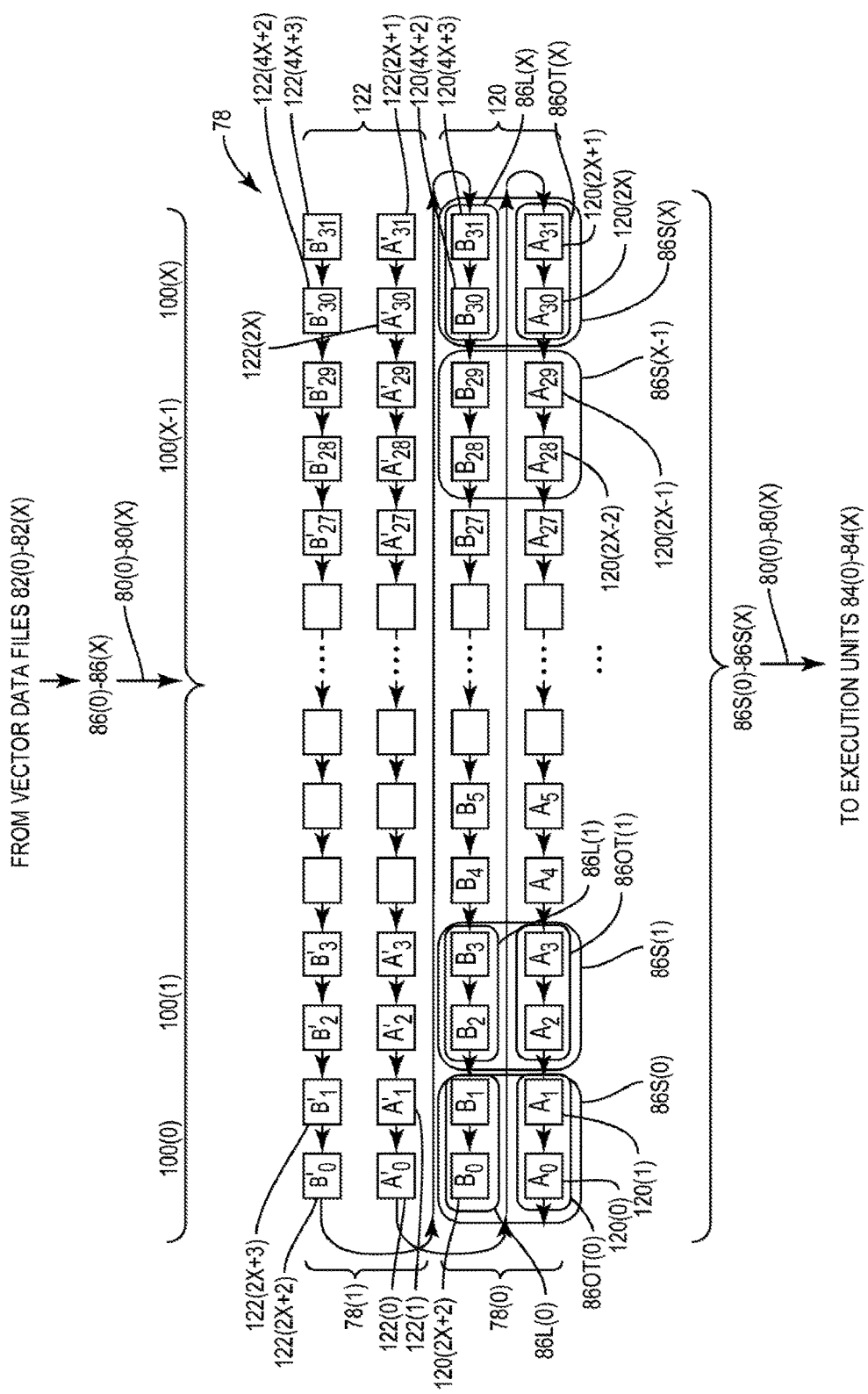
FIG. 14 is a schematic diagram illustrating an exemplary tapped-delay line and optional shadow tapped-delay line that can be provided in the VPE in FIG. 11, wherein the exemplary tapped-delay lines each comprise a plurality of pipeline registers for receiving and providing, to execution units, an input vector data sample set from vector data memory and a shifted input vector data sample set, during a correlation/covariance vector processing operation performed by the VPE.

In this regard, FIG. 14 illustrates the exemplary tapped-delay lines 78 that can be provided in VPE 22(2) in FIG. 11. In this embodiment, the tapped-delay lines 78 comprise the shadow tapped-delay line 78(1) and the primary tapped-delay line 78(0). As previously discussed above, the primary-tapped delay line 78(0) in this example is comprised of a plurality of 8-bit primary pipeline registers 120 to allow resolution of input vector data samples 86 down to 8-bits in length. The first input vector data sample set 86(0)-86(X) processed by the execution units 84(0)-84(X) will be un-shifted in this example for the first correlation operation of the correlation vector processing operation 140. As the execution units 84(0)-84(X) process subsequent correlation operations for the correlation vector processing operation 140, the input vector data samples 86 in the input vector data sample set 86(0)-86(X) stored in the primary tapped-delay line 78(0), are shifted in the primary pipeline registers 120(0)-120(4X+3), as indicated by the arrows in FIG. 14, to become the shifted input vector data sample set 86S(0)-86S (X). In this manner, the execution units 84(0)-84(X) are fully utilized by receiving and performing the correlation vector processing operation 140 of the shifted input vector data sample set 86S(0)-86S(X) without having to store, shift, and re-fetch the input vector data sample set 86 (0)-86 (X) from the vector data files 82(0)-82(X).

The number of shifts performed in the primary and shadow tapped-delay lines 78(0), 78(1) for the correlation vector processing operation 140 will be dependent on the number of samples to be correlated. If the number of input vector data samples 86 in the input vector data sample set 86(0)-86(X) fetched into the primary tapped-delay line 78(0) and shadow tapped-delay line 78(1) from the vector data files 82(0)-82(X) is greater than the number of correlation operations in the correlation vector processing operation 140, the execution units 84(0)-84(X) can perform the correlation vector processing operation 140 without any further input vector data sample sets 86(0)-86(X) being re-fetched from the vector data files 82(0)-82(X). However, if the number of correlation operations in the correlation vector processing operation 140 is greater than the number of input vector data samples 86 in the input vector data sample set 86(0)-86(X) fetched into the primary tapped-delay line 78(0) and shadow tapped-delay line 78(1) from the vector data files 82(0)-82(X), additional input vector data sample sets 86(0)-86(X) can be fetched from the vector data files 82(0)-82(X) as part of the correlation vector processing operation 140.

In this embodiment, the primary pipeline registers 120 (0)-120(4X+3) collectively are the width of the vector data files 82(0)-82(X). In the example of the vector data files 82(0)-82(X) being 512-bits in width with "X" equal to fifteen (15), there will be sixty-four (64) total primary pipeline registers 120(0)-120(63), each eight (8) bits in width to provide a total width of 512 bits (i.e., 64 registers×8 bits each). Thus, in this example, the primary tapped-delay line 78(0) is capable of storing the entire width of one (1) input vector data sample set 86(0)-86(X). By providing the primary pipeline registers 120(0)-120(4X+3) of eight (8) bit widths in this example, the input vector data sample set 86(0)-86(X) can be shifted down to a vector data sample size of eight (8) bits for 8-bit correlation vector processing operations. If larger input vector data sample 86 sizes are desired for a correlation vector processing operation 140, such as 16-bit or 32-bit samples for example, the input vector data sample set 86(0)-86(X) can be shifted in the primary pipeline registers 120(0)-120(4X+3) by two (2) primary pipeline registers 120 at a time.

FIG. 15A illustrates an input vector data sample set 86(0)-86(X) loaded from the vector data files 82(0)-82(X) into the primary tapped-delay line 78(0) during a first clock cycle (CYCLE0) of a correlation vector processing instruction 140. The first input vector data sample set 86(0)-86(X) is loaded into the primary tapped-delay line 78(0) as input vector data samples X1-X32, but sixty-four (64) input vector data samples are provided. The primary pipeline registers 120(0)-120(2X+1) (see also, FIG. 14) are loaded with on-time and late input vector data samples 86 from the input vector data sample set 86(0)-86(X). For example, a special vector instruction may be supported to load the on-time and late input vector data samples of the input vector data sample set 86(0)-86(X) into the primary tapped-delay line 78(0) (and also the shadow-tapped delay line 78(1), as discussed in more detail later below). For example, primary pipeline registers 122(0), 122(1), 122(2X+2), and 122(2X+3) collectively contain input vector data sample 86(0). Primary pipeline registers 122(0), 122(1) contain on-time input vector data sample 86OT(0), which are X(0) and X(1), where "OT" means "on-time." Primary pipeline registers 122(2X+2), 122(2X+3) contain late input vector data samples 86L(0), which are X(1) and X(2), where "L" means "late." This input vector data sample 86 storage pattern in the primary tapped-delay line 78(0) is repeated for the other primary pipeline registers 122(2)-122(2X+1) and 122(2X+4)-122(4X+3) (see FIG. 14).

With reference back to FIG. 14, the shadow tapped-delay line 78(1) is also provided in the tapped-delay line 78. The shadow tapped-delay line 78(1) can be employed to latch or pipeline a next input vector data sample set 86N(0)-86N(X) from the vector data files 82(0)-82(X) for a subsequent vector processing operation. The shadow tapped-delay line 78(1) is also comprised of a plurality of 8-bit shadow pipeline registers 122 to allow resolution of input vector data samples down to 8-bits in length similar to the primary tapped-delay line 78(0). The shadow pipeline registers 122 collectively are the width of the vector data files 82(0)-82(X), which is 512-bits in this example, so that the shadow tapped-delay line 78(1) is also capable of storing the entire width of one (1) input vector data sample set 86(0)-86(X) just like the primary tapped-delay line 78(0). Thus in this embodiment, the number of shadow pipeline registers 122(0)-122(4X+3) included in the primary tapped-delay line 78(0) is four times the number of vector data lanes 100(0)-100(X), which total sixteen (16), each vector data lane 100(0)-100(X) capable of supporting 32-bits each in this example. Thus, the number of primary pipeline registers 120 also totals sixty-four (64) in this example for a total of 512 bits (i.e., 64 registers×8 bits each).

FIG. 15B illustrates a next input vector data sample set 86N(0)-86N(X) loaded into the shadow tapped-delay line 78(1) during a second clock cycle (CYCLE1) of a correlation vector processing instruction 140. The next input vector data sample set 86N(0)-86N(1) is loaded into the shadow tapped-delay line 78(1) after the first input vector data sample set 86(0)-86(X) from the vector data files 82(0)-82(X) is loaded into the primary tapped-delay line 78(0) to setup the execution of a correlation vector processing operation 140. This next input vector data sample set 86N(0)-86N(X) is loaded into the shadow tapped-delay line 78(1) as input vector data samples X(32)-X(63), with both on-time and late input vector data samples 86OT, 86L. Note that in this example, X(32) and X(33) form the on-time input vector data samples 86OT of the input vector data sample 86(0), and X(33) and X(34) form the late input vector data samples 86L of the input vector data sample 86(0), like the storage pattern provided in the primary tapped-delay line 78(0) discussed above. Other patterns could be provided to group the input vector data samples 86 together to form the input vector data sample set 86(0)-86(X). The reference vector data samples 130 correlated during a first processing stage of the correlation vector processing operation 140 from the reference vector data sample set 130(0)-130(X) from the sequence number generator 134 (i.e., Y(0) and Y(1)) are also shown as provided in a register ("C") to the execution units 84(0)-84(X) in FIG. 15B for use in the correlation vector processing operation 140.

With reference back to FIG. 14, as the input vector data samples 86 in the input vector data sample set 86(0)-86(X) are shifted in the primary tapped-delay line 78(0) during each processing stage of the correlation vector processing operation 140, the next input vector data samples 86N stored in the shadow pipeline registers 122 are also shifted in the shadow pipeline registers 122 of the shadow tapped-delay line 78(1). Because in this example, the input vector data samples 86 of the input vector data sample set 86(0)-86(X) are stored as on-time and late versions, the shift pattern provided between the tapped-delay lines 78(0) and 78(1) in FIG. 14 is different than the shift pattern provided between the tapped-delay lines 78(0) and 78(1) in FIG. 7. As shown in FIG. 14, the on-time input vector data samples 86OT are shifted from the shadow pipeline register 122(0) in the shadow tapped-delay line 78(1) to primary pipeline register 120(2X+1) in the primary tapped-delay line 78(0). Likewise, the late input vector data samples 86L are shifted from the shadow pipeline register 122(2X+2) in the shadow tapped-delay line 78(1) to primary pipeline register 120(4X+3) in the primary tapped-delay line 78(0). In this manner, the on-time input vector data samples 86OT and late input vector data samples 86OT are kept segregated from each other in the tapped-delay lines 78(0), 78(1) as the shifting of input vector data samples 86 occurs during the correlation vector processing operation 140.

The correlation vector processing operation 140 processing stages progress in the execution units 84(0)-84(X), eventually, the entire next input vector data sample set 86N(0)-86N(X) initially stored in the shadow tapped-delay line 78(1) is shifted fully into the primary tapped-delay line 78(0) to be provided to the execution units 84(0)-84(X) for processing. In this manner, after the correlation vector processing operation 140 is complete on the current input vector data sample set 86(0)-86(X), the execution units 84(0)-84(X) can then be provided with the previously next input vector sample data set 86N(0)-86N(X) stored in the primary tapped-delay line 78(0) as the current input vector data sample set 86(0)-86(X) for a next correlation vector processing operation 140, if desired, without delay.

After the first input vector data sample set 86(0)-86(X) and next input vector data sample set 86N(0)-86N(X) are loaded into the primary tapped-delay line 78(0) and the shadow tapped-delay line 78(1), respectively, as shown in FIG. 15B, the first input vector data sample set 86(0)-86(X) provided in the primary tapped-delay line 78(0) is provided to the respective execution units 84(0)-84(X) to be processed in a first processing stage of the correlation vector processing operation 140 (block 146 in FIG. 12A). The first input vector data sample set 86(0)-86(X) becomes the current input vector data sample set 86(0)-86(X) being processed by the execution units 84(0)-84(X). The current input vector data sample 86(0) is provided to execution unit 84(0), the current input vector data sample 86(1) is provided to execution unit 84(1), and so on, as illustrated in the VPE 22(2) in FIG. 11. The reference vector data input samples 130(0)-130(X) to be correlated with the input vector data sample set 86(0)-86(X) are provided to the execution units 84(0)-84(X) in the current processing stage of the correlation vector processing operation 140 (block 148 in FIG. 12A).

Next, the execution units 84(0)-84(X) perform the correlation vector processing operation 140 (block 150 in FIG. 12A). More particularly, the execution units 84(0)-84(X)

multiply the current input vector data sample set 86(0)-86(X) by the reference vector data samples 130 during the first processing stage according to the operation: R(OT)[n]= y[0] *x[n] for on-time input vector data samples 86OT and R(L)[n]=y[1]*x[1+n] for late input vector data samples 86L, where y[ ] is the designated reference vector data sample 130, and x[n] is the current input vector data sample set 86(0)-86(X). The result of the correlation is a current on-time correlation output vector data sample set R(OT)[n] and a current late correlation output vector data sample set R(L)[n]. The execution units 84(0)-84(X) then accumulate each current resultant correlation vector data sample set with its corresponding prior resultant correlation vector data sample set calculated by the execution units 84(0)-84(X) to provide the new prior input vector data sample sets 86(0)-86(X) (block 152 in FIG. 12B). In the first processing stage of the correlation vector processing operation 140, there is no prior resultant correlated output vector data sample set 132(0)-132(X). Thus, the first/current resultant correlated output vector data sample set 132(0)-132(X) will simply become the prior input vector data sample set 86(0)-86(X) for the second, next processing stage of the correlation vector processing operation 140.

If all processing stages of the correlation vector processing operation 140 have been completed (block 154 in FIG. 12B), the accumulated prior resultant correlated output vector data sample set 132(0)-132(X) is provided as the resultant correlated output vector data sample set 132(0)-132(X) in the output data flow paths 98(0)-98(X) to be provided and stored in the vector data files 82(0)-82(X) (block 157 in FIG. 12B). If all processing stages of the correlation vector processing operation 140 have not been completed (block 154 in FIG. 12A), the shifted input vector data sample set 86S(0)-86S(X) is shifted in the tapped-delay lines 78(0), 78(1) to the next position for the correlation vector processing operation 140 to provide the shifted input vector data sample set 86S(0)-86S(X) (block 156 in FIG. 12B). The shifted input vector data sample set 86S(0)-86S(X) is provided for calculating a next resultant correlation output vector data sample set 132(0)-132(X) to be accumulated with the prior resultant correlation output vector data sample set 132(0)-132(X). The shifting of the input vector data samples 86 in the tapped-delay lines 78(0), 78(1) was previously described above in detail with regard to FIG. 14.

FIG. 15C illustrates the contents of the tapped-delay lines 78 when the input vector data sample set 86(0)-86(X) is shifted in a second processing stage of the correlation vector processing operation 140 to become the new shifted input vector data sample set 86S(0)-86S(X) for a next correlation processing operation 140 R(OT)[n]=y[2]*x[2+n] for on-time input vector data samples 86SOT and R(L)[n]=y[3]*x[3+n] for late input vector data samples 86SL. The input vector data sample set 86(0)-86(X) in the primary tapped-delay line 78(0) is shifted by two input vector data samples 86. For example, input vector data sample 86OT(1) in FIG. 15B of X(2) and X(3) is now shifted into input vector data sample 86S(0) in FIG. 15C. The shifted input vector data sample set 86S(0)-86S(X) becomes the current input vector data sample set 86(0)-86(X). The reference vector data samples 130 provided to the execution units 84(0)-84(X) are also the reference vector data samples 130, which are Y(2) and Y(3) in this example.

With continuing reference to FIG. 12B, the process repeats by providing the next shifted input vector data sample set 86S(0)-86S(X) from the primary tapped-delay line 78(0) (and from a portion of the shadow tapped-delay line 78(1)) to the execution units 84(0)-84(X) to be multiplied with the next reference vector data samples 130 (block 150 in FIG. 12A), with the resultant correlated output vector data sample set 132(0)-132(X) being accumulated with the prior resultant correlated output vector data sample set 132(0)-132(X) (block 152 in FIG. 12B). FIG. 15D illustrates the state of input vector data samples 86 present in the tapped-delay lines 78(0), 78(1) during the last processing stage of the exemplary correlation vector processing operation 140. In this example as shown in FIG. 15D, there were sixteen (16) processing stages for the correlation vector processing operation 140, because the full data width of the tapped-delay lines 78 were employed for the input vector data sample set 86(0)-86(X), but split among on-time and late input vector data samples 86OT, 86L. Y(30) and Y(31) are the last reference vector data samples 130(X) in the correlation vector processing operation 140 as shown in FIG. 15D, which is reference vector data samples 130(15) in the example of FIG. 13. The shifted input vector data sample set 86S(0)-86S(X) has been shifted sixteen (16) times (the width of the vector data lanes 100(0)-100(X) in this example) such that input vector data samples X(30) and X(31) are stored in the shifted input vector data sample 86S(0) in the primary tapped-delay line 78(0) in the final, sixteenth, processing stage for the correlation vector processing operation 140.

Figure 16:
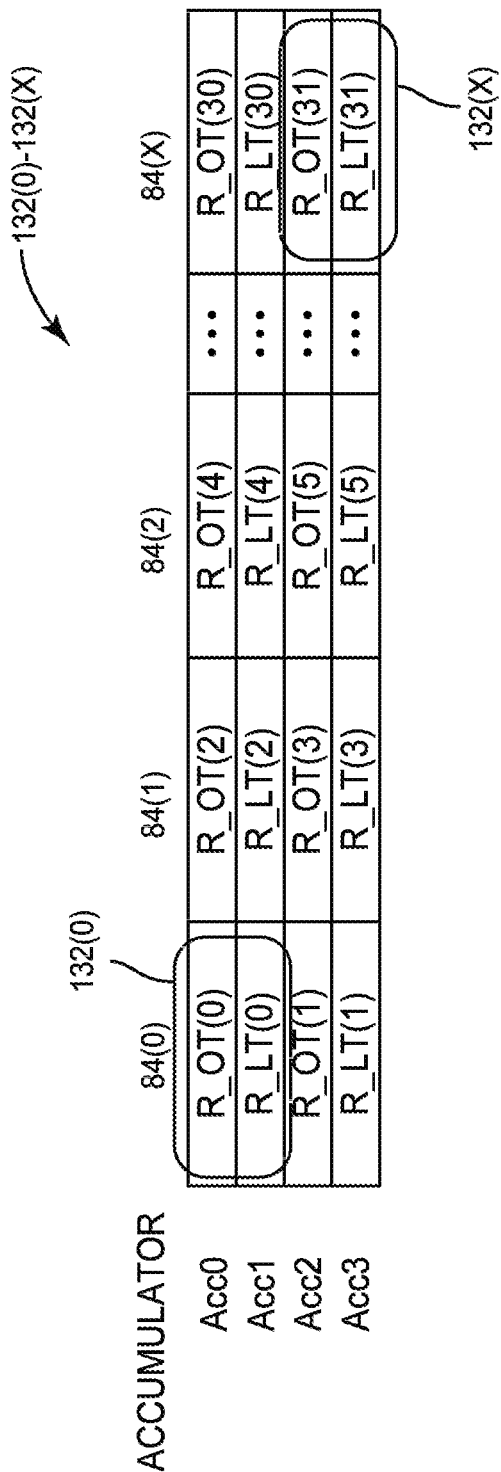
FIG. 16 is a schematic diagram of contents of accumulators of the execution units in the VPE of FIG. 11 after the exemplary correlation/covariance vector processing operation has been fully executed.

FIG. 16 is a schematic diagram of contents of accumulators (i.e., resultant correlated output vector data samples 132) in the execution units 84(0)-84(X) in the VPE 22(2) of FIG. 11 after the exemplary sixteen (16) correlation vector processing stages in the above example have been fully executed. The resultant correlated output vector data sample set is shown as 132(0)-132(X). Accumulators Acc0-Acc3 are shown in FIG. 16, because in this example, each execution unit 84(0)-84(X) has four accumulators disposed in parallel for each vector data lane 100(0)-100(X). The accumulated resultant output vector data samples can be provided on the output data flow paths 98(0)-98(X) to the vector data files 82(0)-82(X) as a collective resultant correlated output vector data sample set 132(0)-132(X) to be stored therein for further analysis and/or processing. A specialized vector instruction may be supported by the VPE 22(2) to move rows of the resultant correlated output vector data sample set 132(0)-132(X) from the vector data files 82(0)-82(X) to the vector unit data memory 32 (see FIG. 2), if desired.

Figure 17A:
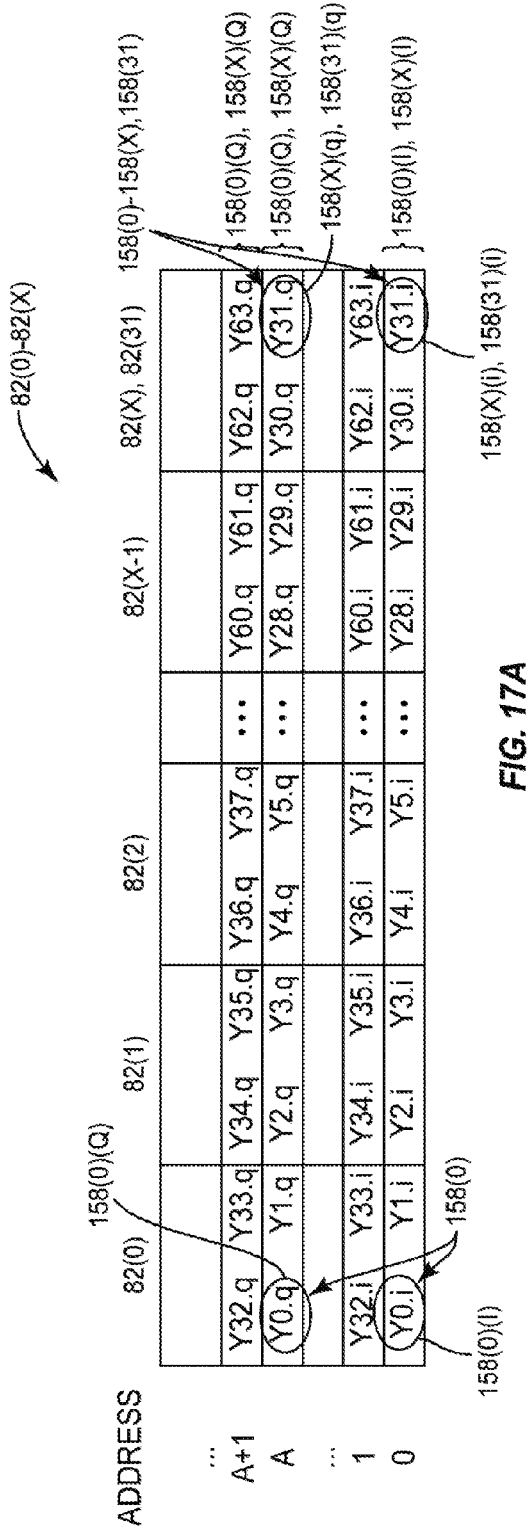
FIG. 17A is a diagram of exemplary vector data files showing a stored resultant filter output vector data sample set stored in the real and imaginary components of resultant filter output vector data samples stored separately.

Resultant output vector data sample sets provided by the execution units 84(0)-84(X), including the resultant filter vector output data sample sets 94(0)-94(X) and the resultant correlated output vector data sample sets 132(0)-132(X) described above, can be stored back in the vector data files 82(0)-82(X), 82(31) in different interleaved formats depending on the vector instruction executed by the VPE. 'X' is equal to thirty-one (31) in this example to provide the vector data files 82(0)-82(X), each thirty-two (32) bits width. For example, as illustrated in FIG. 17A, a resultant output vector data sample set 158(0)-158(X), 158(31) can be stored in the vector data files 82(0)-82(X) separated by their real ("q") and imaginary ("i") components. The resultant output vector data sample set 158(0)-158(X) is comprised of 'X+1' resultant output vector data samples 158, which in this example are 158(0), 158(1), . . . , and 158(X). It may be more efficient to store the resultant output vector data sample set 158(0)-158(X), 158(31) separated by their real ("q") and imaginary ("i") components for efficiency purposes, such as if a next vector instruction operates on real and imaginary components of the resultant output vector data sample set 158(0)-158(X), 158(31) as an input vector data sample set. Or, it may not be possible to store the resultant output vector data sample 158 in a vector data file 82 such that separation of the resultant output vector data sample 158 into its real and imaginary components. For example, if a sixteen (16) bit vector data sample is multiplied by another sixteen (16) bit vector data sample, a thirty-two (32) bit resultant vector data sample results. For example, the thirty-two (32) bit resultant output vector data sample 158 could be Y0 in FIG. 17A. The imaginary component of Y0, Y0.i 158(I), can be stored in ADDRESS '0' of vector data file 82(0), and the real component of Y0, Y0.q 158(Q), can be stored in another ADDRESS, such as ADDRESS 'A."

Figure 17B:
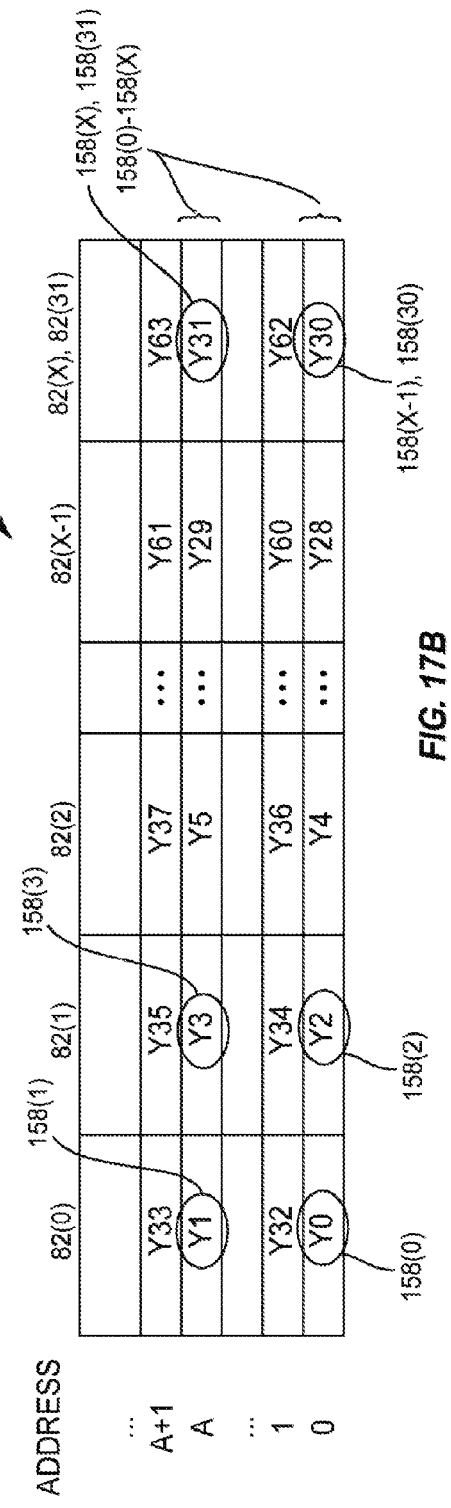
FIG. 17B is a diagram of exemplary vector data files showing a stored resultant filter output vector data sample set stored with its even and odd resultant filter output vector data samples stored separately.

The resultant output vector data sample set 158(0)-158 (X), 158(31) in FIG. 17A could be stored in the vector data files 82(0)-82(X), 82(31) interleaved by even and odd resultant output vector data samples. This is illustrated by example in FIG. 17B. As illustrated in FIG. 17B, resultant output vector data sample Y0-Y31 158(0)-158(X), 158(31) is stored in an interleaved format by even and odd vector data samples among ADDRESS '0' and ADDRESS 'A' in vector data files 82(0)-82(31). Resultant output vector data sample Y0 158(0) is stored in ADDRESS '0' in vector data file 82(0). Resultant output vector data sample Y1 158(1) is stored not in ADDRESS '0' in vector data file 82(1), but in ADDRESS 'A' in vector data file 82(0). Resultant output vector data sample Y2 158(2) is stored in ADDRESS '0' in vector data file 82(1), and so on.

Certain wireless baseband operations require data samples to be format-converted before being processed. For example, the resultant output vector data sample sets 158 (0)-158(X) stored in the vector data files 82(0)-82(X) in interleaved format in FIGS. 17A and 17B may need to be de-interleaved for a next vector processing operation. For example, if the resultant output vector data samples 158(0)- 158(X) represent a CDMA signal, the resultant output vector data samples 158(0)-158(X) may need to be de-interleaved to separate out even and odd phases of the signal. The de-interleaved signal may also be correlated with a locally generated code or sequence number in a correlation processing operation to determine if the CDMA system can extract the signal, such as with the exemplary correlation vector processing operation described above in regard to FIGS. 11-16. Conventional programmable processors implement format conversion of data samples in multiple steps, which add cycles, power consumption, and data flow complications in vector data sample format conversions. Vector processors can pre-process the vector data samples to provide format conversions before the format-converted vector data samples are provided to execution units. The format-converted vector data samples are stored in vector data memory and re-fetched as part of a vector processing operation requiring data format conversion to be processed by execution units. However, this format pre-processing of the vector data samples delays the subsequent processing of the format-converted vector data samples by the execution units, and causes computational components in the execution units to be underutilized.

Embodiments disclosed herein and below provide for conversion of interleaved vector data sample sets, such as those illustrated in FIGS. 18A and 18B. For example, FIGS. 18A and 18AB illustrate a vector data sample set D(0)-D(X) stored in vector data files 82(0)-82(X) in different formats. FIG. 18A illustrates the vector data sample set D(0)-D(X) stored in signed complex (SC) sixteen-bit samples (SC16) and format-interleaved by real and imaginary components. The sixteen (16) bit real and imaginary components of thirty-two (32) bit vector data sample D(0)-D(0)(Q) and D(0)(I) are stored in thirty-two (32) bit vector data file 82(0). The sixteen (16) bit real and imaginary components of vector data sample D(X)-D(X)(Q) and D(X)(I) are stored in thirty-two (32) bit vector data file 82(X). FIG. 18B illustrates the vector data sample set D(0)-D(X) stored in SC eight-bit samples (SC8) and format-interleaved by real and imaginary components. The eight (8) bit real and imaginary components of sixteen (16) bit vector data sample D(0)(1)- D(0)(1)(Q), D(0)(1)(I), are stored in vector data file 82(0). The eight (8) bit real and imaginary components of sixteen (16) bit vector data sample D(0)(0)-D(0)(0)(Q), D(0)(0)(I), are also stored in thirty-two (32) bit vector data file 82(0). Likewise, the eight (8) bit real and imaginary components of sixteen (16) bit vector data sample D(X)(1)-D(X)(1)(Q), D(X)(1)(I), are stored in thirty-two (32) bit vector data file 82(X). The eight (8) bit real and imaginary components of sixteen (16) bit vector data sample D(X)(0)-D(X)(0)(Q), D(X)(0)(I), are also stored in thirty-two (32) bit vector data file 82(X).

Figure 19:
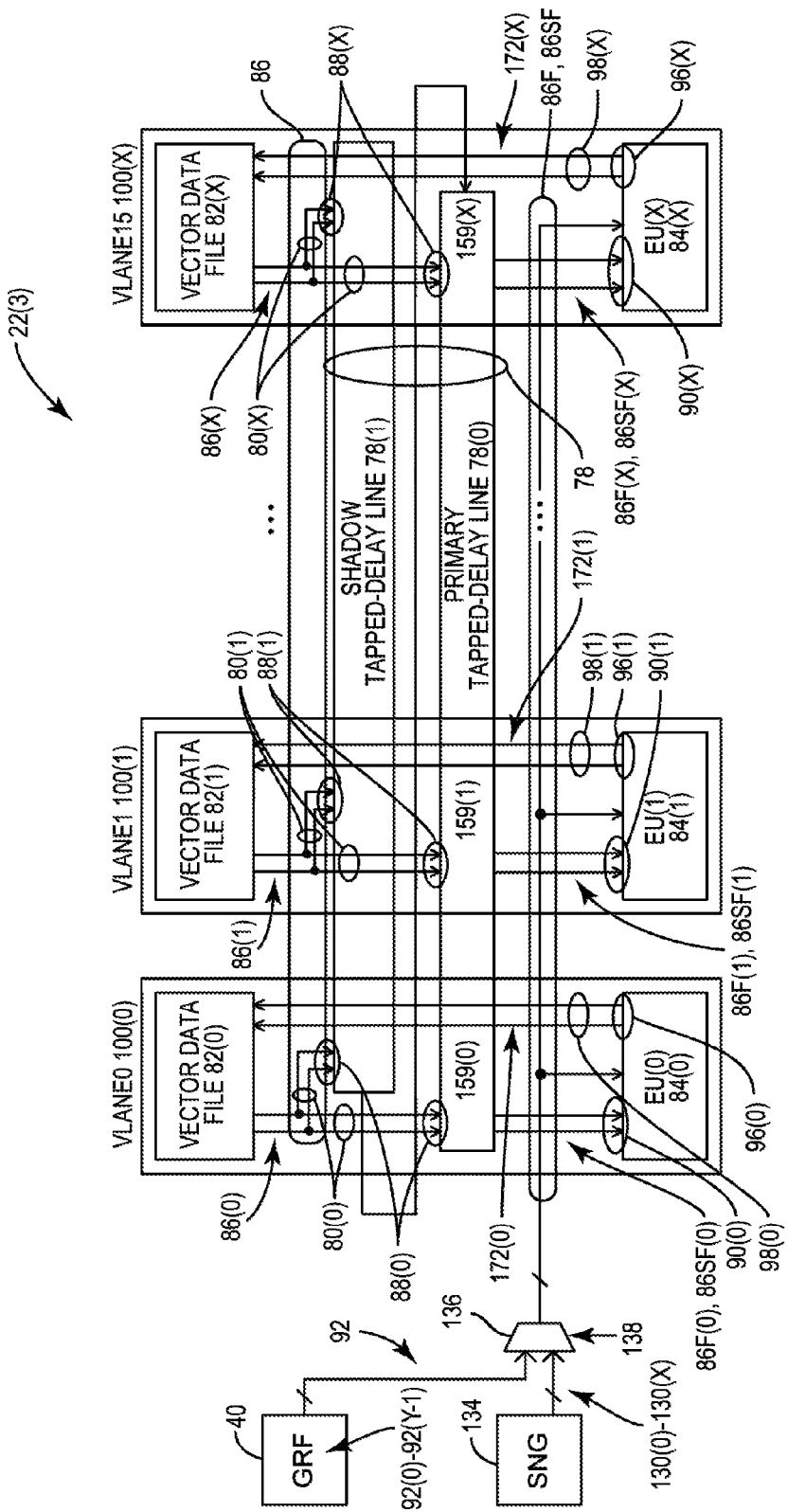
FIG. 19 is a schematic diagram of an exemplary VPE employing format conversion circuitry configured to provide in-flight format-converting of input vector data sample set in at least one input data flow path between a vector data file and at least one execution unit without the input vector data sample set being required to be re-fetched from the vector data file, to provide a format-converted input vector data sample set to the at least one execution unit for executing a vector processing operation.

In this regard, FIG. 19 is a schematic diagram of another exemplary VPE 22(3) that can be provided as the VPE 22 in FIG. 2. As will be described in more detail below, the VPE 22(3) in FIG. 19 is configured to provide in-flight format conversion (e.g., de-interleaving) of input vector data sample sets provided to execution units for vector processing operations in the VPE 22(3) with eliminated or reduced vector data sample re-fetching and reduced power consumption. In-flight format conversion of input vector data sample sets means the input vector data sample set retrieved from vector data memory is format-converted without having to be stored and re-fetched from vector data memory before being provided to execution units for execution. To eliminate or minimize re-fetching of input vector data samples from a vector data file to reduce power consumption and improve processing efficiency, format conversion circuitry 159(0)-159(X) is included in each of the vector data lanes 100(0)-100(X) between the vector data files 82(0)-82(X) and the execution units 84(0)-84(X). As will be discussed in more detail below, the input vector data sample set 86(0)- 86(X) from the vector data files 82(0)-82(X) is format-converted (e.g., de-interleaved) in the format conversion circuitry 159(0)-159(X) in the VPE 22(3) to provide a format-converted input vector data sample set 86F(0)-86F (X) to the execution units 84(0)-84(X) for a vector processing operation that requires de-interleaving of the input vector data sample set 86(0)-86(X). All of the format-converted input vector data samples 86F comprise the format-converted input vector data sample set 86F(0)-86F (X) in this example. 'X'+1 is the maximum number of parallel input data lanes provided in the VPE 22(3) for processing of input vector data samples 86 in this example.

In this manner, format conversion of the input vector data sample sets 86(0)-86(X) in the VPE 22(3) does not require pre-processing, storage, and re-fetching from vector data files 82(0)-82(X), thereby reducing power consumption. Further, because the format conversion of the input vector data sample sets 86(0)-86(X) does not require pre-processing, storage, and re-fetching of the format-converted input vector data sample sets 86(0)-86(X) from vector data file 82(0)-82(X), the execution units 84(0)-84(X) are not delayed from performing vector processing operations. Thus, the efficiency of the data flow paths in the VPE 22(3) are not limited by format conversion pre-processing delays of the input vector data sample sets 86(0)-86(X). The format-converted (e.g., de-interleaved) input vector data sample sets 86F(0)-86F(X) are provided localized to the execution units 84(0)-84(X). The vector processing in the execution units 84(0)-84(X) is only limited by computational resources rather than by data flow limitations.

Note that while the primary and shadow tapped-delay lines 78(0), 78(1) are illustrated in the VPE 22(3) in FIG. 19, including a tapped-delay line in the VPE 22(3) in FIG. 19 is not required. In this example as illustrated in FIG. 19, the format conversion circuitry 159(0)-159(X) can be included in the optional primary tapped-delay line 78(0). This arrangement provides the format conversion circuitry 159(0)-159(X) in the input data flow paths 80(0)-80(X) between the vector data files 82(0)-82(X) and execution units 84(0)-84(X) in the VPE 22(3) in FIG. 19. The operation of the primary tapped-delay line 78(0) was previously described above with regard to VPEs 22(1) and 22(2). As previously discussed above, the primary and shadow tapped-delay lines 78(0), 78(1) may be employed for the vector processing operation, requiring format-converted input vector data sample sets 86F(0)-86F(X) to be provided to the execution units 84(0)-84(X), which in turn also requires format-converted, shifted input vector data sample sets, designated as 86SF(0)-86SF(X).

Note that the same components and architecture provided in the VPE 22(3) in FIG. 19 are provided in the VPE 22(2) in FIG. 11. Common components between VPE 22(3) in FIG. 19 and VPE 22(2) in FIG. 11 are illustrated in FIG. 19 with common element numbers with the components in FIG. 11 of the VPE 22(2). The previous description and discussion of these common components for the VPE 22(2) in FIG. 11 above are also applicable to the VPE 22(3) in FIG. 19, and thus will not be re-described here.

A further description of additional details and features of the VPE 22(3) in FIG. 19 and the tapped-delay lines 78 for providing the format-converted input vector data sample set 86F(0)-86F(X) to the execution units 84(0)-84(X) in the input data flow paths 80(0)-80(X) in this embodiment will now be described. In this regard, FIG. 20 is a flowchart illustrating an exemplary de-interleaving format conversion vector processing operation 160 that can be performed in the VPE 22(3) in FIG. 19 employing the format conversion circuitry 159(0)-159(X) according to an exemplary vector instruction requiring format conversion of the input vector data sample set 86(0)-86(X).

Figure 20:
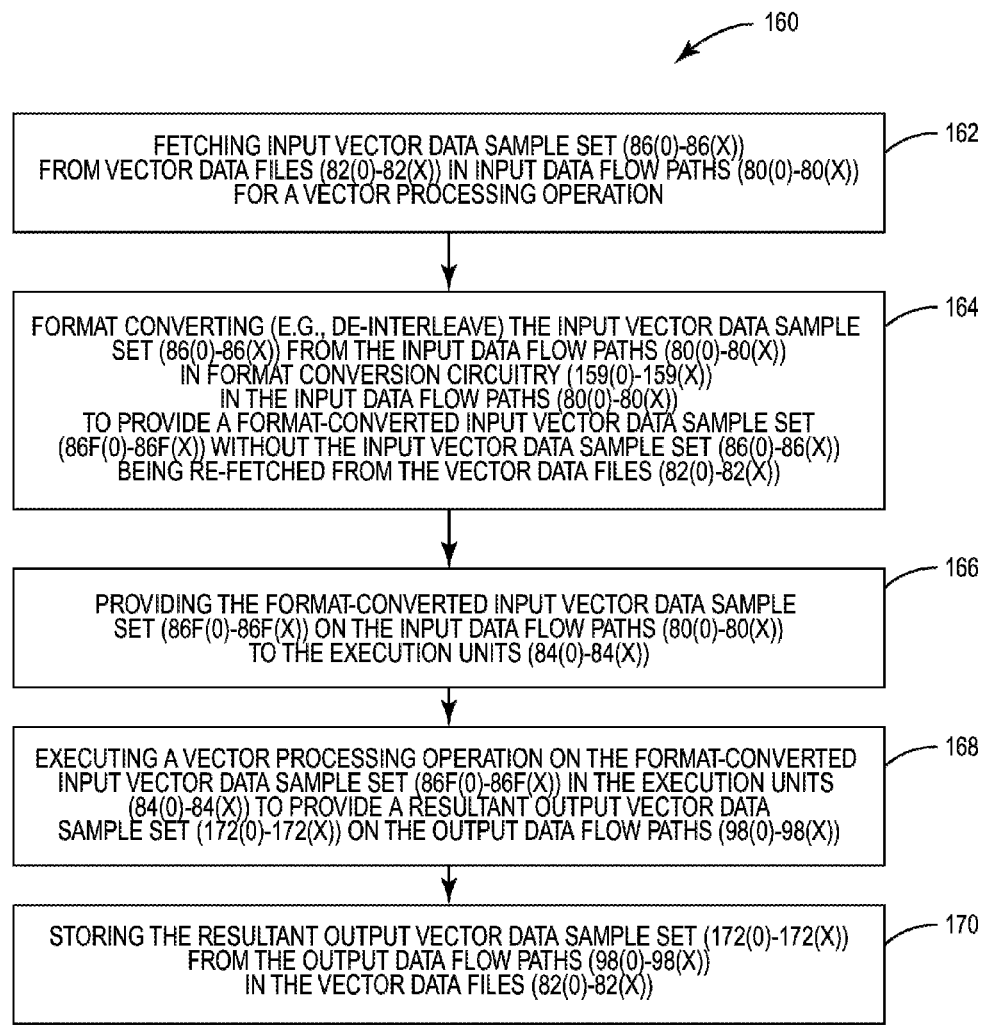
FIG. 20 is a flowchart illustrating exemplary in-flight format-converting of an input vector data sample set in the at least one input data flow path between the vector data file and the at least one execution unit that can be performed in the VPE of FIG. 19.

With reference to FIG. 20, the input vector data sample set 86(0)-86(X) for a vector processing operation 160 according to a vector instruction is fetched from the vector data files 82(0)-82(X) into the input data flow paths 80(0)-80(X) (block 162). For example, the format conversion for the vector processing operation 160 may be a de-interleaving vector processing operation 160 where the input vector data sample set 86(0)-86(X) is de-interleaved from its interleaved state in the vector data files 82(0)-82(X) into de-interleaved input vector data sample set 86F(0)-86F(X). Either one, some, or all of the vector data lanes 100(0)-100(X) in the VPE 22(3) in FIG. 19 can be employed to provide the vector processing operation 160 according to the programming of the vector instruction depending on the width of the input vector data sample set 86(0)-86(X) to be format-converted for the vector processing operation 160. If the entire width of the vector data files 82(0)-82(X) is required, all vector data lanes 100(0)-100(X) can be employed for the vector processing operation 160. The vector processing operation 160 may only require a subset of the vector data lanes 100(0)-100(X) that may be employed for the vector processing operation 160. This may be because the width of the input vector data sample set 86(0)-86(X) is less than the width of all vector data files 82(0)-82(X), where it is desired to employ the additional vector data lanes 100 for other vector processing operations to be performed in parallel to the vector processing operation 160. For the purposes of discussing the current example, it is assumed that the input vector data sample set 86(0)-86(X) format-converted into input vector data sample set 86F(0)-86F(X) for the vector processing operation 160 involves all vector data lanes 100(0)-100(X) in the VPE 22(3) in FIG. 19.

With continuing reference to FIG. 20, the fetched input vector data sample set 86(0)-86(X) is provided into the input data flow paths 80(0)-80(X) to the format conversion circuitry 159(0)-159(X) to be format-converted according to the vector processing operation 160 (block 164). As a non-limiting example, the current input vector data sample set 86(0)-86(X) may optionally be loaded into the primary tapped-delay line 78(0) as the input vector data sample set 86(0)-86(X) to be format-converted before being provided to the execution units 84(0)-84(X) for the vector processing operation 160. As previously discussed, a next input vector data sample set 86(0)-86(X) may also be optionally loaded into the shadow tapped-delay line 78(1) as a next input vector data sample set 86N(0)-86N(X) to be processed by the execution units 84(0)-84(X). As previously discussed above, the purpose of the tapped-delay lines 78 is to shift the input vector data sample set 86(0)-86(X) to shifted input vector data samples 86S(0)-86S(X) to be provided to the execution units 84(0)-84(X) during operation of a vector processing operation 160 operating on shifted input vector data samples 86S. If the format-converted input vector data sample set 86F(0)-86F(X) is also shifted in the tapped-delay lines 78 during the vector processing operation 160, the shifted format-converted input vector data sample set is designated as 86SF(0)-86SF(X).

With continuing reference to FIG. 20, the execution units 84(0)-84(X) may next perform the vector processing operation 160 using the format-converted input vector data sample set 86F(0)-86F(X) (block 166). The execution units 84(0)-84(X) may be configured to provide multiplications and/or accumulation using the format-converted input vector data sample set 86F(0)-86F(X). If the tapped-delay lines 78 are employed to shift the format-converted input vector data sample set 86F(0)-86F(X) during the vector processing operation 160, the execution units 84(0)-84(X) can receive the shifted, format-converted input vector data sample set 86SF(0)-86SF(X) during each processing stage of the vector processing operation 160 until the vector processing operation 160 is completed (block 168). Once the vector processing operation 160 has been completed, a resultant output vector data sample set 172(0)-172(X) based on vector processing with a format-converted input vector data sample set 86F(0)-86F(X), or shifted, format-converted input vector data sample sets 86SF(0)-86SF(X), is provided in the output data flow paths 98(0)-98(X) to be provided and stored in the vector data files 82(0)-82(X) (block 170). The resultant output vector data sample set 172(0)-172(X) is comprised of 'X+1' resultant output vector data samples 172, which in this example are 172(0), 172(1), . . . , and 172(X).

Figure 21:
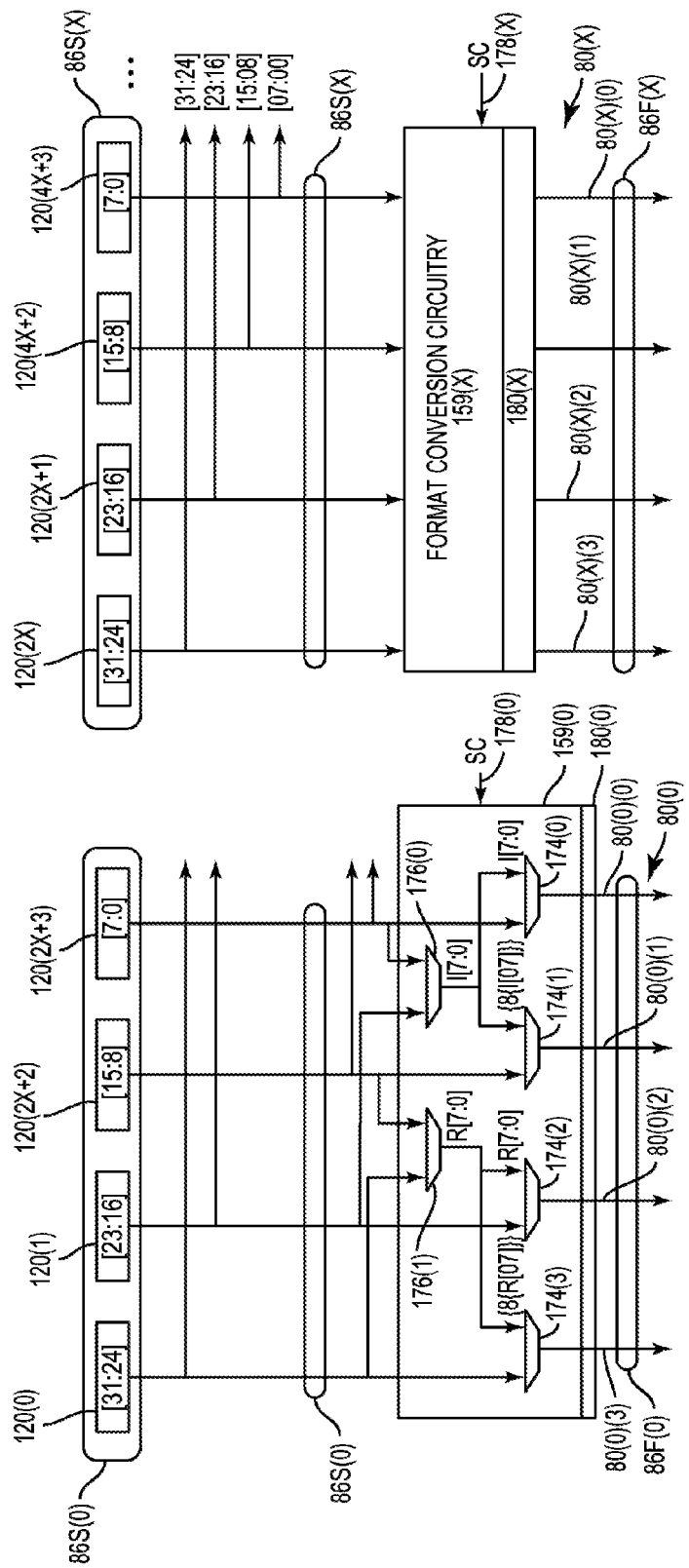
FIG. 21 is a schematic diagram of an exemplary format conversion circuitry provided between tapped-delay lines and execution units in the VPE of FIG. 19, wherein the format conversion circuitry is configured to provide in-flight format-converting of the input vector data sample set provided by the tapped-delay lines in the input data flow path to the execution units.

FIG. 21 is a schematic diagram of exemplary format conversion circuitry 159(0)-159(X) that receive shifted input vector data sample set 86S(0)-86S(X) from the primary tapped-delay line 78(0). In this example, the format conversion circuitry 159(0)-159(X) is provided on the output of the primary tapped-delay line 78(0) in the input data flow paths 80(0)-80(X). The exemplary format conversion circuitry 159(0)-159(X) will now be described.

The exemplary format conversion circuitry 159(0)-159(X) will now be described. Exemplary detail of the internal components of the format conversion circuitry 159(0) is provided in FIG. 21, but such is also applicable for format conversion circuitry 159(1)-159(X). Taking format conversion circuitry 159(0) in FIG. 21 as an example, the format conversion circuitry 159(0) in this example is configured to provide de-interleaving and sign extension of input vector data sample 86(0) or shifted input vector data samples 86S(0) from the primary pipeline registers 120(0), 120(1) 120(2X+2), 120(2X+3) in vector data lane 100(0) to provide format-converted input vector data samples 86F(0) or shifted, format-converted input vector data samples 86SF (0), respectively. In this regard, four multiplexors 174(3)-174(0) are provided in this example, which are arranged according to an assigned primary pipeline register 120(0)-120(2X+3), respectively. Each multiplexor 174(3)-174(0) is configured to select either the portion of the shifted input vector data sample 86S(0) in the assigned primary pipeline register 120(0), 120(1), 120(2X+2), 120(2X+3), or the portion of the shifted input vector data sample 86S(0) to store in a primary pipeline register 120 adjacent to the assigned primary pipeline register 120(0), 120(1), 120(2X+2), 120 (2X+3).

For example, if primary pipeline registers 120(0), 120(1), 120(2X+2), 120(2X+3) store interleaved shifted input vector data sample 86S(0) in complex, interleaved form as real [15:8], imaginary [15:8], real [7:0], imaginary [7:0], and the desired de-interleaved format is real [15:0] and imaginary [15:0] according to the vector instruction to be executed, multiplexor 174(3)-174(0) selections would be as follows. Multiplexor 174(3) would select the portion of the shifted input vector data sample 86S stored in its assigned primary pipeline register 120(0). However, multiplexor 174(2) would select the portion of the shifted input vector data sample 86S stored in primary pipeline register 120(1). This would provide a de-interleaved real portion of the input vector data sample 86S(0) (i.e., real [15:0]) in adjacent input data flow paths 80(0)(3), 80(0)(2). Similarly, multiplexor 174(0) would select the portion of the shifted input vector data sample 86S stored in its assigned primary pipeline register 120(2X+3). However, multiplexor 174(1) would select the portion of the shifted input vector data sample 86S stored in primary pipeline register 120(2X+2). This would provide a de-interleaved imaginary portion of the shifted input vector data sample 86S(0) (i.e., imaginary [15:0]) in adjacent input data flow paths 80(0)(1), 80(0)(0). Multiplexors 176(1), 176(0) provide the ability, to each multiplexor 174(3)-174(0), to select a portion of the shifted input vector data sample 86S(0) from a non-assigned, non-adjacent primary pipeline registers 120(0), 120(1), 120(2X+2)-120(2X+3), as illustrated in FIG. 21.

With continuing reference to FIG. 21, the format conversion circuitry 159(0)-159(X) can also be configured to sign extend format-converted input vector data sample sets 86F (0)-86F(X). For example, if the format conversion of the input vector data sample sets 86(0)-86(X) involves signed vector data samples converted from small bit widths to large bit widths, the format conversion circuitry 159(0)-159(X) can be configured to sign extend the de-interleaved vector data samples by extending the most significant bits as '0''s for non-negative numbers, and as "F"'s for negative numbers. The format conversion circuitry 159(0)-159(X) may have a sign extension (SC) input 178(0)-178(X) set according to the vector instruction being executed to indicate if sign extension is to be performed on the format-converted input vector data sample set 86F(0)-86F(X) or not. The SC inputs 178(0)-178(X) can be provided to sign extension circuitry 180(0)-180(X) provided in the format conversion circuitry 159(0)-159(X) to perform the sign extension according to a programmable data path configuration provided by the SC inputs 178(0)-178(X) according to the vector instruction being processed. The SC inputs 178(0)-178(X) can be configured and reconfigured for each vector instruction to provide for flexibility in the vector processing by the VPE 22(3). For example, the programmable data paths in the format conversion circuitry 159(0)-159(X) can be configured by the SC inputs 178(0)-178(X) can be configured and reconfigured for each clock-cycle of a vector instruction, on a clock-cycle-by-clock-cycle basis if desired, to provide format conversion as desired, with full utilization of the execution units 84(0)-84(X), if desired.

But as discussed above, the format conversion circuitry 159(0)-159(X) does not have to be provided as part of the primary tapped-delay line 78(0). The primary and shadow tapped-delay lines 78(0), 78(1) are optional. The format conversion circuitry 159(0)-159(X) could receive input vector data sample sets 86(0)-86(X) directly from the vector data files 82(0)-82(X). In this scenario as an example, with reference to FIG. 21, the input vector data sample set 86(0)-86(X) could be loaded from the vector register files 82(0)-82(X) directly into the primary registers 120(0)-120 (4X+3).

Further, note that although the format conversion circuitry 159(0)-159(X) is provided on the output of the primary tapped-delay line 78(0) to format converted input vector data sample sets 86(0)-86(X), such is not required. The format conversion circuitry 159(0)-159(X) in FIG. 21 could be provided on the input side of the primary and shadow tapped-delay lines 78(0), 78(1), such that the input vector data sample sets 86(0)-86(X) fetched from the vector data files 82(0)-82(X) are format converted in the format conversion circuitry 159(0)-159(X) prior to being loaded into the primary and shadow tapped-delay lines 78(0), 78(1). In this example, the input vector data sample sets 86(0)-86(X) would be stored as format-converted input vector data sample sets 86F(0)-86F(X) (or 86SF(0)-86SF(X) after shifting) in the primary and shadow tapped-delay lines 78(0), 78(1). The format-converted input vector data sample sets 86F(0)-86F(X) (or 86SF(0)-86SF(X) after shifting) could then be provided directly from the primary tapped-delay line 78(0) directly to the execution units 84(0)-84(X) for execution in a vector processing operation.

As discussed above, the input data flow paths 80(0)-80(X) can be programmed according to a programmable input data path configuration to employ the format conversion circuitry 159(0)-159(X) according to the vector instruction to be executed. In this regard, FIG. 22 is a chart 182 that provides an exemplary data format of bits of a vector instruction to control programming of shifting and format conversion of input vector data sample sets 86(0)-86(X) in the VPE 22(3) in FIG. 19. The data provided in the fields in the chart 182 provide programming to the VPE 22(3) to control whether the format conversion circuitry 159(0)-159(X) and/or tapped-delay lines 78 are included in the input data flow paths 80(0)-80(X) depending on if their functionality is needed for the vector instruction to be processed.

For example in FIG. 22, a bias field 184 (BIAS_SC16) is provided in bits [7:0] of a vector instruction or vector programming to indicate if a shift bias for arithmetic instructions is provided when using signed complex sixteen (16) bit format (SC16) by the tapped-delay lines 78. A first source data format conversion field 186 (DECIMATE_SRC1) is provided in bit [16] of the vector instruction or vector programming to indicate if a first source data (i.e., input vector data sample set 86(0)-86(X)) should be decimated (i.e., de-interleaved) and converted from SC8 to SC16 format or not. A second source data format conversion field 188 (DECIMATE_SRC2) is provided in bit [17] of the vector instruction or vector programming to indicate if a second source data (i.e., input vector data sample set 86(0)-86(X)) should be decimated (i.e., de-interleaved) and converted from SC8 to SC16 format or not. An output data format field 190 (DEST_FMT) is provided in bit [18] to indicate if an output source data (e.g. resultant output vector data sample set 172(0)-172(X) in VPE 22(3) in FIG. 19) should be stored in SC16 format or converted from SC16 to SC8 format and re-ordered when stored in the vector data files 82(0)-82(X). A phase format field 192 (DECIMATE_PHASE) is provided in bit [19] to indicate if input source data (i.e., input vector data sample set 86(0)-86(X)) and output data (e.g., resultant output vector data sample set 172(0)-172(X) in VPE 22(3) in FIG. 19) should be decimated (i.e., de-interleaved) along even (e.g., on-time) and odd (e.g., late) samples, which may be useful for CDMA-specific vector processing operations in particular, as previously described above and in FIG. 17B.

As discussed above, after the execution units 84(0)-84(X) in the VPEs 22 perform vector processing on input vector data sample sets and provide resultant output vector data sample sets on the output data flow paths 98(0)-98(X) as a result, subsequent vector processing operations may need to be performed on the resultant output vector data sample sets. However, the resultant output vector data sample sets may need to be reordered for subsequent vector processing operations. Thus, the resultant output vector data sample sets resulting from previous processing operations must be stored in the vector data files 82(0)-82(X), fetched for reordering, and re-stored in reordered format in vector data files 82(0)-82(X). For example, subsequent processing operations may require previously processed vector data samples to be interleaved when stored in the vector data files 82(0)-82(X), as discussed above in FIGS. 17A and 17B.

As another example, subsequent processing operations may require previously processed vector data samples to be de-interleaved when stored in the vector data files 82(0)-82(X). For example, in CDMA processing operations, data samples representing a signal may need to be stored and interleaved according to even (on-time) and odd (late) phases of the signal. To solve this issue, vector processors can include circuitry that performs post-processing reordering of output vector data from execution units after the output vector data is stored in vector data memory. The post-processed output vector data samples stored in vector data memory are fetched from the vector data memory, reordered, and stored back in the vector data memory. This post-processing delays the subsequent processing of the reordered vector data samples by the execution units, and causes computational components in the execution units to be underutilized.

Figure 23:
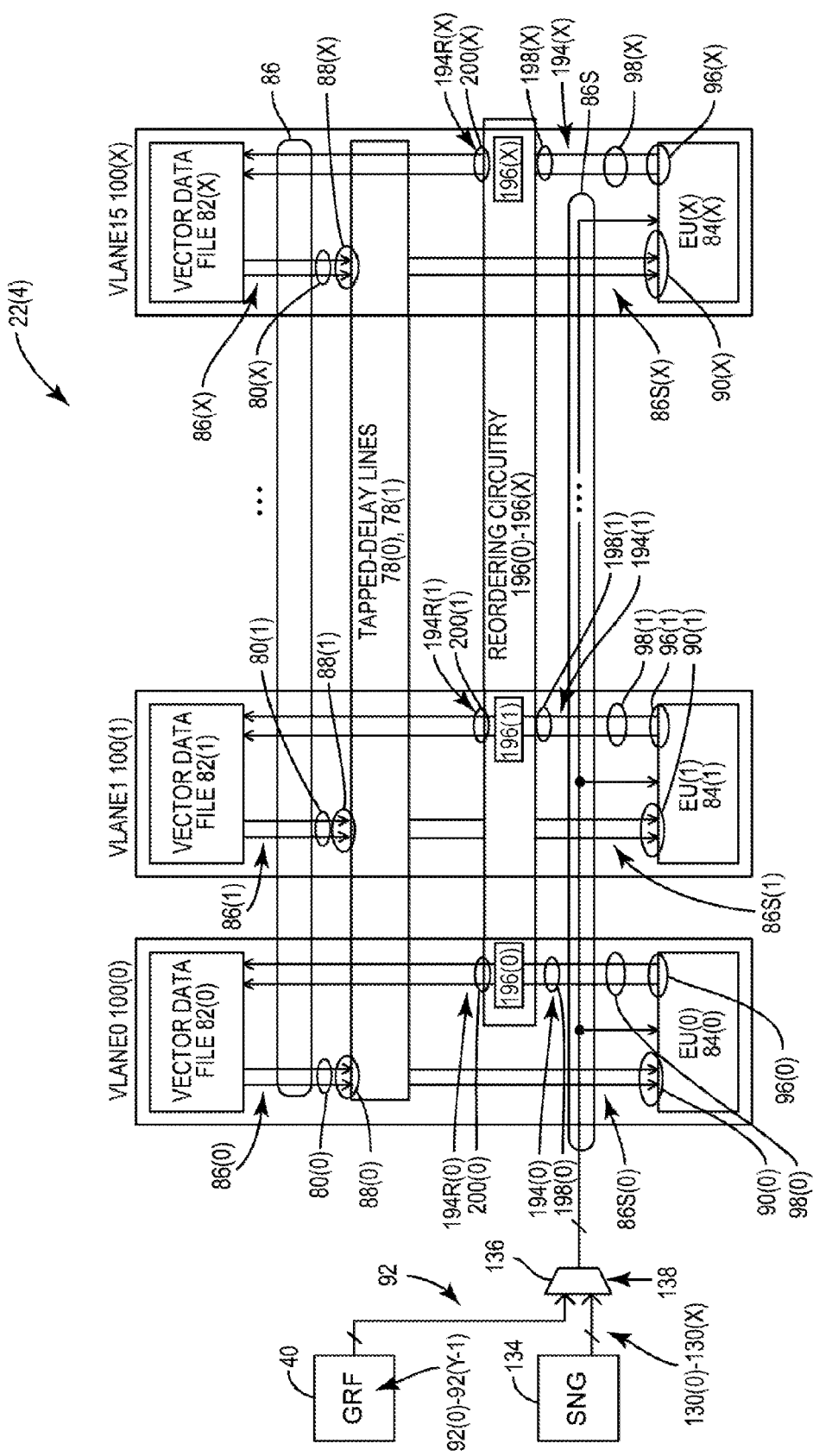
FIG. 23 is a schematic diagram of an exemplary VPE employing reordering circuitry configured to provide in-flight reordering of a resultant output vector data sample set in at least one output data flow path between at least one execution unit and at least one vector data file without the resultant output vector data sample set being stored in the at least one vector data file, to provide and store a re-ordered resultant output data sample set.

In this regard, FIG. 23 is a schematic diagram of another exemplary VPE 22(4) that can be provided as the VPE 22 in FIG. 2. As will be described in more detail below, the VPE 22(4) in FIG. 23 is configured to provide in-flight reordering of resultant output vector data sample sets 194(0)-194(X) provided by the execution units 84(0)-84(X) for vector processing operations to be stored in the vector data files 82(0)-82(X) in the VPE 22(4) with eliminated or reduced vector data sample re-fetching and reduced power consumption. The resultant output vector data sample set 194(0)-194(X) is comprised of 'X+1' resultant output vector data samples 194, which in this example are 194(0), 194(1), . . . , and 194(X). For example, reordering could include interleaving of the resultant output vector data sample sets 194(0)-194(X) before being stored in the vector data files 82(0)-82(X).

As shown in FIG. 23 and discussed in more detail below, reordering circuitry 196(0)-196(X) is provided in the output data flow paths 98(0)-98(X) between the execution units 84(0)-84(X) and the vector data files 82(0)-82(X) in each of the vector data lanes 100(0)-100(X). The reordering circuitry 196(0)-196(X) is configured based on programming according to a vector instruction to be executed to provide reordering of resultant output vector data sample set 194(0)-194(X) as reordered resultant output vector data sample set 194R(0)-194R(X) in the output data flow paths 98(0)-98(X). In-flight reordering of the resultant output vector data sample set 194(0)-194(X) in the VPE 22(4) in FIG. 23 means the resultant output vector data sample set 194(0)-194(X) provided by execution units 84(0)-84(X) is reordered as reordered resultant output vector data sample set 194R(0)-194R(X) before being stored in vector data files 82(0)-82(X). In this manner, the resultant output vector data sample set 194(0)-194(X) is stored in vector data files 82(0)-82(X) in reordered format as the reordered resultant output vector data sample set 194R(0)-194R(X). As a non-limiting example, the reordering of resultant output vector data sample sets 194(0)-194(X) may include interleaving or de-interleaving of the resultant output vector data sample sets 194(0)-194(X) to be stored as the reordered resultant output vector data sample sets 194R(0)-194R(X) to in the vector data files 82(0)-82(X).

Thus, with the reordering circuitry 196(0)-196(X) provided in the output data flow paths 98(0)-98(X), the resultant output vector data sample set 194(0)-194(X) is not required to first be stored in the vector data files 82(0)-82(X), and then fetched from the vector data files 82(0)-82(X), reordered, and restored in vector data files 82(0)-82(X). The resultant output vector data sample set 194(0)-194(X) is reordered before being stored in the vector data files 82(0)-82(X). In this manner, the resultant output vector data sample sets 194(0)-194(X) are stored in the reordered format in the vector data files 82(0)-82(X) without requiring additional post-processing steps, which may delay subsequent vector processing operations to be performed in the execution units 84(0)-84(X). Thus, the efficiency of the data flow paths in the VPE 22(4) are not limited by the reordering of the resultant output vector data sample sets 194(0)-194(X). The subsequent vector processing in the execution units 84(0)-84(X) is only limited by computational resources rather than by data flow limitations when the resultant output vector data sample sets 194(0)-194(X) are to be stored in reordered format as reordered resultant output vector data sample sets 194R(0)-194R(X) in the vector data files 82(0)-82(X).

In this example as illustrated in FIG. 23, the VPE 22(4) that includes the reordering circuitry 196(0)-196(X) can also optionally include the primary tapped-delay line 78(0) and/or the shadow tapped-delay line 78(1). The operation of the tapped-delay lines 78(0), 78(1) was previously described above with regard to VPEs 22(1) and 22(2). As previously discussed above, the tapped-delay lines 78(0), 78(1) may be employed for the vector processing operation requiring shifted input vector data sample sets 86S(0)-86S(X) to be provided to the execution units 84(0)-84(X). Also, note that common components are provided in the VPE 22(4) in FIG. 23 that are provided in the VPEs 22(1)-22(3) in FIGS. 4, 11, and 19. Common components are illustrated in the VPE 22(4) in FIG. 23 with common element numbers. The previous description and discussion of these common components above with regard to VPEs 22(1)-22(3) are also applicable to the VPE 22(4) in FIG. 23, and thus will not be re-described here.

With continuing reference to FIG. 23, more specifically, the reordering circuitry 196(0)-196(X) is configured to receive the resultant output vector data sample sets 194(0)-194(X) on reordering circuitry inputs 198(0)-198(X) on the output data flow paths 98(0)-98(X). The reordering circuitry 196(0)-196(X) is configured to reorder the resultant output vector data sample sets 194(0)-194(X) to provide the reordered resultant output vector data sample sets 194R(0)-194R(X). The reordering circuitry 196(0)-196(X) is configured to provide the reordered resultant output vector data sample sets 194R(0)-194R(X) on reorder circuitry outputs 200(0)-200(X) in the output data flow paths 98(0)-98(X) to be provided to the vector data files 82(0)-82(X) for storage.

A further description of additional details and features of the VPE 22(4) in FIG. 23 for providing the reordered resultant output vector data sample sets 194R(0)-194R(X) to the vector data files 82(0)-82(X) in the output data flow paths 98(0)-98(X) in this embodiment will now be described. In this regard, FIG. 24 is a flowchart illustrating an exemplary reordering of resultant output vector data sample sets 194(0)-194(X) resulting from a vector processing operation 202 that can be performed in the VPE 22(4) in FIG. 23 employing the reordering circuitry 196(0)-196(X) according to an exemplary vector instruction requiring reordering of the resultant output vector data sample set 194(0)-194(X).

Figure 24:
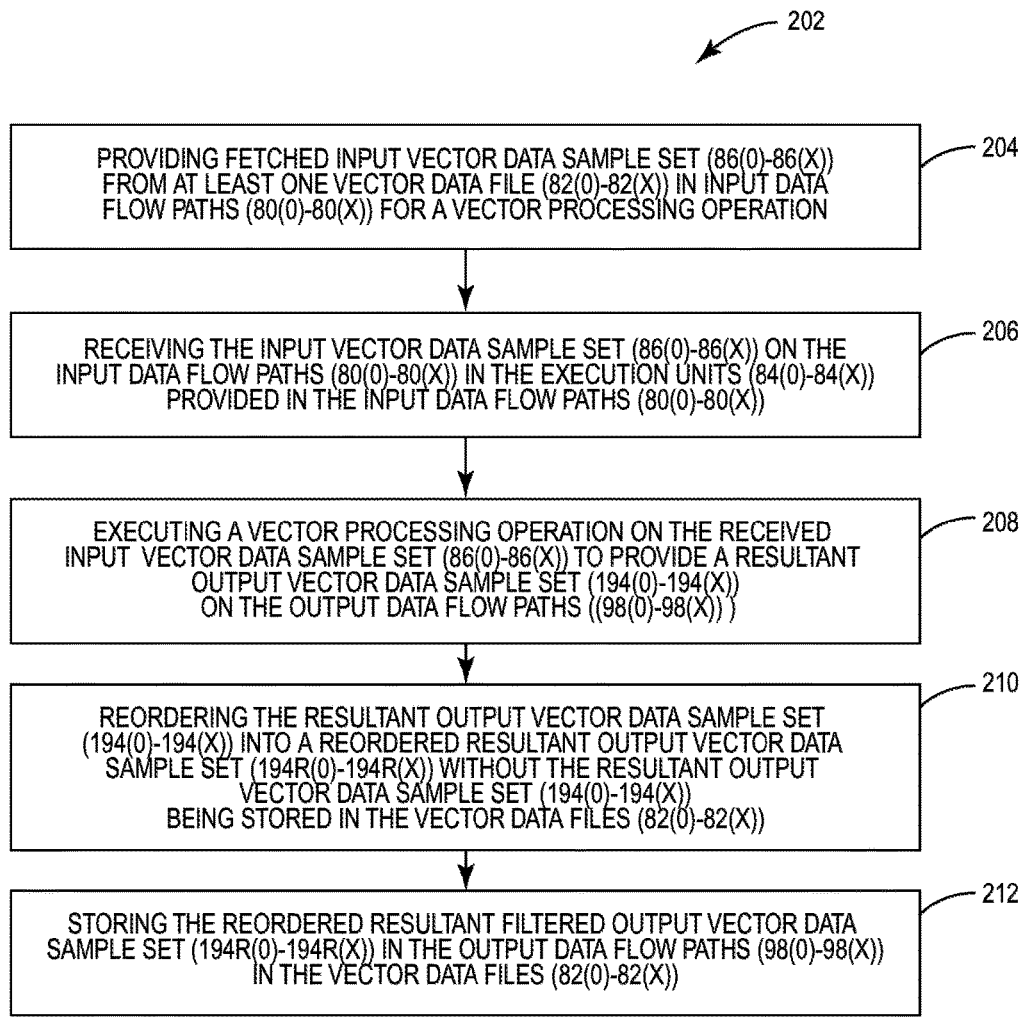
FIG. 24 is a flowchart illustrating exemplary in-flight de-interleaving of an output vector data sample set in the at least one output data flow path between the vector data file and the at least one execution unit in the VPE of FIG. 23 to be stored in reordered form in the vector data file.

With reference to FIGS. 23 and 24, the input vector data sample set 86(0)-86(X) to be processed according to the vector processing operation 202 according to a vector instruction is fetched from the vector data files 82(0)-82(X) and provided in the input data flow paths 80(0)-80(X) (block 204 in FIG. 24). For example, the vector processing operation 202 can involve any vector processing operation desired according to the vector instruction to be executed. Non-limiting examples including the filter, correlation, and the format conversion vector processing operations described above. Either one, some, or all of the vector data lanes 100(0)-100(X) in the VPE 22(4) in FIG. 23 can be employed to provide the vector processing operation 202 according to the programming of the vector instruction depending on the width of the input vector data sample set 86(0)-86(X) for the vector processing operation 202. If the entire width of the vector data files 82(0)-82(X) is required, all vector data lanes 100(0)-100(X) can be employed for the vector processing operation 202. The vector processing operation 202 may only require a subset of the vector data lanes 100(0)-100(X). This may be because the width of the input vector data sample set 86(0)-86(X) is less than the width of all vector data files 82(0)-82(X), where it is desired to employ the additional vector data lanes 100 for other vector processing operations to be performed in parallel to the vector processing operation 202.

With continuing reference to FIGS. 23 and 24, the fetched input vector data sample set 86(0)-86(X) is received from the input data flow paths 80(0)-80(X) at the execution units 84(0)-84(X) (block 206 in FIG. 24). The execution units 84(0)-84(X) perform vector processing on the received input vector data sample set 86(0)-86(X) according to the vector processing operation 202 provided according to a vector instruction (block 208 in FIG. 24). As a non-limiting example, the input vector data sample set 86(0)-86(X) may optionally be loaded into the primary tapped-delay line 78(0) as the input vector data sample set 86(0)-86(X) to be shifted during execution of the vector processing operation 202 during each processing stage of the vector processing operation 202 executed by the execution units 84(0)-84(X) that involve shifting of the input vector data sample set 86(0)-86(X). As previously discussed, a next input vector data sample set 86N(0)-86N(X) may also be optionally loaded into the shadow tapped-delay line 78(1) as a next input vector data sample set 86N(0)-86N(X) to be processed by the execution units 84(0)-84(X). As previously discussed above, the purpose of the tapped-delay lines 78 is to shift the input vector data sample set 86(0)-86(X) to shifted input vector data samples 86S(0)-86S(X) to be provided to the execution units 84(0)-84(X) during operation of a vector processing operation 202 operating on shifted input vector data samples 86S.

With continuing reference to FIGS. 23 and 24, the execution units 84(0)-84(X) may be configured to provide multiplications and/or accumulation using the input vector data sample set 86(0)-86(X). If the tapped-delay lines 78 are employed to shift the format-converted input vector data sample set 86F(0)-86F(X) during the vector processing operation 202, the execution units 84(0)-84(X) can received the shifted input vector data sample set 86S(0)-86S(X) during each processing stage of the vector processing operation 202 until the vector processing operation 202 is completed, as previously described by example. Once the vector processing operation 202 has been completed, a resultant output vector data sample set 194(0)-194(X) based on vector processing of the input vector data sample set 86(0)-86(X), or shifted, format-converted input vector data sample sets 86S(0)-86S(X), is provided in the output data flow paths 98(0)-98(X).

With continuing reference to FIGS. 23 and 24, before the resultant output vector data sample set 194(0)-194(X) is stored in the vector data files 82(0)-82(X), the resultant output vector data sample set 194(0)-194(X) is provided to the reordering circuitry 196(0)-196(X) provided in the output data flow paths 98(0)-98(X) provided between the execution units 84(0)-84(X) and the vector data files 82(0)-82(X). The reordering circuitry 196(0)-196(X) is programmable to be included in the output data flow paths 98(0)-98(X) according to the vector instruction being executed, and if the vector instruction calls for reordering of the resultant output vector data sample set 194(0)-194(X) to be stored in the vector data files 82(0)-82(X), as discussed below in more detail. The reordering circuitry 196(0)-196(X) reorders the resultant output vector data sample set 194(0)-194(X) according to the reordering provided in the programming according to the vector instruction being executed without the resultant output vector data sample set 194(0)-194(X) being stored in the vector data files 82(0)-82(X) (block 210 in FIG. 24). In this manner, the resultant output vector data sample set 194(0)-194(X) does not have to first be stored in the vector data files 82(0)-82(X), re-fetched, reordered in a post-processing operation, and stored in reordered format in the vector data files 82(0)-82(X), thereby providing delay in the execution units 84(0)-84(X). The resultant output vector data sample set 194(0)-194(X) is stored as the reordered resultant output vector data sample set 194R(0)-194R(X) in the vector data files 82(0)-82(X) without reordering post-processing required (block 212 in FIG. 24). For example, the resultant output vector data sample set 194(0)-194(X) may appear in a format like that provided in FIGS. 18A and 18B before being reordered by the reordering circuitry 196(0)-196(X).

An example of the reordering circuitry 196(0)-196(X) will now be described with regard to FIG. 25. Exemplary detail of the internal components of the reordering circuitry 196(0)-196(X) is provided for one instance of the reordering circuitry 196(0) provided in vector data lane 100(0) is provided in FIG. 25, but such is also applicable for reordering circuitry 196(1)-196(X). Taking reordering circuitry 196(0) in FIG. 25 as an example, the reordering circuitry 196(0) in this example is configured to reorder the resultant output vector data sample 194(0) provided by the execution unit 84(0) in the output data flow path 98(0) in vector data lane 100(0) to provide the reordered resultant output vector data sample 194R(0). In this regard, four output vector data sample selectors 214(3)-214(0), provided in the form of multiplexors in this example, are provided in this example, which are arranged according to the bit widths of the execution unit outputs 96(0), which are four (4) in this example of eight (8) bit widths each 96(0)(3)-96(0)(0). Each output vector data sample selector 214(3)-214(0) is configured to select either the portion of the resultant output vector data sample 194(0) in the assigned execution unit output 96(0)(3)-96(0)(0), or a portion of the resultant shifted output vector data sample 194(0) from an execution unit output 96 adjacent to the assigned execution unit output 96(0)(3)-96(0)(0).

For example, if execution unit outputs 96(0)(3)-96(0)(0) provide resultant output vector data sample 194(0) in sixteen (16) bit signed complex format real [31:24], real [23:16], imaginary [15:8], imaginary [7:0] and the desired reordered (e.g., interleaved) format is real [31:24], imaginary [23:16], real [15:8], imaginary [7:0] according to the vector instruction to be executed, output vector data sample selector 214(3)-214(0) selections would be as follows. Output vector data sample selector 214(3) would select the resultant output vector data sample 194(0)(3) from execution unit output 96(0)(3) to provide on output data flow path 98(0)(3). However, output vector data sample selector 214(2) would select the portion of the resultant output vector data sample 194(0)(1) on execution unit output 96(0)(1) to provide on output data flow path 98(0)(2). This would provide an interleaved real portion of the resultant shifted output vector data sample 194(0) (i.e., real [31:24], imaginary [23:16]) in adjacent output data flow paths 98(0)(3), 98(0)(2), as reordered resultant output vector data sample 194R(0)(3), 194R(0)(2) of reordered resultant output vector data sample 194R(0). Similarly, output vector data sample selector 214(0) would select the resultant output vector data sample 194(0)(0) from execution unit output 96(0)(0) to provide in output data flow path 98(0)(0). However, output vector data sample selector 214(1) would select the resultant output vector data sample 194(0)(2) on execution unit output 96(0)(2) to provide on output data flow path 98(0)(1). This would provide a reordered, interleaved resultant output vector data samples 194(0)(2), 194(0)(0) (i.e., real [15:8], imaginary [7:0]) in adjacent output data flow paths 98(0)(1), 98(0)(0), as reordered resultant output vector data samples 194R(0)(1), 194R(0)(0) of reordered resultant output vector data sample 194R(0). Output vector data sample selectors 216(1), 216(0), also provided in the form of multiplexors, provide the ability to select between a resultant output vector data sample 194(0)(3)-194(0)(0) from a non-assigned, non-adjacent execution unit output 96(0)(3)-96(0)(0), as illustrated in FIG. 25.

Figure 25:
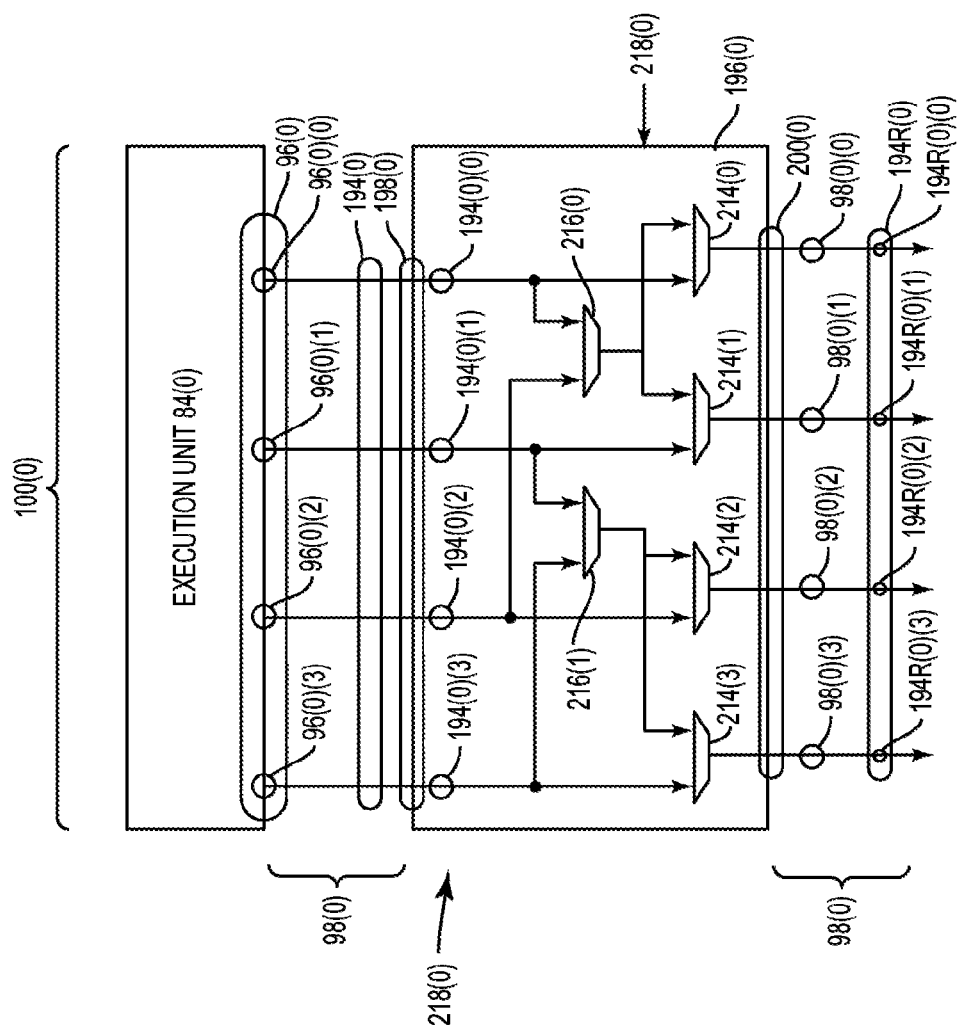
FIG. 25 is a schematic diagram of an exemplary VPE employing reordering circuitry in output data flow paths between executions units and a vector data file to provide in-flight reordering of output vector data sample sets stored to the vector data file.

With continuing reference to FIGS. 23 and 25, the reordering circuitry 196(0)-196(X) could be provided as being programmable to be configured or reconfigured to not reorder resultant output vector data sample set 194(0)-194(X) according to the vector instruction to be executed. In this example, the reordering circuitry 196(0)-196(X) may be programmed to provide for the output data flow paths 98(0)-98(X) to flow straight to the reordering circuitry 196(0)-196(X) without any reordering operations being formed. As previously discussed above and illustrated in FIG. 22, the output data format field 190 (DEST_FMT) in chart 182 can be provided in bit [18] of a vector instruction as a non-limiting example to indicate if an output source data (e.g., resultant output vector data sample set 194(0)-194(X) in VPE 22(4) in FIG. 23) should be stored in SC16 format or converted from SC16 to SC8 format and re-ordered when stored in the vector data files 82(0)-82(X).

In this regard, a programmable reordering data path configuration input 218(0) in FIG. 25 can be provided to the reordering circuitry 196(0) to program the reordering circuitry 196(0) to either reorder or not reorder the resultant output vector data samples 194(0)(3)-194(0)(0) in the output data flow path 98(0). Programmable reordering data path configuration inputs 218(1)-218(X) (not shown) can also be similarly provided to the reordering circuitry 196(1)-196(X) to program the reordering circuitry 196(1)-196(X) to either reorder or not reorder the resultant output vector data sample sets 194(1)-194(X) in the output data flow paths 98(1)-98(X), respectively. In this manner, the reordering circuitry 196(0)-196(X) can be programmed to not reorder the resultant output vector data sample sets 194(0)-194(X) if the vector instruction does not provide for such processing to be performed. The programmable reordering data path configuration inputs 218(0)-218(X) can be configured and reconfigured for each vector instruction to provide for flexibility in the vector processing by the VPE 22(4). For example, the programmable reordering data path configuration inputs 218(0)-218(X) can be configured and reconfigured for each clock-cycle of a vector instruction, on a clock-cycle-by-clock-cycle basis, if desired, to provide reordering as desired, with full utilization of the execution units 84(0)-84(X), if desired.

Other vector processing operations can also be provided that involve in-flight processing of resultant output vector data sample sets from the execution units 84(0)-84(X) without requiring additional post-processing steps, which may delay subsequent vector processing operations to be performed in the execution units 84(0-84(X). For example, CDMA wireless baseband operations requiring despreading of chip sequences according to spread signal data sequences of varying length may benefit from in-flight vector processing.

Figure 26:
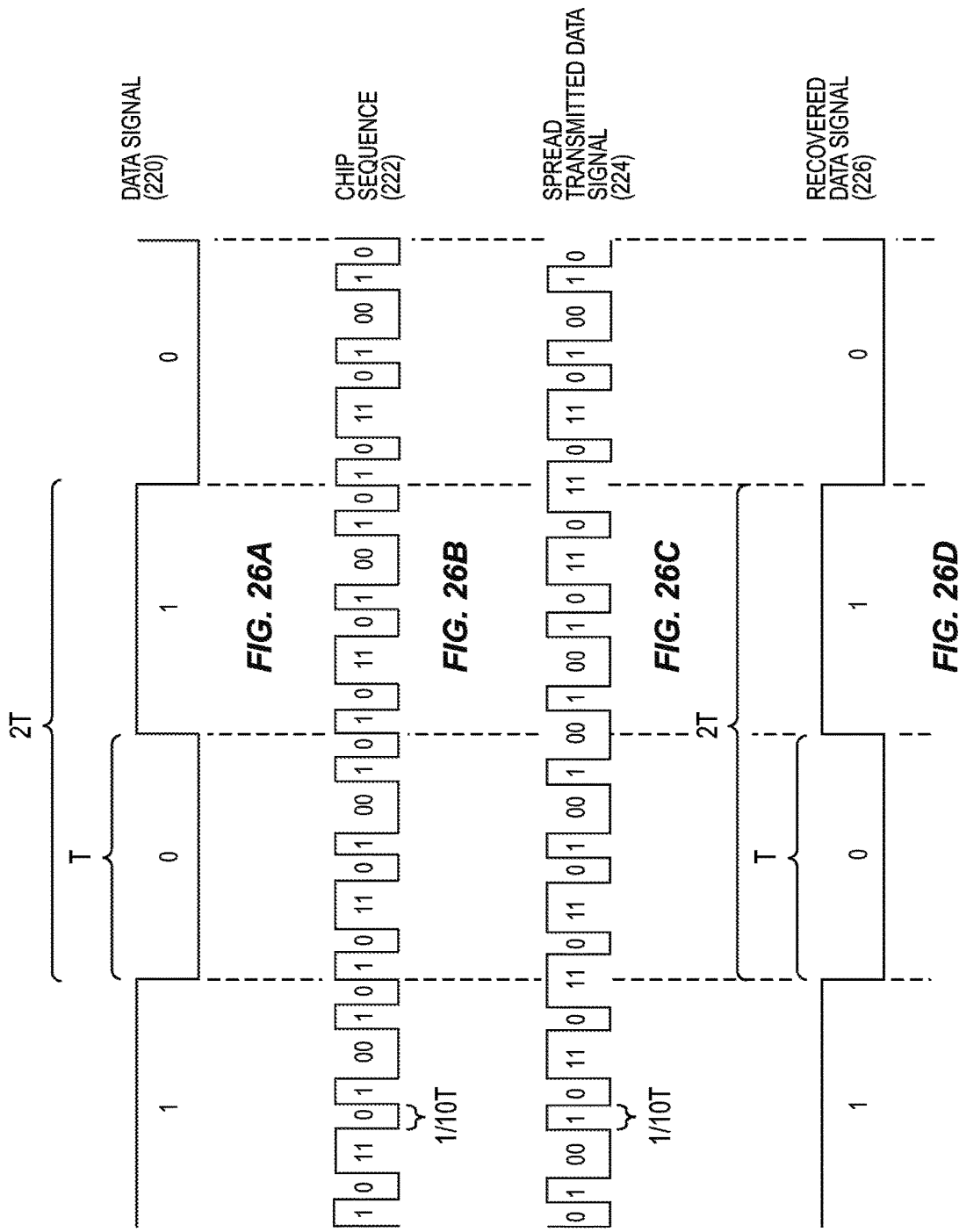
FIG. 26A is a diagram of an exemplary vector data sample sequence representing a communications signal.
FIG. 26B is a diagram of an exemplary code division multiple access (CDMA) chip sequence.
FIG. 26C is a diagram of the vector data sample sequence in FIG. 26A after being spread with the CDMA chip sequence in FIG. 26B.
FIG. 26D is a diagram of despreading the spread vector data sample sequence in FIG. 26C with the CDMA chip sequence in FIG. 26B to recover the original vector data sample sequence in FIG. 26A.

For example, a data signal 220 that can be modulated using CDMA is illustrated in FIG. 26A. The data signal 220 has a period of 2T. The data signal 220 represents the data sequence 1010 in this example, where high signal levels represent a logical '1' and low signal levels represent a logical '0,' as illustrated in FIG. 26A. In CDMA modulation, the data signal 220 is spread by a chip sequence 222, such as chip sequence 222 in FIG. 26B, which may be a pseudorandom code. The chip sequence 222, in this example, has a period that is ten (10) times smaller than the period of the data signal 220 to provide a chip sequence 222 having a spreading rate or factor of ten (10) chips for each sample of the data signal 220 in this example. To spread the data signal 220 in this example, the data signal 220 is exclusively ORed (i.e., XOR'ed) with the chip sequence 222 to provide a spread transmitted data signal 224, as illustrated in FIG. 26C. Other data signals for other users transmitted in the same bandwidth with the spread transmitted data signal 224 are spread with other chip sequences that are orthogonal to each other and the chip sequence 222. In this manner, when the original data signal 220 is to be recovered, the spread transmitted data signal 224 is correlated with the sequence numbers, as previously described above with regard to FIGS. 11-16. If there is a high correlation between the sequence number and the spread transmitted data signal 224, such as will be the case with chip sequence 222, the original data signal 220 can be recovered using the chip sequence associated with the high correlation sequence number. The spread transmitted data signal 224 is despread with the highly correlated chip sequence, which is chip sequence 222 in this example, to recover the original data signal 220 as recovered data signal 226 in FIG. 26D.

The despreading of the spread transmitted data signal 224 in FIG. 26C can be performed in a despreading vector processing operation as an inner product between the spread transmitted data signal 224 and potential chip sequences, similar to the correlation vector processing operation described above with regard to the VPE 22(2) in FIG. 11, to determine a highly correlating chip sequence. The spread transmitted data signal 224 can be despread with the chip sequence 222 determined to have been used to CDMA modulate the original data signal 220, to provide the recovered data signal 226 in FIG. 26D.

In vector processors that include CDMA processing operations, the vector processors can include circuitry that performs despreading of spread signal vector data sequences after being output from execution units and stored in vector data memory. In this regard, the spread signal vector data sequences stored in vector data memory are fetched from vector data memory in a post-processing operation, and despread with correlated spread code sequence or chip sequence to recover the original data signal. The despreaded vector data sequences, which are the original data samples before spreading, are stored back in vector data memory. This post-processing operation can delay the subsequent vector operation processing by the execution units, and causes computational components in the execution units to be underutilized. Further, despreading of spread signal vector data sequences using a spreading code sequence is difficult to parallelize, since the spread signal vector data sequences to be despreaded cross over different data flow paths from the execution units.

To address this issue, in embodiments disclosed below, VPEs that include despreading circuitry provided in data flow paths between execution units and vector data memory in the VPE are provided. The despreading circuitry is configured to despread spread-spectrum sequences using an output vector data sample set from execution units in-flight while the output vector data sample set is being provided over the output data flow paths from the execution units to the vector data memory. In-flight despreading of output vector data sample sets means that the output vector data sample set provided by execution units is despread before being stored in vector data memory, so that the output vector data sample set is stored in vector data memory in a despread format. The despread spread-spectrum sequences (DSSS) can be stored in despread form in the vector data memory without requiring additional post-processing steps, which may delay subsequent vector processing operations to be performed in the execution units. Thus, the efficiency of the data flow paths in the VPE may not be limited by the despreading of the spread-spectrum sequences. The subsequent vector processing in the execution units may only be limited by computational resources rather than by data flow limitations when despread spread-spectrum sequences are stored in vector data memory.

Figure 27:
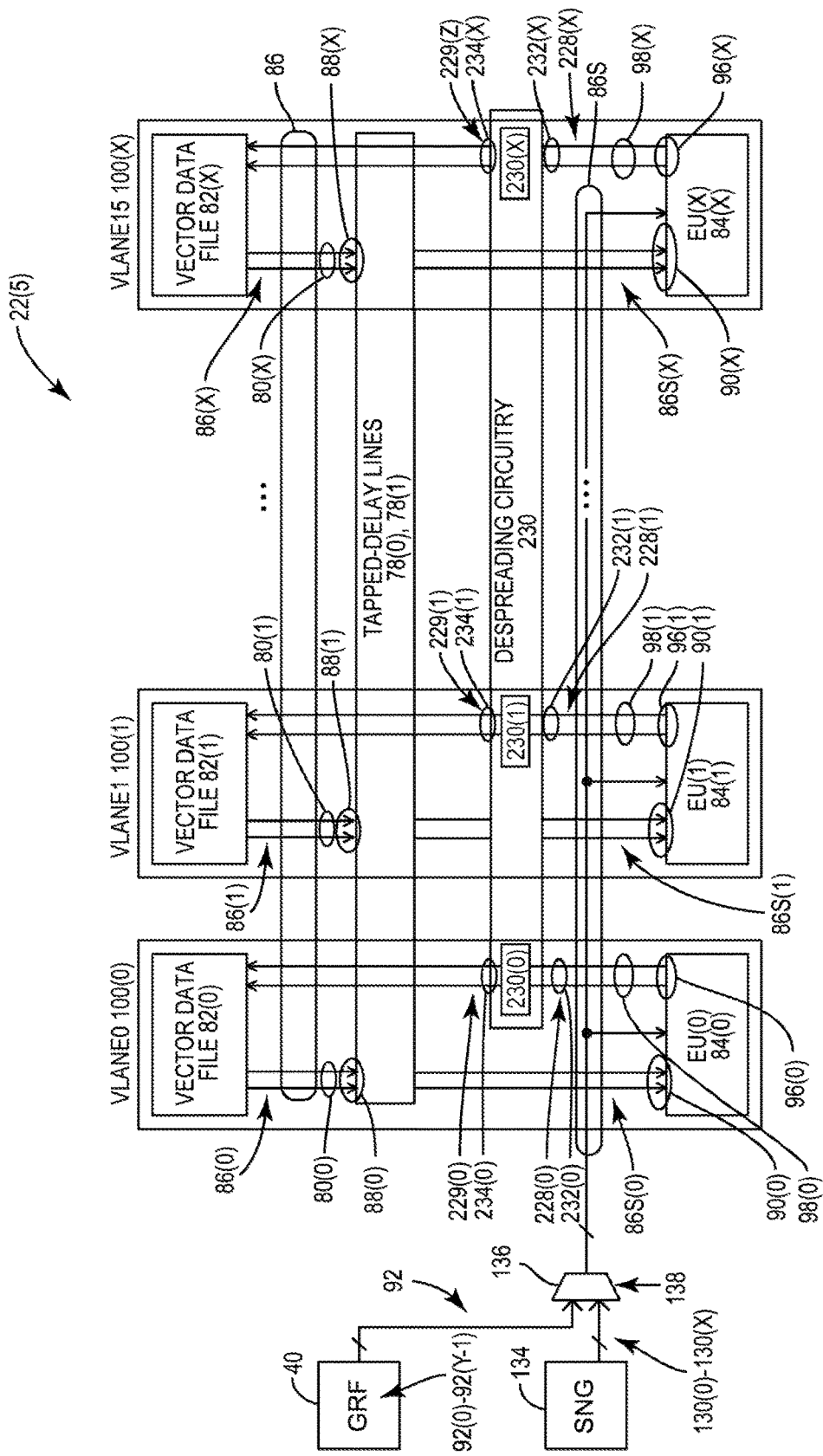
FIG. 27 is a schematic diagram of an exemplary VPE employing despreading circuitry configured to provide despreading of a resultant output vector data sample set in at least one output data flow path between at least one execution unit and at least one vector data file without the resultant output vector data sample set being stored in the at least one vector data file, to provide and store a despread resultant output vector data sample set.

In this regard, FIG. 27 is a schematic diagram of another exemplary VPE 22(5) that can be provided as the VPE 22 in FIG. 2. As will be described in more detail below, the VPE 22(5) in FIG. 27 is configured to provide in-flight despreading of resultant output vector data sample sets 228(0)-228(X) provided by the execution units 84(0)-84(X) with a code sequence for vector processing operations to be stored in the vector data files 82(0)-82(X) in the VPE 22(5) with eliminated or reduced vector data sample re-fetching and reduced power consumption. The resultant output vector data sample sets 228(0)-228(X) are comprised of 'X+1' input resultant output vector data samples 228, which in this example are 228(0), 228(1), . . . , and 228(X). The code sequence could be a spread-spectrum CDMA chip sequence for a CDMA despreading vector processing operation, as a non-limiting example. In the VPE 22(5) in FIG. 27, the resultant output vector data sample set 228(0)-228(X) can be despread with a code sequence before being stored in the vector data files 82(0)-82(X).

As shown in FIG. 27 and discussed in more detail below, despreading circuitry 230 is provided in the output data flow paths 98(0)-98(X) between the execution units 84(0)-84(X) and the vector data files 82(0)-82(X) in each of the vector data lanes 100(0)-100(X). The despreading circuitry 230 is configured based on programming according to a vector instruction to be executed to provide in-flight despreading of the resultant output vector data sample set 228(0)-228(X) with a code sequence provided as reference vector data sample set 130(0)-130(X) generated by sequence number generator 134, as previously described above in FIGS. 11-16 with regard to correlation vector processing operations. A despread resultant output vector data sample set 229(0)-229(Z) is provided by the despreading circuitry 230 in the output data flow paths 98(0)-98(X). The despread resultant output vector data sample set 229(0)-229(Z) is comprised of 'Z+1' despread resultant output vector data samples 229, which in this example are 229(0), 229(1), . . . , and 229(Z). In-flight despreading of the resultant output vector data sample set 228(0)-228(X) in the VPE 22(5) in FIG. 27 means the resultant output vector data sample set 228(0)-228(X) provided by execution units 84(0)-84(X) is despread with a code sequence in the resultant vector data sample set 228(0)-228(X) before being stored in vector data files 82(0)-82(X). In this manner, the resultant output vector data sample set 228(0)-228(X) is stored in vector data files 82(0)-82(X) in despreaded form as despread resultant output vector data sample set 229(0)-229(X).

Thus, with the despreading circuitry 230 provided in the output data flow paths 98(0)-98(X), the resultant output vector data sample set 228(0)-228(X) is not required to first be stored in the vector data files 82(0)-82(X), and then fetched from the vector data files 82(0)-82(X), despread, and restored in despreaded form in the vector data files 82(0)-82(X). The resultant output vector data sample set 228(0)-228(X) is despreaded before being stored in the vector data files 82(0)-82(X). In this manner, the despread resultant output vector data sample set 229(0)-229(Z) is stored in the vector data files 82(0)-82(X) without requiring additional post-processing steps, which may delay subsequent vector processing operations to be performed in the execution units 84(0)-84(X). Thus, the efficiency of the data flow paths in the VPE 22(5) are not limited by the despreading of the resultant output vector data sample set 228(0)-228(X). The subsequent vector processing in the execution units 84(0)-84(X) is only limited by computational resources rather than by data flow limitations when the resultant output vector data sample sets 228(0)-228(X) are stored in despreaded form as despreaded resultant output vector data sample sets 229(0)-229(Z) in the vector data files 82(0)-82(X).

Further, by providing the despreading circuitry 230 in the output data flow paths 98(0)-98(X) between the execution units 84(0)-84(X) and the vector data files 82(0)-82(X), the resultant output vector data sample set 228(0)-228(X) does not have to cross vector data lanes 100 in the input data flow paths 80(0)-80(X) between the vector data files 82(0)-82(X) and the execution units 84(0)-84(X). Providing data flow paths for despreading of input vector data samples 86 in an input vector data sample set 86(0)-86(X) between different vector data lanes 100 would increase routing complexities. As a result, execution units 84(0)-84(X) may be underutilized while despreading operations are being performed in the input data flow paths 80(0)-80(X). Also, as discussed above, despreading of the resultant output vector data sample set 228(0)-228(X) in the input data flow paths 80(0)-80(X) would require the resultant output vector data sample set 228(0)-228(X) to first be stored in the vector data files 82(0)-82(X) in the VPE 22(5) in FIG. 27, thereby increasing power consumption when re-fetched and despread and/or risking underutilization of the execution units 84(0)-84(X) that may be delayed while despreading operations are being performed.

Note that common components are provided in the VPE 22(5) in FIG. 27 that are provided in the VPEs 22(1)-22(4) in FIGS. 4, 11, 19, and 23. Common components are illustrated in the VPE 22(5) in FIG. 27 with common element numbers. The previous description and discussion of these common components above in the VPEs 22(1)-22(4) are also applicable to the VPE 22(5) in FIG. 27, and thus will not be re-described here.

With continuing reference to FIG. 27, more specifically, the despreading circuitry 230 is configured to receive the resultant output vector data sample set 228(0)-228(X) on despreading circuitry inputs 232(0)-232(X) on the output data flow paths 98(0)-98(X). The despreading circuitry 230 is configured to despread the resultant output vector data sample set 228(0)-228(X) to provide the despread resultant output vector data sample set 229(0)-229(Z). As discussed in more detail below, the number of despread resultant output vector data samples 229 is 'Z+1' in the despread resultant output vector data sample set 229(0)-229(Z). The number of despread resultant output vector data samples 229 in the despread resultant output vector data sample set 229(0)-229(Z) is dependent on the spreading factor used to despread the resultant output vector data sample set 228(0)-228(X). The despreading circuitry 230 is configured to provide the despread resultant output vector data sample set 229(0)-229(Z) on despreading circuitry outputs 234(0)-234(X) in the output data flow paths 98(0)-98(X) to be provided to the vector data files 82(0)-82(X) for storage.

A further description of additional details and features of the VPE 22(5) in FIG. 27 for providing the despread resultant output vector data sample set 229(0)-229(Z) to the vector data files 82(0)-82(X) in the output data flow paths 98(0)-98(X) in this embodiment will now be described. In this regard, FIG. 28 is a flowchart illustrating an exemplary despreading of resultant output vector data sample sets 228(0)-228(X) resulting from a despread vector processing operation 236 that can be performed in the VPE 22(5) in FIG. 27 employing the despreading circuitry 230 according to an exemplary vector instruction requiring despreading of the resultant output vector data sample set 228(0)-228(X).

Figure 28:
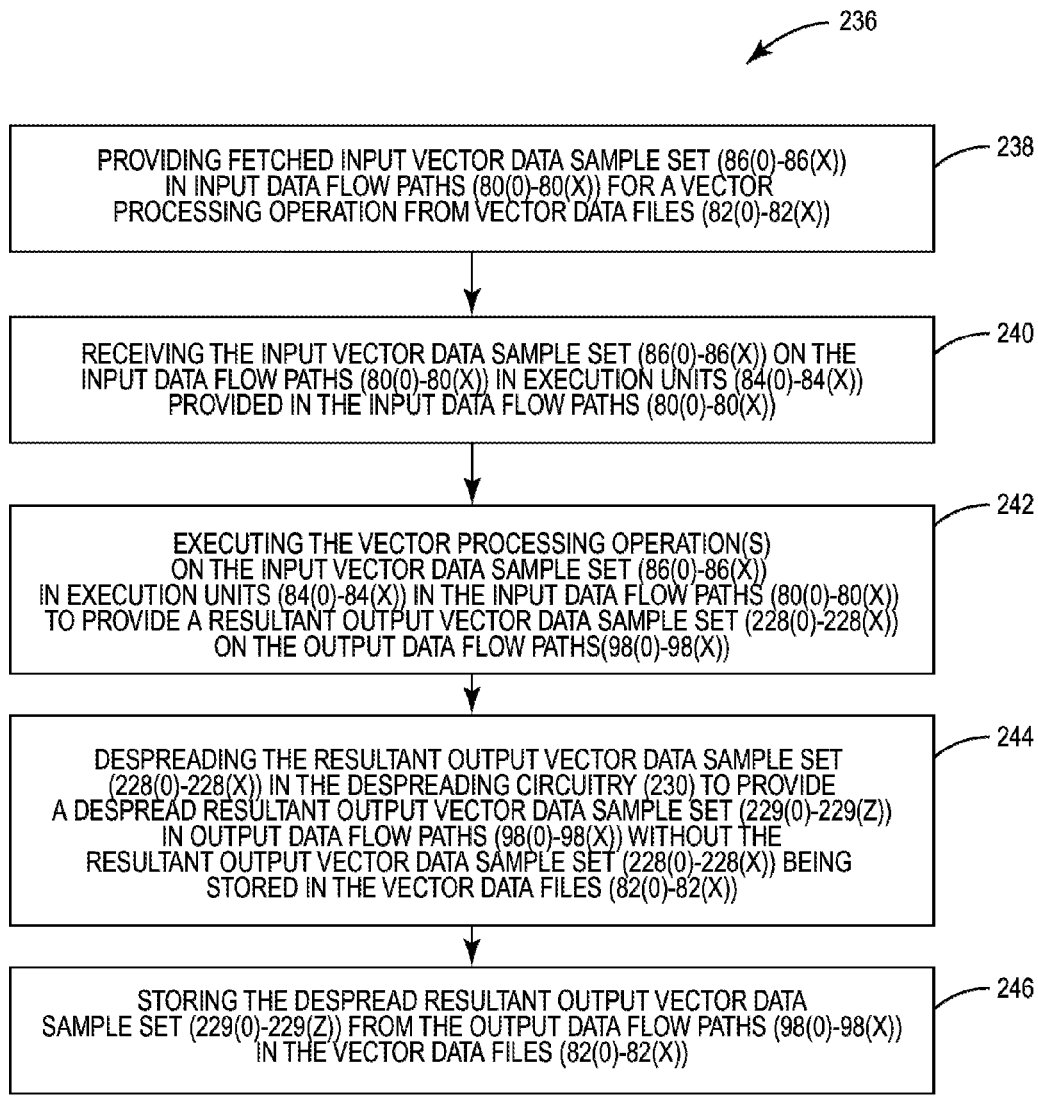
FIG. 28 is a flowchart illustrating exemplary despreading of a resultant output vector data sample set in the at least one output data flow path between the at least one vector data file and the at least one execution unit in the VPE of FIG. 27, to provide and store the despread resultant output vector data sample set in the at least one vector data file.

With reference to FIGS. 27 and 28, the input vector data sample set 86(0)-86(X) to be processed according to the despread vector processing operation 236 according to a vector instruction is fetched from the vector data files 82(0)-82(X) and provided in the input data flow paths 80(0)-80(X) (block 238 in FIG. 28). Either one, some, or all of the vector data lanes 100(0)-100(X) in the VPE 22(5) in FIG. 27 can be employed to provide the despread vector processing operation 236 according to the programming of the vector instruction depending on the width of the resultant output vector data sample set 228(0)-228(X) for the resultant despread vector processing operation 236. If the despread vector processing operation 236 involves performing despreading of all the resultant output vector data samples 228 in the resultant output vector data sample set 228(0)-228(X), all vector data lanes 100(0)-100(X) in the output data flow paths 98(0)-98(X) from the execution units 84(0)-84(X) can be employed for the despread vector processing operation 236. Alternatively, the despread vector processing operation 236 may only involve despreading a subset of resultant output vector data samples 228 in the resultant output vector data sample set 228(0)-228(X), thus only involving the vector data lanes 100 in the output data flow paths 98 corresponding to the subset of resultant output vector data samples 228.

With continuing reference to FIGS. 27 and 28, prior to the despreading vector processing operation performed by the despreading circuitry 230 in the VPE 22(5) in FIG. 27, the fetched input vector data sample set 86(0)-86(X) is received from the input data flow paths 80(0)-80(X) at the execution units 84(0)-84(X) (block 240 in FIG. 28). The execution units 84(0)-84(X) perform one or more vector processing operations on the received input vector data sample set 86(0)-86(X) according to the vector processing operation provided according to a vector instruction (block 242 in FIG. 28). For example, the execution units 84(0)-84(X) provide multiplications and/or accumulations using the input vector data sample set 86(0)-86(X) and the code sequence in the reference vector data sample set 130(0)-130(X) for performing a vector processing operation to provide the resultant output vector data sample set 228(0)-228(X). For example, the resultant output vector data sample set 228(0)-228(X) may be based on vector processing of the input vector data sample set 86(0)-86(X) with the reference vector data sample set 130(0)-130(X) is provided in the output data flow paths 98(0)-98(X) of the VPE 22(5) in FIG. 27.

With continuing reference to FIGS. 27 and 28, if it is desired to despread the resultant output vector data sample set 228(0)-228(X), the despreading vector processing operation 236 can be performed before the resultant output vector data sample set 228(0)-228(X) is stored in the vector data files 82(0)-82(X). In this example, the resultant output vector data sample set 228(0)-228(X) is provided to the despreading circuitry 230 provided in the output data flow paths 98(0)-98(X) provided between the execution units 84(0)-84(X) and the vector data files 82(0)-82(X) in the VPE 22(5) in FIG. 27. The despreading circuitry 230 is programmable to selectively despread resultant output vector data sample set 228(0)-228(X) in the output data flow paths 98(0)-98(X) according to the vector instruction being executed, and if the vector instruction calls for despreading of the resultant output vector data sample set 228(0)-228(X) to be stored in the vector data files 82(0)-82(X). The despreading circuitry 230 despreads the resultant output vector data sample set 228(0)-228(X) according to the despreading programming according to the vector instruction being executed without the resultant output vector data sample set 228(0)-228(X) being stored in the vector data files 82(0)-82(X) (block 244 in FIG. 28).

In this manner, the resultant output vector data sample set 228(0)-228(X) does not have to first be stored in the vector data files 82(0)-82(X), re-fetched, despread in a post-processing operation, and stored in despreaded format in the vector data files 82(0)-82(X) thereby providing delay in the execution units 84(0)-84(X). The resultant output vector data sample set 228(0)-228(X) is stored as the despread resultant output vector data sample set 229(0)-229(Z) in the vector data files 82(0)-82(X) without despreading post-processing required (block 246 in FIG. 28).

Figure 29:
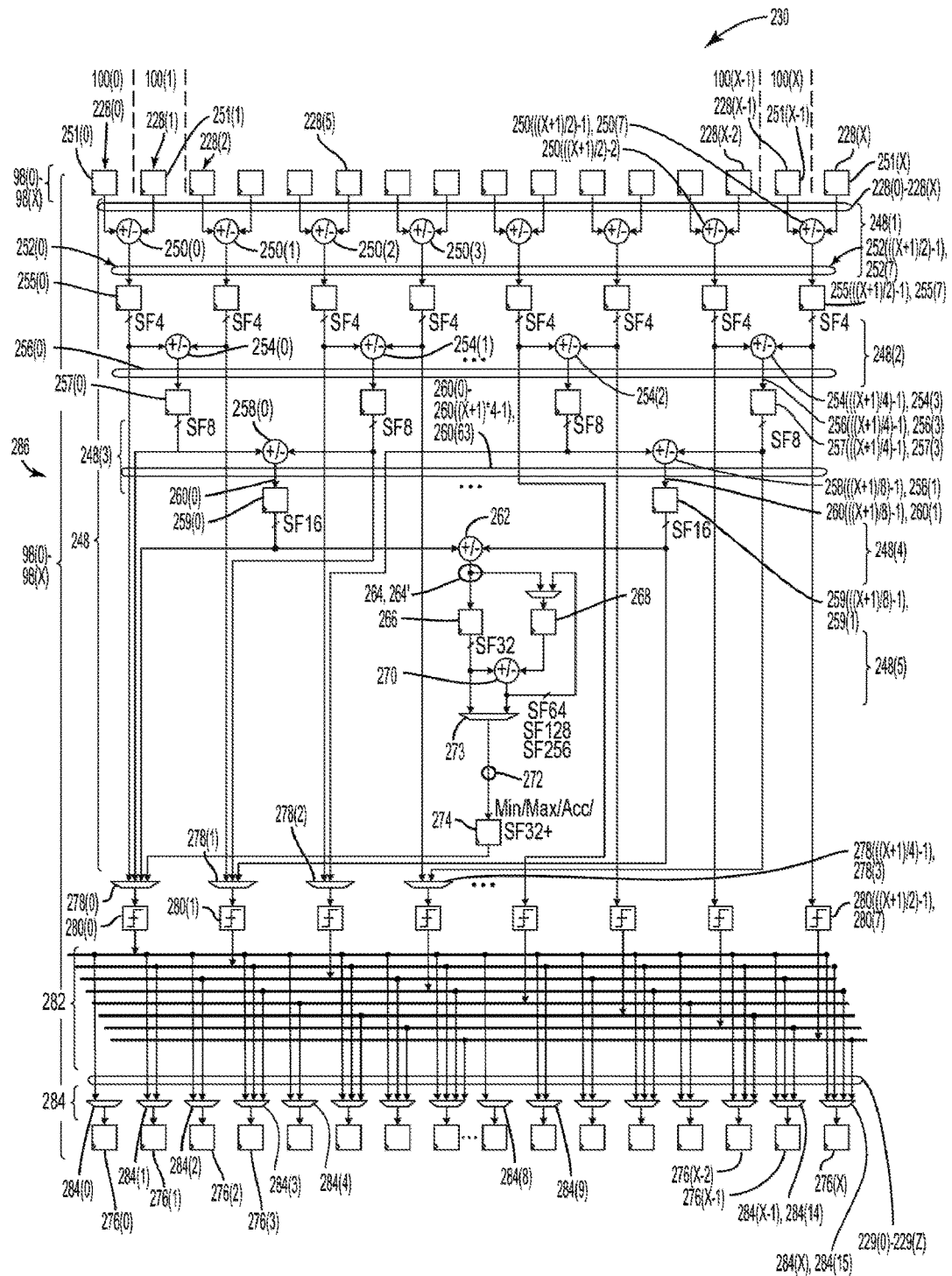
FIG. 29 is a schematic diagram of an exemplary despreading circuitry in output data flow paths between at least one execution unit and at least one vector data file in the VPE of FIG. 27 to provide despreading of resultant output vector data sample sets to provide and store the despread resultant output vector data sample sets in the at least one vector data file.

FIG. 29 is a schematic diagram of an exemplary despreading circuitry 230 that can be provided in the output data flow paths 98(0)-98(X) between the executions units 84(0)-84(X) and the vector data files 82(0)-82(X) in the VPE 22(5) of FIG. 27. The despreading circuitry 230 is configured to provide despreading of the resultant output vector data sample set 228(0)-228(X) to provide the despread resultant output vector data sample set 229(0)-229(Z) for different spreading factors of repeated code sequences in the reference vector data sample set 130(0)-130(X). The resultant output vector data sample set 228(0)-228(X) is provided from the execution unit outputs 96(0)-96(X) to the despreading circuitry 230, as illustrated in FIG. 27. It may be desired to despread the resultant output vector data sample set 228(0)-228(X) with different spreading factors of repeating sequence numbers in the reference vector data sample set 130(0)-130(X) generated by the sequence number generator 134 in FIG. 27, because the spreading factor of the resultant output vector data sample set 228(0)-228(X) may be unknown.

For example, if the resultant output vector data sample set 228(0)-228(X) contained thirty-two samples, and the entire resultant output vector data sample set 228(0)-228(X) was despread assuming a spreading factor of four (4), the despread resultant output vector data sample set 229(0)-229(Z) would contain eight (8) despread samples (i.e., 32 samples/spreading factor of 4) after despreading of the resultant output vector data sample set 228(0)-228(X) is performed. However, in this same example, if the entire resultant output vector data sample set 228(0)-228(X) was despread assuming a spreading factor of eight (8), the despread resultant output vector data sample set 229(0)-229(Z) would contain four (4) despread samples (i.e., 32 samples/spreading factor of 8) after despreading of the resultant output vector data sample set 228(0)-228(X) is performed.

Thus, with continuing reference to FIG. 29, the despreading circuitry 230 is configured to despread the resultant output vector data sample set 228(0)-228(X) for a different number of spreading factors. The despreading circuitry 230 in this embodiment is configured to provide despread resultant output vector data sample set 229(0)-229(Z) for different spreading factors in one vector processing operation/one vector instruction. In this regard, the despreading circuitry 230 contains an adder tree 248 coupled to the execution unit outputs 96(0)-96(X) to receive the resultant output vector data sample set 228(0)-228(X). The adder tree 248 of the despreading circuitry 230 is configured to receive each sample 228 of resultant output vector data sample set 228(0)-228(X) in their respective vector data lanes 100(0)-100(X). A first adder tree level 248(1) is provided in the adder tree 248. The first adder tree level 248(1) is comprised of adders 250(0)-250(((X+1)/2)-1), 250(7) to be able to spread the samples 228 in the resultant output vector data sample set 228(0)-228(X) by a spreading factor of four (4). Latches 251(0)-251(X) are provided in the despreading circuitry 230 to latch the resultant output vector data sample set 228(0)-228(X) from the output data flow paths 98(0)-98(X).

For example, if each sample 228 in the resultant output vector data sample set 228(0)-228(X) is 32 bits wide and comprised of two (2) 16-bit complex vector data (i.e., first vector data according to format I8Q8 and second vector data according to format I8Q8), a spreading factor of four (4) could be applied to despread the four (4) vector data samples in two (2) resultant output vector data samples 228 in the resultant output vector data sample set 228(0)-228(X) into one despread resultant output vector data sample. For example, as illustrated in FIG. 29, adder 250(0) is configured to despread resultant output vector data samples 228(0) and 228(1) by a spreading factor of four (4) for those samples. Likewise, adder 250(1) is configured to despread resultant output vector data samples 228(2) and 228(3) by a spreading factor of four (4) for those samples. Adder 250(((X+1)/2)-1), 250(7) is configured to despread resultant output vector data sample set 228(X-1) and 228(X) to provide a despread vector data sample set 252(0)-252(((X+1)/2)-1), 252(7) with a spreading factor of four (4). A despread vector data sample set 252(0)-252(((X+1)/2)-1), 252(7) from despreading performed by the adders 250(((X+1)/2)-1), 250(7) is latched into latches 255(0)-255(((X+1)/2)-1), 255(7).

If the despread vector processing operation 236 requires a despreading of the resultant output vector data sample set 228(0)-228(X) by a spreading factor of four (4), as will be discussed in more detail below, the despread vector data sample set 252(0)-252(((X+1)/2)-1), 252(7) can be provided as the despread resultant output vector data sample set 229(0)-229(Z), wherein 'Z' is seven (7). However, if the despread vector processing operation 236 calls for a higher spreading factor (e.g., 8, 16, 32, 64, 128, 256), the despread vector data sample set 252(0)-252(((X+1)/2)-1), 252(7) is not provided as despread resultant output vector data sample set 229(0)-229(Z). The despread vector data sample set 252(0)-252(((X+1)/2)-1), 252(7) is provided to a second adder tree level 248(2) to adders 254(0)-254(((X+1)/4)-1), 254(3). In this regard, adder 254(0) is configured to performing despreading on despread vector data samples 252(0) and 252(1) to provide a resultant despread vector data sample 256(0) with a spreading factor of eight (8) for those samples. Likewise, adder 254(1) is configured to perform despreading on despread vector data samples 252(2) and 252(3) to provide a resultant despread vector data sample 256(1) having a spreading factor of eight (8) for those samples. Adder 254(((X+1)/4)-1), 254(3) is configured to perform despreading on despread vector data sample set 252(((X+1)/4)-2), 252(((X+1)/4)-1), 252(3) to provide a resultant despread vector data sample 256(((X+1)/4)-1), 256(3) with a spreading factor of eight (8). The resultant despread vector data sample set 256(0)-256(((X+1)/4)-1), 256(3) from despreading performed by the adders 254(0)-254(((X+1)/4)-1), 254(3) is latched into latches 257(0)-257(((X+1)/4)-1), 257(3).

With continuing reference to FIG. 29, if the despread vector processing operation 236 requires a despreading of the resultant output vector data sample set 228(0)-228(X) by a spreading factor of eight (8), as will be discussed in more detail below, the despread vector data sample set 256(0)-256(((X+1)/4)-1), 256(3) can be provided as the despread resultant output vector data sample set 229(0)-229(Z), wherein 'Z' is three (3). However, if the despread vector processing operation 236 calls for a higher spreading factor than eight (8) (e.g., 16, 32, 64, 128, 256), the despread vector data sample set 256(0)-256(((X+1)/4)-1), 256(3) is not provided as despread resultant output vector data sample set 229(0)-229(Z). The despread vector data sample set 256(0)-256(((X+1)/4)-1), 256(3) is provided to a third adder tree level 248(3) to adders 258(0)-258(((X+1)/8)−1), 258(1). In this regard, adder 258(0) is configured to performing despreading on despread vector data samples 256(0) and 256(1) to provide a spreading factor of sixteen (16) for those samples. Likewise, adder 258(1) is configured to perform despreading on despread vector data samples 256(2) and 256(3) to provide a despread vector data sample set 260(0)-260(((X+1)/8)−1), 260(1) with spreading factor of sixteen (16). The despread vector data sample set 260(0)-260(((X+1)/8)−1), 260(1) from despreading performed by the adders 258(0)-258(((X+1)/8)−1), 258(1) is latched into latches 259(0)-259(((X+1)/8)−1), 259(2).

With continuing reference to FIG. 29, if the despread vector processing operation 236 requires a despreading of the resultant output vector data sample set 228(0)-228(X) by a spreading factor of sixteen (16), as will be discussed in more detail below, the despread vector data sample set 260(0)-260(((X+1)/8)−1), 256(1) can be provided as the despread resultant output vector data sample set 229(0)-229(Z), wherein 'Z' is one (1). However, if the despread vector processing operation 236 calls for a higher spreading factor than sixteen (16) (e.g., 32, 64, 128, 256), the despread vector data sample set 260(0)-260(((X+1)/8)−1), 260(1) is not provided as despread resultant output vector data sample set 229(0)-229(Z). The despread vector data sample set 260(0)-260(((X+1)/8)−1), 260(1) is provided to a fourth adder tree level 248(4) to adder 262. In this regard, the adder 262 is configured to performing despreading on despread vector data samples 260(0) and 260(1) to provide a despread vector data sample 264 with a spreading factor of thirty-two (32). The despread vector data sample 264 from despreading performed by the adder 262 is latched into latches 266 and 268.

With continuing reference to FIG. 29, if the despread vector processing operation 236 requires a despreading of the resultant output vector data sample set 228(0)-228(X) by a spreading factor of thirty-two (32), as will be discussed in more detail below, the despread vector data sample 264 can be provided as a despread resultant output vector data sample 229. However, if the despread vector processing operation 236 calls for a higher spreading factor than thirty-two (32) (e.g., 64, 128, 256), the despread vector data sample 264 is not provided as a despread resultant output vector data sample set 229. The despread vector data sample 264 remains latched into latch 268 without having to be stored in a vector data file 82. Another resultant output vector data sample set 228(0)-228(X) is loaded into latches 251(0)-251(X) over additional processing cycles to be despread using a spreading factor of thirty-two (32), as described above. The resulting despread vector data sample 264' is added by adder 270 in a fifth adder tree 248(5) to the previous despread vector data sample 264 to provide a despread vector data sample 272 having a spreading factor of sixty-four (64). Selector 273 controls whether the despread vector data sample 264 having a spread factor of thirty-two (32) or the despread vector data sample 264' having a spread factor of sixty-four (64) is latched as despread vector data sample 272 is latched into latch 274. This same process of latching additional resultant output vector data sample sets 228(0)-228(X) and despreading of same can be performed to achieve spread factors greater than sixty-four (64), if desired. The despread vector data sample 272 will eventually be latched into latch 274 as the desired despread resultant output vector data sample 229 according to the desired spreading factor for the despread vector processing operation 236.

With continuing reference to FIG. 29, no matter what spreading factor is called for in the despread vector processing operation 236, the despread resultant output vector data sample set 229(0)-229(Z) will need to be stored in the vector data files 82(0)-82(X) in FIG. 27. As will now be discussed, the despreading circuitry 230 in FIG. 29 is also configured to load the despread resultant output vector data samples 229 provided as a result of performing the despreading vector processing operation 236 on resultant output vector data samples 228(0)-228(X) into latches 276(0)-276(X), to form the despread resultant output vector data sample set 229(0)-229(Z). The despread resultant output vector data sample set 229(0)-229(Z) can be provided to the vector data files 82(0)-82(X) to be stored. In this manner, only one (1) write is required to the vector data files 82(0)-82(X) to store the despread resultant output vector data sample set 229(0)-229(Z) created by the despreading circuitry 230. The adder trees 248(1)-248(5) in the despreading circuitry 230 in FIG. 29 can generate despread resultant output vector data samples 229 for all of spreading factors 4, 8, 16, and 32 regardless of what spreading factor is called for in the despread vector processing operation 236. Alternatively, adders in adder trees not necessary to perform the despread vector processing operation 236 according to the desired spreading factor can be disabled or configured to add 0's. However, to determine which of these despread resultant output vector data samples 229 will be provided to the latches 276(0)-276(X) to be stored, selectors 278(0)-278(((X+1)/4)−1), 278(3) are provided, as will now be discussed.

In this regard, with continuing reference to FIG. 29, selector 278(0) can select despread resultant output vector data samples 229 for any of spreading factors 4, 8, and 16 from adders 250(0), 254(0), 258(0), respectively, and spreading factors 32, 64, 128, 256 from adders 262, 270 based on the despread vector processing operation 236 being executed. Selector 278(1) can select despread resultant output vector data samples 229 for spreading factors 4, 8, and 16 from adders 250(1), 254(1), and 258(1) respectively, based on the despread vector processing operation 236 being executed. Selector 278(2) can select despread resultant output vector data samples 229 for spreading factors 4 and 8 from adders 250(2) and 254(2), respectively, based on the despread vector processing operation 236 being executed. Selector 278(3) can select despread resultant output vector data samples 229 for spreading factors 4 and 8 from adders 250(3) and 254(3), respectively, based on the despread vector processing operation 236 being executed. Selector 278(4) can select despread resultant output vector data samples 229 for spreading factors 4 and 8 from adder trees 248(1) and 248(2), respectively, based on the despread vector processing operation 236 being executed. Selectors are not provided to control the despread resultant output vector data samples 229 provided from adders 250(4)-250(7), because providing a spreading factor of eight (8) can be fully satisfied by selectors 278(0)-278(3).

With continuing reference to FIG. 29, a series of data slicers 280(0)-280(((X+1)/2)−1), 280(7) are provided to receive the despread resultant output vector data samples 229 selected by the selectors 278(0)-278(((X+1)/4)−1), 278(3) and adders 250(4)-250(((X+1)/2)−1), 250(7), respectively. Data slicers 280(0)-280(((X+1)/2)−1), 280(7) are configured to select whether its received despread resultant output vector data samples 229 will be characterized as a logical high level (e.g., a logical '1') or a logical low level (e.g., a logical '0'). The despread resultant output vector data samples 229 are then routed through connections to a crossbar 282 to the desired latch 276 among latches 276(0)-

276(X) to be stored. The crossbar 282 provides for the flexibility to provide the despread resultant output vector data samples 229 according to the despread vector processing operation 236 to different latches 276(0)-276(X). In this manner, despread resultant output vector data samples 229 can be stacked in latches 276(0)-276(X) among different iterations of despread vector processing operations 236 before being stored in the vector data files 82(0)-82(X). For example, a despread resultant output vector data sample set 229(0)-229(Z) can be stacked in latches 276(0)-276(X) among different iterations of despread vector processing operations 236 before being stored in the vector data files 82(0)-82(X). In this manner, accesses to the vector data files 82(0)-82(X) to store despread resultant output vector data sample set 229(0)-229(Z) can be minimized for operating efficiency.

For example, as illustrated in FIG. 29, selectors 284(0)-284(X) coupled to crossbar 282 can be controlled to store the despread resultant output vector data sample 229 from data slicer 280(0) in any of latches 276(0)-276(X). Selectors 284(1), 284(3), 284(5), 284(7), 284(9), 284(11), 284(13), 284(15) coupled to crossbar 282 can be controlled to store despread resultant output vector data sample 229 from data slicers 280(1) to be stored in latches 276(1), 276(3), 276(5), 276(7), 276(9), 276(11), 276(13), and 276(15). Selectors 284(2), 284(6), 284(10), 284(14) coupled to crossbar 282 can be controlled to store a despread resultant output vector data sample 229 from data slicer 280(2) in latches 276(2), 276(6), 276(10), and 276(14). Selectors 284(3), 284(7), 284(11), 284(15) coupled to crossbar 282 can be controlled to store a despread resultant output vector data sample 229 from data slicer 280(3) in latches 276(3), 276(7), 276(11), and 276(15). Selectors 284(4) and 284(12) coupled to crossbar 282 can be controlled to store a despread resultant output vector data sample 229 from data slicer 280(4) in latches 276(4) and 276(12). Selectors 284(5) and 284(13) coupled to crossbar 282 can be controlled to store a despread resultant output vector data sample 229 from data slicer 280(5) to be stored in latches 276(5) and 276(13). Selectors 284(6) and 284(14) coupled to crossbar 282 can be controlled to store a despread resultant output vector data sample 229 from data slicer 280(6) in latch 276(6) or 276(14). Selectors 284(7) and 284(15) coupled to crossbar 282 can be controlled to store a despread resultant output vector data sample 229 from data slicer 280(7) in latches 276(7) or 276(15).

With continuing reference to FIG. 29, the despreading circuitry 230 can be programmed to be configured to perform or not perform despreading operations on the resultant output vector data samples 228(0)-228(X) according to the vector instruction to be executed. In this regard, a despread configuration input 286 in FIG. 29 can be provided to the despreading circuitry 230 to perform despread operations on the resultant output vector data samples 228(0)-228(X) or to simply provide the resultant output vector data samples 228(0)-228(X) to the latches 276(0)-276(X), respectively, to be stored in the vector data files 82(0)-82(X). In this manner, the despreading circuitry 230 can be programmed to not despread the resultant output vector data sample sets 228(0)-228(X) if the vector instruction does not provide for such processing to be performed. The despread configuration input 284 can be configured and reconfigured for each vector instruction to provide for flexibility in the vector processing by the VPE 22(5) in FIG. 27. For example, the despread configuration input 284 can be configured and reconfigured for each clock-cycle of a vector instruction, on a clock-cycle-by-clock-cycle basis, if desired, to provide despreading as desired, with full utilization of the execution units 84(0)-84(X), if desired.

Certain other wireless baseband operations require merging of data samples determined from previous processing operations for reasons other than despreading of spread spectrum data sequences. For example, it may be desired to accumulate vector data samples of varying widths that are wider than the data flow paths for the execution units 84(0)-84(X) provided by the vector data lanes 100(0)-100(X). As another example, it may be desired to provide a dot product multiplication of output vector data samples from different execution units 84(0)-84(X) to provide merging of output vector data in vector processing operations. The vector data lanes 100(0)-100(X) in the VPE could include complex routing to provide intravector data paths for crossing over vector data lanes 100(0)-100(X) to provide merged vector processing operations. However, this increases complexity and can reduce efficiency of the VPE, because of parallelization difficulties in the output vector data to be merged crossing over different vector data lanes. Vector processors could include circuitry that performs post-processing merging of output vector data stored in vector data memory from execution units. The post-processed output vector data samples stored in vector data memory are fetched from vector data memory, merged as desired, and stored back in vector data memory. However, this post-processing can delay the subsequent vector processing operations of the VPE, and cause computational components in the execution units to be underutilized.

Figure 30:
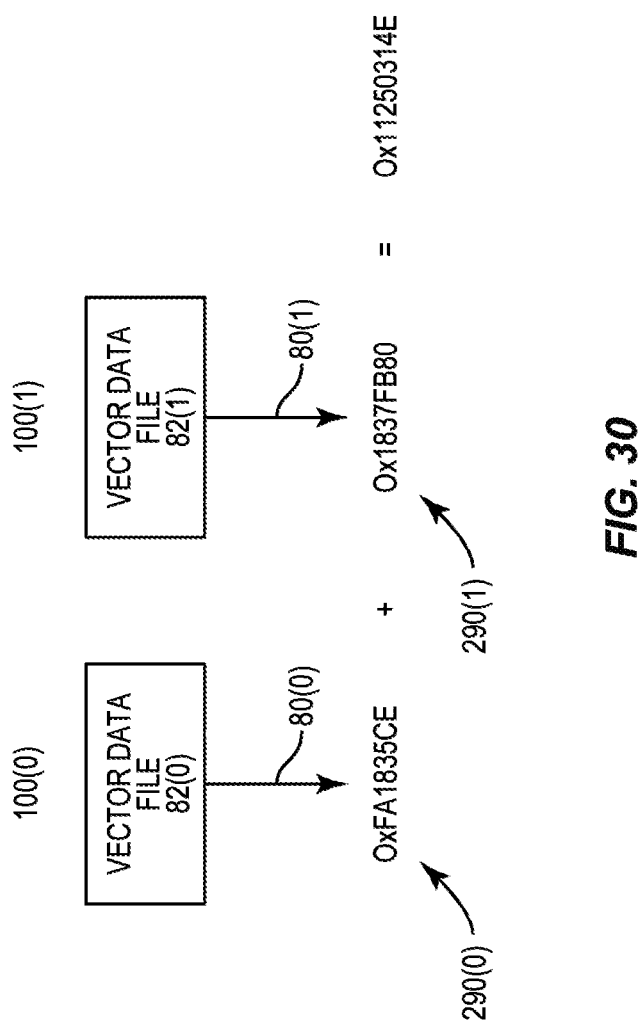
FIG. 30 is a diagram of exemplary vector data samples to be merged, and illustrating the merged resultant vector data samples.

For example, a two input vector data samples 290(0), 290(1) provided in vector data files 82(0), 82(1) in a VPE previously described are shown in FIG. 30. It may be desired to add these two input vector data samples 290(0), 290(1) together. In this example, the sum of the two input vector data samples 290(0), 290(1) is '0x11250314E,' which has a data width larger than either vector data lane 100(0) or 100(1). Data flow paths could be provided in the VPE 22 to provide vector data routing between vector data lanes 100(0), 100(1) to allow execution units 84(0), 84(1) to perform the execution of the sum of the two input vector data samples 290(0), 290(1) together, including providing carry logic between the two execution units 84(0), 84(1) across the vector data lanes 100(0), 100(1). The ability to cross all vector data lanes 100(0)-100(X) may be required to provide a scalar result of merged vector data samples, which may further increase complexity in data flow paths. However, as discussed above, this would add complexity in data flow paths thereby increasing complexity, and possibly reducing efficiency.

To address this issue, the embodiments disclosed below include VPEs that include merging circuitry provided in output data flow paths between execution units and vector data memory in a VPE. The merging circuitry is configured to merge output vector data samples from an output vector data sample set provided by the execution units in-flight while the output vector data sample set is being provided over the output data flow paths from the execution units to the vector data memory. In-flight merging of output vector data samples means the output vector data samples provided by execution units can be merged before being stored in vector data memory, so that the resulting output vector data sample set is stored in vector data memory in a merged format. The merged output vector data samples can be stored in vector data files without requiring additional post-processing steps, which may delay subsequent vector processing operations to be performed in the execution units. Thus, the efficiency of the data flow paths in the VPE is not limited by vector data merging operations. The subsequent vector processing in the execution units is only limited by computational resources rather than by data flow limitations when merged vector data samples are stored in vector data memory.

Figure 31:
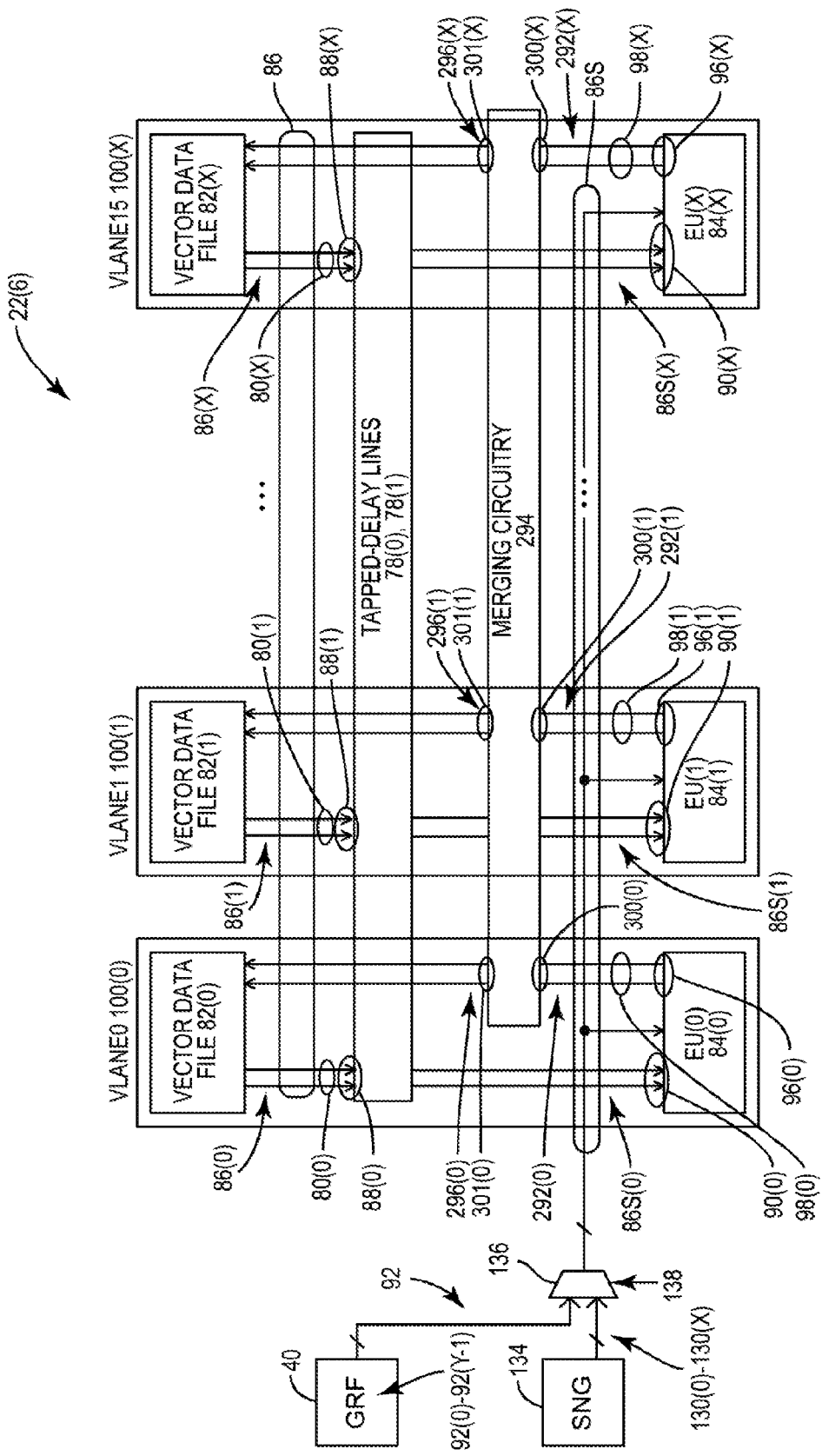
FIG. 31 is a schematic diagram of an exemplary VPE employing merge circuitry configured to provide merging of a resultant output vector data sample set in at least one output data flow path between at least one execution unit and at least one vector data file without the resultant output vector data sample set being stored in the at least one vector data file, to provide and store a merged resultant output vector data sample set.

In this regard, FIG. 31 is a schematic diagram of another exemplary VPE 22(6) that can be provided as the VPE 22 in FIG. 2. As will be described in more detail below, the VPE 22(6) in FIG. 31 is configured to provide in-flight merging of resultant output vector data sample sets 292(0)-292(X) provided by the execution units 84(0)-84(X) with a code sequence for vector processing operations to be stored in the vector data files 82(0)-82(X) in the VPE 22(6) with eliminated or reduced vector data sample re-fetching and reduced power consumption. The resultant output vector data sample set 292(0)-292(X) is comprised of resultant output vector data samples 292(0), . . . , 292(X). As non-limiting examples, a merge vector processing operation could include adding resultant output vector data samples 292, determining a maximum vector data sample value among a plurality of resultant output vector data samples 292, or determining a minimum vector data sample value among a plurality of output vector data samples 292. In the VPE 22(6) in FIG. 31, the resultant output vector data samples 292 among the resultant output vector data set 292(0)-292(X) can be merged before being stored in the vector data files 82(0)-82(X).

The merging circuitry 294 is configured based on programming according to a vector instruction to be executed to provide in-flight merging of the resultant output vector data samples 228 among the resultant output vector data sample set 228(0)-228(X). Merged resultant output vector data samples 296(0)-296(Z) are provided by the merging circuitry 294 in the output data flow paths 98(0)-98(X). 'Z' in the merged resultant output vector data samples 296(0)-296(Z) represents the number of merged resultant output vector data samples 296 in the merged resultant output vector data sample sets 296(0)-296(Z). The merged resultant output vector data sample set 296(0)-296(Z) is comprised of resultant output vector data samples 296, which are 296(0), . . . , and 296(Z) in this example. The number of merged resultant output vector data samples 296 in the merged resultant output vector data sample set 296(0)-296(Z) is dependent on the merging operations performed on the resultant output vector data sample set 292(0)-292(X). In-flight merging of the resultant output vector data samples 292 in the VPE 22(6) in FIG. 31 means that resultant output vector data samples 292 in the resultant output vector data sample set 292(0)-292 (X) provided by execution units 84(0)-84(X) can be merged together before being stored in vector data files 82(0)-82(X). In this manner, the merged resultant output vector data samples 296 of the merged resultant output vector data sample set 296(0)-296(Z) can be stored in vector data files 82(0)-82(X) in merged form as merged resultant output vector data sample set 296(0)-296(Z).

Thus, with the merging circuitry 294 provided in the output data flow paths 98(0)-98(X), the resultant output vector data sample set 292(0)-292(X) is not required to first be stored in the vector data files 82(0)-82(X), and then fetched from the vector data files 82(0)-82(X). Desired resultant output vector data samples 292 are merged, and the resultant output vector data samples 292 are restored in merged form in the vector data files 82(0)-82(X). Resultant output vector data samples 292 from the resultant output vector data sample set 292(0)-292(X) can be merged before being stored in the vector data files 82(0)-82(X). In this manner, merged resultant output vector data samples 296 from the merged resultant output vector data sample set 296(0)-296(Z) are stored in the vector data files 82(0)-82(X) without requiring additional post-processing steps, which may delay subsequent vector processing operations to be performed in the execution units 84(0)-84(X). Thus, the efficiency of the data flow paths in the VPE 22(6) are not limited by the merging of the resultant output vector data samples 292. The subsequent vector processing in the execution units 84(0)-84(X) is only limited by computational resources rather than by data flow limitations when the resultant output vector data samples 292 are stored in merged form in the vector data files 82(0)-82(X).

Further, by providing the merging circuitry 294 in the output data flow paths 98(0)-98(X) between the execution units 84(0)-84(X) and the vector data files 82(0)-82(X), the resultant output vector data sample set 292(0)-292(X) does not have to cross vector data lanes 100 in the input data flow paths 80(0)-80(X) between the vector data files 82(0)-82(X) and the execution units 84(0)-84(X). Providing data flow paths for merging of input vector data samples 86 in an input vector data sample set 86(0)-86(X) between different vector data lanes 100 would increase routing complexities. As a result, execution units 84(0)-84(X) may be underutilized while merging operations are being performed in the input data flow paths 80(0)-80(X). Also, as discussed above, merging of resultant output vector data samples 292 from the resultant output vector data sample set 292(0)-292(X) in the input data flow paths 80(0)-80(X) would require the resultant output vector data sample set 292(0)-292(X) to first be stored in the vector data files 82(0)-82(X) in the VPE 22(6) in FIG. 31, thereby increasing power consumption when re-fetched and merged and/or risking underutilization of the execution units 84(0)-84(X) that may be delayed while merging operations are being performed.

Note that common components are provided in the VPE 22(6) in FIG. 31 that are provided in the VPEs 22(1)-22(5) in FIGS. 4, 11, 19, 23, and 27. Common components are illustrated in the VPE 22(6) in FIG. 31 with common element numbers. The previous description and discussion of these common components above in the VPEs 22(1)-22 (5) are also applicable to the VPE 22(6) in FIG. 31, and thus will not be re-described here.

With continuing reference to FIG. 31, more specifically, the merging circuitry 294 is configured to receive the resultant output vector data sample set 292(0)-292(X) on merging circuitry inputs 300(0)-300(X) on the output data flow paths 98(0)-98(X). The merging circuitry 294 is configured to merge desired resultant output vector data samples 292 from the resultant output vector data sample set 292 (0)-292(X) to provide the merged resultant output vector data sample set 296(0)-296(Z). 'Z' in the merged resultant output vector data sample set 296(0)-296(Z), represents the bit width of the merged resultant output vector data sample set 296(0)-296(Z). 'Z' may be less than the bit width of resultant output vector data sample set 292(0)-292(X), represented by 'X,' due to merging operations. As discussed in more detail below, the number of merged resultant output vector data samples 296 'Z+1' in the merged resultant output vector data sample set 296(0)-296(Z) is dependent on the resultant output vector data samples 292 from the resultant output vector data sample set 292(0)-292(X) to be merged together. The merging circuitry 294 is configured to provide the merged resultant output vector data sample set 296(0)-296(Z) on merging circuitry outputs 301(0)-301(X) in the output data flow paths 98(0)-98(X) to be provided to the vector data files 82(0)-82(X) for storage.

A further description of additional details and features of the VPE 22(6) in FIG. 31 for providing the merged resultant output vector data sample set 296(0)-296(X) to the vector data files 82(0)-82(X) in the output data flow paths 98(0)-98(X) in this embodiment will now be described. In this regard, FIG. 32 is a flowchart illustrating an exemplary merging of resultant output vector data samples 292 of the resultant output vector data sample sets 292(0)-292(X) resulting from a vector processing operation 302 that can be performed in the VPE 22(6) in FIG. 31 employing the merging circuitry 294 according to an exemplary vector instruction requiring merging of the resultant output vector data samples 292.

Figure 32:
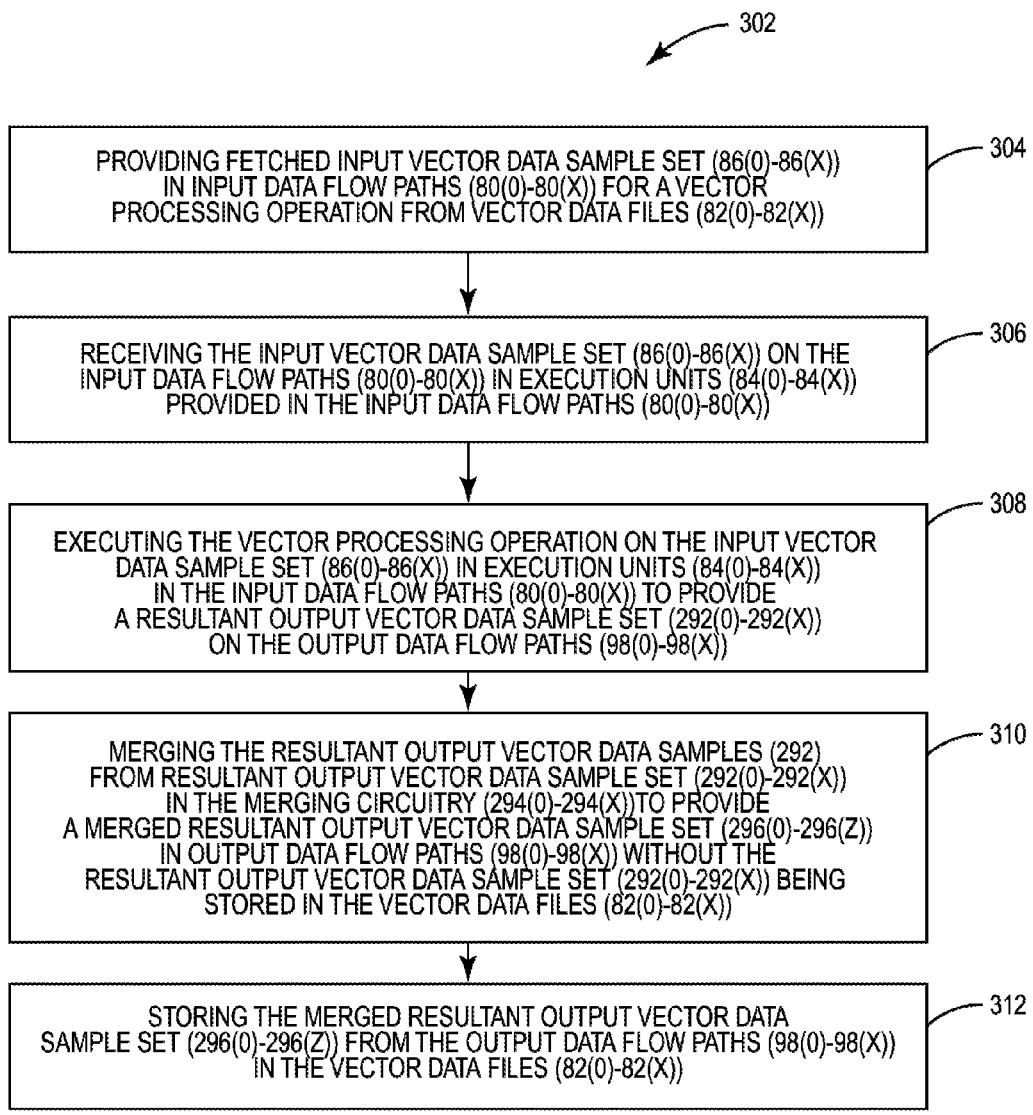
FIG. 32 is a flowchart illustrating exemplary add-merging of a resultant output vector data sample set in the at least one output data flow path between the vector data file and the at least one execution unit in the VPE of FIG. 31, to provide and store the add-merged resultant output vector data sample set in the vector data file.

With reference to FIGS. 31 and 32, the input vector data sample set 86(0)-86(X) to be processed according to a vector processing operation 302 according to a vector instruction is fetched from the vector data files 82(0)-82(X) and provided in the input data flow paths 80(0)-80(X) (block 304 in FIG. 32). Either one, some, or all of the vector data lanes 100(0)-100(X) in the VPE 22(6) in FIG. 31 can be employed to provide the vector processing operation 302 according to the programming of the vector instruction depending on the width of the input vector data sample set 86(0)-86(X) for the vector processing operation 302. If the entire width of the vector data files 82(0)-82(X) is required, all vector data lanes 100(0)-100(X) can be employed for the vector processing operation 302. The vector processing operation 302 may only require a subset of the vector data lanes 100(0)-100(X). This may be because the width of the input vector data sample set 86(0)-86(X) is less than the width of all vector data files 82(0)-82(X), where it is desired to employ the additional vector data lanes 100 for other vector processing operations to be performed in parallel to the vector processing operation 302.

With continuing reference to FIGS. 31 and 32, the fetched input vector data sample set 86(0)-86(X) is received from the input data flow paths 80(0)-80(X) at the execution units 84(0)-84(X) (block 306 in FIG. 32). The execution units 84(0)-84(X) perform the vector processing operation 302 on the received input vector data sample set 86(0)-86(X) according to the vector processing operation 302 provided according to a vector instruction (block 308 in FIG. 32). The execution units 84(0)-84(X) can provide multiplications and/or accumulation using the input vector data sample set 86(0)-86(X) for the vector processing operation 302 to provide the resultant output vector data sample set 292(0)-292(X). Once the vector processing operation 302 has been completed, a resultant output vector data sample set 292(0)-292(X) based on the vector processing operation 302 carried out on the input vector data sample set 86(0)-86(X) is provided in the output data flow paths 98(0)-98(X) of the VPE 22(6) in FIG. 31.

With continuing reference to FIGS. 31 and 32, before the resultant output vector data sample set 292(0)-292(X) is stored in the vector data files 82(0)-82(X), the resultant output vector data sample set 292(0)-292(X) is provided to the merging circuitry 294 provided in the output data flow paths 98(0)-98(X) provided between the execution units 84(0)-84(X) and the vector data files 82(0)-82(X). The merging circuitry 294 is programmable to be included in the output data flow paths 98(0)-98(X) according to the vector instruction being executed, and if the vector instruction calls for merging of the resultant output vector data samples 292 from the resultant output vector data sample set 292(0)-292(X) to be stored in the vector data files 82(0)-82(X), as discussed below in more detail. The merging circuitry 294 merges the resultant output vector data samples 292 from the resultant output vector data sample set 292(0)-292(X) according to the vector instruction being executed without the resultant output vector data sample set 292(0)-292(X) being stored in the vector data files 82(0)-82(X) (block 310 in FIG. 32). In this manner, the resultant output vector data sample set 292(0)-292(X) does not have to first be stored in the vector data files 82(0)-82(X), re-fetched, merged in a post-processing operation, and stored in merged format in the vector data files 82(0)-82(X), thereby providing delay in the execution units 84(0)-84(X). The resultant output vector data sample set 292(0)-292(X) is stored as the merged resultant output vector data sample set 296(0)-296(Z) in the vector data files 82(0)-82(X) without merge post-processing required (block 312 in FIG. 32).

Figure 33:
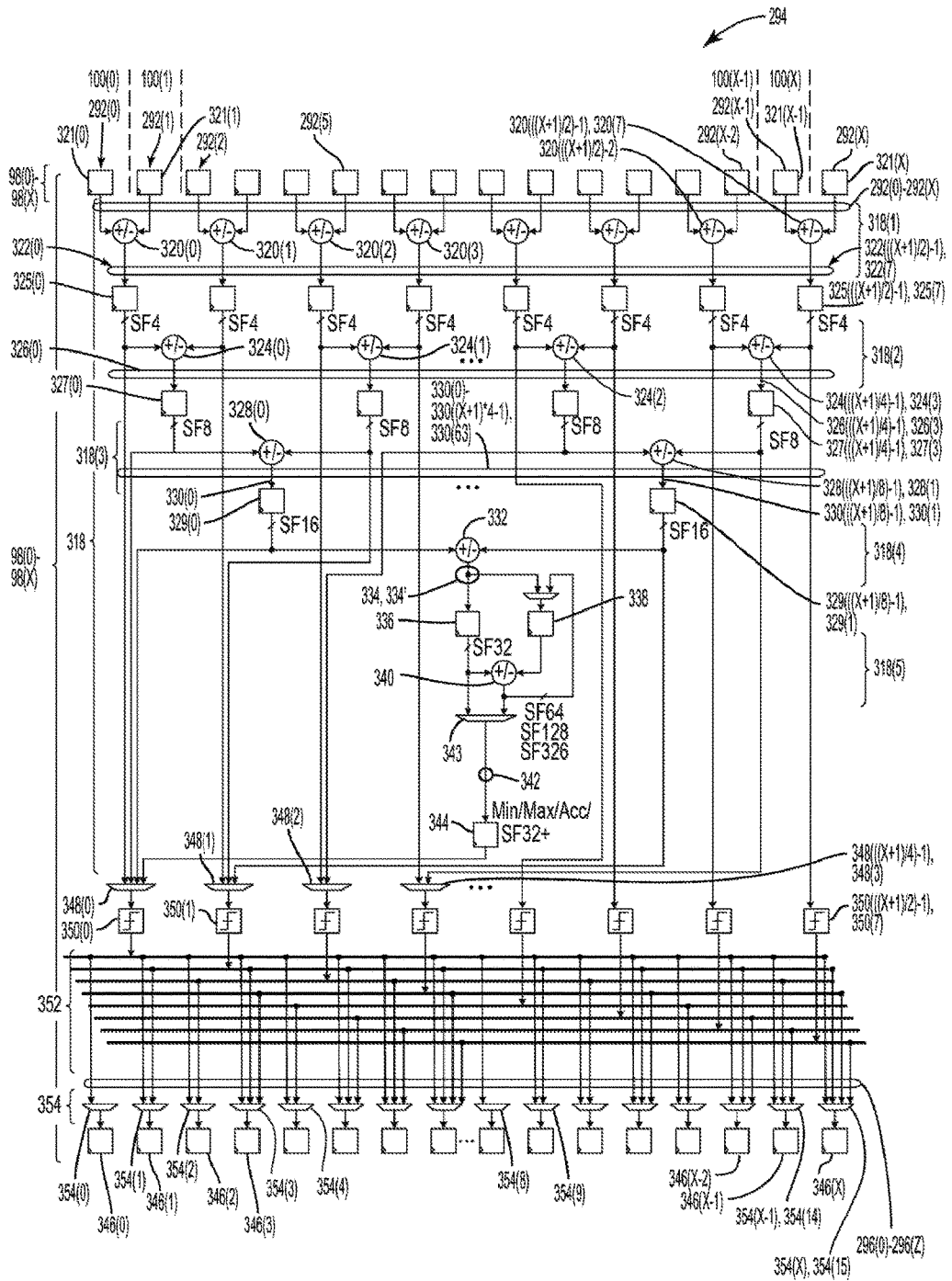
FIG. 33 is a schematic diagram of an exemplary merge circuitry in output data flow paths between executions units and a vector data file in the VPE of FIG. 31 to provide add-merging of resultant output vector data sample sets and storing of the add-merged resultant output vector data sample set in the vector data file.

FIG. 33 is a schematic diagram of an exemplary merging circuitry 294 that can be provided in the output data flow paths 98(0)-98(X) between the execution units 84(0)-84(X) and the vector data files 82(0)-82(X) in the VPE 22(6) of FIG. 31. The merging circuitry 294 is configured to provide merging of the resultant output vector data sample set 292(0)-292(X) to provide the merged resultant output vector data sample set 296(0)-296(Z). The resultant output vector data sample set 292(0)-292(X) is provided from the execution unit outputs 96(0)-96(X) to the merging circuitry 294, as illustrated in FIG. 31.

With continuing reference to FIG. 33, the merging circuitry 294 is configured to merge the resultant output vector data sample set 292(0)-292(X). The merging circuitry 294 in this embodiment is configured to provide a merged resultant output vector data sample set 296(0)-296(Z). In this regard, the merging circuitry 294 contains an adder tree 318 coupled to the execution unit outputs 96(0)-96(X) to receive the resultant output vector data sample set 292(0)-292(X). The adder tree 318 of the merging circuitry 294 is configured to receive each sample 292 of resultant output vector data sample set 292(0)-292(X) in their respective vector data lanes 100(0)-100(X). A first adder tree level 318(1) is provided in the adder tree 318. The first adder tree level 318(1) is comprised of merge circuits 320(0)-320(((X+1)/2)−1), 320(7) to be able to merge adjacent samples 292 in the resultant output vector data sample set 292(0)-292(X). Latches 321(0)-321(X) are provided in the merging circuitry 294 to latch the resultant output vector data sample set 292(0)-292(X) from the output data flow paths 98(0)-98(X).

For example, if each sample 292 in the resultant output vector data sample set 292(0)-292(X) is 32 bits wide and comprised of two (2) 16-bit complex vector data (i.e., first vector data according to format I8Q8 and second vector data according to format I8Q8), a merging operation could be applied to merge the four (4) vector data samples in two (2) resultant output vector data samples 292 in the resultant output vector data sample set 292(0)-292(X) into one merged resultant output vector data sample 296. For example, as illustrated in FIG. 33, adder 320(0) is configured to merge resultant output vector data samples 292(0) and 292(1). Likewise, adder 320(1) is configured to merge resultant output vector data samples 292(2) and 292(3) for those samples. Adder 320(((X+1)/2)−1), 320(7) is configured to merge resultant output vector data sample set 292(X−1) and 292(X) to provide a merge vector data sample set 322(0)-322(((X+1)/2)−1), 322(7). A merge vector data sample set 322(0)-322(((X+1)/2)−1), 322(7) from merging performed by the adders 320(((X+1)/2)−1), 320(7) is latched into latches 325(0)-325(((X+1)/2)−1), 325(7).

If the merge vector processing operation 302 requires a merging of the resultant output vector data sample set 292(0)-292(X), as will be discussed in more detail below, the merge vector data sample set 322(0)-322(((X+1)/2)−1), 322 (7) can be provided as the merge resultant output vector data sample set 296(0)-296(Z), wherein 'Z' is seven (7). However, if the merge vector processing operation 302 calls for a merging of non-adjacent resultant output vector data samples 292 in resultant output vector data sample set 292(0)-292(X), the merge vector data sample set 322(0)-322(((X+1)/2)−1), 322(7) is not provided as merge resultant output vector data sample set 296(0)-296(Z). The merge vector data sample set 322(0)-322(((X+1)/2)−1), 322(7) is provided to a second adder tree level 318(2) to adders 324(0)-324(((X+1)/4)−1), 324(3). In this regard, adder 324(0) is configured to perform merging on merge vector data samples 322(0) and 322(1) to provide a resultant merge vector data sample 326(0). Likewise, adder 324(1) is configured to perform merging on merge vector data samples 322(2) and 322(3) to provide a resultant merge vector data sample 326(1). Adder 324(((X+1)/4)−1), 324(3) is configured to perform merging on merge vector data sample 322(((X+1)/4)−2), 322(((X+1)/4)−1), 322(3) to provide a resultant merge vector data sample 326(((X+1)/4)−1), 326 (3). The resultant merge vector data sample set 326(0)-326 (((X+1)/4)−1), 326(3) from merging performed by the adders 324(0)-324(((X+1)/4)−1), 324(3) is latched into latches 327(0)-327(((X+1)/4)−1), 327(3).

With continuing reference to FIG. 33, if the merge vector processing operation 302 requires a merging of the resultant output vector data sample set 292(0)-292(X) by a merge factor of eight (8), as will be discussed in more detail below, the merge vector data sample set 326(0)-326(((X+1)/4)−1), 326(3) can be provided as the merge resultant output vector data sample set 296(0)-296(Z), wherein 'Z' is three (3). However, if the merge vector processing operation 302 calls for a higher merge factor than eight (8) (e.g., 16, 32, 64, 128, 256), the merge vector data sample set 326(0)-326(((X+1)/4)−1), 326(3) is not provided as merge resultant output vector data sample set 296(0)-296(Z). The merge vector data sample set 326(0)-326(((X+1)/4)−1), 326(3) is provided to a third adder tree level 318(3) to adders 328(0)-328(((X+1)/8)−1), 328(1). In this regard, adder 328(0) is configured to performing merging on merge vector data samples 326(0) and 326(1) to provide a merge factor of sixteen (16) for those samples. Likewise, adder 328(1) is configured to perform merging on merge vector data samples 326(2) and 326(3) to provide a merge vector data sample set 330(0)-330(((X+1)/8)−1), 330(1) with merge factor of sixteen (16). The merge vector data sample set 330(0)-330(((X+1)/8)−1), 330(1) from merging performed by the adders 328(0)-328(((X+1)/8)−1), 328(1) is latched into latches 329(0)-329(((X+1)/8)−1), 329(1).

With continuing reference to FIG. 33, if the merge vector processing operation 302 requires a merging of the resultant output vector data sample set 292(0)-292(X) by a merge factor of sixteen (16), as will be discussed in more detail below, the merge vector data sample set 330(0)-330(((X+1)/8)−1), 330(1) can be provided as the merge resultant output vector data sample set 296(0)-296(Z), wherein 'Z' is one (1). However, if the merge vector processing operation 236 calls for a higher merge factor than sixteen (16) (e.g., 32, 64, 128, 256), the merge vector data sample set 330(0)-330 (((X+1)/8)−1), 330(1) is not provided as merge resultant output vector data sample set 296(0)-296(Z). The merge vector data sample set 330(0)-330(((X+1)/8)−1), 330(1) is provided to a fourth adder tree level 318(4) to adder 332. In this regard, the adder 332 is configured to perform merging on merge vector data samples 330(0) and 330(1) to provide a merge vector data sample 334 with a merge factor of thirty-two (32). The merge vector data sample 334 from merging performed by the adder 332 is latched into latches 336 and 338.

With continuing reference to FIG. 33, if the merge vector processing operation 302 requires a merging of the resultant output vector data sample set 292(0)-292(X) by a merge factor of thirty-two (32), as will be discussed in more detail below, the merge vector data sample 334 can be provided as a merge resultant output vector data sample 296. However, if the merge vector processing operation 302 calls for a higher merge factor than thirty-two (32) (e.g., 64, 128, 256), the merge vector data sample 334 is not provided as a merge resultant output vector data sample set 296. The merge vector data sample 334 remains latched into latch 338 without having to be stored in a vector data file 82. Another resultant output vector data sample set 292(0)-292(X) is loaded into latches 321(0)-321(X) over additional processing cycles to be merged using a merge factor of thirty-two (32), as described above. The resulting merge vector data sample 334' is added by adder 340 in a fifth adder tree 318(5) to the previous merge vector data sample 334 to provide a merge vector data sample 342 having a merge factor of sixty-four (64). Selector 343 controls whether the merge vector data sample 334 having a merge factor of thirty-two (32) or the merge vector data sample 334' having a merge factor of sixty-four (64) is latched as merge vector data sample 342 is latched into latch 344. This same process of latching additional resultant output vector data sample sets 292(0)-292(X) and merging of same can be performed to achieve merge factors greater than sixty-four (64), if desired. The merge vector data sample 342 will eventually be latched into latch 344 as the desired merge resultant output vector data sample 296 according to the desired merge factor for the merge vector processing operation 302.

With continuing reference to FIG. 33, no matter what merge vector processing operation is called for in the merge vector processing operation 302, the merge resultant output vector data sample set 296(0)-296(Z) will need to be stored in the vector data files 82(0)-82(X). As will now be discussed, the merging circuitry 294 in FIG. 33 is also configured to load the merge resultant output vector data samples 296 provided as a result of performing the merging vector processing operation 302 on resultant output vector data samples 292(0)-292(X) into latches 346(0)-346(X), to form the merge resultant output vector data sample set 296(0)-296(Z). The merge resultant output vector data sample set 296(0)-296(Z) can be provided to the vector data files 82(0)-82(X) to be stored. In this manner, only one (1) write is required to the vector data files 82(0)-82(X) to store the merge resultant output vector data sample set 296(0)-296(Z) created by the merging circuitry 294. The adder trees 318 (1)-318(5) in the merging circuitry 294 in FIG. 33 can generate merge resultant output vector data samples 296 for all of merge factors 4, 8, 16, and 32 regardless of what merge factor is called for in the merge vector processing operation 302. Alternatively, adders in adder trees not necessary to perform the merge vector processing operation 302 according to the desired merge factor can be disabled or configured to add 0's. However, to determine which of these merge resultant output vector data samples 296 will be provided to the latches 346(0)-346(X) to be stored, selectors 348(0)-348 (((X+1)/4)−1), 348(3) are provided, as will now be discussed.

In this regard, with continuing reference to FIG. 33, selector 348(0) can select merge resultant output vector data samples 296 for any of merge factors 4, 8, and 16 from adders 320(0), 324(0), 328(0), respectively, and merge factors 32, 64, 128, 256 from adders 332, 340 based on the merge vector processing operation 302 being executed. Selector 348(1) can select merge resultant output vector data samples 296 for merge factors 4, 8, and 16 from adders 320(1), 324(1), and 328(1) respectively, based on the merge vector processing operation 302 being executed. Selector 348(2) can select merge resultant output vector data samples 296 for merge factors 4 and 8 from adders 320(2) and 324(2), respectively, based on the merge vector processing operation 302 being executed. Selector 348(3) can select merge resultant output vector data samples 296 for merge factors 4 and 8 from adders 320(3) and 324(3), respectively, based on the merge vector processing operation 302 being executed. Selectors are not provided to control the merge resultant output vector data samples 296 provided from adders 320(4)-320(7), because providing a merge factor of eight (8) can be fully satisfied by selectors 348(0)-348(3).

With continuing reference to FIG. 33, the data slicers 350(0)-350(((X+1)/2)−1), 350(7) provided for merge vector processing operations could be bypassed or configured to not perform data splicing on the received merge resultant output vector data samples 296 selected by the selectors 348(0)-348(((X+1)/4)−1), 348(3) and adders 320(4)-320 (((X+1)/2)−1), 320(7), respectively. The merge resultant output vector data samples 296 are then routed through connections to a crossbar 352 to the desired latch 346 among latches 346(0)-346(X) to be stored. The crossbar 352 provides for the flexibility to provide the merge resultant output vector data samples 296 according to the merge vector processing operation 302 to different latches 346(0)-346(X). In this manner, merge resultant output vector data samples 296 can be stacked in latches 346(0)-346(X) among different iterations of merge vector processing operations 302 before being stored in the vector data files 82(0)-82(X). For example, a merge resultant output vector data sample set 296(0)-296(Z) can be stacked in latches 346(0)-346(X) among different iterations of merge vector processing operations 302 before being stored in the vector data files 82(0)-82(X). In this manner, accesses to the vector data files 82(0)-82(X) to store merge resultant output vector data sample set 296(0)-296(Z) can be minimized for operating efficiency.

For example, as illustrated in FIG. 33, selectors 354(0)-354(X) coupled to crossbar 352 can be controlled to store the merge resultant output vector data sample 296 from selector 348(0) in any of latches 346(0)-346(X). Selectors 354(1), 354(3), 354(5), 354(7), 354(9), 354(11), 354(13), 354(15) coupled to crossbar 352 can be controlled to store merge resultant output vector data sample 296 from selector 348(1) to be stored in latches 346(1), 346(3), 346(5), 346(7), 346(9), 346(11), 346(13), and 346(15). Selectors 354(2), 354(6), 354(10), 354(14) coupled to crossbar 352 can be controlled to store a merge resultant output vector data sample 296 from selector 348(2) in latches 346(2), 346(6), 346(10), and 346(14). Selectors 354(3), 354(7), 354(11), 354(15) coupled to crossbar 352 can be controlled to store a merge resultant output vector data sample 296 from selector 348(3) in latches 346(3), 346(7), 346(11), and 346(15). Selectors 354(4) and 354(12) coupled to crossbar 352 can be controlled to store a merge resultant output vector data sample 296 from adder 320(4) in latches 346(4) and 346(12). Selectors 354(5) and 354(13) coupled to crossbar 352 can be controlled to store a merge resultant output vector data sample 296 from adder 320(5) to be stored in latches 346(5) and 346(13). Selectors 354(6) and 354(14) coupled to crossbar 352 can be controlled to store a merge resultant output vector data sample 296 from adder 320(6) in latch 346(6) or 346(14). Selectors 354(7) and 354(15) coupled to crossbar 352 can be controlled to store a merge resultant output vector data sample 296 from adder 320(7) in latches 346(7) or 346(15).

Note that in the merging circuitry 294 in FIG. 33, the adders could be configured to allow non-adjacent resultant output vector data samples 282 in the resultant output vector data sample set 292(0)-292(X) to be merged. For example, if it is desired to merge resultant output vector data samples 292(0) with resultant output vector data samples 292(9), adders in adder tree levels 318(1)-318(3) could be configured to simply pass merge resultant output vector data samples 292(0) with resultant output vector data samples 292(9) to adder tree level 318(4). The adder 332 in adder tree level 318(4) could then merge resultant output vector data sample 292(0) with resultant output vector data samples 292(9) to provide merged output vector data samples 296.

Merging circuitry could also be provided in the output data flow paths 98(0)-98(X) between the execution units 84(0)-84(X) and the vector data files 82(0)-82(X) that provide other types of vector merging operations other than vector and/or scalar adding. For example, the merging circuitry 294 in FIG. 33 could be configured to provide maximum or minimum vector and/or scalar merging operations. For example, the adders in the adder tree levels 318(1)-318(5) in the adder tree 318 in FIG. 33 could be replaced with maximum or minimum function circuitry. In other words, the circuitry would select to pass either the larger or the lesser of two resultant output vector data samples 292 from the resultant output vector data sample set 292(0)-292(X). For example, if the two resultant output vector data samples 292 from the resultant output vector data sample set 292(0)-292(X) were the two input vector data samples 290(0), 290(1) in FIG. 30, the merging circuitry 294 could be configured to select vector data samples 290(1) if the merging circuitry 294 is configured to select the maximum vector data sample.

Figure 34:
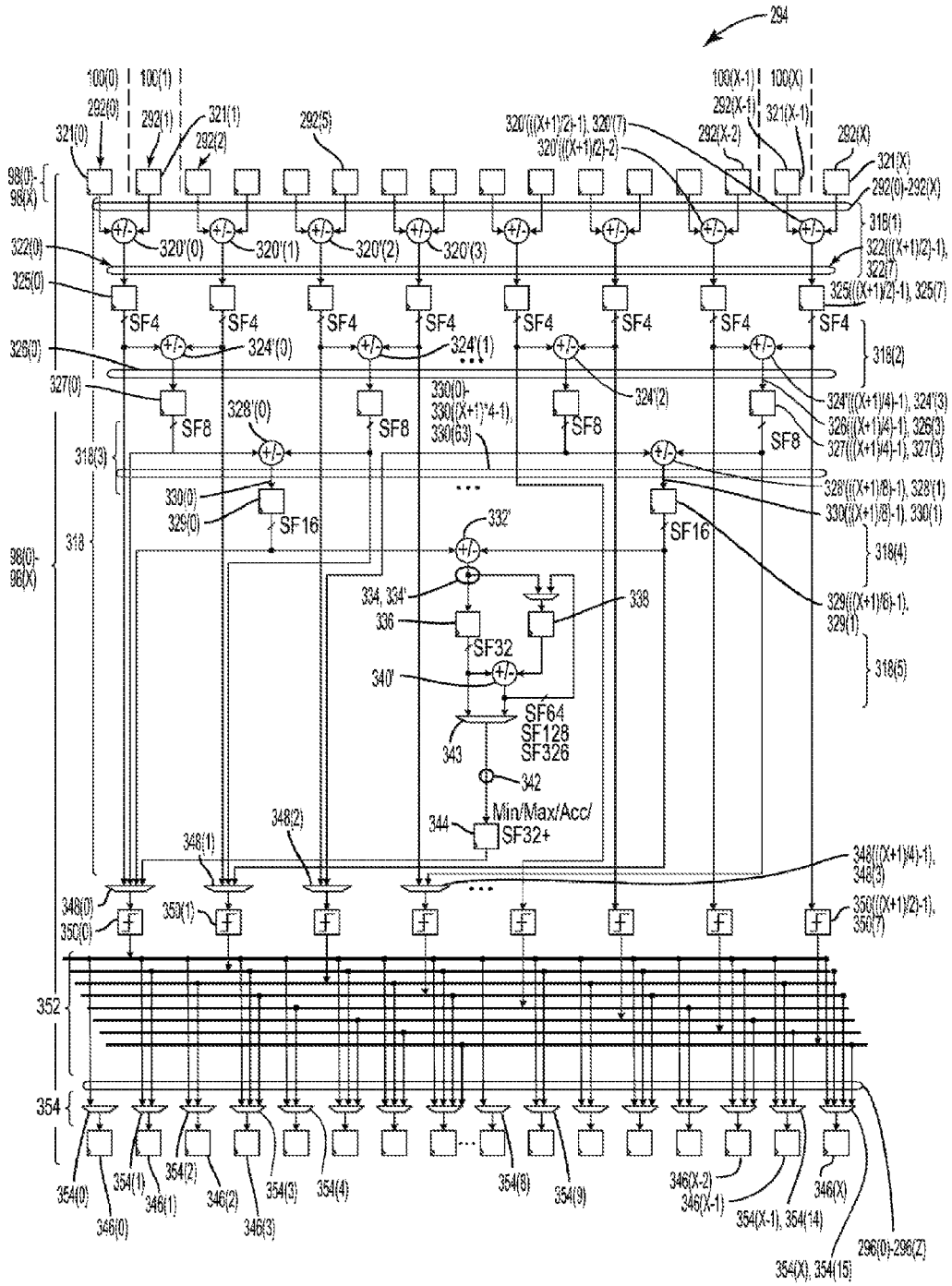
FIG. 34 is a schematic diagram of an exemplary merge circuitry in output data flow paths between executions units and a vector data file in the VPE of FIG. 31 to provide maximum/minimum merging of resultant output vector data sample sets and storing of the maximum/minimum-merged resultant output vector data sample sets in the vector data file.

In this regard, with reference to FIG. 34, adders 320(0)-320(((X+1)/2)−1), 320(7) in the first adder tree level 318(1) in FIG. 33 could be replaced with maximum or minimum merge selectors adders 320'(0)-320'(((X+1)/2)−1), 320'(7), as illustrated in FIG. 34. Adders 324(0)-324(((X+1)/4)−1), 324(3) in the second adder tree level 318(2) could be replaced with maximum or minimum selectors 324'(0)-324' (((X+1)/4)−1), 324'(3), as illustrated in FIG. 34. Adders 328(0)-328(((X+1)/8)−1), 328(1) in the third adder tree level 318(3) could be replaced with maximum or minimum selectors 328'(0)-328'(((X+1)/8)−1), 328'(1), as illustrated in FIG. 34. Adder 332 in the fourth adder tree level 318(4) could be replaced with maximum or minimum selector 332', as illustrated in FIG. 34. Adder 340 in the fifth adder tree level 318(5) could be replaced with maximum or minimum selector 340', as illustrated in FIG. 34. Note that in the merging circuitry 294 in FIG. 34, the adders could be configured to select a maximum or minimum resultant output vector data sample 292 between non-adjacent resultant output vector data samples 292 in the resultant output vector data sample set 292(0)-292(X) to be merged. For example, if it is desired to maximum merge resultant output vector data samples 292(0) with resultant output vector data samples 292(9), adders in adder tree levels 318(1)-318(3) could be configured to simply pass merge resultant output vector data samples 292(0) with resultant output vector data samples 292(9) to adder tree level 318(4). The adder 332' in adder tree level 318(4) could then maximum merge the resultant output vector data sample 292(0) with resultant output vector data samples 292(9) to provide merged output vector data samples 264.

As discussed above, the execution units 84(0)-84(X) are provided in the VPEs 22(1)-22(6) to perform vector processing operations on input vector data sample sets 86(0)-86(X). The execution units 84(0)-84(X) also include programmable data path configurations that allow the execution units 84(0)-84(X) to provide multiple modes of operation with common circuitry and hardware for different vector processing operations. More exemplary detail regarding the execution units 84(0)-84(X) and their programmable data path configurations for providing multiple modes of operation with common circuitry and hardware are now discussed.

Figure 35:
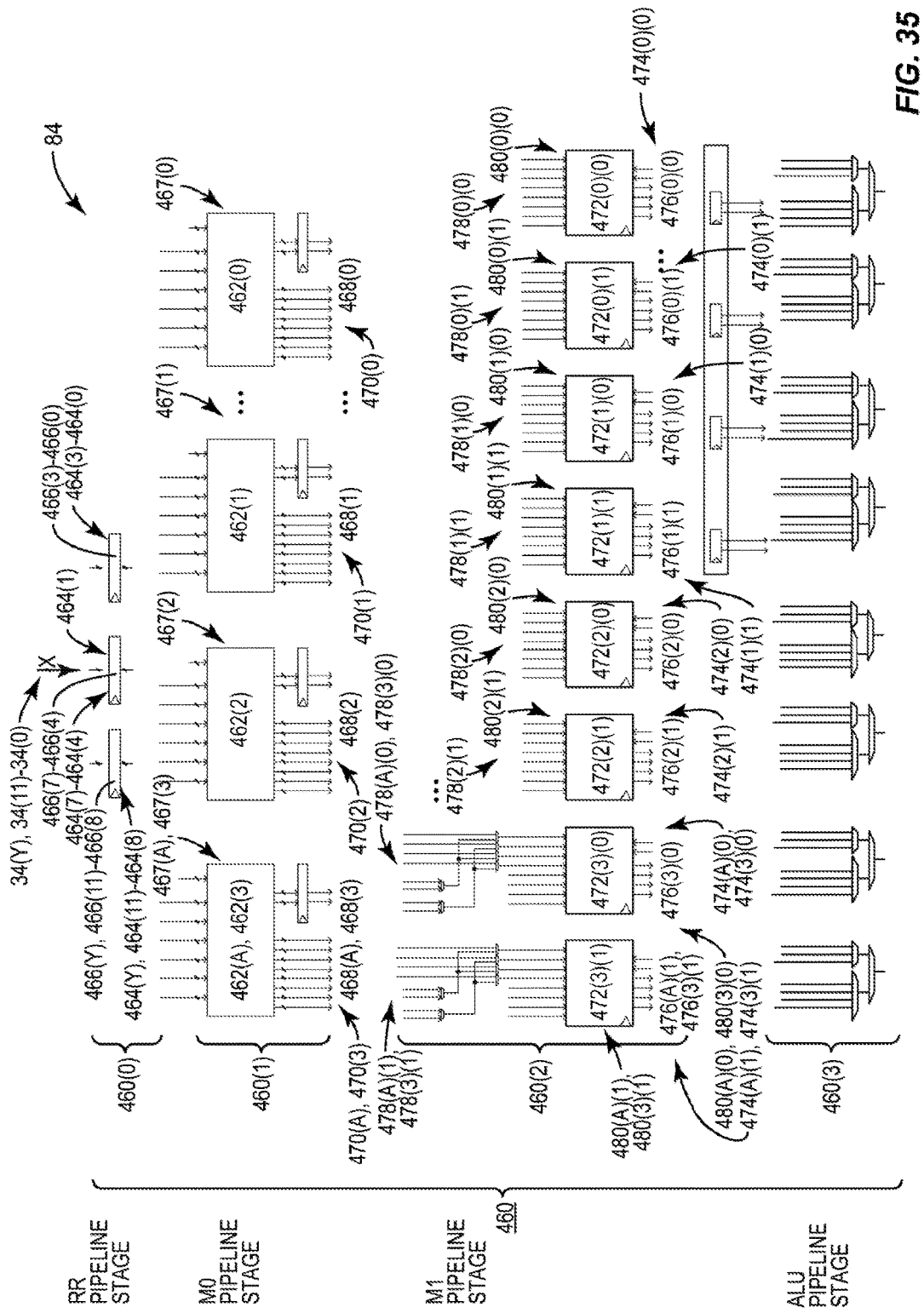
FIG. 35 is a schematic diagram of exemplary vector processing stages that can be provided in a VPE, wherein certain of the vector processing stages include exemplary vector processing blocks having programmable data path configurations.

In this regard, FIG. 35 illustrates an exemplary schematic diagram of an exemplary execution unit that can be provided for each of the execution units 84(0)-84(X) in the VPEs 22(1)-22(6). As illustrated in FIG. 35 and as will be described in more detail below in FIGS. 36-39, the execution unit 84 includes a plurality of exemplary vector pipeline stages 460 having exemplary vector processing blocks that may be configured with programmable data path configurations. As will be discussed in more detail below, the programmable data path configurations provided in the vector processing blocks allow specific circuits and hardware to be programmed and reprogrammed to support performing different, specific vector processing operations on the vector data 30 received from the vector unit data memory 32 in FIG. 2.

For example, certain vector processing operations may commonly require multiplication of the vector data 30 followed by an accumulation of the multiplied vector data results. Non-limiting examples of such vector processing includes filtering operations, correlation operations, and Radix-2 and Radix-4 butterfly operations commonly used for performing Fast Fourier Transform (FFT) operations for wireless communications algorithms, where a series of parallel multiplications are provided followed by a series of parallel accumulations of the multiplication results. As will also be discussed in more detail below with regard to FIGS. 39 and 40, the execution unit 84 in FIG. 35 also has the option of fusing multipliers with carry-save accumulators to provide a redundant carry-save format in the carry-save accumulators. Providing a redundant carry-save format in the carry-save accumulators can eliminate a need to provide a carry propagation path and a carry propagation add operation during each step of accumulation.

In this regard, with further reference to FIG. 35, a M0 multiply vector pipeline stage 460(1) of the VPE 22 will first be described. The M0 multiply vector pipeline stage 460(1) is a second vector pipeline stage containing a plurality of vector processing blocks in the form of any desired number of multiplier blocks 462(A)-462(0), each having programmable data path configurations. The multiplier blocks 462(A)-462(0) are provided to perform vector multiply operations in the execution unit 84. The plurality of multiplier blocks 462(A)-462(0) are disposed in parallel to each other in the M0 multiply vector pipeline stage 460(1) for providing multiplication of up to twelve (12) multiply vector data sample sets 34(Y)-34(0). In this embodiment, 'A' is equal to three (3), meaning four (4) multiplier blocks 462(3)-462(0) are included in the M0 multiply vector pipeline stage 460(1) in this example. The multiply vector data sample sets 34(Y)-34(0) are loaded into the execution unit 84 for vector processing into a plurality of latches 464(Y)-464(0) provided in an input read (RR) vector pipeline stage, which is a first vector pipeline stage 460(0) in the execution unit 84. There are twelve (12) latches 464(11)-464(0) in the execution unit 84 in this embodiment, meaning that 'Y' is equal to eleven (11) in this embodiment. The latches 464(11)-464(0) are configured to latch the multiply vector data sample sets 34(11)-34(0) retrieved from the vector registers (see the vector data files 28 of FIG. 2) as vector data input sample sets 466(11)-466(0). In this example, each latch 464(11)-464(0) is 8-bits wide. The latches 464(11)-464(0) are each respectively configured to latch the multiply vector data input sample sets 466(11)-466(0), for a total of 96-bits wide of vector data 30 (i.e., 12 latches×8 bits each).

With continuing reference to FIG. 35, the plurality of multiplier blocks 462(3)-462(0) are configured to be able to receive certain combinations of the vector data input sample sets 466(11)-466(0) for providing vector multiply operations, wherein 'Y' is equal to eleven (11) in this example. The multiply vector data input sample sets 466(11)-466(0) are provided in a plurality of input data paths A3-A0, B3-B0, and C3-C0 according to the design of the execution unit 84. Vector data input sample sets 466(3)-466(0) correspond to input data paths C3-C0 as illustrated in FIG. 35. Vector data input sample sets 466(7)-466(4) correspond to input data paths B3-B0 as illustrated in FIG. 35. Vector data input sample sets 466(11)-466(8) correspond to input data paths A3-A0 as illustrated in FIG. 35. The plurality of multiplier blocks 462(3)-462(0) are configured to process the received vector data input sample sets 466(11)-466(0) according to the input data paths A3-A0, B3-B0, C3-C0, respectively, provided to the plurality of multiplier blocks 462(3)-462(0), to provide vector multiply operations.

As will be discussed in more detail below with regard to FIGS. 37 and 38, programmable internal data paths 467(3)-467(0) provided in the multiplier blocks 462(3)-462(0) in FIG. 35 can be programmed to have different data path configurations. These different data path configurations provide different combinations and/or different bit lengths of multiplication of particular received vector data input sample sets 466(11)-466(0) provided to the multiplier blocks 462(3)-462(0) according to the particular input data paths A3-A0, B3-B0, C3-C0 provided to each multiplier block 462(3)-462(0). In this regard, the plurality of multiplier blocks 462(3)-462(0) provide vector multiply output sample sets 468(3)-468(0) as a vector result output sample set comprising a multiplication result of multiplying a particular combination of the vector data input sample sets 466(11)-466(0) together.

For example, the programmable internal data paths 467(3)-467(0) of the multiplier blocks 462(3)-462(0) may be programmed according to settings provided from a vector instruction decoder in the instruction dispatch circuit 48 of the baseband processor 20 in FIG. 2. In this embodiment, there are four (4) programmable internal data paths 467(3)-467(0) of the multiplier blocks 462(3)-462(0). The vector instruction specifies the specific type of operation to be performed by the execution unit 84. Thus, the execution unit 84 can be programmed and reprogrammed to configure the programmable internal data paths 467(3)-467(0) of the multiplier blocks 462(3)-462(0) to provide different types of vector multiply operations with the same common circuitry in a highly efficient manner. For example, the execution unit 84 may be programmed to configure and reconfigure the programmable internal data paths 467(3)-467(0) of the multiplier blocks 462(3)-462(0) on a clock-cycle-by-clock-cycle basis for each vector instruction executed, according to decoding of the vector instructions in an instruction pipeline in the instruction dispatch circuit 48. Thus, if the M0 multiply vector pipeline stage 460(1) in the execution unit 84 is configured to process vector data input sample sets 466 every clock cycle, as a result, the multiplier blocks 462(3)-462(0) perform vector multiply operations on every clock cycle according to decoding of the vector instructions in an instruction pipeline in the instruction dispatch circuit 48.

The multiplier blocks 462 can be programmed to perform real and complex multiplications. With continuing reference to FIG. 35, in one vector processing block data path configuration, a multiplier block 462 may be configured to multiply two 8-bit vector data input sample sets 466 together. In one multiply block data path configuration, a multiplier block 462 may be configured to multiply two 16-bit vector data input sample sets 466 together, which are formed from a first pair of 8-bit vector data input sample sets 466 multiplied by a second pair of 8-bit vector data input sample sets 466. This is illustrated in FIG. 38 and discussed in more detail below. Again, providing the programmable data path configurations in the multiplier blocks 462(3)-462(0) provides flexibility in that the multiplier blocks 462(3)-462(0) can be configured and reconfigured to perform different types of multiply operations to reduce area in the execution unit 84 and possibly allow fewer execution units 84 to be provided in the baseband processor 20 to carry out the desired vector processing operations.

With reference back to FIG. 35, the plurality of multiplier blocks 462(3)-462(0) is configured to provide the vector multiply output sample sets 468(3)-468(0) in programmable output data paths 470(3)-470(0) to either the next vector processing stage 460 or an output processing stage. The vector multiply output sample sets 468(3)-468(0) are provided in the programmable output data paths 470(3)-470(0) according to a programmed configuration based on the vector instruction being executed by the plurality of multiplier blocks 462(3)-462(0). In this example, the vector multiply output sample sets 468(3)-468(0) in the programmable output data paths 470(3)-470(0) are provided to the M1 accumulation vector pipeline stage 460(2) for accumulation, as will be discussed below. In this specific design of the execution unit 84, it is desired to provide the plurality of multiplier blocks 462(3)-462(0) followed by accumulators to support specialized vector instructions that call for multiplications of vector data inputs followed by accumulation of the multiplied results. For example, Radix-2 and Radix-4 butterfly operations commonly used to provide FFT operations include a series of multiply operations followed by an accumulation of the multiplication results. However, note that these combinations of vector processing blocks provided in the execution unit 84 are exemplary and not limiting. A VPE that has programmable data path configurations could be configured to include one or any other number of vector processing stages having vector processing blocks. The vector processing blocks could be provided to perform any type of operations according to the design and specific vector instructions designed to be supported by an execution unit.

With continued reference to FIG. 35, in this embodiment, the vector multiply output sample sets 468(3)-468(0) are provided to a plurality of accumulator blocks 472(3)-472(0) provided in a next vector processing stage, which is the M1 accumulation vector processing stage 460(2). Each accumulator block among the plurality of accumulator blocks 472(A)-472(0) contains two accumulators 472(X)(1) and 472(X)(0) (i.e., 472(3)(1), 472(3)(0), 472(2)(1), 472(2)(0), 472(1)(1), 472(1)(0), and 472(0)(1), 472(0)(0)). The plurality of accumulator blocks 472(3)-472(0) accumulate the results of the vector multiply output sample sets 468(3)-468(0). As will be discussed in more detail below with regard to FIGS. 39 and 40, the plurality of accumulator blocks 472(3)-472(0) can be provided as carry-save accumulators, wherein the carry product is in essence saved and not propagated during the accumulation process until the accumulation operation is completed. The plurality of accumulator blocks 472(3)-472(0) also have the option of being fused with the plurality of multiplier blocks 462(3)-462(0) in FIGS. 35 and 37 to provide redundant carry-save format in the plurality of accumulator blocks 472(3)-472(0). Providing redundant carry-save format in the plurality of accumulator blocks 472(3)-472(0) can eliminate a need to provide a carry propagation path and a carry propagation add operation during each step of accumulation in the plurality of accumulator blocks 472(3)-472(0). The M1 accumulation vector processing stage 460(2) and its plurality of accumulator blocks 472(3)-472(0) will now be introduced with reference to FIG. 35.

With reference to FIG. 35, the plurality of accumulator blocks 472(3)-472(0) in the M1 accumulation vector processing stage 460(2) is configured to accumulate the vector multiply output sample sets 468(3)-468(0) in programmable output data paths 474(3)-474(0) (i.e., 474(3)(1), 474(3)(0), 474(2)(1), 474(2)(0), 474(1)(1), 474(1)(0), and 474(0)(1), 474(0)(0)), according to programmable output data path configurations, to provide accumulator output sample sets 476(3)-476(0) (i.e., 476(3)(1), 476(3)(0), 476(2)(1), 476(2)(0), 476(1)(1), 476(1)(0), and 476(0)(1), 476(0)(0)) in either a next vector processing stage 460 or an output processing stage. In this example, the accumulator output sample sets 476(3)-476(0) are provided to an output processing stage, which is an ALU processing stage 460(3). For example, as discussed in more detail below, the accumulator output sample sets 476(3)-476(0) can also be provided to the ALU 46 in the scalar processor 44 in the baseband processor 20 in FIG. 2, as a non-limiting example. For example, the ALU 46 may take the accumulator output sample sets 476(3)-476(0) according to the specialized vector instructions executed by the execution unit 84 to be used in more general processing operations.

With reference back to FIG. 35, programmable input data paths 478(3)-478(0) and/or programmable internal data paths 480(3)-480(0) of the accumulator blocks 472(3)-472(0) can be programmed to be reconfigured to receive different combinations and/or bit lengths of the vector multiply output sample sets 468(3)-468(0) provided from the multiplier blocks 462(3)-462(0) to the accumulator blocks 472(3)-472(0). Because each accumulator block 472 is comprised of two accumulators 472(X)(1), 472(X)(0), the programmable input data paths 478(A)-478(0) are shown in FIG. 35 as 478(3)(1), 478(3)(0), 478(2)(1), 478(2)(0), 478(1)(1), 478(1)(0), and 478(0)(1), 478(0)(0). Similarly, the programmable internal data paths 480(3)-480(0) are shown in FIG. 35 as 480(3)(1), 480(3)(0), 480(2)(1), 480(2)(0), 480(1)(1), 480(1)(0), 480(0)(1), 480(0)(0). Providing programmable input data paths 478(3)-478(0) and/or programmable internal data paths 480(3)-480(0) in the accumulator blocks 472(3)-472(0) is discussed in more detail below with regard to FIGS. 39 and 40. In this manner, according to the programmable input data paths 478(3)-478(0) and/or the programmable internal data paths 480(3)-480(0) of the accumulator blocks 472(3)-472(0), the accumulator blocks 472(3)-472(0) can provide the accumulator output sample sets 476(3)-476(0) according to the programmed combination of accumulated vector multiply output sample sets 468(3)-468

(0). Again, this provides flexibility in that the accumulator blocks 472(3)-472(0) can be configured and reconfigured to perform different types of accumulation operations based on the programming of the programmable input data paths 478(3)-478(0) and/or the programmable internal data paths 480(3)-480(0) to reduce area in the execution unit 84 and possibly allow fewer execution units 84 to be provided in the baseband processor 20 to carry out the desired vector processing operations.

For example, in one accumulator mode configuration, the programmable input data path 478 and/or the programmable internal data paths 480 of two accumulator blocks 472 may be programmed to provide for a single 40-bit accumulator as a non-limiting example. In another accumulator mode configuration, the programmable input data path 478 and/or the programmable internal data path 480 of two accumulator blocks 472 may be programmed to provide for dual 24-bit accumulators as a non-limiting example. In another accumulator mode configuration, the programmable input data path 478 and/or the programmable internal data path 480 of two accumulator blocks 472 may be programmed to provide for a 16-bit carry-save adder followed by a single 24-bit accumulator. Specific, different combinations of multiplications and accumulation operations can also be supported by the execution unit 84 according to the programming of the multiplier blocks 462(3)-462(0) and the accumulator blocks 472(3)-472(0) (e.g., 16-bit complex multiplication with 16-bit accumulation, and 32-bit complex multiplication with 16-bit accumulation).

The programmable input data paths 478(3)-478(0) and/or the programmable internal data paths 480(3)-480(0) of the accumulator blocks 472(3)-472(0) may be programmed according to settings provided from a vector instruction decoder in the instruction dispatch circuit 48 of the baseband processor 20 in FIG. 2. The vector instruction specifies the specific type of operation to be performed by the execution unit 84. Thus, the execution unit 84 can be configured to reprogram the programmable input data paths 478(3)-478(0) and/or the programmable internal data paths 480(3)-480(0) of the accumulator blocks 472(3)-472(0) for each vector instruction executed according to decoding of the vector instruction in an instruction pipeline in the instruction dispatch circuit 48. A vector instruction may execute over one or more clock cycles of the execution unit 84. Also in this example, the execution unit 84 can be configured to reprogram the programmable input data paths 478(3)-478(0) and/or the programmable internal data paths 480(3)-480(0) of the accumulator blocks 472(3)-472(0) for each clock cycle of a vector instruction on a clock-cycle-by-clock-cycle basis. Thus, for example, if a vector instruction executed by the M1 accumulation vector processing stage 460(2) in the execution unit 84 processes the vector multiply output sample sets 468(3)-468(0) every clock cycle, as a result, the programmable input data paths 478(3)-478(0) and/or the programmable internal data paths 480(3)-480(0) of the accumulator blocks 472(3)-472(0) can be reconfigured each clock cycle during execution of the vector instruction.

Figure 36:
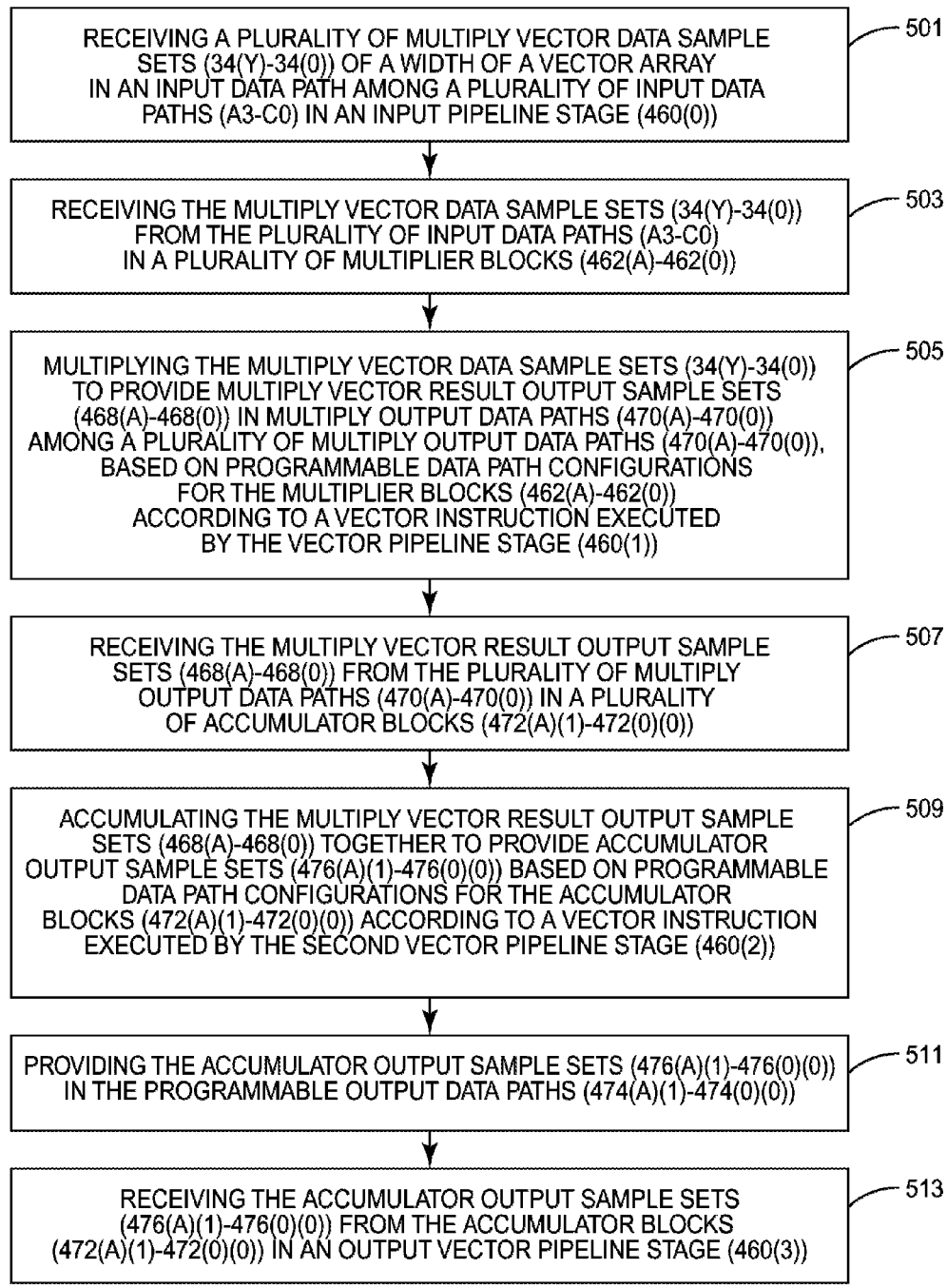
FIG. 36 is a flowchart illustrating exemplary vector processing of multiplier blocks and accumulator blocks, each having programmable data path configurations and provided in different vector processing stages in the exemplary VPE of FIG. 35.

FIG. 36 is a flowchart illustrating exemplary vector processing of the multiplier blocks 462(A)-462(0) and the accumulator blocks 472(A)(1)-472(0)(0) in the execution unit 84 in FIGS. 2 and 35 to provide additional illustration of the exemplary vector processing. The multiplier blocks 462(A)-462(0) and accumulator blocks 472(A)(1)-472(0)(0) each have programmable data path configurations and are provided in different vector processing stages in the exemplary execution unit 84 of FIGS. 2 and 35. For example, FFT vector operations involve multiply operations followed by accumulate operations.

In this regard, with regard to FIG. 36, the vector processing involves receiving a plurality of multiply vector data sample sets 34(Y)-34(0) of a width of a vector array in an input data path among a plurality of input data paths A3-C0 in an input processing stage 460(0) (block 501). The vector processing then includes receiving the multiply vector data sample sets 34(Y)-34(0) from the plurality of input data paths A3-C0 in a plurality of multiplier blocks 462(A)-462(0) (block 503). The vector processing then includes multiplying the multiply vector data sample sets 34(Y)-34(0) to provide multiply vector result output sample sets 468(A)-468(0) in multiply output data paths 470(A)-470(0) among a plurality of multiply output data paths 470(A)-470(0), based on programmable data path configurations for the multiplier blocks 462(A)-462(0) according to a vector instruction executed by the vector processing stage 460(1) (block 505). The vector processing next includes receiving the multiply vector result output sample sets 468(A)-468(0) from the plurality of multiply output data paths 470(A)-470(0) in a plurality of accumulator blocks 472(A)(1)-472(0)(0) (block 507). The vector processing next includes accumulating the multiply vector result output sample sets 468(A)-468(0) together to provide accumulator output sample sets 476(A)(1)-476(0)(0) based on programmable input data paths 478(A)(1)-478(0)(0), programmable internal data paths 480(A)(1)-480(0)(0), and programmable output data paths 474(A)(1)-474(0)(0) configurations for the accumulator blocks 472(A)(1)-472(0)(0) according to a vector instruction executed by the second vector processing stage 460(2) (block 509). The vector processing then includes providing the accumulator output sample sets 476(A)(1)-476(0)(0) in the programmable output data paths 474(A)(1)-474(0)(0) (block 511). The vector processing then includes receiving the accumulator output sample sets 476(A)(1)-476(0)(0) from the accumulator blocks 472(A)(1)-472(0)(0) in an output vector processing stage 460(3) (block 513).

Now that the overview of the exemplary execution unit 84 of FIG. 35 and vector processing in FIG. 36 employing vector processing blocks having programmable data path configurations have been described, the remainder of the description describes more exemplary, non-limiting details of these vector processing blocks in FIGS. 37-40.

Figure 37:
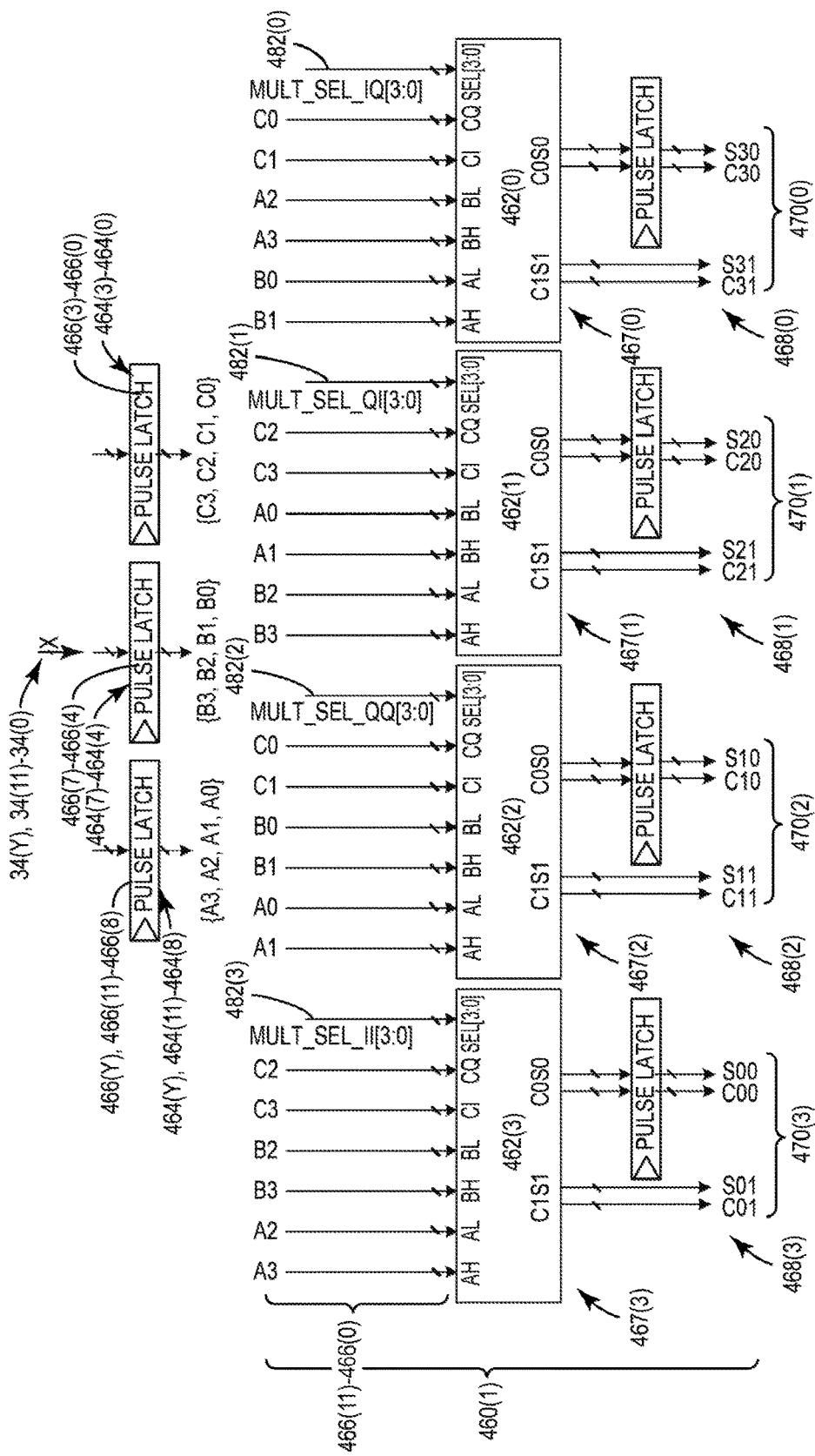
FIG. 37 is a more detailed schematic diagram of a plurality of multiplier blocks provided in a vector processing stage of the VPE of FIG. 35, wherein the plurality of multiplier blocks each have programmable data path configurations, so that the plurality of multiplier blocks can be programmed in multiple modes to perform specific, different types of vector multiply operations.

In this regard, FIG. 37 is a more detailed schematic diagram of the plurality of multiplier blocks 462(3)-462(0) in the M0 multiply vector processing stage 460(1) of the execution unit 84 of FIG. 35. FIG. 38 is a schematic diagram of internal components of a multiplier block 462 in FIG. 37. As illustrated in FIG. 37, the vector data input sample sets 466(11)-466(0) that are received by the multiplier blocks 462(3)-462(0) according to the particular input data paths A3-A0, B3-B0, C3-C0 are shown. As will be discussed in more detail below with regard to FIG. 38, each of the multiplier blocks 462(3)-462(0) in this example include four (4) 8-bit by 8-bit multipliers. With reference back to FIG. 37, each of the multiplier blocks 462(3)-462(0) in this example are configured to multiply a multiplicand input 'A' by either multiplicand input 'B' or multiplicand input 'C.' The multiplicand inputs 'A," and 'B' or 'C' that can be multiplied together in a multiplier block 462 are controlled by which input data paths A3-A0, B3-B0, C3-C0 are connected to the multiplier blocks 462(3)-462(0), as shown in FIG. 37. A multiplicand selector input 482(3)-482(0) is provided as an input to each multiplier block 462(3)-462(0) to control the programmable internal data paths 467(3)-467(0) in each multiplier block 462(3)-462(0) to select whether multiplicand input 'B' or multiplicand input 'C' is selected to be multiplied by multiplicand input 'A.' In this manner, the multiplier blocks 462(3)-462(0) are provided with the capability for their programmable internal data paths 467(3)-467(0) to be reprogrammed to provide different multiply operations, as desired.

With continuing reference to FIG. 37, using multiplier block 462(3) as an example, input data paths A3 and A2 are connected to inputs AH and AL, respectively. Input AH represents the high bits of multiplicand input A, and AL means the low bits of input multiplicand input 'A.' Input data paths B3 and B2 are connected to inputs BH and BL, respectively. Input BH represents the high bits of multiplicand input 'B,' and AL represents the low bits of input multiplicand input 'B." Input data paths C3 and C2 are connected to inputs CI and CQ, respectively. Input CI represents the real bits portion of input multiplicand input 'C' in this example. CQ represents the imaginary bits portion of input multiplicand input 'C' in this example. As will be discussed in more detail below with regard to FIG. 38, the multiplicand selector input 482(3) also controls whether the programmable internal data path 467(3) of multiplier block 462(3) is configured to perform 8-bit multiplication on multiplicand input 'A' with multiplicand input 'B' or multiplicand input 'C,' or whether multiplier block 462(3) is configured to perform 16-bit multiplication on multiplicand input 'A' with multiplicand input 'B' or multiplicand input 'C' in this example.

With continuing reference to FIG. 37, the multiplier blocks 462(3)-462(0) are configured to each generate vector multiply output sample sets 468(3)-468(0) as carry 'C' and sum 'S' vector output sample sets of the multiplication operation based on the configuration of their programmable internal data paths 467(3)-467(0). As will be discussed in more detail below with regard to FIGS. 39 and 40, the carry 'C' and sum 'S' of the vector multiply output sample sets 468(3)-468(0) are fused, meaning that the carry 'C' and the sum 'S' are provided in redundant carry-save format to the plurality of accumulator blocks 472(3)-472(0) to provide redundant carry-save format in the plurality of accumulator blocks 472(3)-472(0). As will be discussed in more detail below, providing a redundant carry-save format in the plurality of accumulator blocks 472(3)-472(0) can eliminate a need to provide a carry propagation path and a carry propagation add operation during accumulation operations performed by the plurality of accumulator blocks 472(3)-472(0).

Examples of the multiplier blocks 462(3)-462(0) generating the vector multiply output sample sets 468(3)-468(0) as carry 'C' and sum 'S' vector output sample sets of the multiplication operation based on the configuration of their programmable internal data paths 467(3)-467(0) are shown in FIG. 37. For example, multiplier block 462(3) is configured to generate carry C00 and sum S00 as 32-bit values for 8-bit multiplications and carry C01 and sum S01 as 64-bit values for 16-bit multiplications. The other multiplier blocks 462(2)-462(0) have the same capability in this example. In this regard, multiplier block 462(2) is configured to generate carry C10 and sum S10 as 32-bit values for 8-bit multiplications and carry C11 and sum S11 as 64-bit values for 16-bit multiplications. Multiplier block 462(1) is configured to generate carry C20 and sum S20 as 32-bit values for 8-bit multiplications and carry C21, and sum S21 as 64-bit values for 16-bit multiplications. Multiplier block 462(0) is configured to generate carry C30 and sum S30 as 32-bit values for 8-bit multiplications and carry C31 and sum S31 as 64-bit values for 16-bit multiplications.

Figure 38:
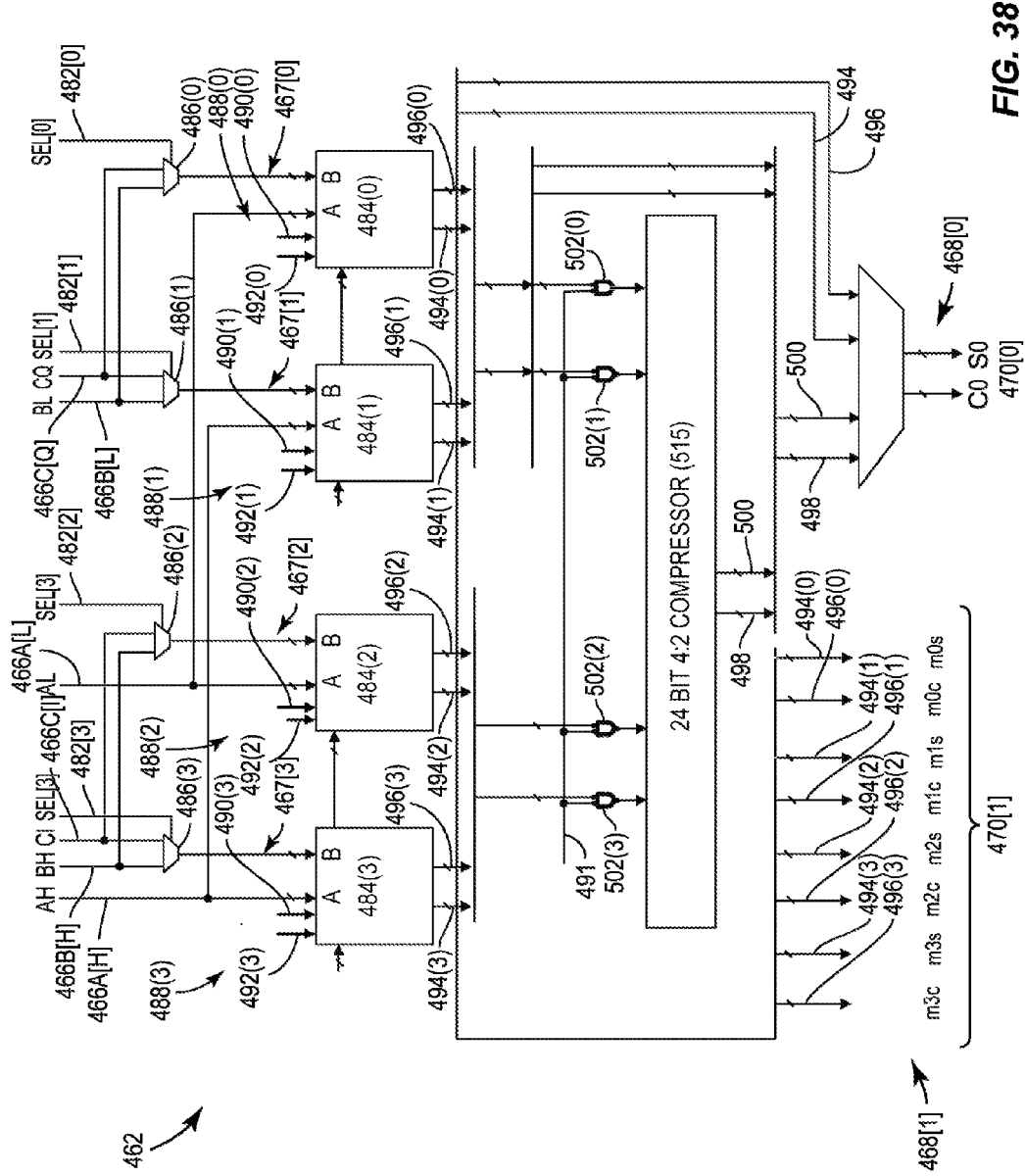
FIG. 38 is a schematic diagram of internal components of a multiplier block among the plurality of multiplier blocks in FIG. 37 having programmable data paths configurations capable of being programmed to provide multiply operations for 8-bit by 8-bit input vector data sample sets and 16-bit by 16-bit input vector data sample sets.

To explain more exemplary detail of programmable data path configurations provided in a multiplier block 462 in FIG. 37, FIG. 38 is provided. FIG. 38 is a schematic diagram of internal components of a multiplier block 462 in FIG. 37 having programmable data path configurations capable of multiplying 8-bit by 8-bit vector data input sample set 466, and 16-bit by 16-bit vector data input sample set 466. In this regard, the multiplier block 462 includes four 8×8-bit multipliers 484(3)-484(0) in this example. Any desired number of multipliers 484 could be provided. A first multiplier 484(3) is configured to receive 8-bit vector data input sample set 466A[H] (which is the high bits of input multiplicand input 'A') and multiply the vector data input sample set 466A[H] with either 8-bit vector data input sample set 466B[H] (which is the high bits of input multiplicand input 'B') or 8-bit vector data input sample set 466C[I] (which is the high bits of input multiplicand input 'C'). A multiplexor 486(3) is provided that is configured to select either 8-bit vector data input sample set 466B[H] or 8-bit vector data input sample set 466C[I] being providing as a multiplicand to the multiplier 484(3). The multiplexor 486(3) is controlled by multiplicand selector input 482[3], which is the high bit in the multiplicand selector input 482 in this embodiment. In this manner, the multiplexor 486(3) and the multiplicand selector input 482[3] provide a programmable internal data path 467[0] configuration for the multiplier 484(3) to control whether 8-bit vector data input sample set 466B[H] or 8-bit vector data input sample set 466C[I] is multiplied with received vector data input sample set 466A[H].

With continuing reference to FIG. 38, the other multipliers 484(2)-484(0) also include similar programmable internal data paths 467[2]-467[0] as provided for the first multiplier 484(3). Multiplier 484(2) includes the programmable internal data path 467[2] having a programmable configuration to provide either 8-bit vector data input sample set 466B[H] or 8-bit vector data input sample set 466C[I] in the programmable internal data path 467[1] to be multiplied with 8-bit vector data input sample set 466A[L], which is the low bits of multiplicand input 'A.' The selection is controlled by multiplexor 486(2) according to the multiplicand selector input 482[2] in the multiplicand selector input 482 in this embodiment. Multiplier 484(1) includes programmable internal data path 467[1] programmable to provide either 8-bit vector data input sample set 466B[L], which is the low bits of multiplicand input 'B,' or 8-bit vector data input sample set 466C[Q], which is the low bits of multiplicand input 'C' in the programmable internal data path 467[1] to be multiplied with 8-bit vector data input sample set 466A[H]. The selection is controlled by multiplexor 486(1) according to the multiplicand selector input 482[1] in the multiplicand selector input 482 in this embodiment. Further, multiplier 484(0) includes programmable internal data path 467[0] programmable to provide either 8-bit vector data input sample set 466B[L] or 8-bit vector data input sample set 466C[Q] in the programmable internal data path 467[0], to be multiplied with 8-bit vector data input sample set 466A[L]. The selection is controlled by multiplexor 486(0) according to the multiplicand selector bit input 482[0] in the multiplicand selector input 482 in this embodiment.

With continuing reference to FIG. 38, as discussed above, the multipliers 484(3)-484(0) can be configured to perform different bit length multiplication operations. In this regard, each multiplier 484(3)-484(0) includes bit length multiply mode inputs 488(3)-488(0), respectively. In this example, each multiplier 484(3)-484(0) can be programmed in 8-bit by 8-bit mode according to the inputs that control the configuration of programmable data paths 490(3)-490(0), 491, and 492(3)-492(0), respectively. Each multiplier 484 (3)-484(0) can also be programmed to provide part of a larger bit multiplication operation, including 16-bit by 16-bit mode and 24-bit by 8-bit mode, according to the inputs that control the configuration of programmable data paths 490 (3)-490(0), 491, and 492(3)-492(0), respectively. For example, if each multiplier 484(3)-484(0) is configured in 8-bit by 8-bit multiply mode according to the configuration of the programmable data paths 490(3)-490(0), the plurality of multipliers 484(3)-484(0) as a unit can be configured to comprise two (2) individual 8-bit by 8-bit multipliers as part of the multiplier block 462. If each multiplier 484(3)-484(0) is configured in 16-bit by 16-bit multiply mode according to configuration of the programmable data path 491, the plurality of multipliers 484(3)-484(0) as a unit can be configured to comprise a single 16-bit by 16-bit multiplier as part of the multiplier block 462. If the multipliers 484(3)-484(0) are configured in 24-bit by 8-bit multiply mode according to configuration of the programmable data paths 492(3)-492 (0), the plurality of multipliers 484(3)-484(0) as a unit can be configured to comprise one (1) 16-bit by 24-bit by 8-bit multiplier as part of the multiplier block 462.

With continuing reference to FIG. 38, the multipliers 484(3)-484(0) in this example are shown as being configured in 16-bit by 16-bit multiply mode. Sixteen (16)-bit input sums 494(3), 494(2) and input carries 496(3), 496(2) are generated by each multiplier 484(3), 484(2), respectively. Sixteen (16)-bit input sums 494(1), 494(0) and input carries 496(1), 496(0) are generated by each multiplier 484(1), 484(0), respectively. The 16-bit input sums 494(3), 494(2) and input carries 496(3), 496(2) are also provided to a 24-bit 4:2 compressor 515 along with 16-bit sums input 494(1), 494(0) and input carries 496(1), 496(0) to add the input sums 494(3)-494(0) and input carries 496(3)-496(0) together. The added input sums 494(3)-494(0) and input carries 496(3)-496(0) provide a single sum 498 and single carry 500 in 16-bit by 16-bit multiply mode when the programmable data path 491 is active and gated with the input sums 494(3)-494(0) and input carries 496(3)-496(0). The programmable data path 491 is gated by a first AND-based gate 502(3) with combined input sums 494(3), 494(2) as a 16-bit word, and by a second AND-based gate 502(2) with combined input carries 496(3), 496(2) as a 16-bit word to be provided to the 24-bit 4:2 compressor 515. The programmable data path 491 is also gated by a third AND-based gate 502(1) with combined input sums 494(1), 494(0) as a 16-bit word, and by a fourth AND-based gate 502(0) with combined input carries 496(1), 496(0) as a 16-bit word to be provided to the 24-bit 4:2 compressor 515. The programmable output data path 470[0] is provided with the vector multiply output sample set 468[0] as a compressed 32-bit sum S0 and 32-bit carry C0 partial product if the multiplier block 462 is configured in a 16-bit by 16-bit or 24-bit by 8-bit multiply mode.

The programmable output data path 470[1] configuration is provided as the 16-bit input sums 494(3)-494(0) and corresponding 16-bit input carries 496(3)-496(0) as partial products without compression, if the multipliers 484(3)-484 (0) in the multiplier block 462 are configured in 8-bit by 8-bit multiply mode. The programmable output data path 470[1] is provided as the 16-bit input sums 494(3)-494(0) and corresponding 16-bit input carries 496(3)-496(0) as the vector multiply output sample sets 468[1] without compression if the multipliers 484(3)-484(0) in the multiplier block 462 are configured in 8-bit by 8-bit multiply mode. The vector multiply output sample sets 468[0], 468[1], depending on a multiplication mode of the multiplier block 462, are provided to the accumulator blocks 472(3)-472(0) for accumulation of sum and carry products according to the vector instruction being executed.

Figure 39:
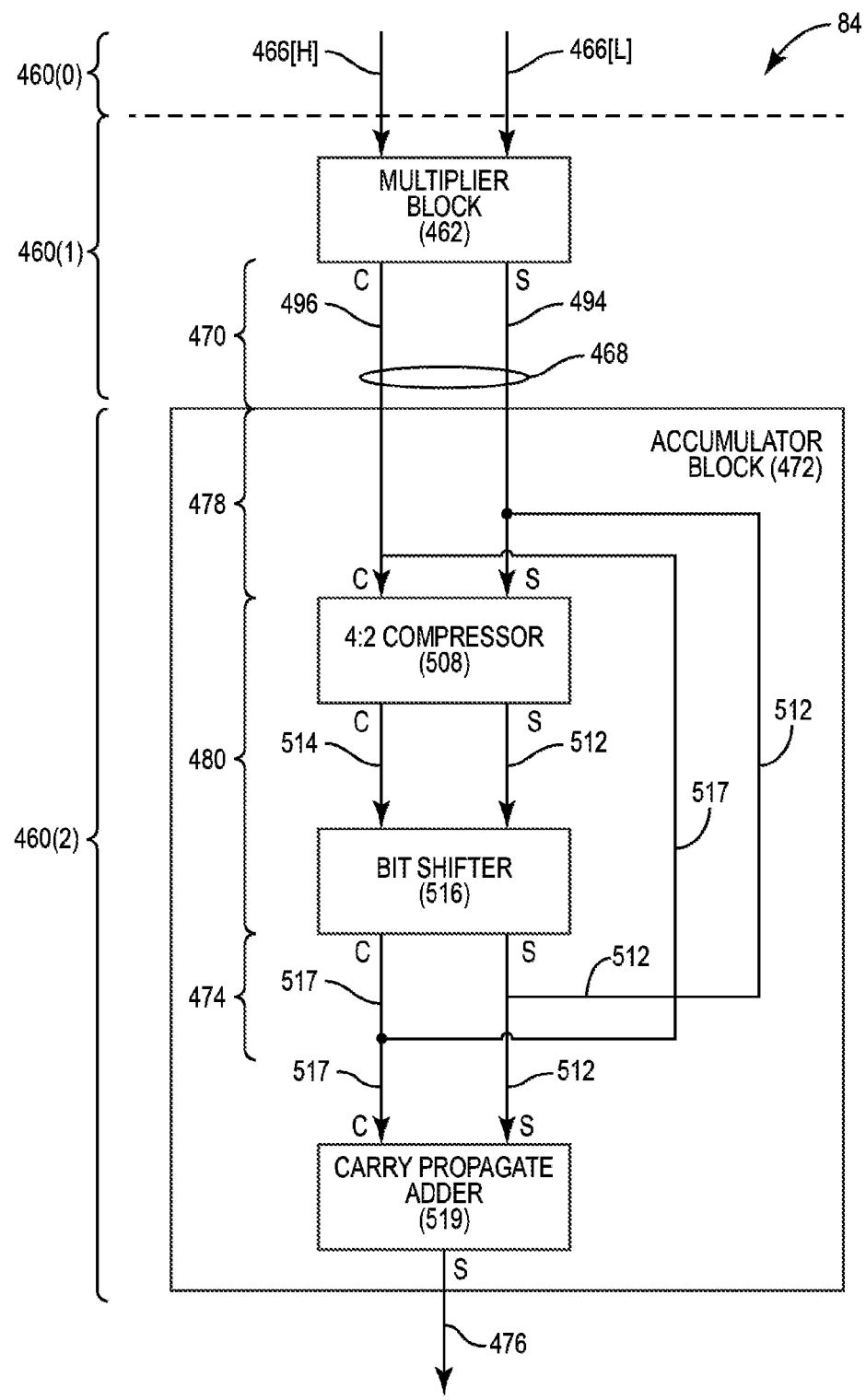
FIG. 39 is a generalized schematic diagram of a multiplier block and accumulator block in the VPE of FIG. 38, wherein the accumulator block employs a carry-save accumulator structure employing redundant carry-save format to reduce carry propagation.

Now that the multiplier blocks 462(3)-462(0) in FIGS. 37 and 38 having programmable data path configurations have been described, features of the multiplier blocks 462(3)-462 (0) in the execution unit 84 to be fused with the accumulator blocks 472(3)-472(0) configured in redundant carry-save format will now described in general with regard to FIG. 39.

In this regard, FIG. 39 is a generalized schematic diagram of a multiplier block and accumulator block in the execution units 84(0)-84(X) described above, wherein the accumulator block employs a carry-save accumulator structure employing redundant carry-save format to reduce carry propagation. As previously discussed and illustrated in FIG. 38, the multiplier blocks 462 are configured to multiply multiplicand inputs 466[H] and 466[L] and provide at least one input sum 494 and at least one input carry 496 as a vector multiply output sample sets 468 in the programmable output data path 470. To eliminate the need to provide a carry propagation path and a carry propagation adder in the accumulator block 472 for each accumulation step, the at least one input sum 494 and the at least one input carry 496 in the vector multiply output sample sets 468 in the programmable output data path 470 are fused in redundant carry-save format to at least one accumulator block 472. In other words, the carry 496 in the vector multiply output sample sets 468 is provided as vector input carry 496 in carry-save format to the accumulator block 472. In this manner, the input sum 494 and the input carry 496 in the vector multiply output sample sets 468 can be provided to a compressor 508 of the accumulator block 472, which in this embodiment is a complex gate 4:2 compressor. The compressor 508 is configured to accumulate the input sum 494 and the input carry 496 together with a previous accumulated vector output sum 512 and a previous shifted accumulated vector output carry 517, respectively. The previous shifted accumulated vector output carry 517 is in essence the saved carry accumulation during the accumulation operation.

In this manner, only a single, final carry propagate adder is required to be provided in the accumulator block 472 to propagate the received input carry 496 to the input sum 494 as part of the accumulation generated by the accumulator block 472. Power consumption associated with performing a carry propagation add operation during each step of accumulation in the accumulator block 472 is reduced in this embodiment. Also, gate delay associated with performing a carry propagation add operation during each step of accumulation in the accumulator block 472 is also eliminated in this embodiment.

With continuing reference to FIG. 39, the compressor 508 is configured to accumulate the input sum 494 and the input carry 496 in a redundant form with the previous accumulated vector output sum 512 and previous shifted accumulated vector output carry 517, respectively. The shifted accumulated vector output carry 517 is generated by an accumulated vector output carry 514 generated by the compressor 508 by shifting the accumulated vector output carry 514 before the next accumulation of the next received input sum 494 and input carry 496 is performed by the compressor 508. The final shifted accumulated vector output carry 517 is added to the final accumulated vector output sum 512 by a single, final carry propagate adder 519 provided in the accumulator block 472 to propagate the carry accumulation in the final shifted accumulated vector output carry 517 to convert the final accumulated vector output sum 512 to the final accumulator output sample set 476 2's complement notation. The final accumulated vector output sum 512 is provided as accumulator output sample set 476 in the programmable output data path 474 (see FIG. 35).

Figure 40:
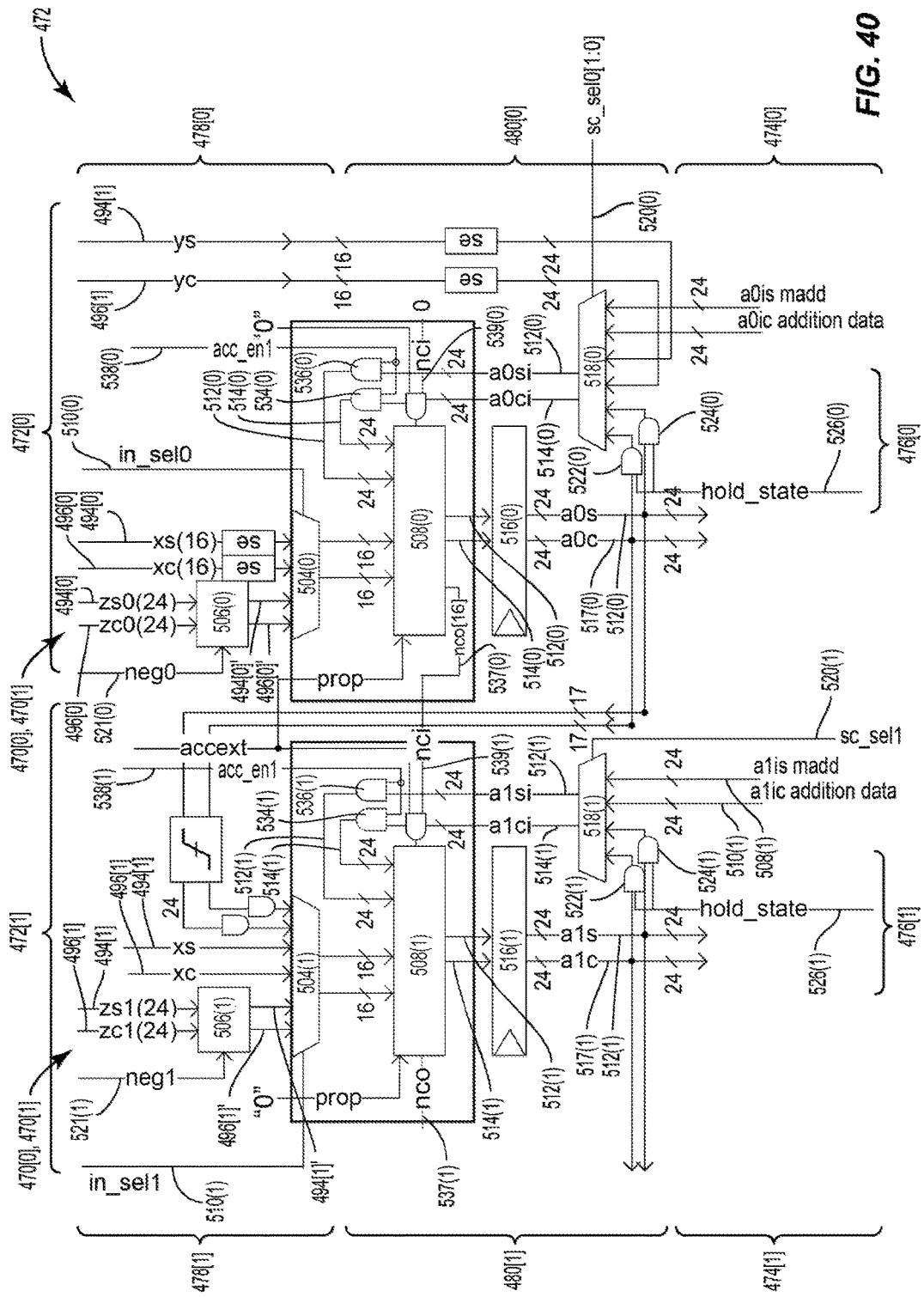
FIG. 40 is a detailed schematic diagram of exemplary internal components of the accumulator block of FIG. 39, which is provided in the VPE of FIG. 35, wherein the accumulator block has programmable data path configurations, so that the accumulator block can be programmed in multiple modes to perform specific, different types of vector accumulate operations with redundant carry-save format.

Now that FIG. 39 illustrating the fusing of a multiplier blocks 462 with an accumulator block 472 configured in redundant carry-save format has been described, more exemplary detail regarding the accumulator blocks 472(3)-472(0) are now described in general with regard to FIG. 40. FIG. 40 is a detailed schematic diagram of exemplary internal components of an accumulator block 472 provided in the execution unit 84 of FIG. 35. As previously discussed and discussed in more detail below, the accumulator block 472 is configured with programmable input data paths 478(3)-478(0) and/or the programmable internal data paths 480(3)-480(0), so that the accumulator block 472 can be programmed to act as dedicated circuitry designed to perform specific, different types of vector accumulation operations. For example, the accumulator block 472 can be programmed to provide a number of different accumulations and additions, including signed and unsigned accumulate operations. Specific examples of the programmable input data paths 478(3)-478(0) and/or programmable internal data paths 480(3)-480(0) in the accumulator block 472 being configured to provide different types of accumulation operations are disclosed. Also, the accumulator block 472 is configured to include carry-save accumulators 472[0], 472[1] to provide redundant carry arithmetic to avoid or reduce carry propagation to provide high speed accumulation operations with reduced combinational logic.

Exemplary internal components of the accumulator block 472 are shown in FIG. 40. As illustrated therein, the accumulator block 472 in this embodiment is configured to receive a first input sum 494[0] and first input carry 496[0], and a second input sum 494[1] and second input carry 496[1] from a multiplier block 462 to be accumulated together. With regard to FIG. 40, the input sums 494[0], 494[1] and input carries 496[0], 496[1] will be referred to as vector input sums 494[0], 494[1] and vector input carries 496[0], 496[1]. As previously described and illustrated in FIG. 39, the vector input sums 494[0], 494[1] and vector input carries 496[0], 496[1] in this embodiment are each 16-bits in length. The accumulator block 472 in this example is provided as two 24-bit carry-save accumulator blocks 472[0], 472[1], each containing similar components with common element numbers with '[0]' being designated for carry-save accumulator block 472[0], and with '[1]' being designated for carry-save accumulator block 472[1]. The carry-save accumulator blocks 472[0], 472[1] can be configured to perform vector accumulation operations concurrently.

With reference to carry-save accumulator block 472[0] in FIG. 40, the vector input sum 494[0] and vector input carry 496[0] are input in a multiplexor 504(0) provided as part of the programmable internal data path 480[0]. A negation circuit 506(0), which may be comprised of exclusive OR-based gates, is also provided that generates a negative vector input sum 494[0]' and negative vector input carry 496[0]' according to an input 521(0), as inputs into the multiplexor 504(0) for accumulation operations requiring a negative vector input sum 494[0]' and negative vector input carry 496[0]'. The multiplexor 504(0) is configured to select either vector input sum 494[0] and vector input carry 496[0] or the negative vector input sum 494[0]' and the negative vector input carry 496[0]' to be provided to a compressor 508(0) according to a selector input 510(0) generated as a result of the vector instruction decoding. In this regard, the selector input 510(0) allows the programmable input data path 478[0] of carry-save accumulator block 472[0] to be programmable to provide either the vector input sum 494[0] and vector input carry 496[0], or the negative vector input sum 494[0]' and the negative vector input carry 496[0]', to the compressor 508(0) according to the accumulation operation configured to be performed by the accumulator block 472.

With continuing reference to FIG. 40, the compressor 508(0) of the carry-save accumulator block 472[0] in this embodiment is a complex gate 4:2 compressor. In this regard, the compressor 508(0) is configured to accumulate sums and carries in redundant carry-save operations. The compressor 508(0) is configured to accumulate a current vector input sum 494[0] and vector input carry 496[0], or a current negative vector input sum 494[0]' and negative vector input carry 496[0]', together with previous accumulated vector input sum 494[0] and vector input carry 496[0], or accumulated negative vector input sum 494[0]' and negative vector input carry 496[0]', as the four (4) inputs to the compressor 508(0). The compressor 508(0) provides an accumulated vector output sum 512(0) and accumulated vector output carry 514(0) as the accumulator output sample set 476[0] in the programmable output data path 474[0] (see FIG. 35) to provide accumulator output sample sets 476(3)-476(0). The accumulated vector output carry 514(0) is shifted by a bit shifter 516(0) during accumulation operations to provide a shifted accumulated vector output carry 517(0) to control bit width growth during each accumulation step. For example, the bit shifter 516(0) in this embodiment is a barrel-shifter that is fused to the compressor 508(0) in redundant carry-save format. In this manner, the shifted accumulated vector output carry 517(0) is in essence saved without having to be propagated to the accumulated vector output sum 512(0) during the accumulation operation performed by the accumulator block 472[0]. In this manner, power consumption and gate delay associated with performing a carry propagation add operation during each step of accumulation in the accumulator block 472[0] is eliminated in this embodiment.

Additional follow-on vector input sums 494[0] and vector input carries 496[0], or negative vector input sums 494[0]' and negative vector input carries 496[0]', can be accumulated with the current accumulated vector output sum 512(0) and current accumulated vector output carry 517(0). The vector input sums 494[0] and vector input carries 496[0], or negative vector input sums 494[0]' and negative vector input carries 496[0]', are selected by a multiplexor 518(0) as part of the programmable internal data path 480[0] according to a sum-carry selector 520(0) generated as a result of the vector instruction decoding. The current accumulated vector output sum 512(0) and current shifted accumulated vector output carry 517(0) can be provided as inputs to the compressor 508(0) for carry-save accumulator block 472[0] to provide an updated accumulated vector output sum 512(0) and accumulated vector output carry 514(0). In this regard, the sum-carry selector 520(0) allows the programmable internal data path 480[0] of accumulator block 472[0] to be programmable to provide the vector input sum 494[0] and vector input carry 496[0] to the compressor 508(0) according to the accumulation operation configured to be performed by the accumulator block 472. Hold gates 522(0), 524(0) are also provided in this embodiment to cause the multiplexor 518(0) to hold the current state of the accumulated vector output sum 512(0) and shifted accumulated vector output carry 517(0) according to a hold state input 526(0) to control operational timing of the accumulation in the carry-save accumulator block 472[0].

With continuing reference to FIG. 40, the accumulated vector output sum 512(0) and shifted accumulated vector output carry 517(0) of carry-save accumulator block 472[0], and the accumulated vector output sum 512(1) and shifted accumulated vector output carry 517(1) of carry-save accumulator block 472[1], are gated by control gates 534(0), 536(0) and 534(1), 536(1), respectively. The control gates 534(0), 536(0) and 534(1), 536(1) control the accumulated vector output sum 512(0) and shifted accumulated vector output carry 517(0), and the accumulated vector output sum 512(1) and shifted accumulated vector output carry 517(1), respectively, being returned to the compressors 508(0), 508(1).

In summary, with the programmable input data paths 478[0], 478[1] and programmable internal data paths 480[0], 480[1] of the accumulator blocks 472[0], 472[1] of the accumulator block 472 in FIG. 40, the accumulator block 472 can be configured in different modes. The accumulator block 472 can be configured to provide different accumulation operations according to a specific vector processing instruction with common accumulator circuitry illustrated in FIG. 40.

The VPEs according to concepts and embodiments discussed herein, may be provided in or integrated into any processor-based device. Examples, without limitation, include a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

Figure 41:
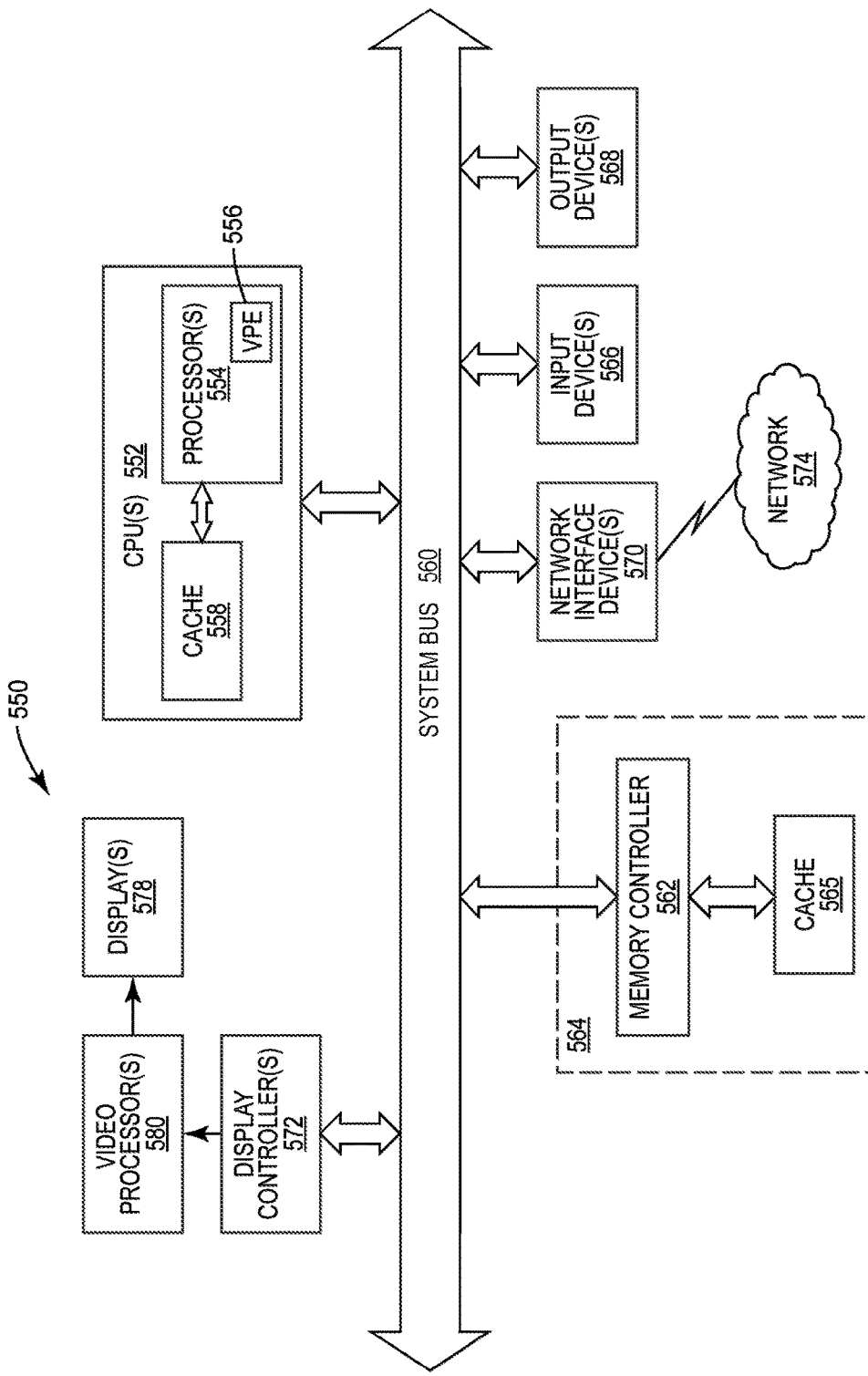
FIG. 41 is a block diagram of an exemplary processor-based system that can include a vector processor that can include the VPEs disclosed herein to provide the vector processing circuits and vector processing operations, according to the embodiments disclosed herein.

In this regard, FIG. 41 illustrates an example of a processor-based system 550. In this example, the processor-based system 550 includes one or more processing units (PUs) 552, each including one or more processors or cores 554. The PU(s) 552 may be the baseband processor 20 in FIG. 2 as a non-limiting example. The processor 554 may be a vector processor like the baseband processor 20 provided in FIG. 2 as a non-limiting example. In this regard, the processor 554 may also include a VPE 556, including but not limited to the execution unit 84 in FIG. 2. The PU(s) 552 may have cache memory 558 coupled to the processor(s) 554 for rapid access to temporarily stored data. The PU(s) 552 is coupled to a system bus 560 and can intercouple master and slave devices included in the processor-based system 550. As is well known, the PU(s) 552 communicates with these other devices by exchanging address, control, and data information over the system bus 560. For example, the PU(s) 552 can communicate bus transaction requests to a memory controller 562 as an example of a slave device. Although not illustrated in FIG. 41, multiple system buses 560 could be provided, wherein each system bus 560 constitutes a different fabric.

Other master and slave devices can be connected to the system bus 560. As illustrated in FIG. 41, these devices can include a memory system 564, one or more input devices 566, one or more output devices 568, one or more network interface devices 570, and one or more display controllers 572, as examples. The memory system 564 can include memory 565 accessible by the memory controller 562. The input device(s) 566 can include any type of input device, including but not limited to input keys, switches, voice processors, etc. The output device(s) 568 can include any type of output device, including but not limited to audio, video, other visual indicators, etc. The network interface device(s) 570 can be any devices configured to allow exchange of data to and from a network 574. The network 574 can be any type of network, including but not limited to a wired or wireless network, a private or public network, a local area network (LAN), a wide local area network (WLAN), and the Internet. The network interface device(s) 570 can be configured to support any type of communication protocol desired.

The PUs 552 may also be configured to access the display controller(s) 572 over the system bus 560 to control information sent to one or more displays 578. The display controller(s) 572 sends information to the display(s) 578 to be displayed via one or more video processors 580, which process the information to be displayed into a format suitable for the display(s) 578. The display(s) 578 can include any type of display, including but not limited to a cathode ray tube (CRT), a liquid crystal display (LCD), a plasma display, etc.

Those of skill in the art will further appreciate that the various illustrative logical blocks, modules, circuits, and algorithms described in connection with the embodiments of dual voltage domain memory buffers disclosed herein may be implemented as electronic hardware, instructions stored in memory or in another computer-readable medium and executed by a processor or other processing device, or combinations of both. The arbiters, master devices, and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a processor, a DSP, an Application Specific Integrated Circuit (ASIC), an FPGA or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. It is to be understood that the operational steps illustrated in the flow chart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A vector processing engine (VPE) configured to provide a filter vector processing operation, comprising:
   at least one vector data file configured to:
      provide an input vector data sample set in at least one input data flow path for a filter vector processing operation;
      receive a resultant filtered output vector data sample set from at least one output data flow path; and
      store the resultant filtered output vector data sample set;
   at least one tapped-delay line provided between the at least one vector data file and at least one execution unit in the at least one input data flow path, the at least one tapped-delay line configured to shift the input vector data sample set by a vector data sample width in a plurality of pipeline registers for each processing stage among a plurality of processing stages equal to a number of filter taps in the filter vector processing operation, to provide a shifted input vector data sample set for each processing stage among the plurality of processing stages; and
   the at least one execution unit provided in the at least one input data flow path, comprising:
      at least one multiplier configured to apply a filter tap operation on the shifted input vector data sample set for each processing stage among the plurality of processing stages, to generate a filter tap output vector data sample set for each filter tap of the filter vector processing operation; and
      at least one accumulator configured to accumulate the filter tap output vector data sample sets in the at least one accumulator for each processing stage among the plurality of processing stages;
   the at least one execution unit configured to provide the resultant filtered output vector data sample set on the at least one output data flow path.

2. The VPE of claim 1, wherein the at least one accumulator is configured to accumulate the filter tap output vector data sample sets for each processing stage among the plurality of processing stages, without the input vector data sample set being re-fetched from the at least one vector data file.

3. The VPE of claim 1, wherein the at least one accumulator is configured to accumulate the filter tap output vector data sample sets for each processing stage among the plurality of processing stages without the input vector data sample set being re-fetched from the at least one vector data file, if a number of input vector data samples in the input vector data sample set is less than the number of filter taps in the filter vector processing operation.

4. The VPE of claim 1, wherein the at least one tapped-delay line is further configured to receive another fetch of an additional input vector data sample set on the at least one input data flow path from the at least one vector data file, if the number of filter taps in the filter vector processing operation is greater than a number of input vector data samples in the input vector data sample set.

5. The VPE of claim 1, wherein the at least one vector data file is configured to:
   provide the input vector data sample set of a width of the at least one vector data file in the at least one input data flow path for the filter vector processing operation; and
   receive the resultant filtered output vector data sample set of the width of the at least one vector data file from the at least one output data flow path to be stored.

6. The VPE of claim 1, wherein:
   the at least one tapped-delay line is further configured to:
      receive the input vector data sample set in the at least one input data flow path from the at least one vector data file into the plurality of pipeline registers; and
      provide each of the shifted input vector data sample sets in the at least one input data flow path to the at least one execution unit for each processing stage among the plurality of processing stages; and
   the at least one execution unit is further configured to receive the shifted input vector data sample sets in the at least one input data flow path from the at least one tapped-delay line for each processing stage among the plurality of processing stages.

7. The VPE of claim 6, wherein:
   the at least one tapped-delay line is configured to:
      provide a first input vector data sample in the at least one input data flow path to the at least one execution unit in a first processing stage among the plurality of processing stages; and
      provide the shifted input vector data sample sets in the at least one input data flow path and to the at least one execution unit in subsequent processing stages among the plurality of processing stages;
   the at least one multiplier configured to multiply a first filter coefficient with the first input vector data sample set to generate a first filter tap output vector data sample set in the first processing stage; and multiply subsequent filter tap coefficients with the shifted input vector data sample sets to generate subsequent filter tap output vector data sample sets in the subsequent processing stages; and the at least one accumulator configured to accumulate the first filter tap output vector data sample set and the subsequent filter tap output vector data sample sets in the at least one accumulator to provide the resultant filtered output vector data sample set.

8. The VPE of claim 6, wherein:

the at least one vector data file is further configured to:
provide the input vector data sample set as the input vector data sample set on at least one tapped-delay line input in the at least one input data flow path; and
receive the resultant filtered output vector data sample set on at least one execution unit output in the at least one output data flow path;

the at least one tapped-delay line is further configured to:
receive the input vector data sample set on the at least one tapped-delay line input in the at least one input data flow path from the at least one vector data file; and
provide each of the shifted input vector data sample sets on at least one execution unit input in the at least one input data flow path to the at least one execution unit for each processing stage among the plurality of processing stages; and the at least one execution unit is further configured to:
receive the shifted input vector data sample set on the at least one execution unit input in the at least one input data flow path from the at least one tapped-delay line for each processing stage among the plurality of processing stages; and
provide the resultant filtered output vector data sample set on the at least one output data flow path in the at least one execution unit output.

9. The VPE of claim 1, wherein the at least one tapped-delay line comprises:

a shadow tapped-delay line configured to:
receive a next input vector data sample set from the at least one vector data file in the at least one input data flow path into a plurality of shadow pipeline registers; and
shift the next input vector data sample set by the vector data sample width in the plurality of shadow pipeline registers for each processing stage into a primary tapped-delay line to provide the shifted input vector data sample set; and the primary tapped-delay line configured to provide the shifted input vector data sample set in the at least one input data flow path to the at least one execution unit for each processing stage in the plurality of processing stages.

10. The VPE of claim 1, further comprising a plurality of input vector data sample selectors, each of the plurality of input vector data sample selectors assigned to a pipeline register among the plurality of pipeline registers in the at least one tapped-delay line;

the plurality of input vector data sample selectors each configured to select among an input vector data sample from the input vector data sample set from the at least one vector data file and an input vector data sample stored in an adjacent pipeline register, to store a shifted input vector data sample in the assigned pipeline register.

11. The VPE of claim 1, wherein the at least one tapped-delay line is configurable to be selectively provided in the at least one input data flow path between the at least one vector data file and the at least one execution unit based on a programmable input data path configuration for the at least one tapped-delay line according to a vector instruction to be executed by the at least one execution unit.

12. The VPE of claim 11, wherein the at least one tapped-delay line is configured to be reconfigured to be selectively provided in the at least one input data flow path based on the programmable input data path configuration for the at least one tapped-delay line according to a next vector instruction to be executed by the at least one execution unit.

13. The VPE of claim 12, wherein the at least one tapped-delay line is configured to be reconfigured to be selectively provided in the at least one input data flow path on each clock cycle of the VPE to be executed by the at least one execution unit.

14. The VPE of claim 1, wherein the at least one execution unit is configurable to process different bit widths of input vector data samples from the input vector data sample set based on a programmable input data flow path configuration for the at least one execution unit.

15. The VPE of claim 1, wherein the at least one execution unit is configured to:

provide real resultant filtered output vector data samples of the resultant filtered output vector data sample set in the at least one output data flow path to be stored together in the at least one vector data file; and provide imaginary resultant filtered output vector data samples of the resultant filtered output vector data sample set in the at least one output data flow path to be stored together in the at least one vector data file separately from the real resultant filtered output vector data samples.

16. The VPE of claim 1, wherein the at least one execution unit is configured to:

provide even resultant filtered output vector data samples of the resultant filtered output vector data sample set in the at least one output data flow path to be stored together in the at least one vector data file; and provide odd resultant filtered output vector data samples of the resultant filtered output vector data sample set in the at least one output data flow path to be stored together in the at least one vector data file separately from the even resultant filtered output vector data samples.

17. The VPE of claim 1, further comprising:

a register file configured to store filter coefficients for the at least one execution unit; and the at least one execution unit further configured to receive a filter tap coefficient from the register file for the filter vector processing operation for each processing stage; and the at least one multiplier further configured to apply the filter tap operation on each of the shifted input vector data sample sets in each processing stage by multiplying in the at least one multiplier, each received input vector data sample set with the received filter tap coefficient for a processing stage to generate a respective filter tap output vector data sample set for each processing stage.

18. The VPE of claim 1, wherein the at least one execution unit is configured to perform the filter vector processing operation comprised of a discrete-time finite impulse response (FIR) filter according to:

$$y[n] = \sum_{l=0}^{l=Y-1} h(l) * x[n-l]$$

where:
x[n] comprises the input vector data sample set;
y[n] comprises the resultant filtered output vector data sample set;
h(l) is comprised of filter coefficients; and
Y is the number of the filter coefficients.

19. An apparatus for performing a filter vector processing operation in a vector processing engine (VPE), comprising:
means for fetching an input vector data sample set from at least one vector data file into at least one input data flow path for a filter vector processing operation;
means for receiving the fetched input vector data sample set in the at least one input data flow path into at least one tapped-delay line provided in the at least one input data flow path between the at least one vector data file and at least one execution unit; and
for each processing stage of a plurality of processing stages in the at least one execution unit, wherein a number of the plurality of processing stages equals a number of filter taps of the filter vector processing operation:
means for shifting the input vector data sample set within the at least one tapped-delay line to a next filter tap for the filter vector processing operation in the input vector data sample set to provide a shifted input vector data sample set as the input vector data sample set, the at least one tapped-delay line configured to shift the input vector data sample set by a vector data sample width in a plurality of pipeline registers for each processing stage among a plurality of processing stages equal to a number of filter taps in the filter vector processing operation;
means for providing the shifted input vector data sample set from the at least one tapped-delay line in the at least one input data flow path to the at least one execution unit in a current processing stage;
means for applying a filter tap operation on the shifted input vector data sample set in the at least one execution unit in the current processing stage to generate a filter tap output vector data sample set;
means for accumulating the filter tap output vector data sample set with a prior resultant filtered output vector data sample set in the current processing stage; and
means for providing the prior resultant filtered output vector data sample set as a resultant filtered output vector data sample set in at least one output data flow path to the at least one vector data file to be stored in the at least one vector data file.

20. A method of performing a filter vector processing operation in a vector processing engine (VPE), comprising:
fetching an input vector data sample set from at least one vector data file into at least one input data flow path for the filter vector processing operation;
receiving the fetched input vector data sample set in the at least one input data flow path into at least one tapped-delay line provided in the at least one input data flow path between the at least one vector data file and at least one execution unit; and
for each processing stage of a plurality of processing stages in the at least one execution unit, wherein a number of the plurality of processing stages equals a number of filter taps of the filter vector processing operation:
shifting the input vector data sample set within the at least one tapped-delay line to a next filter tap for the filter vector processing operation in the input vector data sample set to provide a shifted input vector data sample set as the input vector data sample set, the at least one tapped-delay line configured to shift the input vector data sample set by a vector data sample width in a plurality of pipeline registers for each processing stage among a plurality of processing stages equal to a number of filter taps in the filter vector processing operation;
providing the shifted input vector data sample set from the at least one tapped-delay line in the at least one input data flow path to the at least one execution unit in a current processing stage;
applying a filter tap operation on the shifted input vector data sample set in the at least one execution unit in the current processing stage to generate a filter tap output vector data sample set;
accumulating the filter tap output vector data sample set with a prior resultant filtered output vector data sample set in the current processing stage;
providing the prior resultant filtered output vector data sample set as a resultant filtered output vector data sample set in at least one output data flow path to the at least one vector data file to be stored in the at least one vector data file.

21. The method of claim 20, further comprising, if a number of input vector data samples in the input vector data sample set is less than the number of filter taps in the filter vector processing operation, not re-fetching the input vector data sample set from the at least one vector data file during the filter vector processing operation.

22. The method of claim 20, further comprising if a number of input vector data samples in the input vector data sample set is greater than the number of filter taps in the filter vector processing operation:
fetching a next input vector data sample set from the at least one vector data file into the at least one input data flow path for the filter vector processing operation; and
receiving the next fetched input vector data sample set in the at least one input data flow path from the at least one vector data file into the at least one tapped-delay line.

23. The method of claim 20, further comprising:
receiving a next input vector data sample set from the at least one vector data file in the at least one input data flow path into a plurality of shadow pipeline registers; and shifting the next input vector data sample set by a vector data sample width in the plurality of shadow pipeline registers for each processing stage into a primary tapped-delay line to provide the shifted input vector data sample set;
the primary tapped-delay line configured to provide the shifted input vector data sample set in the at least one input data flow path to the at least one execution unit for each processing stage in the plurality of processing stages.

24. The method of claim 20, further comprising selecting between an input vector data sample from the input vector data sample set from the at least one vector data file and an input vector data sample stored in an adjacent pipeline register in the at least one tapped-delay line, to store the shifted input vector data sample set in the adjacent pipeline register among a plurality of pipeline registers in the at least one tapped-delay line.

25. The method of claim 20, further comprising selectively providing the at least one tapped-delay line in the at least one input data flow path between the at least one vector data file and the at least one execution unit based on a programmable input data path configuration for the at least one tapped-delay line according to a vector instruction to be executed by the at least one execution unit.

26. The method of claim 25, further comprising reconfiguring the at least one tapped-delay line to be selectively provided in the at least one input data flow path based on the programmable input data path configuration for the at least one tapped-delay line according to a next vector instruction to be executed by the at least one execution unit.

27. The method of claim 26, comprising reconfiguring the at least one tapped-delay line to be selectively provided in the at least one input data flow path on each clock cycle of the VPE to be executed by the at least one execution unit.

28. The method of claim 20, further comprising processing different bit widths of input vector data samples from the input vector data sample set in the at least one execution unit based on a programmable input data flow path configuration for the at least one execution unit.

29. The method of claim 20, wherein providing the prior resultant filtered output vector data sample set as the resultant filtered output vector data sample set comprises:

providing real resultant filtered output vector data samples of the resultant filtered output vector data sample set in the at least one output data flow path to be stored together in the at least one vector data file; and providing imaginary resultant filtered output vector data samples of the resultant filtered output vector data sample set in the at least one output data flow path to be stored together in the at least one vector data file separately from the real resultant filtered output vector data samples.

30. The method of claim 20, wherein providing the prior resultant filtered output vector data sample set as the resultant filtered output vector data sample set comprises:

providing even resultant filtered output vector data samples of the resultant filtered output vector data sample set in the at least one output data flow path to be stored together in the at least one vector data file; and providing odd resultant filtered output vector data samples of the resultant filtered output vector data sample set in the at least one output data flow path to be stored together in the at least one vector data file separately from the even resultant filtered output vector data samples.

* * * * *